US012711368B1

(12) United States Patent
Tang et al.

(10) Patent No.: US 12,711,368 B1
(45) Date of Patent: Aug. 18, 2026

(54) NEURAL NETWORK SYSTEM FOR OBJECT IDENTIFICATION

(71) Applicant: NVIDIA Corporation, Santa Clara, CA (US)

(72) Inventors: Zheng Tang, Seattle, WA (US); Stan Birchfield, Sammamish, WA (US); William Heyward Hodge, Seattle, WA (US); FNU Ratnesh Kumar, Campbell, CA (US); Milind Naphade, Cupertino, CA (US); Jonathan Tremblay, Redmond, WA (US); Shuo Wang, Santa Clara, CA (US); Xiaodong Yang, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 638 days.

(21) Appl. No.: 16/442,375

(22) Filed: Jun. 14, 2019

(51) Int. Cl.

| | |
|---|---|
| ***G06K 9/62*** | (2022.01) |
| ***G06F 18/24*** | (2023.01) |
| ***G06N 3/08*** | (2023.01) |
| ***G06V 20/54*** | (2022.01) |
| ***G06V 20/64*** | (2022.01) |

(52) U.S. Cl.
CPC ............... *G06N 3/08* (2013.01); *G06F 18/24* (2023.01); *G06V 20/54* (2022.01); *G06V 20/64* (2022.01)

(58) Field of Classification Search
CPC ........ G06N 3/08; G06N 3/0454; G06N 3/045; G06V 20/64; G06V 20/00; G06V 20/584; G06V 20/597; G06K 9/6267; G06K 9/6262; B60R 1/00; G05D 1/0246; G06F 18/24133
USPC ............................................... 348/148; 701/1
See application file for complete search history.

(56) References Cited

U.S. PATENT DOCUMENTS

| | | | | |
|---|---|---|---|---|
| 2013/0231824 | A1* | 9/2013 | Wilson | G05D 1/0246 701/1 |
| 2015/0350607 | A1* | 12/2015 | Kim | B60R 1/00 348/148 |
| 2018/0336434 | A1* | 11/2018 | Kicanaoglu | G06F 18/24133 |
| 2018/0341706 | A1* | 11/2018 | Agrawal | G06V 20/597 |
| 2019/0077398 | A1* | 3/2019 | Kusano | G06V 20/584 |
| 2019/0279292 | A1* | 9/2019 | Tang | G06K 9/6262 |
| 2019/0347515 | A1* | 11/2019 | Kehl | G06N 3/0454 |
| 2020/0020117 | A1* | 1/2020 | Daehler | G06N 3/045 |

OTHER PUBLICATIONS

"Unreal Engine 5," retrieved from https://www.unrealengine.com/en-US/unreal-engine-5, 2005, 20 pages.
Amdriluka et al., "2D Human Pose Estimation: New Benchmark and State of the Art Analysis," CVPR, 2014, 8 pages.
Ansari et al., "The Earth ain't Flat: Monocular Reconstruction of Vehicles on Steep and Graded Roads from a Moving Camera," IROS, 2018, 8 pages.

(Continued)

*Primary Examiner* — Abdul-Samad A Adediran
(74) *Attorney, Agent, or Firm* — Davis Wright Tremaine LLP

(57) ABSTRACT

Apparatuses, systems, and techniques to identify objects in an image. In at least one embodiment, one or more neural networks identify the objects using pose information of the objects and visible properties of the objects.

37 Claims, 44 Drawing Sheets

(56) References Cited

OTHER PUBLICATIONS

Bai et al., "Group Sensitive Triplet Embedding for Vehicle Re-Identification," IEEE Transactions on Multimedia, 20(9): Sep. 2018, 15 pages.
Chebotar et al., "Closing the Sim-to-Real Loop: Adapting Simulation Randomization with Real World Experience," 2019 IEEE International Conference on Robotics and Automation (ICRA), May 20, 2019, 9 pages.
Deng et al. "Imagenet: A Large-Scale Hierarchical Image Database," ICLR, 2009, 8 pages.
He et al., "Deep Residual Leaming for Image Recognition," CVPR, 2016, 9 pages.
Hermans et al., "In Defense of the Triplet Loss for Person Re-Identification," Nov. 21, 2017, 17 pages.
Huang et al., "Densely Connected Convolutional Networks," In The IEEE Conference on Computer Vision and Pattern Recognition (CVPR), Jul. 2017, 9 pages.
IEEE, "IEEE Standard 754-2008 (Revision of IEEE Standard 754-1985): IEEE Standard for Floating-Point Arithmetic," Aug. 29, 2008, 70 pages.
James et al., "Transferring End-to-End Visuomotor Control from Simulation to Real World for a Multi-Stage Task," Oct. 17, 2017, 10 pages.
Kingma et al. "Adam: A Method for Stochastic Optimization," Dec. 22, 2014, 9 pages.
Kumar et al., "Vehicle Reidentification: An Efficient Baseline using Triplet Embedding," IJCNN, 2019, 12 pages.
Kundu et al., 3D-RCNN: Instance-Level 3D Object Reconstruction via Render-and-Compare, CVPR, 2018, 10 pages.
Lin et al., "Improving Person Re-Identification by Attribute and Identity Learning," Apr. 16, 2017, 10 pages.
Liu et al., "A Deep Learning-Based Approach to Progressive Vehicle Re-Identification for Urban Surveillance," ECCV, 2016, 16 pages.
Liu et al., "Deep Relative Distance Learning: Tell the Difference Between Similar Vehicles," CVPR, 2016, 9 pages.
Liu et al., "PROVID: Progressive and Multimodal Vehicle Reidentification for Large-Scale Urban Surveillance," IEEE Transactions on Multimedia, 20(3): 2017, 14 pages.
Maaten, "Accelerating t-SNE Using Tree-Based Algorithms," Journal of Machine Learning Research, 15(1): 2014, 25 pages.
Mayer et al., "A Large Dataset to Train Convolutional Networks for Disparity, Optical Flow, and Scene Flow Estimation," CVPR, 2016, 9 pages.
Mousavian et al., "3D Bounding Box Estimation using Deep Learning and Geometry," CVPR, 2017, 10 pages.
Naphade et al., "AI City Challenge," retrieved from https://www.aicitychallenge.org/, 2019, 10 pages.
Naphade et al., The 2018 Nvidia AI City Challenge. CVPR Workshop, 2018, 8 pages.
Newell et al., "Stacked Hourglass Networks for Human Pose Estimation," In European Conference on Computer Vision, Jul. 26, 2016, 17 pages.
Prakash et al., "Structured Domain Randomization: Bridging the Reality Gap by Contextaware Synthetic Data," ICRA, 2018, 7 pages.
Sener et al., "Multi-Task Learning as Multi-Objective Optimization," NeurIPS, 2018, 12 pages.
Shen et al., "Learning Deep Neural Networks for Vehicle Re-ID with Visual-Spatiotemporal Path Proposals," ICCV, 2017, 10 pages.
Society of Automotive Engineers On-Road Automated Vehicle Standards Committee, "Taxonomy and Definitions for Terms Related to Driving Automation Systems for On-Road Motor Vehicles," Standard No. J3016-201609, Sep. 30, 2016, 30 pages.
Society of Automotive Engineers On-Road Automated Vehicle Standards Committee, "Taxonomy and Definitions for Terms Related to Driving Automation Systems for On-Road Motor Vehicles," Standard No. J3016-201806, issued Jan. 2014, revised Jun. 2018, 35 pages.
Sun et al., "Deep High-Resolution Representation Learning for Human Pose Estimation," CVPR, 2019, 11 pages.
Sundermeyer et al., "Implicit 3D Orientation Learning for 6D Object Detection from RGB Images," ECCV, 2018, 17 pages.
Szegedy et al., "Going Deeper with Convolutions," CVPR, 2015, 9 pages.
Szegedy et al., "Rethinking the Inception Architecture for Computer Vision," CVPR, 2016, 9 pages.
Tan et al., "Sim-to-real: Learning Agile Locomotion for Quadruped Robots," CoRL, 2018, 11 pages.
Tang et al., "CityFlow: A City-Scale Benchmark for Multi-Target Multicamera Vehicle Tracking and Re-Identification," CVPR, 2019, 10 pages.
Tang et al., "Multiple-Kernel Based Vehicle Tracking Using 3D Deformable Model and Camera Self-Calibration," 2017, 6 pages.
Tang et al., "Single-Camera and Inter-Camera Vehicle Tracking and 3D Speed Estimation Based on Fusion of Visual and Semantic Features," CVPRW, 2018, 8 pages.
To et al., "NDDS: Nvidia Deep Learning Dataset Synthesizer," Jun. 21, 2018, 41 pages.
Tobin et al., "Domain Randomization for Transferring Deep Neural Networks from Simulation to the Real World," IEEE/RSJ International Conference on Intelligent Robots and Systems (IROS), Mar. 20, 2017, pp. 23-30.
Tremblay et al., "Deep Object Pose Estimation for Semantic Robotic Grasping of Household Objects," Conference on Robot Learning, Sep. 27, 2018, 11 pages.
Tremblay et al., Training Deep Networks with Synthetic Data: Bridging the Reality Gap by Domain Randomization, CVPR, 2018, 9 pages.
Wang et al., "Orientation Invariant Feature Embedding and Spatial Temporal Regularization for Vehicle Reidentification," ICCV, 2017, 9 pages.
Wen et al., "A Discriminative Feature Learning Approach for Deep Face Recognition," ECCV, 2016, 17 pages.
Xu et al., "Empirical Evaluation of Rectified Activations in Convolutional Network," 2015, 5 pages.
Yan et al., "Exploiting Multi-Grain Ranking Constraints for Precisely Searching Visually-Similar Vehicles," ICCV, 2017, 9 pages.
Zheng et al., "Scalable Person Re-identification: A Benchmark," ICCV, 2015, 9 pages.
Zhou et al., "Viewpoint-Aware Attentive Multi-View Inference for Vehicle Re-Identification," CVPR, 2018, 10 pages.
Zhou, "Deep-Person-Reid," GitHub, retrieved from https://github.com/KaiyangZhou/deep-person-reid, 2019, 10 pages.

* cited by examiner

NEURAL NETWORK SYSTEM FOR OBJECT IDENTIFICATION

FIELD

Embodiments relate generally to computer processors. More specifically, embodiments relate to computer processors for object identification.

BACKGROUND

Neural network-based object identification can suffer from lack of accuracy due to an object's capacity to have a differing shape and appearance from different viewpoints, and due to differing objects sometimes having similar shape and appearance in a single viewpoint.

Capabilities for neural networks to effectively deal with these issues can be improved.

DETAILED DESCRIPTION

Figure 1:
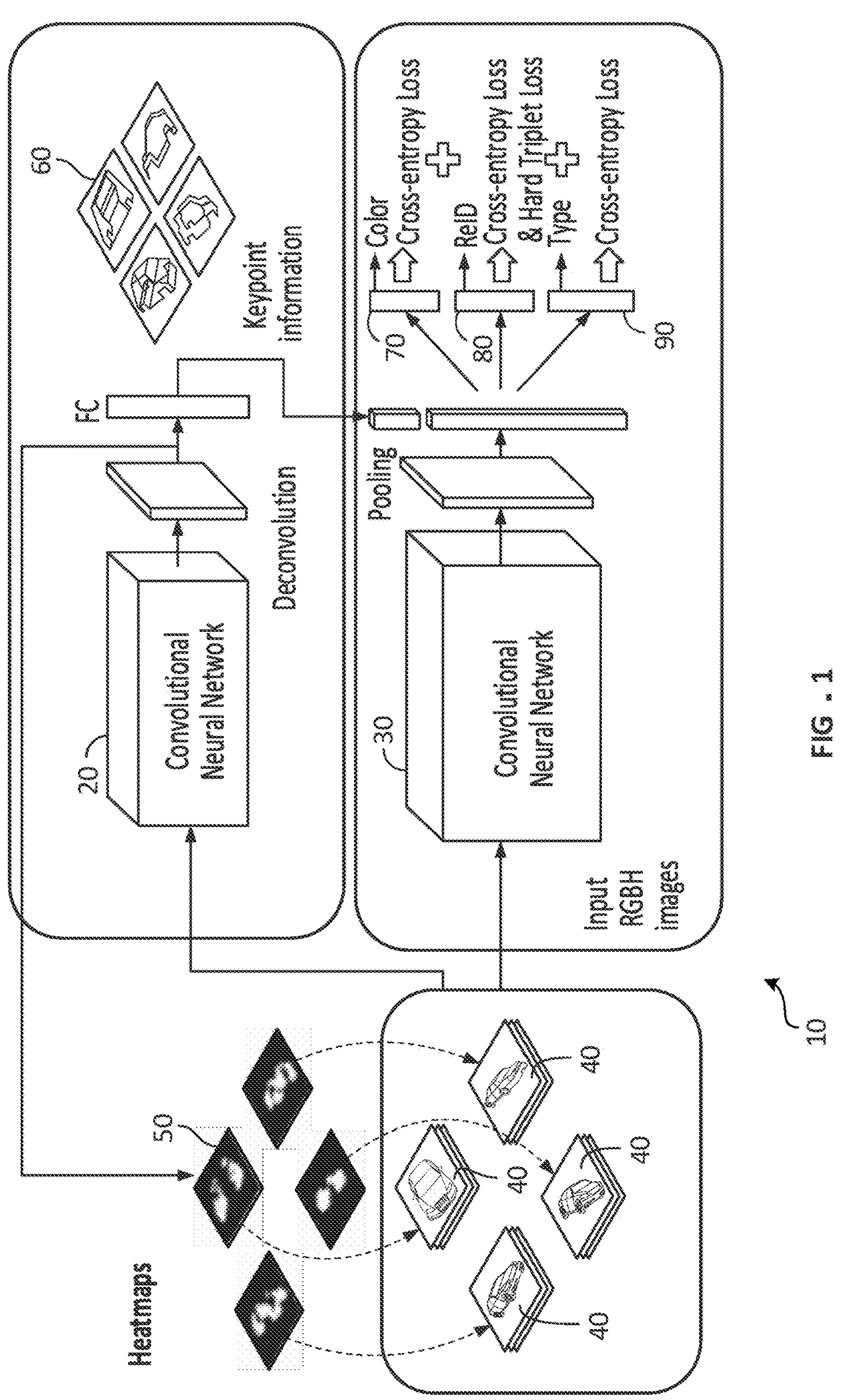
FIG. 1 illustrates a diagram of neural network operation in object identification, according to at least one embodiment.

FIG. 1 illustrates a diagram of neural network operation in object identification, according to at least one embodiment. In at least one embodiment, system 10 of FIG. 1 includes a first neural network 20 that receives object images as input and outputs object pose or orientation information. In at least one embodiment, system 10 also includes a second neural network 30 that receives both object images and pose output of a first neural network 20 and classifies objects accordingly.

In at least one embodiment, first neural network 20 is a convolutional neural network. In at least one embodiment, first neural network 20 is a convolutional neural network of any depth. In at least one embodiment, first neural network 20 is any sufficiently deep neural network, a multilayer perceptron, a recurrent neural network, or any other type of neural network suitable for object recognition. In at least one embodiment, first neural network 20 receives object images as input. In at least one embodiment, first neural network 20 has a 3-channel input for receiving red, green, and blue channels of a visible light image of an object. In at least one embodiment, network 20 is programmed and trained to apply a keypoint-based deformable model of an object to output a set of heatmaps 50 from a deconvolution layer of network 20, and to output corresponding keypoints 60 from a fully connected (FC) layer of network 20. In at least one embodiment, this deconvolution layer outputs a heatmap 50 from which each keypoint 60 is determined, where keypoints 60 are locations of designated portions of an object, and corresponding heatmaps 50 show likelihoods of their keypoint 60 being at each position or pixel of object image. In at least one embodiment, designated portions of an object are predetermined characteristic visible elements of an object. In at least one embodiment, an object is a vehicle with predetermined visible elements of any type, such as wheels, a hood, roof, windows, and bumpers. In at least one embodiment, keypoints are points that may be used to represent each visible element. In at least one embodiment, keypoints are characteristic positions of each visible element such as area centers of wheels, and corners of a hood.

In at least one embodiment, heatmaps 50 output from a deconvolution layer of network 20 are appended to a visible light image of their corresponding object, to form an augmented visible light image that has both visible light channels and a heatmap channel. In at least one embodiment, such augmented images have red, green, blue, and heatmap channels. In at least one embodiment, keypoints 60 output from FC layer of network 20 are maximum likelihood positions of heatmaps 50. In at least one embodiment, keypoints 60 describe likeliest positions of various portions of an object shown in an input image. In at least one embodiment, one of ordinary skill will thus observe that keypoints 60, and heatmaps 50 from which keypoints 60 are derived, show relative locations of various components of an object, which collectively indicate pose or orientation of an object.

In at least one embodiment, second neural network 30 is a convolutional neural network, although any type of neural network may be employed. In at least one embodiment, second neural network 30 receives as input augmented object images. In at least one embodiment, second neural network 30 has a 8-channel input whose inputs are red, green, and blue channels for receiving red, green, and blue channels respectively of a visible light image, and a heatmap channel for receiving a heatmap 50 of one or more objects in this visible light image. In at least one embodiment, second neural network 30 is trained to output, from its pooling layer, a vector of features of an object in an input image. In at least one embodiment, keypoints 60 output from FC layer of first neural network 20 are appended to this feature vector to form an augmented feature vector which contains both features and keypoints 60 of an object in an input image.

In at least one embodiment, this augmented feature vector is input to FC layer of second neural network 30, which includes three different classifiers: a color classifier 70, an identification classifier 80, and a type classifier 90. In at least one embodiment, color classifier 70 is a classifier trained to output similarity scores corresponding to how closely an input image object matches each color of a predetermined set of colors. In at least one embodiment, type classifier 90 is a classifier trained to output similarity scores corresponding to how closely an input image object matches each of a predetermined set of object types. In at least one embodiment, identification classifier 80 is a classifier trained to output similarity scores corresponding to how closely an input image object matches each of a predetermined set of object classes. In at least one embodiment, these colors, types, and classes may be any colors, types, and classes into which an object can be categorized. In at least one embodiment, objects may be anything capable of representation in an image, including without limitation plants, animals, any portions thereof, any physical object including without limitation manmade and natural objects of any size and shape, and any representation of any object real or imagined, including without limitation drawings, paintings, and computer generated images. In at least one embodiment, objects may be vehicles, with colors being colors such as black, red, white or similar, types being vehicle types such as car, motorcycle, bus, train, plane, truck, boat, or similar, and classes being vehicle classes such as makes and models.

Figure 2:
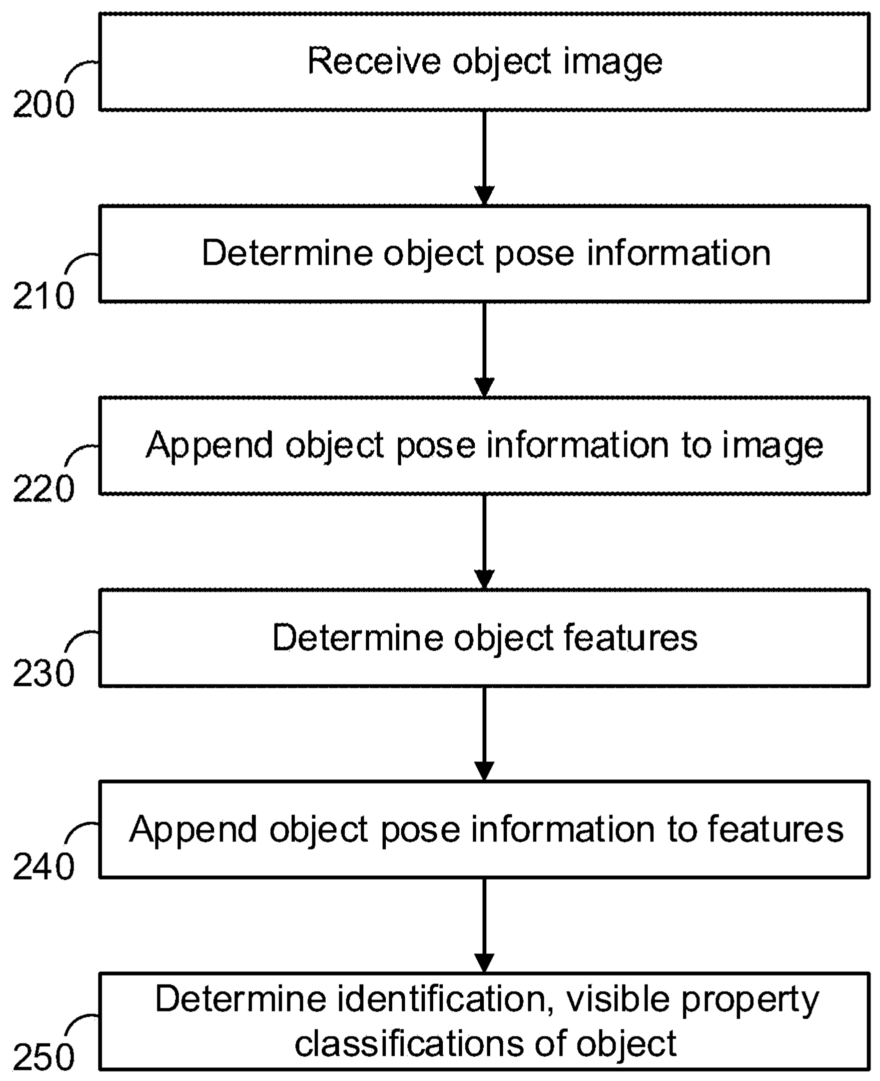
FIG. 2 is a flowchart illustrating an object identification process according to at least one embodiment.

FIG. 2 is a flowchart illustrating an object identification process according to at least one embodiment. In at least one embodiment, neural network 20 first receives an image of an object (Step 240). In at least one embodiment, an image is a red, green, and blue (RGB) visible light image of an object. Object pose information is then determined (Step 250). In at least one embodiment, this pose information includes keypoints of an object and corresponding heatmaps. In at least one embodiment, hidden layers of neural network 20 are trained to extract features of an input image using suitable kernels for convolution, with output of a deconvolution layer being a set of heatmaps describing a probability that each point in an image is a point representative of a particular object feature. In at least one embodiment, heatmaps are transmitted to FC layer of network 20, which outputs keypoints 60 corresponding to its heatmaps. In at least one embodiment, heatmaps of an object are also added or superposed to generate a single collective heatmap 50 which is appended to its input image, thereby creating an input image with added pose information (Step 260). In at least one embodiment, object features are then determined (Step 270). In at least one embodiment, this augmented image is then input to neural network 30, whose hidden layers are trained to extract features of this augmented image and output a vector of such features. In at least one embodiment, keypoints 60, which are another form of pose information, are appended to this output feature vector (Step 280), which is in turn sent to each classifier 70, 80, and 90. In at least one embodiment, classifiers 70, 80, 90 determine an identification and visible property classifications of objects (Step 290). In at least one embodiment, classifiers 70, 80, 90 respectively produce, from their input vector, a color, class or identification, and type classification of objects shown in input images. In this manner, pose information submitted as input to neural networks 20, 30 allows these neural networks 20, 30 to consider object orientation or viewpoint, which in turn allows networks 24, 30 to account for differing object shape in differing viewpoints, thus increasing system accuracy. In at least one embodiment, color and type information is further provided to increase accuracy. In at least one embodiment, color and type classifications are also used in training neural network 30 to further increase its accuracy. In at least one embodiment, any object pose information may be appended at Step 260, such as heatmaps, keypoints, or any other suitable information conveying object orientation. In at least one embodiment, any object pose information may be appended at Step 280, such as heatmaps, keypoints, or any other suitable information conveying object orientation.

Computer Systems

Figure 3:
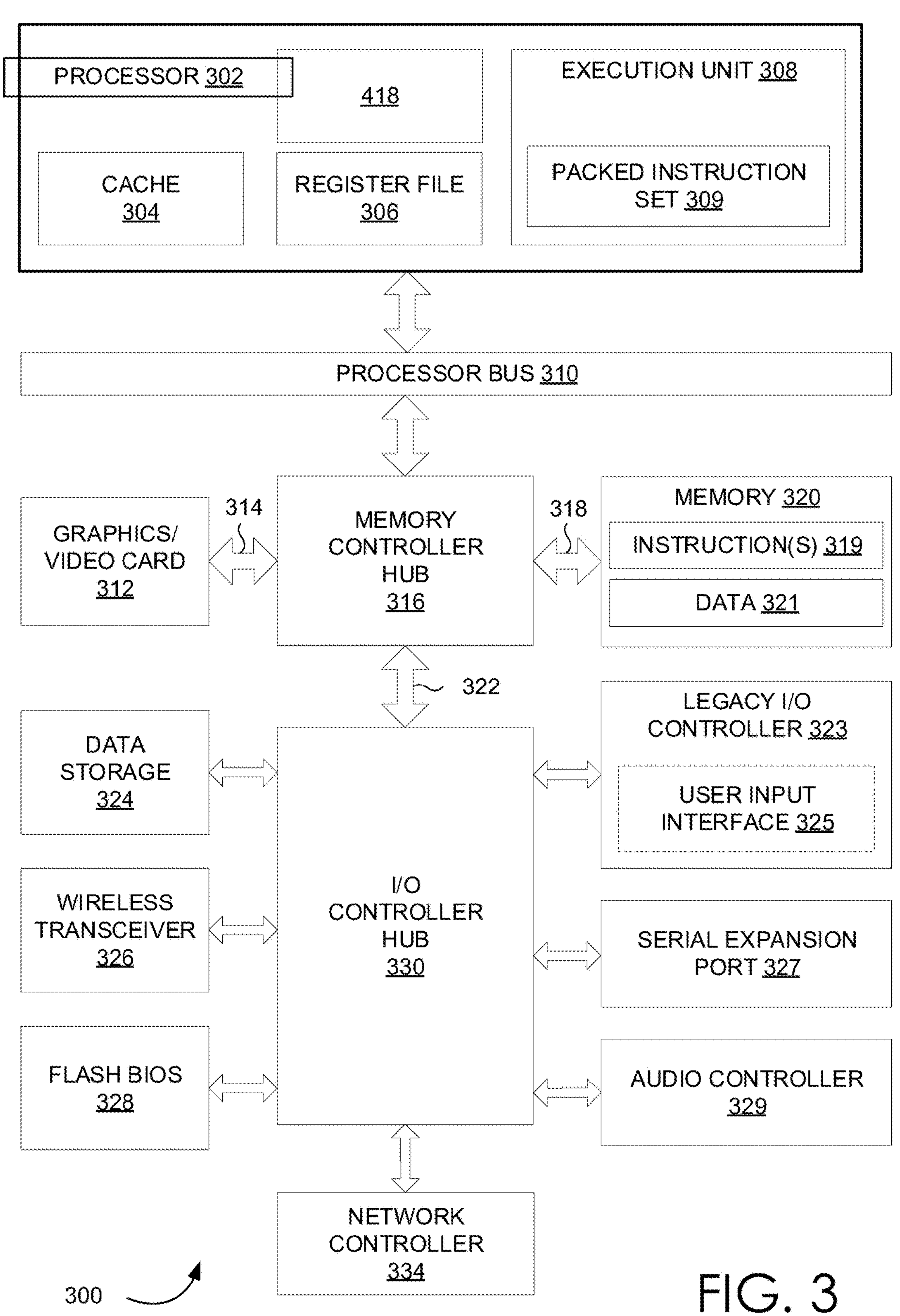
FIG. 3 is a block diagram illustrating a computer system, according to at least one embodiment.

FIG. 3 is a block diagram illustrating an exemplary computer system, which may be a system with interconnected devices and components, a system-on-a-chip (SOC) or some combination thereof 300 formed with a processor that may include execution units to execute an instruction, according to at least one embodiment. In at least one embodiment, computer system 300 may include, without limitation, a component, such as a processor 302 to employ execution units including logic to perform algorithms for processing data, in accordance with present disclosure, such as in an embodiment described herein. In at least one embodiment, computer system 300 may include processors, such as an NVIDIA® GeForce™ or Tesla™ graphics processing unit (GPU), a PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 300 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 300 may include, without limitation, processor 302 that may include, without limitation, one or more execution units 308 to perform machine learning model training and/or inferencing according to techniques described herein. In at least one embodiment, system 3 is a single processor desktop or server system, but in another embodiment system 3 may be a multiprocessor system. In at least one embodiment, processor 302 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 302 may be coupled to a processor bus 310 that may transmit data signals between processor 302 and other components in computer system 300.

In at least one embodiment, processor 302 may include, without limitation, a Level 1 ("L1") internal cache memory ("cache") 304. In at least one embodiment, processor 302 may have a single internal cache or multiple levels of internal cache. In at least one embodiment, cache memory may reside external to processor 302. Other embodiments may also include a combination of both internal and external caches depending on particular implementation and needs. In at least one embodiment, register file 306 may store different types of data in various registers including, without limitation, integer registers, floating point registers, status registers, and instruction pointer register.

In at least one embodiment, execution unit 308, including, without limitation, logic to perform integer and floating point operations, also resides in processor 302. Processor 302 may also include a microcode ("ucode") read only memory ("ROM") that stores microcode for certain macro instructions. In at least one embodiment, execution unit 308 may include logic to handle a packed instruction set 309. In at least one embodiment, by including packed instruction set 309 in instruction set of a general-purpose processor 302, along with associated circuitry to execute instructions, operations used by many multimedia applications may be performed using packed data in a general-purpose processor 302. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 308 may also be used in microcontrollers, embedded processors, graphics devices, DSPs, and other types of logic circuits. In at least one embodiment, computer system 300 may include, without limitation, a memory 320. In at least one embodiment, memory 320 may be implemented as a Dynamic Random Access Memory ("DRAM") device, a Static Random Access Memory ("SRAM") device, flash memory device, or other memory device. Memory 320 may store instruction(s) 319 and/or data 321 represented by data signals that may be executed by processor 302.

In at least one embodiment, system logic chip may be coupled to processor bus 310 and memory 320. In at least one embodiment, system logic chip may include, without limitation, a memory controller hub ("MCH") 316, and processor 302 may communicate with MCH 316 via processor bus 310. In at least one embodiment, MCH 316 may provide a high bandwidth memory path 318 to memory 320 for instruction and data storage and for storage of graphics commands, data and textures. In at least one embodiment, MCH 316 may direct data signals between processor 302, memory 320, and other components in computer system 300 and to bridge data signals between processor bus 310, memory 320, and a system I/O 322. In at least one embodiment, system logic chip may provide a graphics port for coupling to a graphics controller. In at least one embodiment, MCH 316 may be coupled to memory 320 through a high bandwidth memory path 318 and graphics/video card 312 may be coupled to MCH 316 through an Accelerated Graphics Port ("AGP") interconnect 314.

In at least one embodiment, computer system 300 may use system I/O 322 that is a proprietary hub interface bus to couple MCH 316 to I/O controller hub ("ICH") 330. In at least one embodiment, ICH 330 may provide direct connections to some I/O devices via a local I/O bus. In at least one embodiment, local I/O bus may include, without limitation, a high-speed I/O bus for connecting peripherals to memory 320, chipset, and processor 302. Examples of such peripherals may include, without limitation, an audio controller 329, a firmware hub ("flash BIOS") 328, a wireless transceiver 326, a data storage 324, a legacy I/O controller 323 containing user input and keyboard interfaces, a serial expansion port 327, such as Universal Serial Bus ("USB"), and a network controller 334. In at least one embodiment, data storage 324 may comprise a hard disk drive, a floppy disk drive, a CD-ROM device, a flash memory device, or other mass storage device.

In at least one embodiment, FIG. 3 illustrates a system, which includes interconnected hardware devices or "chips", whereas in other embodiments, FIG. 3 may illustrate an exemplary System on a Chip ("SoC"). In at least one embodiment, devices illustrated in FIG. 3 may be interconnected with proprietary interconnects, standardized interconnects (for example, PCIe) or some combination thereof. In at least one embodiment, one or more components of system 300 are interconnected using compute express link (CXL) interconnects.

Inference and/or training logic 818 are used to perform inferencing and/or training operations associated with any one or more embodiments. Details regarding inference and/or training logic 818 are provided below in conjunction with FIGS. 11A and/or 11B. In at least one embodiment, inference and/or training logic 818 may be used in a system of FIG. 3 for inferencing or predicting operations based, at least in part, on weight parameters calculated using neural network training operations, neural network architectures, functions used in a neural network, or neural network use cases described herein.

Figure 4A:
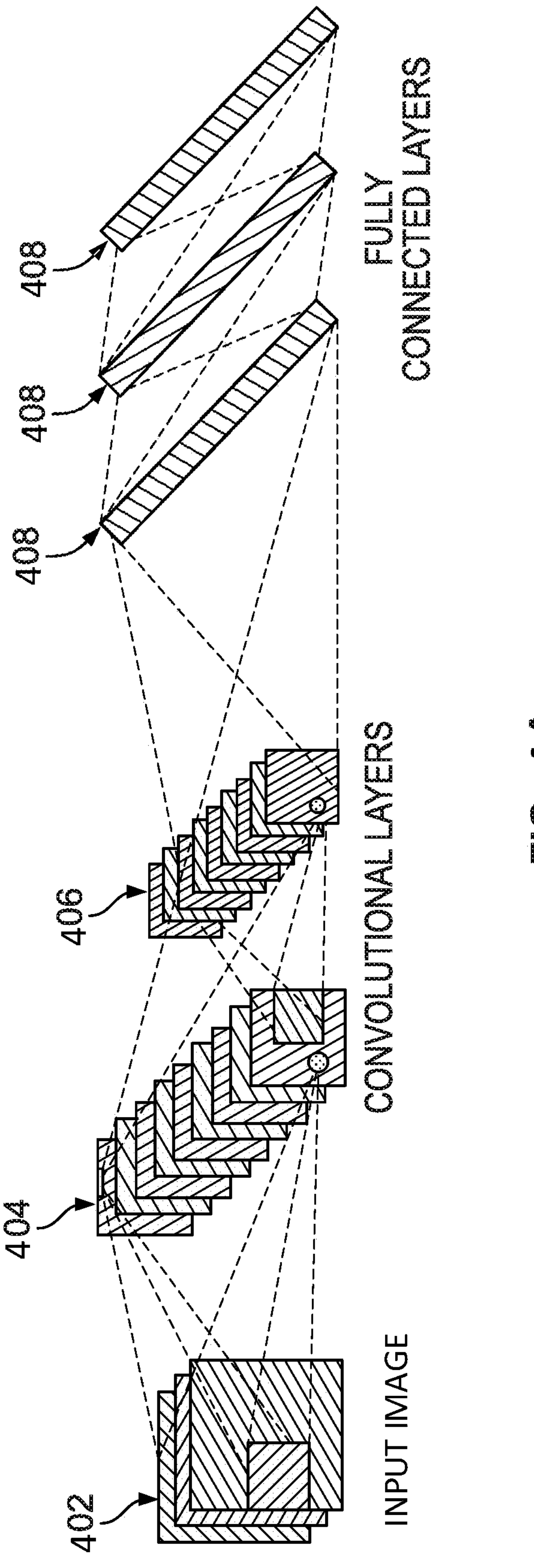
FIGS. 4A-4B illustrate an exemplary convolutional neural network, according to at least one embodiment.
Figure 4B:
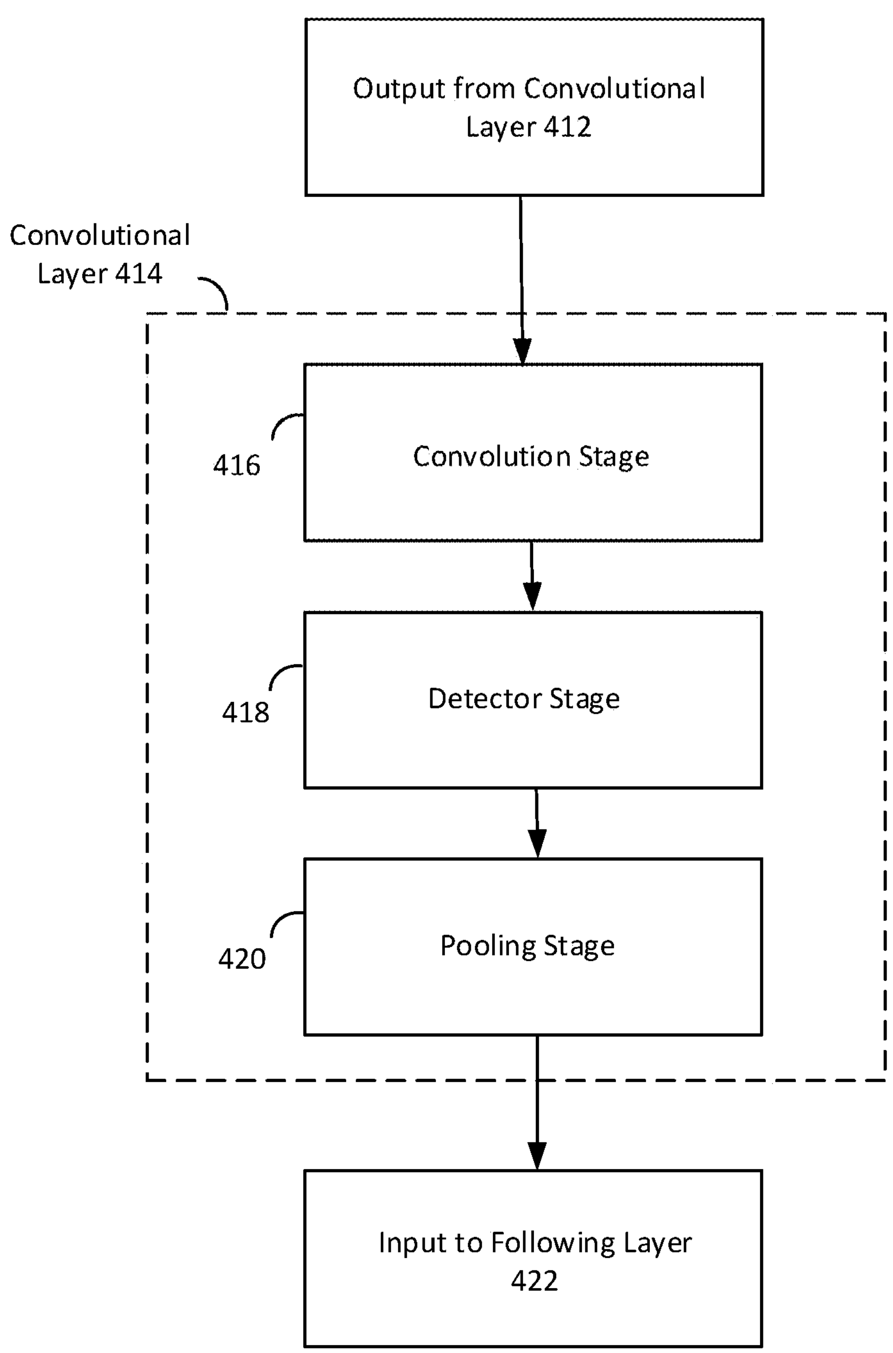

FIGS. 4A-4B illustrate an exemplary convolutional neural network, according to at least one embodiment. FIG. 4A illustrates various layers within a convolutional neural network. In at least one embodiment, and as illustrated in FIG. 4A, a convolutional neural network used to model image processing receives input 402 describing red, green, and blue components of an input image. In at least one embodiment, input 402 is any input image having any type and number of planes, such as an image having various color planes as well as other image types such as pose information. In at least one embodiment, input 402 can be processed by multiple convolutional layers, such as convolutional layer 404 and convolutional layer 406. In at least one embodiment, output from these multiple convolutional layers may be processed by a set of optional fully connected layers 408. In at least one embodiment, neurons in a fully connected layer may have full connections to all activations in their previous layer. In at least one embodiment, neurons in a fully connected layer need not have full connections to all activations in their previous layer. Output from fully connected layers 408 can be used to generate an output result. In at least one embodiment, activations within fully connected layers 408 can be computed using matrix multiplication instead of convolution. In at least one embodiment, not all convolutional neural network implementations make use of fully connected layers 406. In at least one embodiment, for instance, output of convolutional layer 406 may be output for its convolutional neural network.

In at least one embodiment, convolutional layers may be fully connected, such that every output unit interacts with every subsequent input. In at least one embodiment, convolutional layers may be less than fully connected or may be sparsely connected. Convolutional layers may for example be sparsely connected because convolution output of a field is input (instead of a respective state value of each node in a field) to nodes of a subsequent layer, as shown in FIG. 4A. In at least one embodiment, kernels associated with convolutional layers perform convolution operations whose output is sent to a following layer. In at least one embodiment, resulting dimensionality reduction allows convolutional neural networks to more efficiently process large images.

In at least one embodiment, a neural network may include parameters, such as weight and bias values as described above, which may be loaded into hardware, such as arithmetic logic units (ALUs), according to software, such as graph code, according to an architecture of a neural network. In at least one embodiment, graph code is executed to configure ALUs in a manner to implement neural network functions described herein. In at least one embodiment, graph code contains instructions for loading each layer of a neural network into ALUs as a series of computation stages that are executed sequentially. FIG. 4B illustrates exemplary computation stages within a convolutional layer of a convolutional neural network. In at least one embodiment, output of a convolutional layer 412 of a convolutional neural network can be processed in three stages of a convolutional layer 414. In at least one embodiment, these three stages can include a convolution stage 416, a detector stage 418, and a pooling stage 420. In at least one embodiment, convolution layer 414 can then output data to a successive convolutional layer. In at least one embodiment, a final convolutional layer of a network can generate, for example, output feature map data or provide input to a fully connected layer to generate a classification value for input to a convolutional neural network.

In at least one embodiment of convolution stage 416, convolutional layer 414 can perform several convolutions in parallel to produce a set of linear activations. In at least one embodiment, convolution stage 416 can include an affine transformation, which is any transformation that can be specified as a linear transformation plus a translation. Affine transformations include, for example, rotations, translations, scaling, and any combinations of these transformations. In at least one embodiment, convolution stage 416 computes an output of functions, such as neurons, that are associated with specific regions in an input to its convolutional neural network. In at least one embodiment, stage 416 computes outputs of neurons associated with specific regions of an input image. In at least one embodiment, neurons compute a dot product between a weight value and a region of an input to which these neurons are associated. In at least one embodiment, output from convolution stage 416 defines a set of linear activations that are processed by successive stages of convolutional layer 414.

In at least one embodiment, these linear activations can be processed by a detector stage 418. In at least one embodiment of detector stage 418, each linear activation is processed by a non-linear activation function. This non-linear activation function increases nonlinear properties of its overall network without affecting receptive fields of a convolution layer. Several types of non-linear activation functions may be used. In at least one embodiment, a rectified linear unit (ReLU) is used, which uses an activation function defined as f(x)=max(0, x), such that activation is capped at zero.

In at least one embodiment, pooling stage 420 uses a pooling function that replaces output of convolutional layer 406 with a summary statistic of nearby outputs. In at least one embodiment, a pooling function can be used to introduce translation invariance into its neural network, such that small translations to input do not change pooled outputs. In at least one embodiment, invariance to local translation can be useful when a presence of a feature in input data is more important than a precise location of this feature. In at least one embodiment, any types of pooling functions can be used in pooling stage 420, including max pooling, average pooling, and 12-norm pooling. In at least one embodiment, pooling is optional and may or may not be included. In at least one embodiment, implementations without pooling can substitute an additional convolution stage having an increased stride relative to previous convolution stages.

In at least one embodiment, output from convolutional layer 414 can then be processed by next layer 422. In at least one embodiment, next layer 422 can be an additional convolutional layer or one of multiple fully connected layers 408. For example, in at least one embodiment, first convolutional layer 404 of FIG. 4A can output to second convolutional layer 406, while second convolutional layer 406 can output to a first layer of fully connected layers 408.

In at least one embodiment, graph code contains instructions for loading each convolutional layer 412 to data storage 1505. In at least one embodiment, graph code contains inference code instructing ALUs 1510 to execute each convolutional layer 412, retrieving it from data storage 1505 and performing requisite mathematical operations of each stage 416, 418, and 420 as described above.

Figure 5:
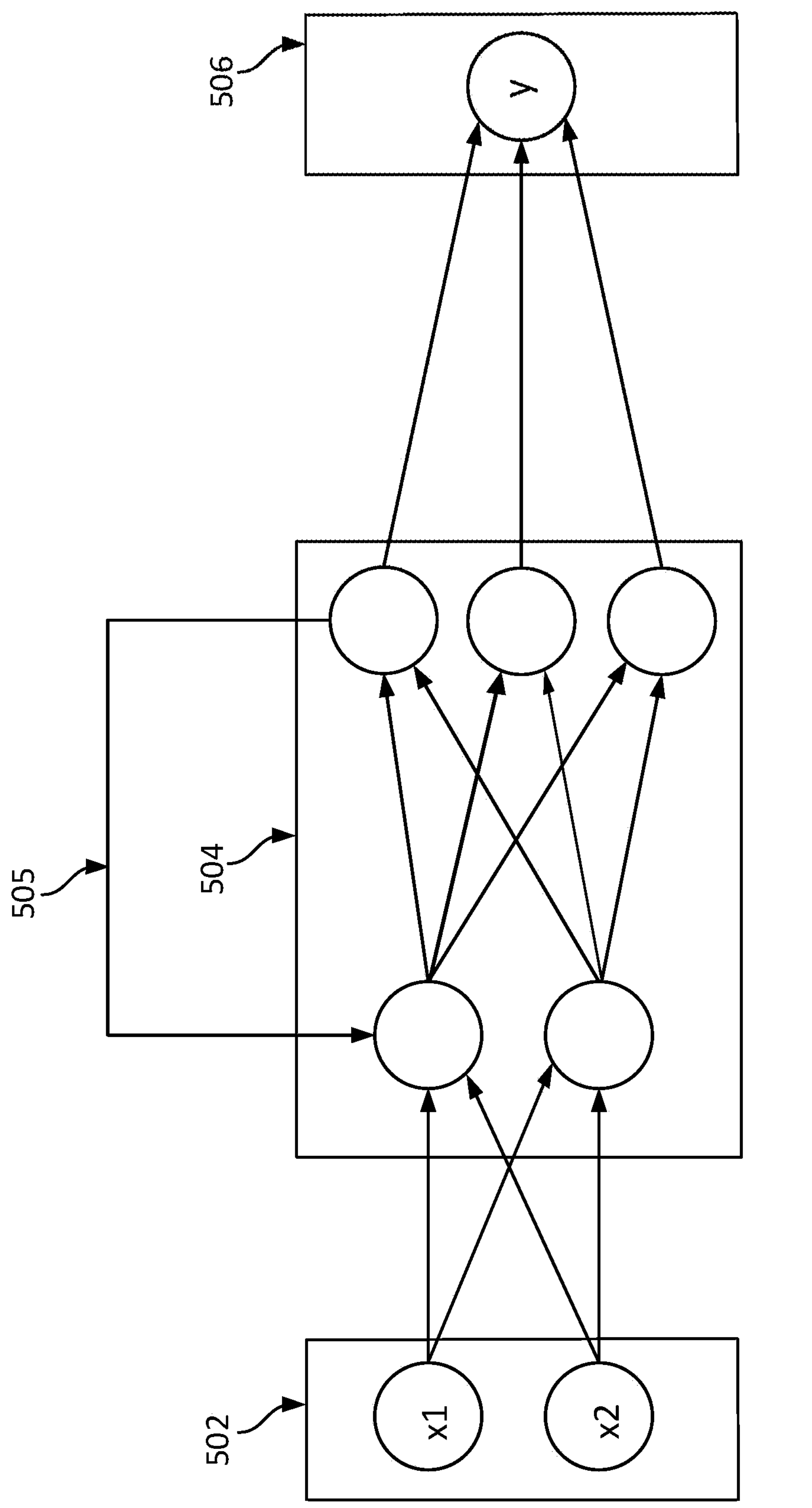
FIG. 5 illustrates an exemplary recurrent neural network, according to at least one embodiment.

FIG. 5 illustrates an exemplary recurrent neural network 500, according to at least one embodiment. In at least one embodiment, in a recurrent neural network, a previous network state influences an output of a current network state. Recurrent neural networks can be built in a variety of ways using a variety of functions. In at least one embodiment, use of recurrent neural networks generally revolves around using mathematical models to predict future output based on a prior sequence of inputs. For example, in at least one embodiment, a recurrent neural network may be used to perform statistical language modeling to predict an upcoming word given a previous sequence of words. In at least one embodiment, recurrent neural network 500 can be described has having an input layer 502 that receives an input vector, hidden layers 504 to implement a recurrent function, a feedback mechanism 505 to implement a 'memory' of previous states, and an output layer 506 to output a result. In at least one embodiment, recurrent neural network 500 operates based on time-steps. In at least one embodiment, a state of this recurrent neural network at a given time step is influenced by a previous time step via feedback mechanism 505. In at least one embodiment, for a given time step, a state of hidden layers 504 is defined by a previous state and an input of recurrent neural network 500. An initial input (x1) at a first time step can be processed by hidden layer 504. A second input (x2) can be processed by hidden layer 504 using state information that is determined during processing of initial input (x1). A given state can be computed as $$s_t=f(Ux_t+Ws_{t-1}),$$

where U and W are parameter matrices. In at least one embodiment, function f is a nonlinear function, such as a hyperbolic tangent function (Tanh) or a variant of rectifier function f(x)=max(0, x). However, any mathematical function can be used in hidden layers 504.

In at least one embodiment, any other type of network or any variant of any above described networks can be employed. One exemplary recurrent neural network variant that can be employed is a long short term memory (LSTM) recurrent neural network. LSTM recurrent neural networks are capable of learning long-term dependencies that may be desirable for processing longer sequences of language. A convolutional neural network variant is a convolutional deep belief network, which has a structure similar to a convolutional neural network and is trained in a manner similar to a deep belief network. A deep belief network (DBN) is a generative neural network that is composed of multiple layers of stochastic (random) variables. DBNs can be trained layer-by-layer using, for instance, greedy unsupervised learning. Learned weights of a DBN can then be used to provide pre-train neural networks by determining an optimal initial set of weights for a neural network.

Figure 6:
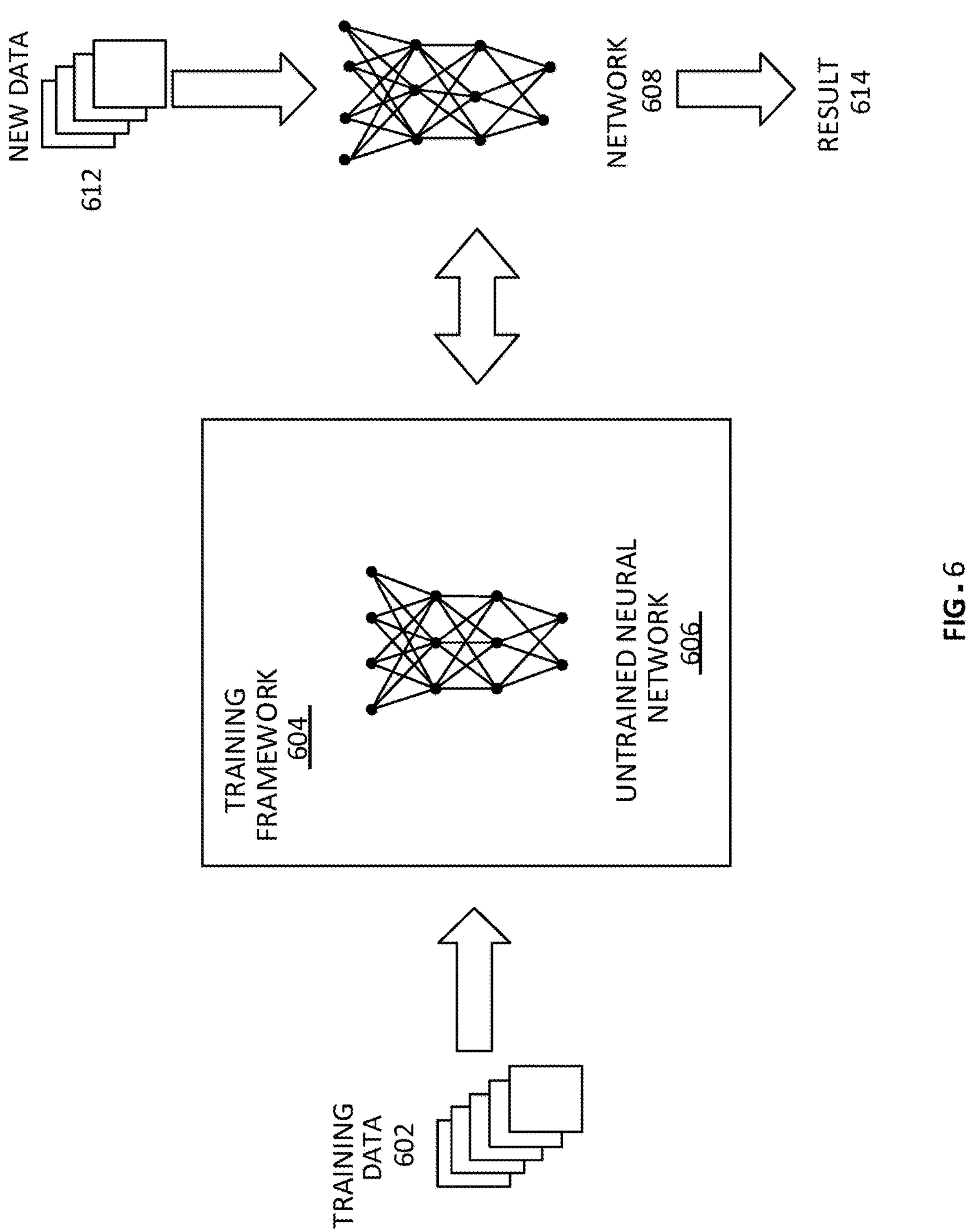
FIG. 6 graphically illustrates training and deployment of a deep neural network, according to at least one embodiment.

FIG. 6 illustrates exemplary training and deployment of a deep neural network, according to at least one embodiment. In at least one embodiment, once a given network has been structured for a task, this neural network is trained using a training dataset 602. Various training frameworks 604 have been developed to implement hardware acceleration of training processes. For example, training framework 1604, described below, can be employed as framework 604. The training framework 1604 can hook into an untrained neural network 606 to train it using parallel processing resources described herein to generate a trained neural net 608.

In at least one embodiment, initial weights may be chosen randomly or by pre-training using a deep belief network. Training can then be performed in either a supervised or unsupervised manner. Training using either supervised learning or unsupervised learning is further described below in connection with FIG. 16. Variations on supervised and unsupervised training may also be employed. Semi-supervised learning is a technique in which training dataset 602 includes a mix of labeled and unlabeled data of a same distribution. Incremental learning is a variant of supervised learning in which input data is continuously used to further train a model. Incremental learning enables trained neural network 608 to adapt to new data 612 without forgetting knowledge instilled within this network during initial training.

Whether supervised or unsupervised, training of particularly deep neural networks may be too computationally intensive for a single compute node. Instead of using a single compute node, a distributed network of computational nodes can be used to accelerate training.

Figure 7:
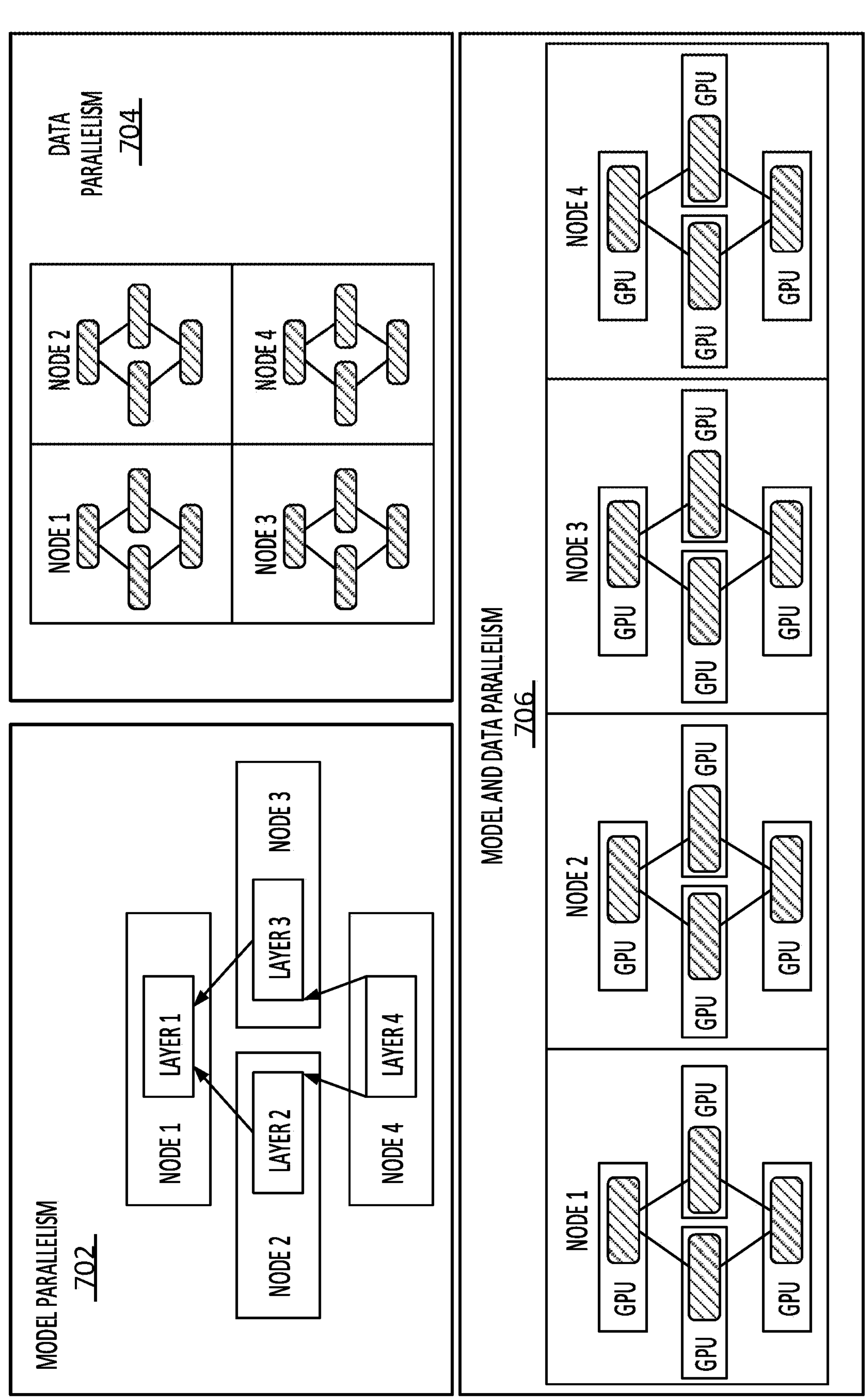
FIG. 7 is a block diagram illustrating distributed learning, according to at least one embodiment.

FIG. 7 is a block diagram illustrating distributed learning, according to at least one embodiment. Distributed learning is a training model that uses multiple distributed computing nodes to perform supervised or unsupervised training of a neural network. In at least one embodiment, distributed computational nodes can each include one or more host processors and one or more general-purpose processing nodes, such as GPGPU 1330 of FIG. 13B. In at least one embodiment, distributed learning can be performed by model parallelism 702, data parallelism 704, or a combination of model and data parallelism 704.

In model parallelism 702, different computational nodes in a distributed system can perform training computations for different parts of a single network. For example, each layer of a neural network can be trained by a different processing node of a distributed system. Benefits of model parallelism include ability to scale to particularly large models. Splitting computations associated with different layers of a neural network enables training of very large neural networks in which weights of all layers would not fit into memory of a single computational node. In some instances, model parallelism can be useful in performing unsupervised training of large neural networks.

In at least one embodiment, in data parallelism 704, different nodes of a distributed network have a complete instance of a model and each node receives a different portion of corresponding data. Results from different nodes are then combined. While different approaches to data parallelism are possible, data parallel training approaches often perform a technique of combining results and synchronizing model parameters between each node. Exemplary approaches to combining data include parameter averaging and update based data parallelism. Parameter averaging trains each node on a subset of training data and sets global parameters such as weights and biases to an average of parameters from each node. Parameter averaging uses a central parameter server that maintains parameter data. Update based data parallelism is similar to parameter averaging except that instead of transferring parameters from nodes to a parameter server, updates to a model are transferred. Additionally, update based data parallelism can be performed in a decentralized manner, where updates are compressed and transferred between nodes.

Combined model and data parallelism 706 can be implemented, for example, in a distributed system in which each computational node includes multiple GPUs. Each node can have a complete instance of a model with separate GPUs within each node being used to train different model portions.

In at least one embodiment, parallel processors and GPGPUs described herein can each implement various techniques to reduce overhead of distributed training, including techniques to enable high bandwidth GPU-to-GPU data transfer and accelerated remote data synchronization.

In at least one embodiment, inference and/or training logic 818 performs inferencing and/or training of neural networks 20 and 30. In at least one embodiment, neural network 20 is a convolutional neural network such as HR-Net, jointly released by Microsoft Research Asia and University of Science and Technology of China. In at least one embodiment, initial weights of network 20 are set to values of pre-trained weights found at ImageNet, an online large-scale hierarchical image database, although any initial weight values may be used. In at least one embodiment, input images are 256×256 pixel images, and output heatmaps 50 are 64×64 pixel images. In at least one embodiment, training batch size is set at 32, with a maximum number of epochs set at 60 with learning rate 1e-3. In at least one embodiment, final FC layer of convolutional neural network 20 is set to output a 72-dimensional vector of 36 2-dimensional keypoints.

In at least one embodiment, neural network 30 is a convolutional neural network such as DenseNet121 or another densely connected convolutional neural network configured for image classification, with its first convolutional layer modified to allow an additional fourth channel (red, green, blue, and heatmap) of input. In at least one embodiment, initial weights are set to those of a pre-trained model on ImageNet, although any initial weights can be employed. In at least one embodiment, input images are 256×256 pixel images. In at least one embodiment, training batch size is set at 32. In at least one embodiment, an Adam stochastic optimizer is used to train models for 100 maximum epochs, with an initial learning rate set to 3e-4, decaying to 3e-5 and e3-6 at $30^{th}$ and $100^{th}$ epochs respectively. In at least one embodiment, a dimension of a final FC layer of identification classifier 80 is set at 1024, equal to a number of features in an output feature vector of network 30, whereas dimensions of final FC layers for color classifier 70 and type classifier 90 are each set to 512, half a number of features in their output feature vector. In at least one embodiment, FC layers of network 30 and classifiers 70, 80, 90 employ a leaky rectified linear unit (Leaky ReLU) as an activation function.

Figure 8:
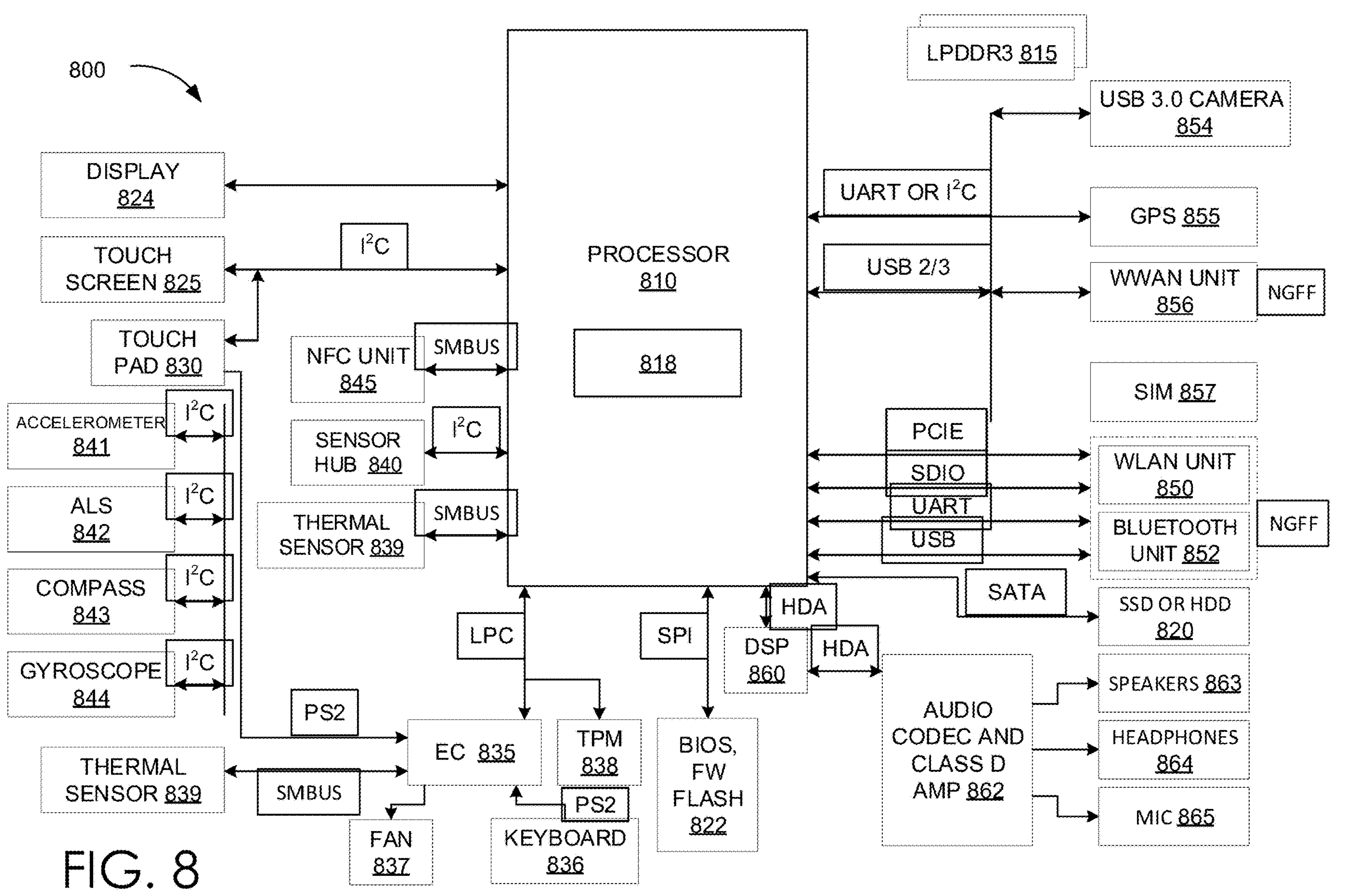
FIG. 8 is a block diagram illustrating a computer system, according to at least one embodiment.

FIG. 8 is a block diagram illustrating an electronic device 800 for utilizing a processor 810, according to at least one embodiment. In at least one embodiment, electronic device 800 may be, for example and without limitation, a notebook, a tower server, a rack server, a blade server, a laptop, a desktop, a tablet, a mobile device, a phone, an embedded computer, or any other suitable electronic device.

In at least one embodiment, system 800 may include, without limitation, processor 810 communicatively coupled to any suitable number or kind of components, peripherals, modules, or devices. In at least one embodiment, processor 810 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices illustrated in FIG. 8 may be interconnected with proprietary interconnects, standardized interconnects (for example, PCIe) or some combination thereof. In at least one embodiment, one or more components of FIG. 8 are interconnected using compute express link (CXL) interconnects.

In at least one embodiment, FIG. 8 may include a display 824, a touch screen 825, a touch pad 830, a Near Field Communications unit ("NFC") 845, a sensor hub 840, a thermal sensor 846, an Express Chipset ("EC") 835, a Trusted Platform Module ("TPM") 838, BIOS/firmware/flash memory ("BIOS, FW Flash") 822, a DSP 860, a drive "SSD or HDD") 820 such as a Solid State Disk ("SSD") or a Hard Disk Drive ("HDD"), a wireless local area network unit ("WLAN") 850, a Bluetooth unit 852, a Wireless Wide Area Network unit ("WWAN") 856, a Global Positioning System (GPS) 855, a camera ("USB 3.0 camera") 854 such as a USB 3.0 camera, or a Low Power Double Data Rate ("LPDDR") memory unit ("LPDDR3") 815 implemented in, for example, LPDDR3 standard. These components may each be implemented in any suitable manner.

In at least one embodiment, other components may be communicatively coupled to processor 810 through components discussed above. In at least one embodiment, an accelerometer 841, Ambient Light Sensor ("ALS") 842, compass 843, and a gyroscope 844 may be communicatively coupled to sensor hub 840. In at least one embodiment, thermal sensor 839, a fan 837, a keyboard 846, and a touch pad 830 may be communicatively coupled to EC 835. In at least one embodiment, speaker 863, a headphones 864, and a microphone ("mic") 865 may be communicatively coupled to an audio unit ("audio codec and class d amp") 864, which may in turn be communicatively coupled to DSP 860. In at least one embodiment, audio unit 864 may include, for example and without limitation, an audio coder/decoder ("codec") and a class D amplifier. In at least one embodiment, SIM card ("SIM") 857 may be communicatively coupled to WWAN unit 856. In at least one embodiment, components such as WLAN unit 850 and Bluetooth unit 852, as well as WWAN unit 856 may be implemented in a Next Generation Form Factor ("NGFF").

Inference and/or training logic 818 are used to perform inferencing and/or training operations associated with any one or more embodiments. Details regarding inference and/or training logic 818 are provided herein in conjunction with FIGS. 15A and/or 15B. In at least one embodiment, inference and/or training logic 818 may be used in system FIG. 8 for inferencing or predicting operations based, at least in part, on weight parameters calculated using neural network training operations, neural network functions and/or architectures, or neural network use cases described herein.

Figure 9:
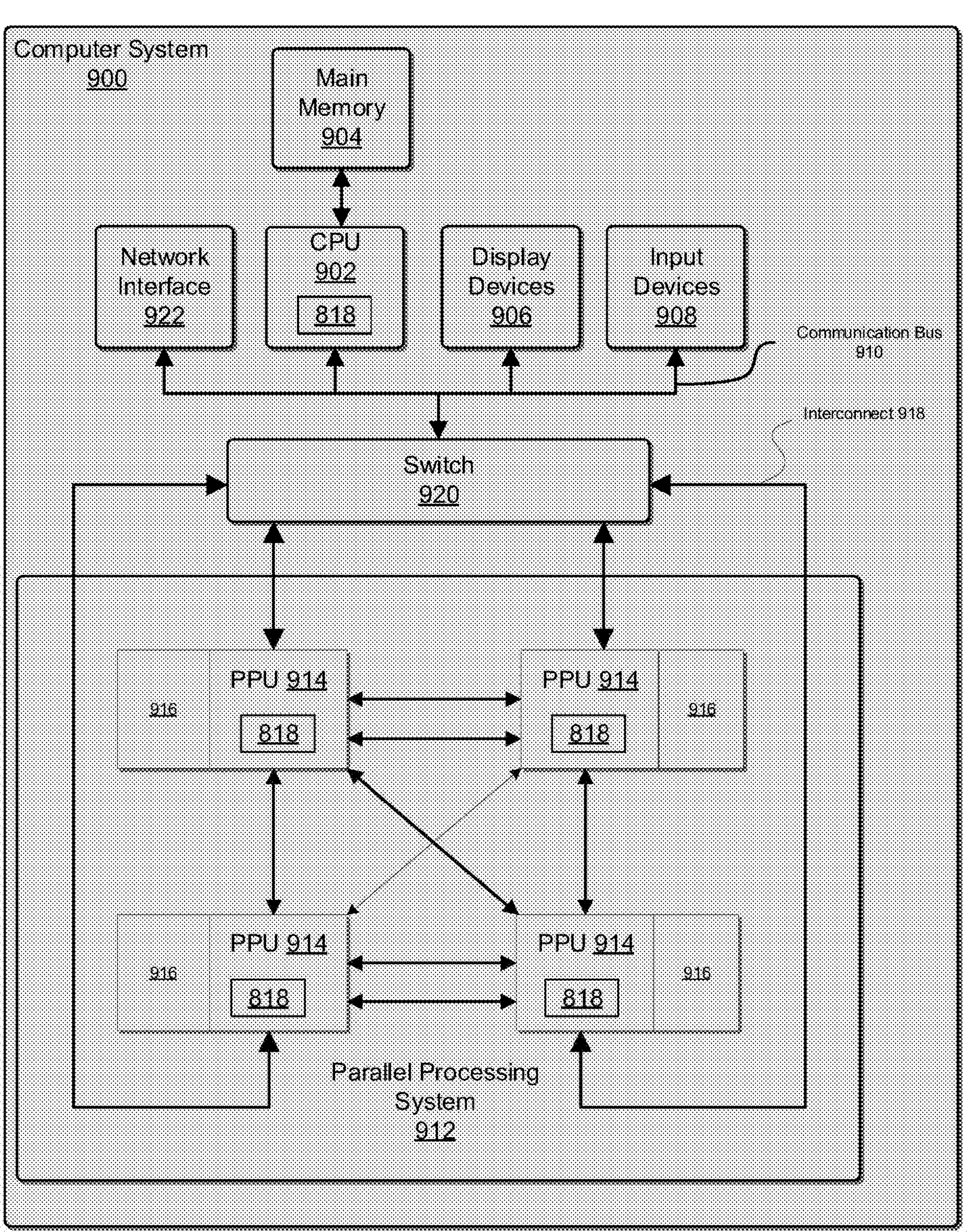
FIG. 9 illustrates a computer system, according to at least one embodiment.

FIG. 9 illustrates a computer system 900, according to at least one embodiment. In at least one embodiment, computer system 900 is configured to implement various processes and methods described throughout this disclosure.

In at least one embodiment, computer system 900 comprises, without limitation, at least one central processing unit ("CPU") 902 that is connected to a communication bus 910 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 900 includes, without limitation, a main memory 904 and control logic (for example, implemented as hardware, software, or a combination thereof) and data are stored in main memory 904 which may take form of random access memory ("RAM"). In at least one embodiment, a network interface subsystem ("network interface") 922 provides an interface to other computing devices and networks for receiving data from and transmitting data to other systems from computer system 900.

In at least one embodiment, computer system 900, in at least one embodiment, includes, without limitation, input devices 908, parallel processing system 912, and display devices 906 which can be implemented using a conventional cathode ray tube ("CRT"), liquid crystal display ("LCD"), light emitting diode ("LED"), plasma display, or other suitable display technologies. In at least one embodiment, user input is received from input devices 908 such as keyboard, mouse, touchpad, microphone, and more. In at least one embodiment, each of foregoing modules can be situated on a single semiconductor platform to form a processing system.

Inference and/or training logic 818 are used to perform inferencing and/or training operations associated with any one or more embodiments. Details regarding inference and/or training logic 818 are provided herein in conjunction with FIGS. 15A and/or 15B. In at least one embodiment, inference and/or training logic 818 may be used in system FIG. 9 for inferencing or predicting operations based, at least in part, on weight parameters calculated using neural network training operations, neural network functions and/or architectures, or neural network use cases described herein.

In at least one embodiment, inference and/or training logic 818 performs inferencing and/or training of neural networks 20 and 30. In at least one embodiment, initial neural network 20 is any convolutional neural network structured in any manner with any kernels and any FC layer, such as a convolutional neural network such as HR-Net, jointly released by Microsoft Research Asia and University of Science and Technology of China. In at least one embodiment, initial weights of network 20 are any weight values, and for example may be set to values of pre-trained weights found at ImageNet, an online large-scale hierarchical image database, although any initial weight values may be used. In at least one embodiment, input images are 256×256 pixel images, and output heatmaps 50 are 64×64 pixel images, although any size images and any size heatmaps 50 may be used. In at least one embodiment, any batch size, number of epochs, and learning rate may be employed in training, such as a training batch size set at 32, with a maximum number of epochs set at 60 and learning rate of 1e-3. In at least one embodiment, final FC layer of convolutional neural network 20 is set to output a 72-dimensional vector of 36 2-dimensional keypoints.

In at least one embodiment, initial neural network 30 is any convolutional neural network structured in any manner with any kernels and any FC layer, such as DenseNet121 or another densely connected convolutional neural network configured for image classification, with its first convolutional layer modified to allow an additional fourth channel (red, green, blue, and heatmap) of input. In at least one embodiment, initial weights are set to those of a pre-trained model on ImageNet, although any initial weights can be employed. In at least one embodiment, input images are 256×256 pixel images, although any size images may be employed. In at least one embodiment, any training batch size may be employed, and may be for example set at 32. In at least one embodiment, any learning rate or learning rate scheme can be used. In at least one embodiment, an Adam stochastic optimizer is used to train models for 100 maximum epochs, with an initial learning rate set to 3e-4, decaying to 3e-5 and e3-6 at $30^{th}$ and $100^{th}$ epochs respectively. In at least one embodiment, a dimension of a final FC layer of identification classifier 80 is set at 1024, equal to a number of features in an output feature vector of network 30, whereas dimensions of final FC layers for color classifier 70 and type classifier 90 are each set to 512, half a number of features in their output feature vector, although any dimensions are contemplated. In at least one embodiment, FC layers of network 30 and classifiers 70, 80, 90 employ a leaky rectified linear unit (Leaky ReLU) as an activation function, although any activation function may be used, such as a sigmoid function, a hyperbolic tangent function, or a rectified linear unit function.

Figure 10:
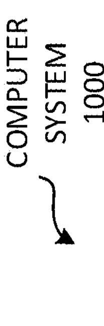
FIG. 10 illustrates a computer system, according at least one embodiment.
Figure 10:
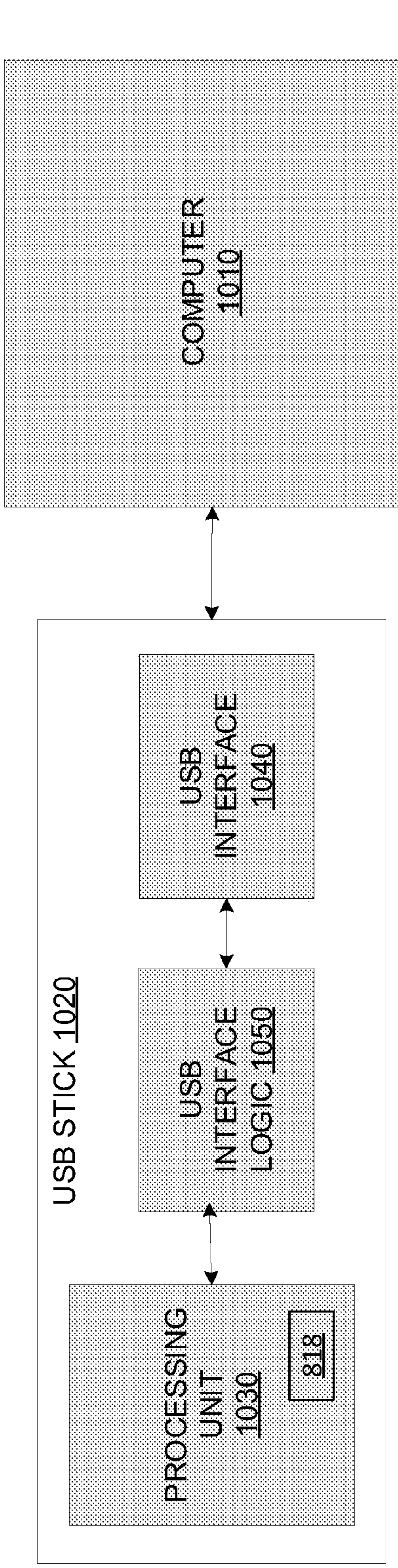

FIG. 10 illustrates a computer system 1000, according to at least one embodiment. In at least one embodiment, computer system 1000 includes, without limitation, a computer 1010 and a USB stick 1020. In at least one embodiment, computer 1010 may include, without limitation, any number and type of processor(s) (not shown) and a memory (not shown). In at least one embodiment, computer 1010 includes, without limitation, a server, a cloud instance, a laptop, a desktop computer, an edge computing device, an Internet of Things (IoT) device, and a smartphone.

In at least one embodiment, USB stick 1020 includes, without limitation, a processing unit 1030, a USB interface 1040, and USB interface logic 1050. In at least one embodiment, processing unit 1030 may be any instruction execution system, apparatus, or device capable of executing instructions. In at least one embodiment, processing unit 1030 may include, without limitation, any number and type of processing cores (not shown). In at least one embodiment, processing core 1030 comprises an application specific integrated circuit ("ASIC") that is optimized to perform any amount and type of operations associated with machine learning. For instance, in at least one embodiment, processing core 1030 is a tensor processing unit ("TPC") that is optimized to perform machine learning inference operations. In at least one embodiment, processing core 1030 is a vision processing unit ("VPU") that is optimized to perform machine vision and machine learning inference operations.

In at least one embodiment, USB interface 1040 may be any type of USB connector or USB socket. For instance, in at least one embodiment, USB interface 1040 is a USB 3.0 Type-C socket for data and power. In at least one embodiment, USB interface 1040 is a USB 3.0 Type-A connector. In at least one embodiment, USB interface logic 1050 may include any amount and type of logic that enables processing unit 1030 to interface with or devices (for example, computer 1010) via USB connector 1040.

Inference and/or training logic 818 are used to perform inferencing and/or training operations associated with any one or more embodiments. Details regarding inference and/or training logic 818 are provided herein in conjunction with FIGS. 15A and/or 15B. In at least one embodiment, inference and/or training logic 818 may be used in system FIG. 10 for inferencing or predicting operations based, at least in part, on weight parameters calculated using neural network training operations, neural network functions and/or architectures, or neural network use cases described herein.

In at least one embodiment, inference and/or training logic 818 performs inferencing and/or training of neural networks 20 and 30. In at least one embodiment, initial neural network 20 is any convolutional neural network structured in any manner with any kernels and any FC layer, such as a convolutional neural network such as HR-Net, jointly released by Microsoft Research Asia and University of Science and Technology of China. In at least one embodiment, initial weights of network 20 are any weight values, and for example may be set to values of pre-trained weights found at ImageNet, an online large-scale hierarchical image database, although any initial weight values may be used. In at least one embodiment, input images are 256×256 pixel images, and output heatmaps 50 are 64×64 pixel images, although any size images and any size heatmaps 50 may be used. In at least one embodiment, any batch size, number of epochs, and learning rate may be employed in training, such as a training batch size set at 32, with a maximum number of epochs set at 60 and learning rate of 1e-3. In at least one embodiment, final FC layer of convolutional neural network 20 is set to output a 72-dimensional vector of 36 2-dimensional keypoints.

In at least one embodiment, initial neural network 30 is any convolutional neural network structured in any manner with any kernels and any FC layer, such as DenseNet121 or another densely connected convolutional neural network configured for image classification, with its first convolutional layer modified to allow an additional fourth channel (red, green, blue, and heatmap) of input. In at least one embodiment, initial weights are set to those of a pre-trained model on ImageNet, although any initial weights can be employed. In at least one embodiment, input images are 256×256 pixel images, although any size images may be employed. In at least one embodiment, any training batch size may be employed, and may be for example set at 32. In at least one embodiment, any learning rate or learning rate scheme can be used. In at least one embodiment, an Adam stochastic optimizer is used to train models for 100 maximum epochs, with an initial learning rate set to 3e-4, decaying to 3e-5 and e3-6 at $30^{th}$ and $100^{th}$ epochs respectively. In at least one embodiment, a dimension of a final FC layer of identification classifier 80 is set at 1024, equal to a number of features in an output feature vector of network 30, whereas dimensions of final FC layers for color classifier 70 and type classifier 90 are each set to 512, half a number of features in their output feature vector, although any dimensions are contemplated. In at least one embodiment, FC layers of network 30 and classifiers 70, 80, 90 employ a leaky rectified linear unit (Leaky ReLU) as an activation function, although any activation function may be used, such as a sigmoid function, a hyperbolic tangent function, or a rectified linear unit function.

Figure 11:
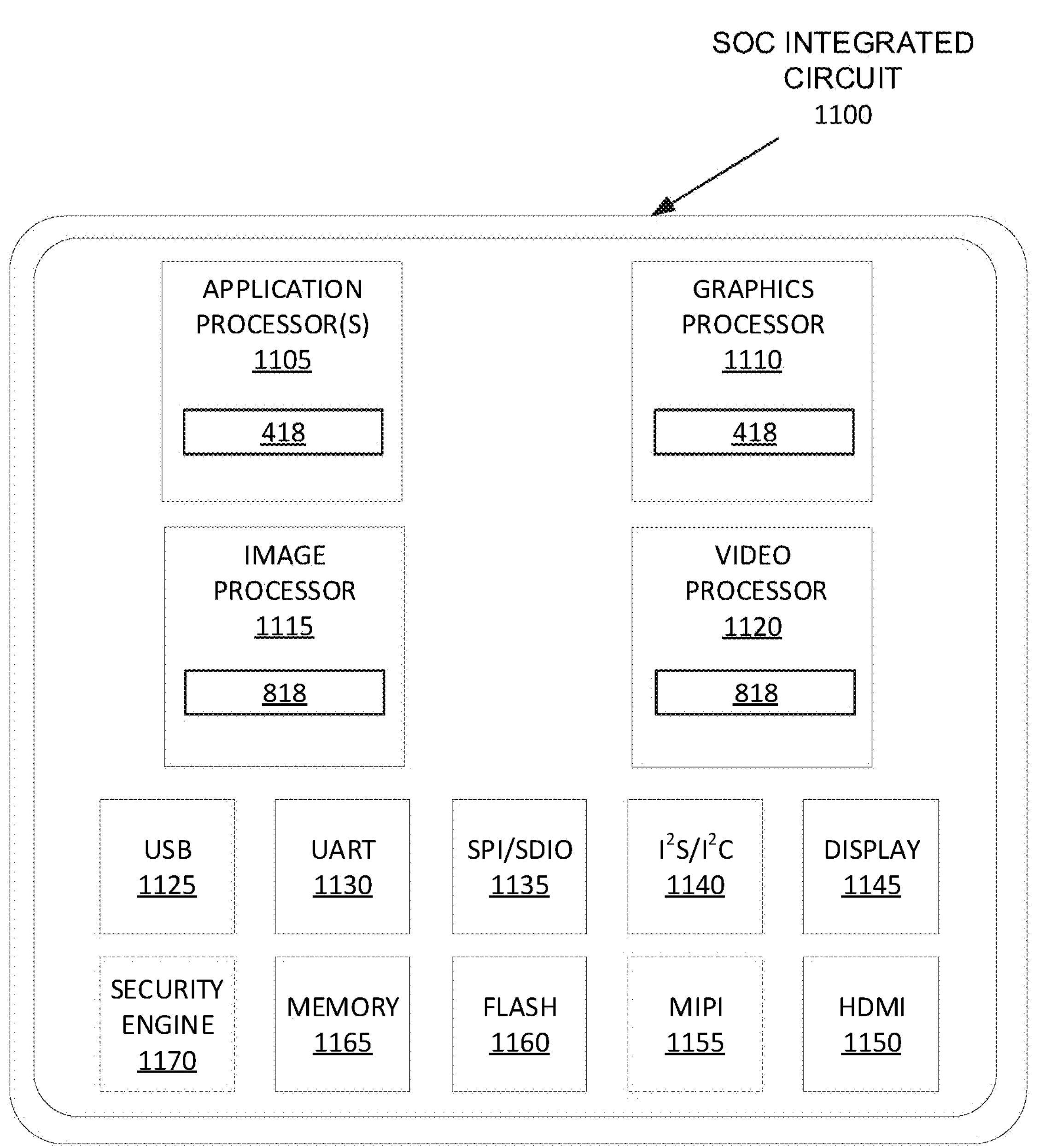
FIG. 11 illustrates exemplary integrated circuits and associated graphics processors that may be fabricated using one or more IP cores, according to various embodiments described herein.

FIG. 11 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 11 is a block diagram illustrating an exemplary system on a chip integrated circuit 1100 that may be fabricated using one or more IP cores, according to at least one embodiment. In at least one embodiment, integrated circuit 1100 includes one or more application processor(s) 1105 (for example, CPUs), at least one graphics processor 1110, and may additionally include an image processor 1115 and/or a video processor 1120, any of which may be a modular IP core. In at least one embodiment, integrated circuit 1100 includes peripheral or bus logic including a USB controller 1125, UART controller 1130, an SPI/SDIO controller 1135, and an $I^2S/I^2C$ controller 1140. In at least one embodiment, integrated circuit 1100 can include a display device 1145 coupled to one or more of a high-definition multimedia interface (HDMI) controller 1150 and a mobile industry processor interface (MIPI) display interface 1155. In at least one embodiment, storage may be provided by a flash memory subsystem 1160 including flash memory and a flash memory controller. In at least one embodiment, memory interface may be provided via a memory controller 1165 for access to SDRAM or SRAM memory devices. In at least one embodiment, some integrated circuits additionally include an embedded security engine 1170.

Inference and/or training logic 818 are used to perform inferencing and/or training operations associated with any one or more embodiments. Details regarding inference and/or training logic 818 are provided herein in conjunction with FIGS. 15A and/or 15B. In at least one embodiment, inference and/or training logic 818 may be used in integrated circuit 1100 for inferencing or predicting operations based, at least in part, on weight parameters calculated using neural network training operations, neural network functions and/or architectures, or neural network use cases described herein.

In at least one embodiment, inference and/or training logic 818 performs inferencing and/or training of neural networks 20 and 30. In at least one embodiment, initial neural network 20 is any convolutional neural network structured in any manner with any kernels and any FC layer, such as a convolutional neural network such as HR-Net, jointly released by Microsoft Research Asia and University of Science and Technology of China. In at least one embodiment, initial weights of network 20 are any weight values, and for example may be set to values of pre-trained weights found at ImageNet, an online large-scale hierarchical image database, although any initial weight values may be used. In at least one embodiment, input images are 256×256 pixel images, and output heatmaps 50 are 64×64 pixel images, although any size images and any size heatmaps 50 may be used. In at least one embodiment, any batch size, number of epochs, and learning rate may be employed in training, such as a training batch size set at 32, with a maximum number of epochs set at 60 and learning rate of 1e-3. In at least one embodiment, final FC layer of convolutional neural network 20 is set to output a 72-dimensional vector of 36 2-dimensional keypoints.

In at least one embodiment, initial neural network 30 is any convolutional neural network structured in any manner with any kernels and any FC layer, such as DenseNet121 or another densely connected convolutional neural network configured for image classification, with its first convolutional layer modified to allow an additional fourth channel (red, green, blue, and heatmap) of input. In at least one embodiment, initial weights are set to those of a pre-trained model on ImageNet, although any initial weights can be employed. In at least one embodiment, input images are 256×256 pixel images, although any size images may be employed. In at least one embodiment, any training batch size may be employed, and may be for example set at 32. In at least one embodiment, any learning rate or learning rate scheme can be used. In at least one embodiment, an Adam stochastic optimizer is used to train models for 100 maximum epochs, with an initial learning rate set to 3e-4, decaying to 3e-5 and e3-6 at $30^{th}$ and $100^{th}$ epochs respectively. In at least one embodiment, a dimension of a final FC layer of identification classifier 80 is set at 1024, equal to a number of features in an output feature vector of network 30, whereas dimensions of final FC layers for color classifier 70 and type classifier 90 are each set to 512, half a number of features in their output feature vector, although any dimensions are contemplated. In at least one embodiment, FC layers of network 30 and classifiers 70, 80, 90 employ a leaky rectified linear unit (Leaky ReLU) as an activation function, although any activation function may be used, such as a sigmoid function, a hyperbolic tangent function, or a rectified linear unit function.

Figure 12A:
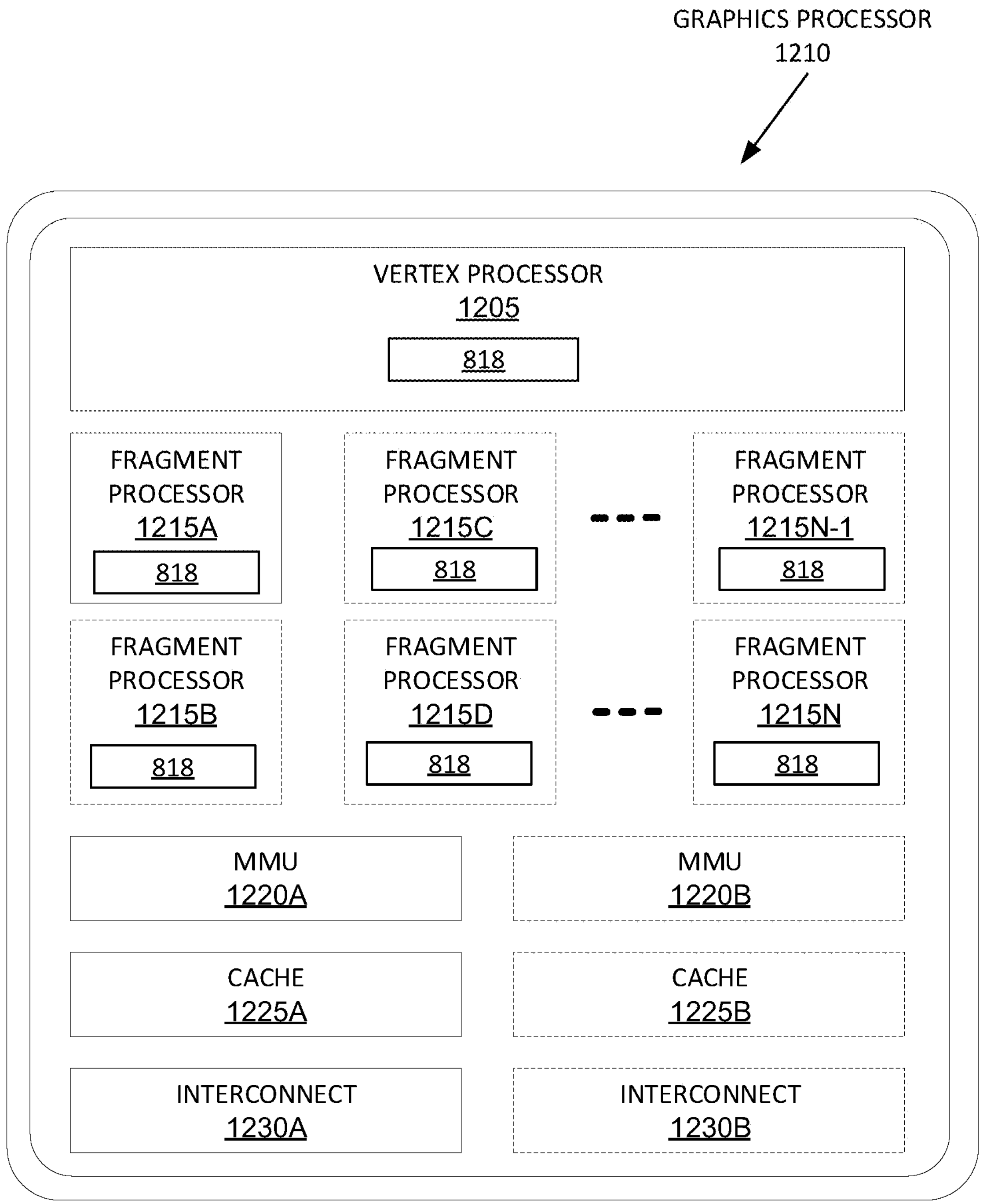
FIGS. 12A-12B illustrate exemplary integrated circuits and associated graphics processors that may be fabricated using one or more IP cores, according to various embodiments described herein.
Figure 12B:
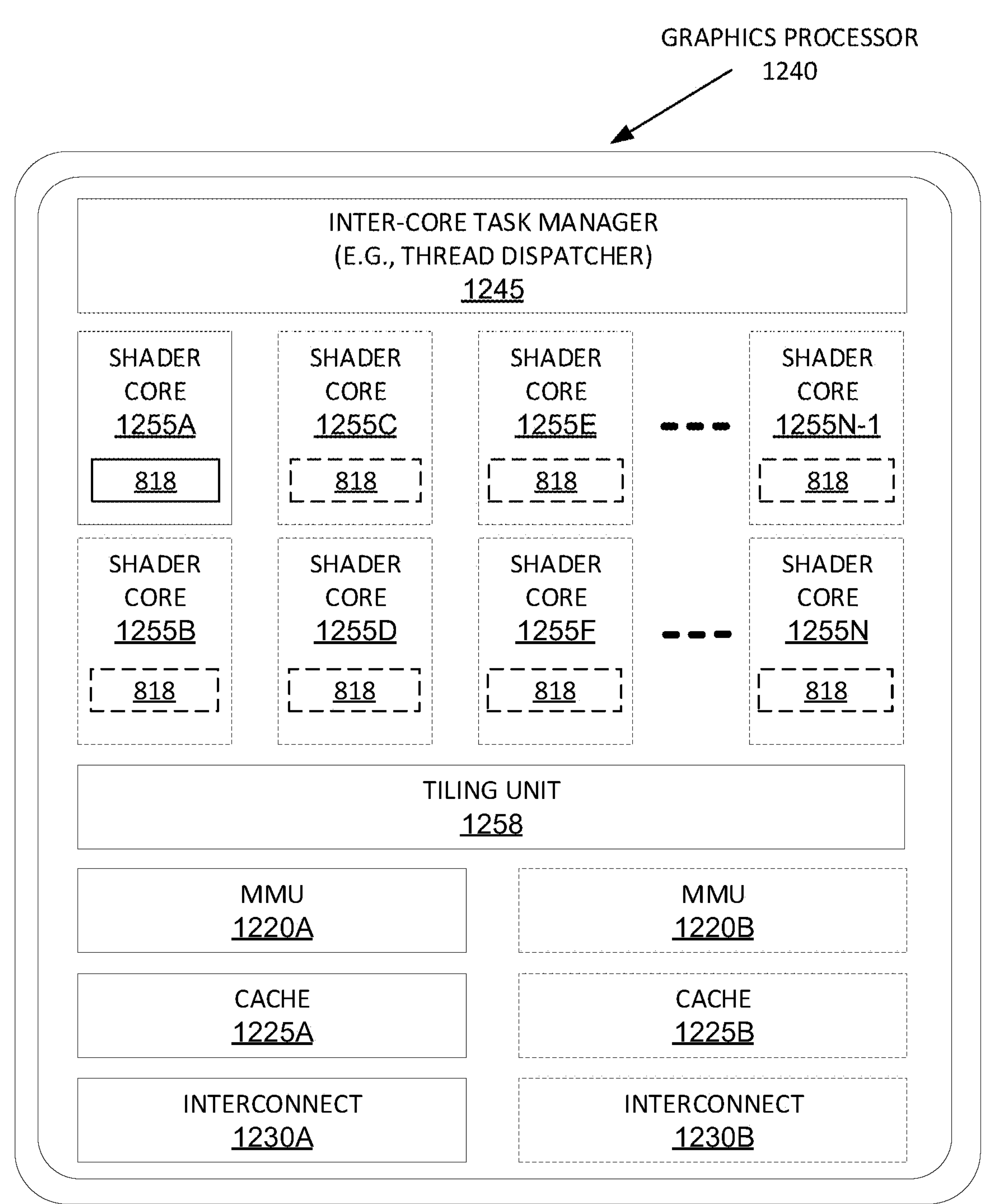

FIGS. 12A-12B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 12A-12B are block diagrams illustrating exemplary graphics processors for use within an SoC, according to embodiments described herein. FIG. 12A illustrates an exemplary graphics processor 1210 of a system on a chip integrated circuit that may be fabricated using one or more IP cores, according to at least one embodiment. FIG. 12B illustrates an additional exemplary graphics processor 1240 of a system on a chip integrated circuit that may be fabricated using one or more IP cores, according to at least one embodiment. In at least one embodiment, graphics processor 1210 of FIG. 12A is a low power graphics processor core. In at least one embodiment, graphics processor 1240 of FIG. 12B is a higher performance graphics processor core. In at least one embodiment, each of graphics processors 1210, 1240 can be variants of graphics processor 1110 of FIG. 11.

In at least one embodiment, graphics processor 1210 includes a vertex processor 1205 and one or more fragment processor(s) 1215A-815N (for example, 1215A, 1215B, 1215C, 1215D, through 1215N−1, and 1215N). In at least one embodiment, graphics processor 1210 can execute different shader programs via separate logic, such that vertex processor 1205 is optimized to execute operations for vertex shader programs, while one or more fragment processor(s) 1215A-815N execute fragment (for example, pixel) shading operations for fragment or pixel shader programs. In at least one embodiment, vertex processor 1205 performs a vertex processing stage of a 3D graphics pipeline and generates primitives and vertex data. In at least one embodiment, fragment processor(s) 1215A-815N use primitive and vertex data generated by vertex processor 1205 to produce a framebuffer that is displayed on a display device. In at least one embodiment, fragment processor(s) 1215A-815N are optimized to execute fragment shader programs as provided for in an OpenGL API, which may be used to perform similar operations as a pixel shader program as provided for in a Direct 3D API.

In at least one embodiment, graphics processor 1210 additionally includes one or more memory management units (MMUs) 1220A-820B, cache(s) 1225A-825B, and circuit interconnect(s) 1230A-830B. In at least one embodiment, one or more MMU(s) 1220A-820B provide for virtual to physical address mapping for graphics processor 1210, including for vertex processor 1205 and/or fragment processor(s) 1215A-815N, which may reference vertex or image/texture data stored in memory, in addition to vertex or image/texture data stored in one or more cache(s) 1225A-825B. In at least one embodiment, one or more MMU(s) 1220A-820B may be synchronized with other MMUs within their system, including one or more MMUs associated with one or more application processor(s) 1105, image processors 1115, and/or video processors 1120 of FIG. 11, such that each processor 1105-720 can participate in a shared or unified virtual memory system. In at least one embodiment, one or more circuit interconnect(s) 1230A-830B enable graphics processor 1210 to interface with other IP cores within an SoC, either via an internal bus of an SoC or via a direct connection.

In at least one embodiment, graphics processor 1240 includes one or more MMU(s) 1220A-820B, caches 1225A-825B, and circuit interconnects 1230A-830B of graphics processor 1210 of FIG. 12A. In at least one embodiment, graphics processor 1240 includes one or more shader core(s) 1255A-855N (for example, 1255A, 1255B, 1255C, 1255D, 1255E, 1255F, through 1255N−1, and 1255N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 1240 includes an inter-core task manager 1245, which acts as a thread dispatcher to dispatch execution threads to one or more shader cores 1255A-855N and a tiling unit 1258 to accelerate tiling operations for tile-based rendering, in which rendering operations for a scene are subdivided in image space, for example to exploit local spatial coherence within a scene or to optimize use of internal caches.

Inference and/or training logic 818 are used to perform inferencing and/or training operations associated with any one or more embodiments. Details regarding inference and/or training logic 818 are provided herein in conjunction with FIGS. 15A and/or 15B. In at least one embodiment, inference and/or training logic 818 may be used in integrated circuit 12A and/or 12B for inferencing or predicting operations based, at least in part, on weight parameters calculated using neural network training operations, neural network functions and/or architectures, or neural network use cases described herein.

In at least one embodiment, inference and/or training logic 818 performs inferencing and/or training of neural networks 20 and 30. In at least one embodiment, initial neural network 20 is any convolutional neural network structured in any manner with any kernels and any FC layer, such as a convolutional neural network such as HR-Net, jointly released by Microsoft Research Asia and University of Science and Technology of China. In at least one embodiment, initial weights of network 20 are any weight values, and for example may be set to values of pre-trained weights found at ImageNet, an online large-scale hierarchical image database, although any initial weight values may be used. In at least one embodiment, input images are 256×256 pixel images, and output heatmaps 50 are 64×64 pixel images, although any size images and any size heatmaps 50 may be used. In at least one embodiment, any batch size, number of epochs, and learning rate may be employed in training, such as a training batch size set at 32, with a maximum number of epochs set at 60 and learning rate of 1e-3. In at least one embodiment, final FC layer of convolutional neural network 20 is set to output a 72-dimensional vector of 36 2-dimensional keypoints.

In at least one embodiment, initial neural network 30 is any convolutional neural network structured in any manner with any kernels and any FC layer, such as DenseNet121 or another densely connected convolutional neural network configured for image classification, with its first convolutional layer modified to allow an additional fourth channel (red, green, blue, and heatmap) of input. In at least one embodiment, initial weights are set to those of a pre-trained model on ImageNet, although any initial weights can be employed. In at least one embodiment, input images are 256×256 pixel images, although any size images may be employed. In at least one embodiment, any training batch size may be employed, and may be for example set at 32. In at least one embodiment, any learning rate or learning rate scheme can be used. In at least one embodiment, an Adam stochastic optimizer is used to train models for 100 maximum epochs, with an initial learning rate set to 3e-4, decaying to 3e-5 and e3-6 at $30^{th}$ and $100^{th}$ epochs respectively. In at least one embodiment, a dimension of a final FC layer of identification classifier 80 is set at 1024, equal to a number of features in an output feature vector of network 30, whereas dimensions of final FC layers for color classifier 70 and type classifier 90 are each set to 512, half a number of features in their output feature vector, although any dimensions are contemplated. In at least one embodiment, FC layers of network 30 and classifiers 70, 80, 90 employ a leaky rectified linear unit (Leaky ReLU) as an activation function, although any activation function may be used, such as a sigmoid function, a hyperbolic tangent function, or a rectified linear unit function.

Figure 13A:
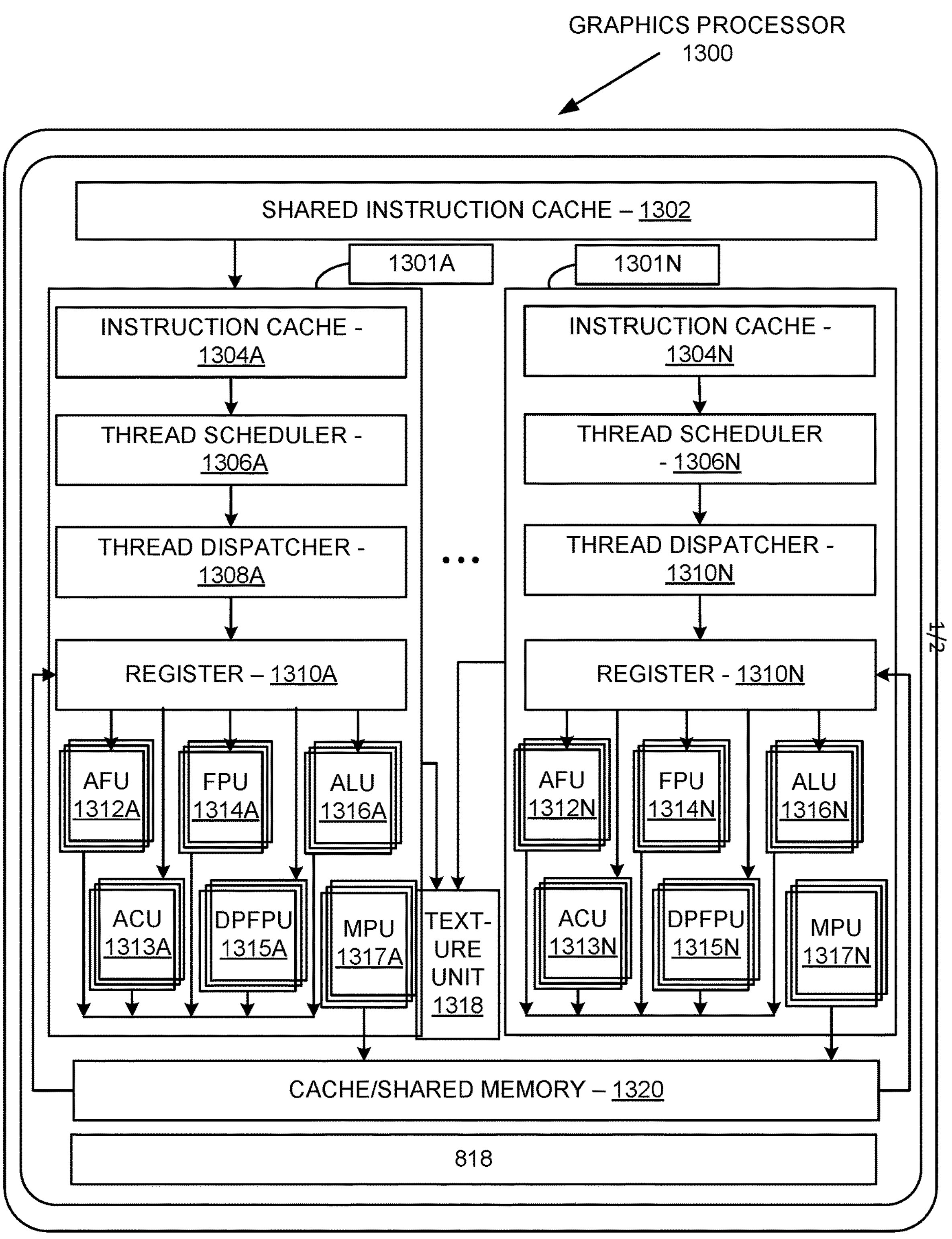
FIGS. 13A-13B illustrate additional exemplary graphics processor logic according to embodiments described herein.
Figure 13B:
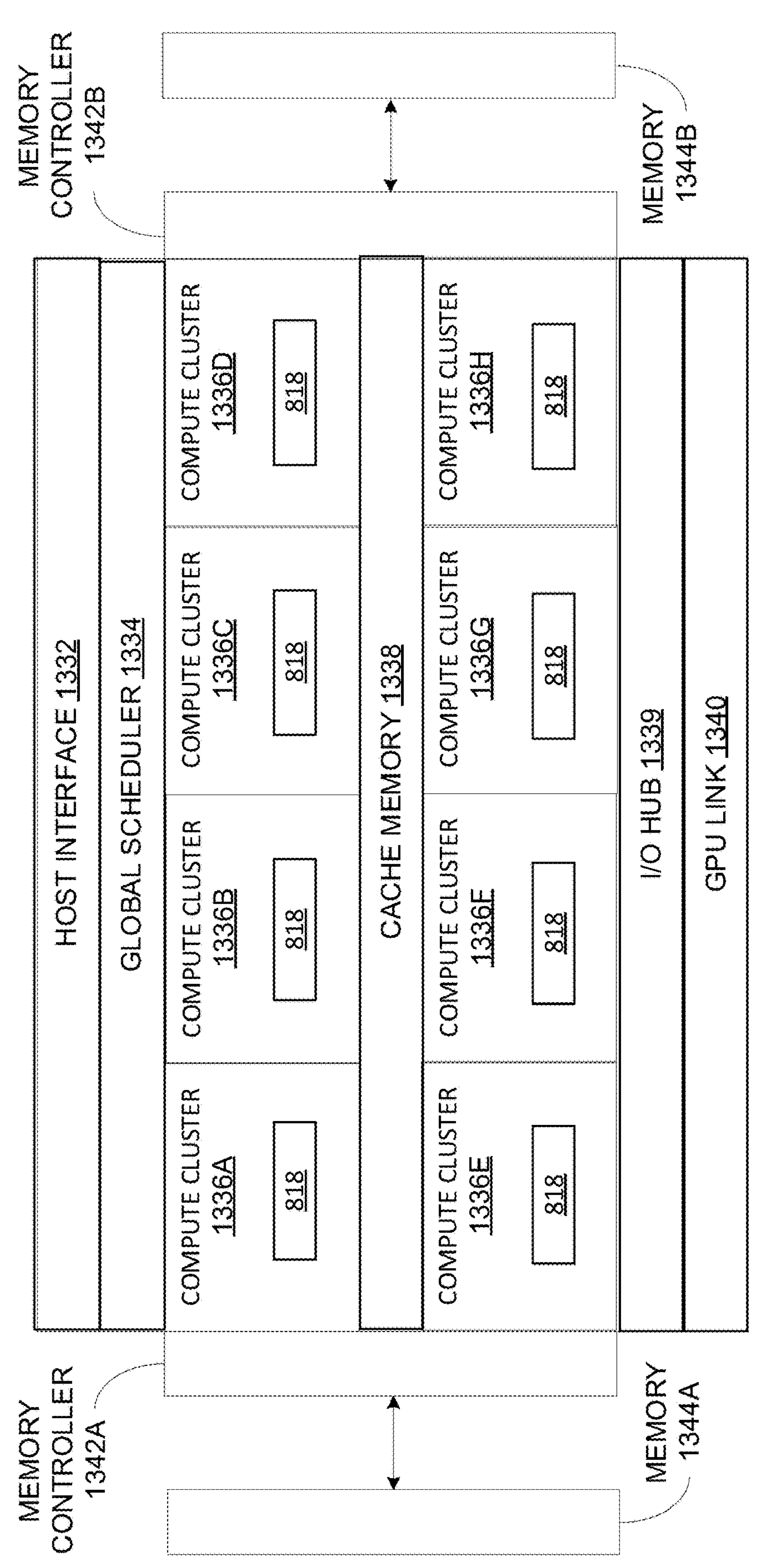

FIGS. 13A-13B illustrate additional exemplary graphics processor logic according to embodiments described herein. FIG. 13A illustrates a graphics core 1300 that may be included within graphics processor 1110 of FIG. 11, in at least one embodiment, and may be a unified shader core 1255A-855N as in FIG. 12B in at least one embodiment. FIG. 13B illustrates a highly-parallel general-purpose graphics processing unit 1330 suitable for deployment on a multi-chip module in at least one embodiment.

In at least one embodiment, graphics core 1300 includes a shared instruction cache 1302, a texture unit 1318, and a cache/shared memory 1320 that are common to execution resources within graphics core 1300. In at least one embodiment, graphics core 1300 can include multiple slices 1301A-901N or partition for each core, and a graphics processor can include multiple instances of graphics core 1300. Slices 1301A-901N can include support logic including a local instruction cache 1304A-904N, a thread scheduler 1306A-906N, a thread dispatcher 1308A-908N, and a set of registers 1310A-910N. In at least one embodiment, slices 1301A-901N can include a set of additional function units (AFUs 1312A-912N), floating-point units (FPU 1314A-914N), integer arithmetic logic units (ALUs 1316-916N), address computational units (ACU 1313A-913N), double-precision floating-point units (DPFPU 1315A-915N), and matrix processing units (MPU 1317A-917N).

In at least one embodiment, FPUs 1314A-914N can perform single-precision (32-bit) and half-precision (16-bit) floating point operations, while DPFPUs 1315A-915N perform double precision (64-bit) floating point operations. In at least one embodiment, ALUs 1316A-916N can perform variable precision integer operations at 12-bit, 20-bit, and 32-bit precision, and can be configured for mixed precision operations. In at least one embodiment, MPUs 1317A-917N can also be configured for mixed precision matrix operations, including half-precision floating point and 12-bit integer operations. In at least one embodiment, MPUs 1317-917N can perform a variety of matrix operations to accelerate machine learning application frameworks, including enabling support for accelerated general matrix to matrix multiplication (GEMM). In at least one embodiment, AFUs 1312A-912N can perform additional logic operations not supported by floating-point or integer units, including trigonometric operations (for example, Sine, Cosine, etc.).

Inference and/or training logic 818 are used to perform inferencing and/or training operations associated with any one or more embodiments. Details regarding inference and/or training logic 818 are provided herein in conjunction with FIGS. 15A and/or 15B. In at least one embodiment, inference and/or training logic 818 may be used in graphics core 1300 for inferencing or predicting operations based, at least in part, on weight parameters calculated using neural network training operations, neural network functions and/or architectures, or neural network use cases described herein.

In at least one embodiment, inference and/or training logic 818 performs inferencing and/or training of neural networks 20 and 30. In at least one embodiment, initial neural network 20 is any convolutional neural network structured in any manner with any kernels and any FC layer, such as a convolutional neural network such as HR-Net, jointly released by Microsoft Research Asia and University of Science and Technology of China. In at least one embodiment, initial weights of network 20 are any weight values, and for example may be set to values of pre-trained weights found at ImageNet, an online large-scale hierarchical image database, although any initial weight values may be used. In at least one embodiment, input images are 256×256 pixel images, and output heatmaps 50 are 64×64 pixel images, although any size images and any size heatmaps 50 may be used. In at least one embodiment, any batch size, number of epochs, and learning rate may be employed in training, such as a training batch size set at 32, with a maximum number of epochs set at 60 and learning rate of 1e-3. In at least one embodiment, final FC layer of convolutional neural network 20 is set to output a 72-dimensional vector of 36 2-dimensional keypoints.

In at least one embodiment, initial neural network 30 is any convolutional neural network structured in any manner with any kernels and any FC layer, such as DenseNet121 or another densely connected convolutional neural network configured for image classification, with its first convolutional layer modified to allow an additional fourth channel (red, green, blue, and heatmap) of input. In at least one embodiment, initial weights are set to those of a pre-trained model on ImageNet, although any initial weights can be employed. In at least one embodiment, input images are 256×256 pixel images, although any size images may be employed. In at least one embodiment, any training batch size may be employed, and may be for example set at 32. In at least one embodiment, any learning rate or learning rate scheme can be used. In at least one embodiment, an Adam stochastic optimizer is used to train models for 100 maximum epochs, with an initial learning rate set to 3e-4, decaying to 3e-5 and e3-6 at $30^{th}$ and $100^{th}$ epochs respectively. In at least one embodiment, a dimension of a final FC layer of identification classifier 80 is set at 1024, equal to a number of features in an output feature vector of network 30, whereas dimensions of final FC layers for color classifier 70 and type classifier 90 are each set to 512, half a number of features in their output feature vector, although any dimensions are contemplated. In at least one embodiment, FC layers of network 30 and classifiers 70, 80, 90 employ a leaky rectified linear unit (Leaky ReLU) as an activation function, although any activation function may be used, such as a sigmoid function, a hyperbolic tangent function, or a rectified linear unit function.

FIG. 13B illustrates a general-purpose processing unit (GPGPU) 1330 that can be configured to enable highly-parallel compute operations to be performed by an array of graphics processing units, in at least one embodiment. In at least one embodiment, GPGPU 1330 can be linked directly to other instances of GPGPU 1330 to create a multi-GPU cluster to improve training speed for deep neural networks. In at least one embodiment, GPGPU 1330 includes a host interface 1332 to enable a connection with a host processor. In at least one embodiment, host interface 1332 is a PCI Express interface. In at least one embodiment, host interface 1332 can be a vendor specific communications interface or communications fabric. In at least one embodiment, GPGPU 1330 receives commands from a host processor and uses a global scheduler 1334 to distribute execution threads associated with those commands to a set of compute clusters 1336A-936H. In at least one embodiment, compute clusters 1336A-936H share a cache memory 1338. In at least one embodiment, cache memory 1338 can serve as a higher-level cache for cache memories within compute clusters 1336A-936H.

In at least one embodiment, GPGPU 1330 includes memory 1344A-944B coupled with compute clusters 1336A-936H via a set of memory controllers 1342A-942B. In at least one embodiment, memory 1344A-944B can include various types of memory devices including dynamic random access memory (DRAM) or graphics random access memory, such as synchronous graphics random access memory (SGRAM), including graphics double data rate (GDDR) memory.

In at least one embodiment, compute clusters 1336A-936H each include a set of graphics cores, such as graphics core 1300 of FIG. 13A, which can include multiple types of integer and floating point logic units that can perform computational operations at a range of precisions including suited for machine learning computations. For example, in at least one embodiment, at least a subset of floating point units in each of compute clusters 1336A-936H can be configured to perform 20-bit or 32-bit floating point operations, while a different subset of floating point units can be configured to perform 104-bit floating point operations.

In at least one embodiment, multiple instances of GPGPU 1330 can be configured to operate as a compute cluster. In at least one embodiment, communication used by compute clusters 1336A-936H for synchronization and data exchange varies across embodiments. In at least one embodiment, multiple instances of GPGPU 1330 communicate over host interface 1332. In at least one embodiment, GPGPU 1330 includes an I/O hub 1339 that couples GPGPU 1330 with a GPU link 1340 that enables a direct connection to other instances of GPGPU 1330. In at least one embodiment, GPU link 1340 is coupled to a dedicated GPU-to-GPU bridge that enables communication and synchronization between multiple instances of GPGPU 1330. In at least one embodiment GPU link 1340 couples with a high speed interconnect to transmit and receive data to other GPGPUs or parallel processors. In at least one embodiment, multiple instances of GPGPU 1330 are located in separate data processing systems and communicate via a network device that is accessible via host interface 1332. In at least one embodiment GPU link 1340 can be configured to enable a connection to a host processor in addition to or as an alternative to host interface 1332.

In at least one embodiment, GPGPU 1330 can be configured to train neural networks. In at least one embodiment, GPGPU 1330 can be used within an inferencing platform. In at least one embodiment, in which GPGPU 1330 is used for inferencing, GPGPU may include fewer compute clusters 1336A-936H relative to when GPGPU is used for training a neural network. In at least one embodiment, memory technology associated with memory 1344A-944B may differ between inferencing and training configurations, with higher bandwidth memory technologies devoted to training configurations. In at least one embodiment, inferencing configuration of GPGPU 1330 can support inferencing specific instructions. For example, in at least one embodiment, an inferencing configuration can provide support for one or more 12-bit integer dot product instructions, which may be used during inferencing operations for deployed neural networks.

Inference and/or training logic 818 are used to perform inferencing and/or training operations associated with any one or more embodiments. Details regarding inference and/or training logic 818 are provided herein in conjunction with FIGS. 15A and/or 15B. In at least one embodiment, inference and/or training logic 818 may be used in GPGPU 1330 for inferencing or predicting operations based, at least in part, on weight parameters calculated using neural network training operations, neural network functions and/or architectures, or neural network use cases described herein.

In at least one embodiment, inference and/or training logic 818 performs inferencing and/or training of neural networks 20 and 30. In at least one embodiment, initial neural network 20 is any convolutional neural network structured in any manner with any kernels and any FC layer, such as a convolutional neural network such as HR-Net, jointly released by Microsoft Research Asia and University of Science and Technology of China. In at least one embodiment, initial weights of network 20 are any weight values, and for example may be set to values of pre-trained weights found at ImageNet, an online large-scale hierarchical image database, although any initial weight values may be used. In at least one embodiment, input images are 256×256 pixel images, and output heatmaps 50 are 64×64 pixel images, although any size images and any size heatmaps 50 may be used. In at least one embodiment, any batch size, number of epochs, and learning rate may be employed in training, such as a training batch size set at 32, with a maximum number of epochs set at 60 and learning rate of 1e-3. In at least one embodiment, final FC layer of convolutional neural network 20 is set to output a 72-dimensional vector of 36 2-dimensional keypoints.

In at least one embodiment, initial neural network 30 is any convolutional neural network structured in any manner with any kernels and any FC layer, such as DenseNet121 or another densely connected convolutional neural network configured for image classification, with its first convolutional layer modified to allow an additional fourth channel (red, green, blue, and heatmap) of input. In at least one embodiment, initial weights are set to those of a pre-trained model on ImageNet, although any initial weights can be employed. In at least one embodiment, input images are 256×256 pixel images, although any size images may be employed. In at least one embodiment, any training batch size may be employed, and may be for example set at 32. In at least one embodiment, any learning rate or learning rate scheme can be used. In at least one embodiment, an Adam stochastic optimizer is used to train models for 100 maximum epochs, with an initial learning rate set to 3e-4, decaying to 3e-5 and e3-6 at $30^{th}$ and $100^{th}$ epochs respectively. In at least one embodiment, a dimension of a final FC layer of identification classifier 80 is set at 1024, equal to a number of features in an output feature vector of network 30, whereas dimensions of final FC layers for color classifier 70 and type classifier 90 are each set to 512, half a number of features in their output feature vector, although any dimensions are contemplated. In at least one embodiment, FC layers of network 30 and classifiers 70, 80, 90 employ a leaky rectified linear unit (Leaky ReLU) as an activation function, although any activation function may be used, such as a sigmoid function, a hyperbolic tangent function, or a rectified linear unit function.

Figure 14:
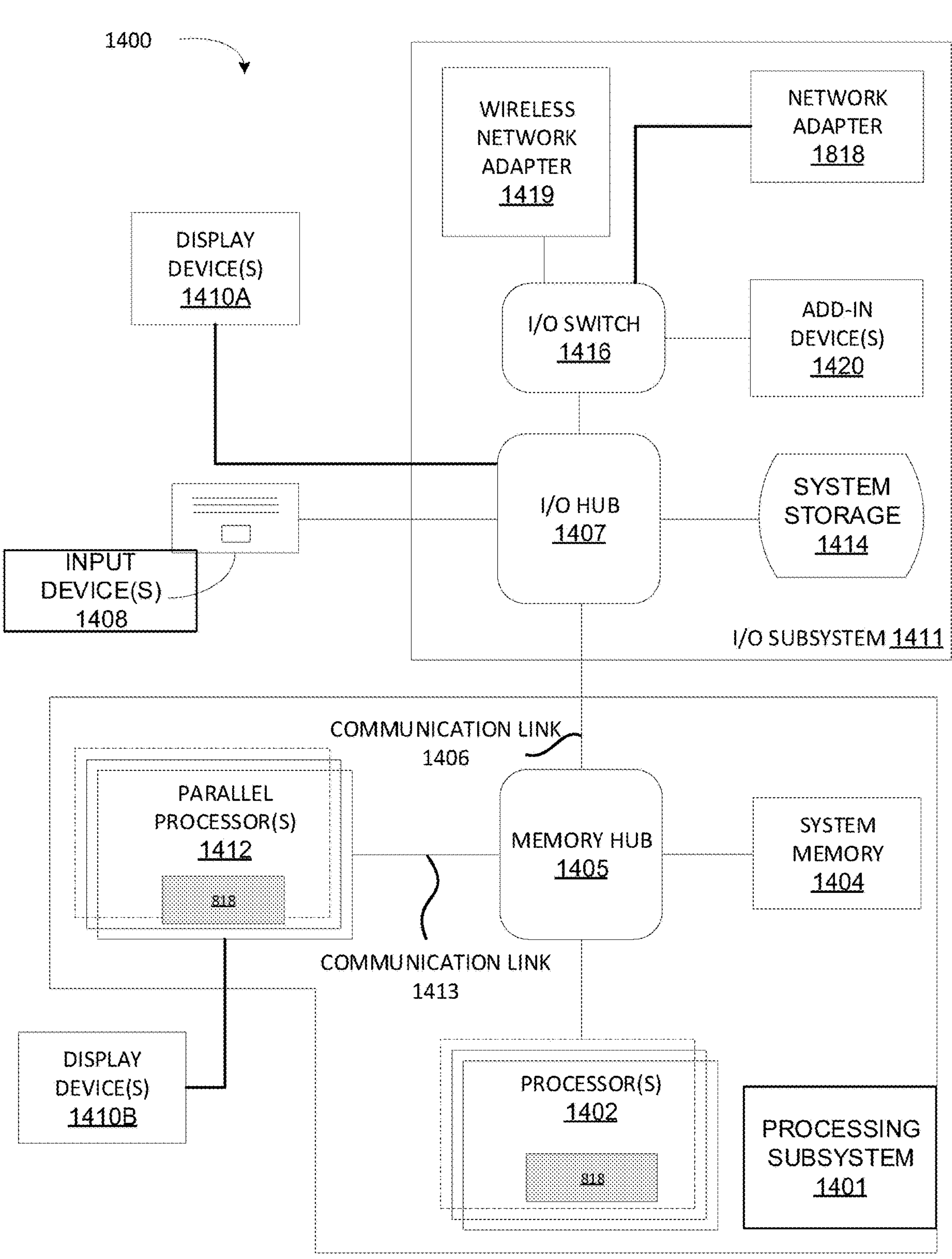
FIG. 14 illustrates a computer system, according to at least one embodiment.

FIG. 14 is a block diagram illustrating a computing system 1000 according to at least one embodiment. In at least one embodiment, computing system 1000 includes a processing subsystem 1001 having one or more processor(s) 1402 and a system memory 1404 communicating via an interconnection path that may include a memory hub 1405. In at least one embodiment, memory hub 1405 may be a separate component within a chipset component or may be integrated within one or more processor(s) 1402. In at least one embodiment, memory hub 1405 couples with an I/O subsystem 1011 via a communication link 1406. In at least one embodiment, I/O subsystem 1011 includes an I/O hub 1407 that can enable computing system 1000 to receive input from one or more input device(s) 1408. In at least one embodiment, I/O hub 1407 can enable a display controller, which may be included in one or more processor(s) 1402, to provide outputs to one or more display device(s) 1410A. In at least one embodiment, one or more display device(s) 1410A coupled with I/O hub 1407 can include a local, internal, or embedded display device.

In at least one embodiment, processing subsystem 1001 includes one or more parallel processor(s) 1412 coupled to memory hub 1405 via a bus or other communication link 1413. In at least one embodiment, communication link 1413 may be one of any number of standards based communication link technologies or protocols, such as, but not limited to PCI Express, or may be a vendor specific communications interface or communications fabric. In at least one embodiment, one or more parallel processor(s) 1412 form a computationally focused parallel or vector processing system that can include a large number of processing cores and/or processing clusters, such as a many integrated core (MIC) processor. In at least one embodiment, one or more parallel processor(s) 1412 form a graphics processing subsystem that can output pixels to one of one or more display device(s) 1410A coupled via I/O Hub 1407. In at least one embodiment, one or more parallel processor(s) 1412 can also include a display controller and display interface (not shown) to enable a direct connection to one or more display device(s) 1410B.

In at least one embodiment, a system storage unit 1414 can connect to I/O hub 1407 to provide a storage mechanism for computing system 1000. In at least one embodiment, an I/O switch 1416 can be used to provide an interface mechanism to enable connections between I/O hub 1407 and other components, such as a network adapter 1418 and/or wireless network adapter 1419 that may be integrated into this platform, and various other devices that can be added via one or more add-in device(s) 1420. In at least one embodiment, network adapter 1418 can be an Ethernet adapter or another wired network adapter. In at least one embodiment, wireless network adapter 1419 can include one or more of a Wi-Fi, Bluetooth, near field communication (NFC), or other network device that includes one or more wireless radios.

In at least one embodiment, computing system 1000 can include other components not explicitly shown, including USB or other port connections, optical storage drives, video capture devices, and similar or other components may also be connected to I/O hub 1407. In at least one embodiment, communication paths interconnecting various components in FIG. 14 may be implemented using any suitable protocols, such as PCI (Peripheral Component Interconnect) based protocols (for example, PCI-Express), or other bus or point-to-point communication interfaces and/or protocol(s), such as an NV-Link high-speed interconnect, or interconnect protocols.

In at least one embodiment, one or more parallel processor(s) 1412 incorporate circuitry optimized for graphics and video processing, including, for example, video output circuitry, and constitutes a graphics processing unit (GPU). In at least one embodiment, one or more parallel processor(s) 1412 incorporate circuitry optimized for general purpose processing. In at least embodiment, components of computing system 1000 may be integrated with one or more other system elements on a single integrated circuit. For example, in at least one embodiment, one or more parallel processor(s) 1412, memory hub 1405, processor(s) 1402, and I/O hub 1407 can be integrated into a system on chip (SoC) integrated circuit. In at least one embodiment, components of computing system 1000 can be integrated into a single package to form a system in package (SIP) configuration. In at least one embodiment, at least a portion of components of computing system 1000 can be integrated into a multi-chip module (MCM), which can be interconnected with other multi-chip modules into a modular computing system.

Inference and/or training logic 818 are used to perform inferencing and/or training operations associated with any one or more embodiments. Details regarding inference and/or training logic 818 are provided herein in conjunction with FIGS. 15A and/or 15B. In at least one embodiment, inference and/or training logic 818 may be used in system FIG. 1400 for inferencing or predicting operations based, at least in part, on weight parameters calculated using neural network training operations, neural network functions and/or architectures, or neural network use cases described herein.

In at least one embodiment, inference and/or training logic 818 performs inferencing and/or training of neural networks 20 and 30. In at least one embodiment, initial neural network 20 is any convolutional neural network structured in any manner with any kernels and any FC layer, such as a convolutional neural network such as HR-Net, jointly released by Microsoft Research Asia and University of Science and Technology of China. In at least one embodiment, initial weights of network 20 are any weight values, and for example may be set to values of pre-trained weights found at ImageNet, an online large-scale hierarchical image database, although any initial weight values may be used. In at least one embodiment, input images are 256×256 pixel images, and output heatmaps 50 are 64×64 pixel images, although any size images and any size heatmaps 50 may be used. In at least one embodiment, any batch size, number of epochs, and learning rate may be employed in training, such as a training batch size set at 32, with a maximum number of epochs set at 60 and learning rate of 1e-3. In at least one embodiment, final FC layer of convolutional neural network 20 is set to output a 72-dimensional vector of 36 2-dimensional keypoints.

In at least one embodiment, initial neural network 30 is any convolutional neural network structured in any manner with any kernels and any FC layer, such as DenseNet121 or another densely connected convolutional neural network configured for image classification, with its first convolutional layer modified to allow an additional fourth channel (red, green, blue, and heatmap) of input. In at least one embodiment, initial weights are set to those of a pre-trained model on ImageNet, although any initial weights can be employed. In at least one embodiment, input images are 256×256 pixel images, although any size images may be employed. In at least one embodiment, any training batch size may be employed, and may be for example set at 32. In at least one embodiment, any learning rate or learning rate scheme can be used. In at least one embodiment, an Adam stochastic optimizer is used to train models for 100 maximum epochs, with an initial learning rate set to 3e-4, decaying to 3e-5 and e3-6 at $30^{th}$ and $100^{th}$ epochs respectively. In at least one embodiment, a dimension of a final FC layer of identification classifier 80 is set at 1024, equal to a number of features in an output feature vector of network 30, whereas dimensions of final FC layers for color classifier 70 and type classifier 90 are each set to 512, half a number of features in their output feature vector, although any dimensions are contemplated. In at least one embodiment, FC layers of network 30 and classifiers 70, 80, 90 employ a leaky rectified linear unit (Leaky ReLU) as an activation function, although any activation function may be used, such as a sigmoid function, a hyperbolic tangent function, or a rectified linear unit function.

Inference and Training Logic

Figure 15A:
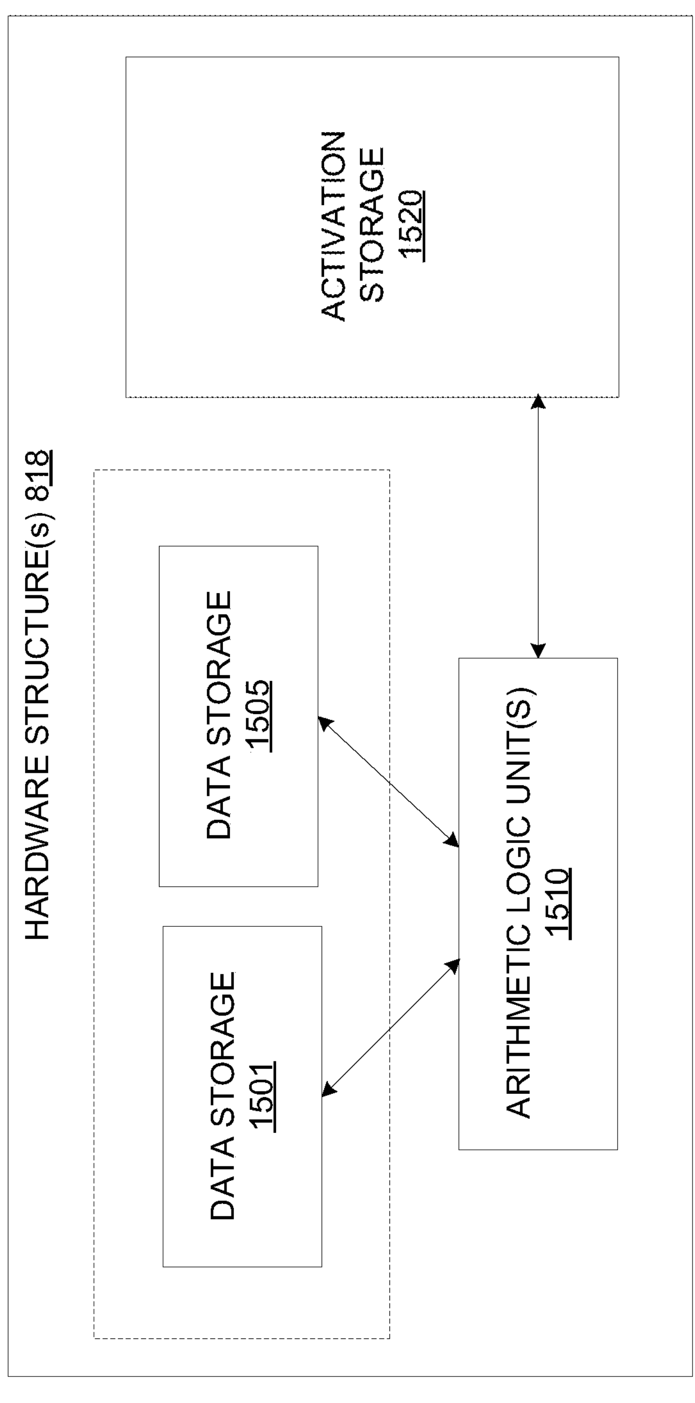
FIG. 15A illustrates inference and/or training logic, according to at least one embodiment.

Neural networks 20 and 30, including their various layers and classifiers 70, 80, and 90, can be implemented on any electronic computing system. FIG. 15A illustrates inference and/or training logic 818 used to perform inferencing and/or training operations associated with any one or more embodiments. Details regarding inference and/or training logic 818 are provided herein in conjunction with FIGS. 15A and/or 15B.

In at least one embodiment, inference and/or training logic 818 may include, without limitation, a data storage 1501 to store forward and/or output weight and/or input/output data corresponding to neurons or layers of a neural network trained and/or used for inferencing in aspects of one or more embodiments. In at least one embodiment data storage 1501 stores weight parameters and/or input/output data of each layer of a neural network trained or used in conjunction with any one or more embodiments during forward propagation of input/output data and/or weight parameters during training and/or inferencing using aspects of one or more embodiments. In at least one embodiment, any portion of data storage 1501 may be included with other on-chip or off-chip data storage, including a processor's L1, L2, or L3 cache or system memory.

In at least one embodiment, any portion of data storage 1501 may be internal or external to one or more processors or other hardware logic devices or circuits. In at least one embodiment, data storage 1501 may be cache memory, dynamic randomly addressable memory ("DRAM"), static randomly addressable memory ("SRAM"), non-volatile memory (for example, Flash memory), or other storage. In at least one embodiment, choice of whether data storage 1501 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 818 may include, without limitation, a data storage 1505 to store backward and/or output weight and/or input/output data corresponding to neurons or layers of a neural network trained and/or used for inferencing in aspects of one or more embodiments. In at least one embodiment, data storage 1505 stores weight parameters and/or input/output data of each layer of a neural network trained or used in conjunction with any one or more embodiments during backward propagation of input/output data and/or weight parameters during training and/or inferencing using aspects of one or more embodiments. In at least one embodiment, any portion of data storage 1505 may be included with other on-chip or off-chip data storage, including a processor's L1, L2, or L3 cache or system memory. In at least one embodiment, any portion of data storage 1505 may be internal or external to on one or more processors or other hardware logic devices or circuits. In at least one embodiment, data storage 1505 may be cache memory, DRAM, SRAM, non-volatile memory (for example, Flash memory), or other storage. In at least one embodiment, choice of whether data storage 1505 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, data storage 1501 and data storage 1505 may be separate storage structures. In at least one embodiment, data storage 1501 and data storage 1505 may be same storage structure. In at least one embodiment, data storage 1501 and data storage 1505 may be partially same storage structure and partially separate storage structures. In at least one embodiment, any portion of data storage 1501 and data storage 1505 may be included with other on-chip or off-chip data storage, including a processor's L1, L2, or L3 cache or system memory.

In at least one embodiment, inference and/or training logic 818 may include, without limitation, one or more arithmetic logic unit(s) ("ALU(s)") 1510 to perform logical and/or mathematical operations based, at least in part on, or indicated by, training and/or inference code, result of which may result in activations (for example, output values from layers or neurons within a neural network) stored in an activation storage 1520 that are functions of input/output and/or weight parameter data stored in data storage 1501 and/or data storage 1505. In at least one embodiment, activations stored in activation storage 1520 are generated according to linear algebraic and or matrix-based mathematics performed by ALU(s) 1510 in response to performing instructions or other code, wherein weight values stored in data storage 1505 and/or data 1501 are used as operands along with other values, such as bias values, gradient information, momentum values, or other parameters or hyperparameters, any or all of which may be stored in data storage 1505 or data storage 1501 or another storage on or off-chip. In at least one embodiment, ALU(s) 1510 are included within one or more processors or other hardware logic devices or circuits, whereas in another embodiment, ALU(s) 1510 may be external to a processor or other hardware logic device or circuit that uses them (for example, a co-processor). In at least one embodiment, ALUs 1510 may be included within a processor's execution units or otherwise within a bank of ALUs accessible by a processor's execution units either within same processor or distributed between different processors of different types (for example, central processing units, graphics processing units, fixed function units, etc.). In at least one embodiment, data storage 1501, data storage 1505, and activation storage 1520 may be on a same processor or other hardware logic device or circuit, whereas in another embodiment, they may be in different processors or other hardware logic devices or circuits, or some combination of same and different processors or other hardware logic devices or circuits. In at least one embodiment, any portion of activation storage 1520 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 1520 may be cache memory, DRAM, SRAM, non-volatile memory (for example, Flash memory), or other storage. In at least one embodiment, activation storage 1520 may be completely or partially within or external to one or more processors or other logical circuits. In at least one embodiment, a choice of whether activation storage 1520 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 818 illustrated in FIG. 15A may be used in conjunction with an application-specific integrated circuit ("ASIC"), such as TensorFlow® Processing Unit from Google, an inference processing unit (IPU) from Graphcore™, or a Nervana® (for example, "Lake Crest") processor from Intel Corp. In at least one embodiment, inference and/or training logic 818 illustrated in FIG. 15A may be used in conjunction with central processing unit ("CPU") hardware, graphics processing unit ("GPU") hardware or other hardware, such as field programmable gate arrays ("FPGAs").

Figure 15B:
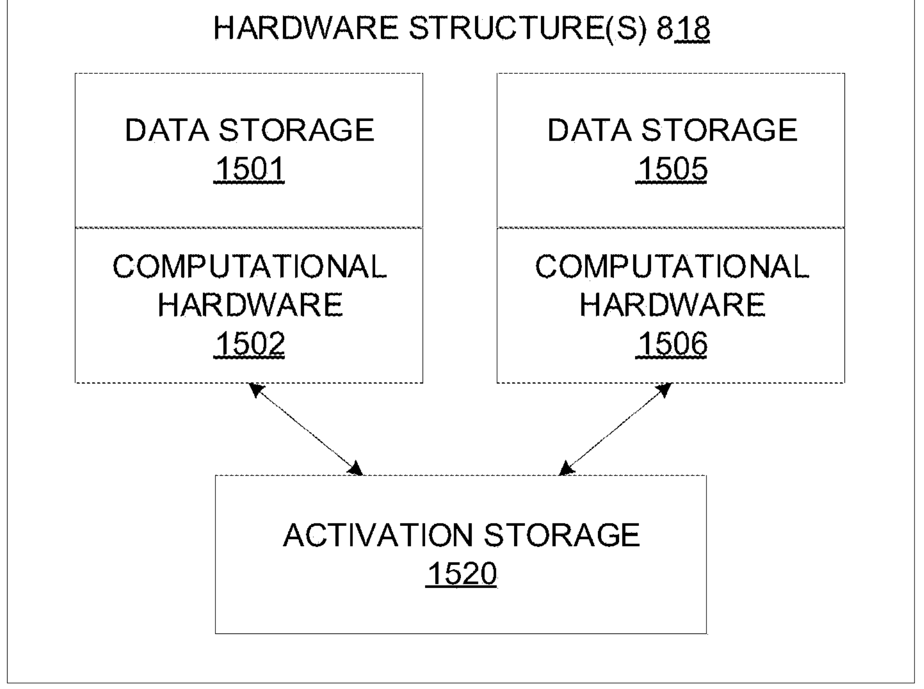
FIG. 15B illustrates inference and/or training logic, according to at least one embodiment.

FIG. 15B illustrates inference and/or training logic 818, according to at least one embodiment various. In at least one embodiment, inference and/or training logic 818 may include, without limitation, hardware logic in which computational resources are dedicated or otherwise exclusively used in conjunction with weight values or other information corresponding to one or more layers of neurons within a neural network. In at least one embodiment, inference and/or training logic 818 illustrated in FIG. 15B may be used in conjunction with an application-specific integrated circuit (ASIC), such as TensorFlow® Processing Unit from Google, an inference processing unit (IPU) from Graphcore™, or a Nervana® (for example, "Lake Crest") processor from Intel Corp. In at least one embodiment, inference and/or training logic 818 illustrated in FIG. 15B may be used in conjunction with central processing unit (CPU) hardware, graphics processing unit (GPU) hardware or other hardware, such as field programmable gate arrays (FPGAs). In at least one embodiment, inference and/or training logic 818 includes, without limitation, data storage 1501 and data storage 1505, which may be used to store weight values and/or other information, including bias values, gradient information, momentum values, and/or other parameter or hyperparameter information. In at least one embodiment illustrated in FIG. 15B, each of data storage 1501 and data storage 1505 is associated with a dedicated computational resource, such as computational hardware 1502 and computational hardware 1506, respectively. In at least one embodiment, each of computational hardware 1502 and computational hardware 1506 comprises one or more ALUs that perform mathematical functions, such as linear algebraic functions, only on information stored in data storage 1501 and data storage 1505, respectively, result of which is stored in activation storage 1520.

In at least one embodiment, each of data storage 1501 and 1505 and corresponding computational hardware 1502 and 1506, respectively, correspond to different layers of a neural network, such that resulting activation from one "storage/computational pair 1501/1102" of data storage 1501 and computational hardware 1502 is provided as an input to next "storage/computational pair 1505/1106" of data storage 1505 and computational hardware 1506, in order to mirror conceptual organization of a neural network. In at least one embodiment, each of storage/computational pairs 1501/1102 and 1505/1106 may correspond to more than one neural network layer. In at least one embodiment, additional storage/computation pairs (not shown) subsequent to or in parallel with storage computation pairs 1501/1102 and 1505/1106 may be included in inference and/or training logic 818.

Neural Network Training and Deployment

In at least one embodiment, training of neural networks 20 and 30, as well as classifiers 70, 80, and 90, is performed in any manner such as by any loss function, and by any suitable electronic computing system. In at least one embodiment, second neural network 30 is trained according to a loss function that is a joint loss of outputs of classifiers 70, 80, and 90. That is, training in at least one embodiment is performed according to joint loss of color, type, and identification classifications. In at least one embodiment, identification classifier loss is a sum of hard-mining triplet loss and cross-entropy loss:

$$\mathcal{L}_{ID} = \lambda_{htri}\mathcal{L}_{htri}(\alpha, p, n) + \lambda_{xent}\mathcal{L}_{xent}(y, \hat{y})$$

where $\lambda_{htri}$ and $\lambda_{xent}$ are regularization factors that can be set to 1 and $L_{htri}(\alpha, p, n)$ is a hard triplet loss with α, p, and n respectively denoting anchor, positive and negative samples:

$$\mathcal{L}_{htri}(\alpha, p, n) = [\alpha + \max(D_{ap}) - \min(D_{an})]_+$$

where α is distance margin, $D_{ap}$ and $D_{an}$ are distance metrics between an anchor and all positive/negative samples, and [•]+ indicates max(•,0); and $L_{xent}$ is a cross-entropy loss:

$$\mathcal{L}_{xent}(y, \hat{y}) = -\frac{1}{N}\sum_{i=1}^{N} y_i \log(\hat{y}_i)$$

where y is a ground-truth vector, ŷ is an estimation, and N=number of classes. In at least one embodiment, cross-entropy losses of color classifier 70 and type classifier 90 are:

$$\mathcal{L}_{color} = \mathcal{L}_{xent}(y_{color}, \hat{y}_{color})$$

$$\mathcal{L}_{type} = \mathcal{L}_{xent}(y_{type}, \hat{y}_{type})$$

In at least one embodiment, a final loss is thus a weighted combination of each classification:

$$\mathcal{L}(\Theta, X) = \mathcal{L}_{ID} + \lambda_{color}\mathcal{L}_{color} + \lambda_{type}\mathcal{L}_{type}$$

where $X=\{(x_i,y_i)\}$ represents an input training set and Θ is a set of network parameters. In at least one embodiment, regularization parameters are set to much lower than 1.0, for example 0.125, as identification may conflict with color/type classification, such as when two different objects have a same color/type. In at least one embodiment, color and type terms are omitted from final loss function L(Θ,X), so that final loss is a function of $L_{ID}$ only, that is, only output of classifier 80 is used to train network 30. In at least one embodiment, either color terms or type terms are omitted from final loss function L(Θ,X), so that final loss is a function of $L_{ID}$ and either color terms or type terms, that is, output of classifier 80 is used to train network 30, and output of either classifier 70 or classifier 90 is also used to train network 30.

In at least one embodiment, training is performed using input images of objects as described above, where these images are images of actual physical objects. In at least one embodiment, training is performed using input images that are synthetic images or simulated objects, such as computer-generated images of objects. In at least one embodiment, training is performed using input images that are a mix of both images of actual physical objects and synthetic images.

Figure 16:
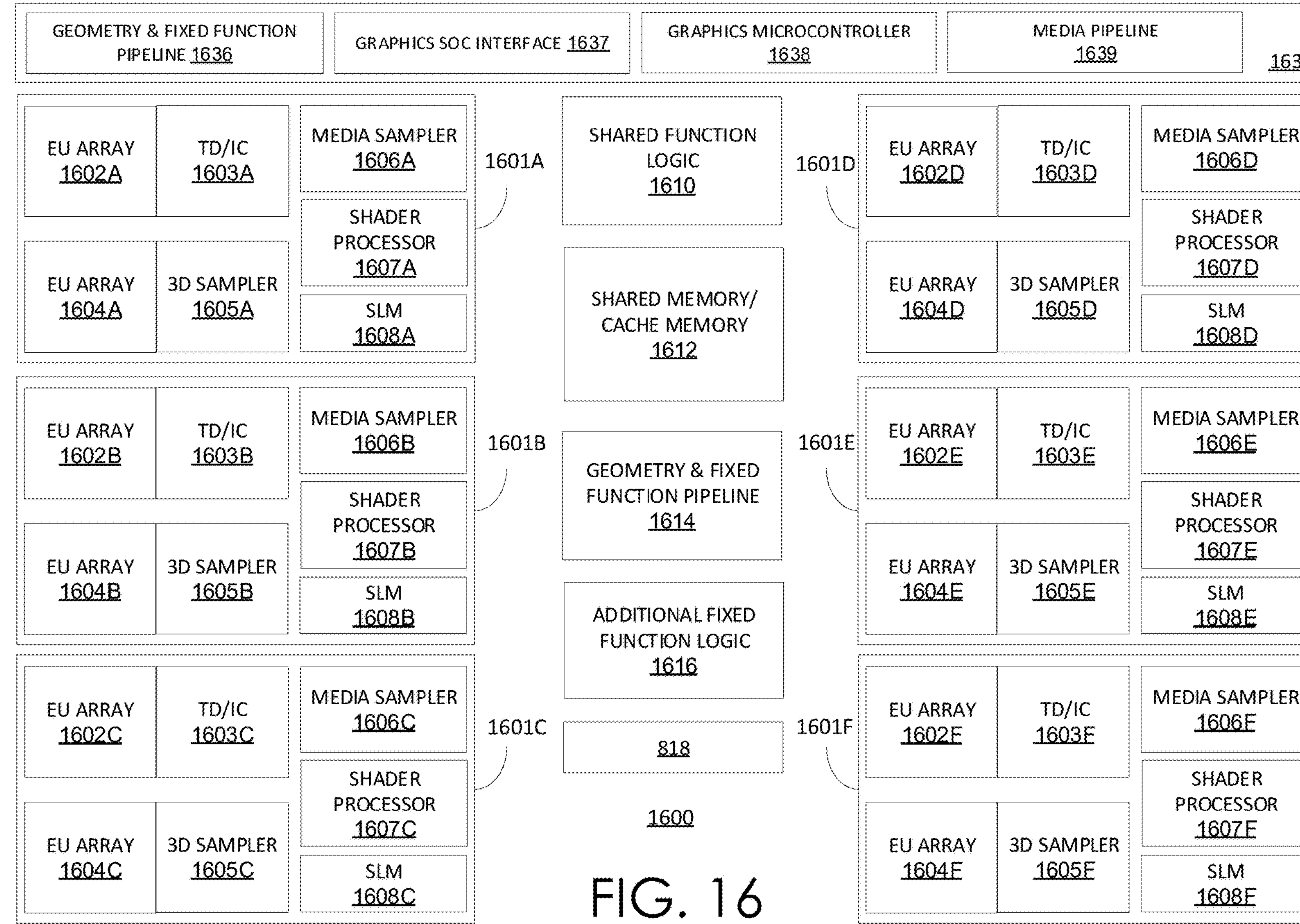
FIG. 16 illustrates training and deployment of a neural network, according to at least one embodiment.

In at least one embodiment, training as above can be performed on any suitable electronic computer. FIG. 16 illustrates training and deployment of a deep neural network, according to at least one embodiment. In at least one embodiment, untrained neural network 1606 is trained using a training dataset 1602. In at least one embodiment, training framework 1604 is a PyTorch framework, whereas in other embodiments, training framework 1604 is a TensorFlow, Boost, Caffe, Microsoft Cognitive Toolkit/CNTK, MXNet, Chainer, Keras, Deeplearning4j, or other training framework. In at least one embodiment training framework 1604 trains an untrained neural network 1606 and enables it to be trained using processing resources described herein to generate a trained neural network 1608. In at least one embodiment, weights may be chosen randomly or by pre-training using a deep belief network. In at least one embodiment, training may be performed in either a supervised, partially supervised, or unsupervised manner.

In at least one embodiment, untrained neural network 1606 is trained using supervised learning, wherein training dataset 1602 includes an input paired with a desired output for an input, or where training dataset 1602 includes input having known output and outputs of neural networks are manually graded. In at least one embodiment, untrained neural network 1606 is trained in a supervised manner processes inputs from training dataset 1602 and compares resulting outputs against a set of expected or desired outputs. In at least one embodiment, errors are then propagated back through untrained neural network 1606. In at least one embodiment, training framework 1604 adjusts weights that control untrained neural network 1606. In at least one embodiment, training framework 1604 includes tools to monitor how well untrained neural network 1606 is converging towards a model, such as trained neural network 1608, suitable to generating correct answers, such as in result 1614, based on known input data, such as new data 1612. In at least one embodiment, training framework 1604 trains untrained neural network 1606 repeatedly while adjust weights to refine an output of untrained neural network 1606 using a loss function and adjustment algorithm, such as stochastic gradient descent. In at least one embodiment, training framework 1604 trains untrained neural network 1606 until untrained neural network 1606 achieves a desired accuracy. In at least one embodiment, trained neural network 1608 can then be deployed to implement any number of machine learning operations.

In at least one embodiment, untrained neural network 1606 is trained using unsupervised learning, wherein untrained neural network 1606 attempts to train itself using unlabeled data. In at least one embodiment, unsupervised learning training dataset 1602 will include input data without any associated output data or "ground truth" data. In at least one embodiment, untrained neural network 1606 can learn groupings within training dataset 1602 and can determine how individual inputs are related to untrained dataset 1602. In at least one embodiment, unsupervised training can be used to generate a self-organizing map, which is a type of trained neural network 1608 capable of performing operations useful in reducing dimensionality of new data 1612. In at least one embodiment, unsupervised training can also be used to perform anomaly detection, which allows identification of data points in a new dataset 1612 that deviate from normal patterns of new dataset 1612.

In at least one embodiment, semi-supervised learning may be used, which is a technique in which training dataset 1602 includes a mix of labeled and unlabeled data. In at least one embodiment, training framework 1604 may be used to perform incremental learning, such as through transferred learning techniques. In at least one embodiment, incremental learning enables trained neural network 1608 to adapt to new data 1612 without forgetting knowledge instilled within network during initial training.

Data Center

Figure 17:
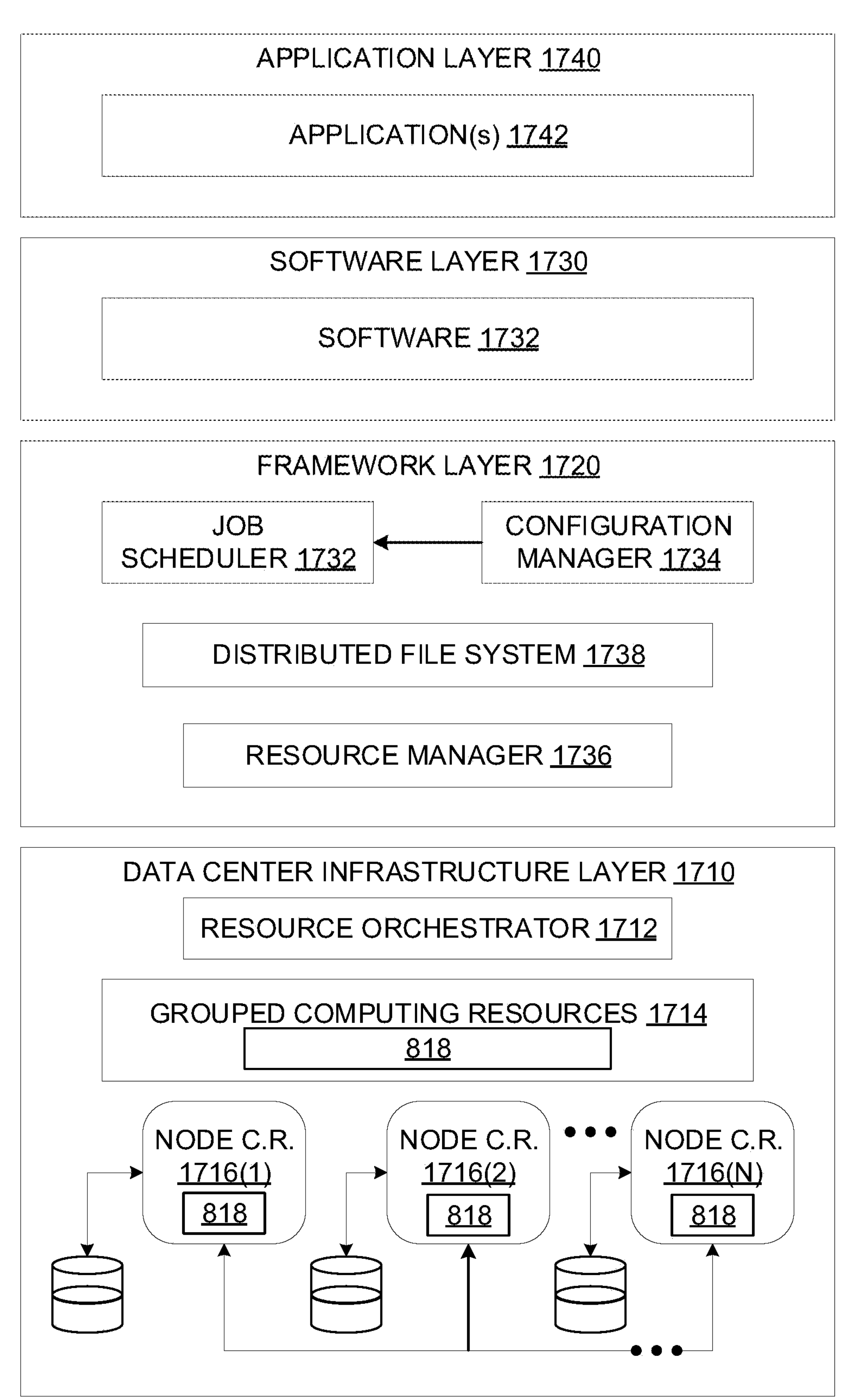
FIG. 17 illustrates an example data center system, according to at least one embodiment.

FIG. 17 illustrates an example data center 1700, in which at least one embodiment may be used. In at least one embodiment, data center 1700 includes a data center infrastructure layer 1710, a framework layer 1720, a software layer 1730 and an application layer 1740.

In at least one embodiment, as shown in FIG. 17, data center infrastructure layer 1710 may include a resource orchestrator 1712, grouped computing resources 1714, and node computing resources ("node C.R.s") 1716(1)-1316(N), where "N" represents any whole, positive integer. In at least one embodiment, node C.R.s 1716(1)-1316(N) may include, but are not limited to, any number of central processing units ("CPUs") or other processors (including accelerators, field programmable gate arrays (FPGAs), graphics processors, etc.), memory devices (for example, dynamic read-only memory), storage devices (for example, solid state or disk drives), network input/output ("NW I/O") devices, network switches, virtual machines ("VMs"), power modules, and cooling modules, etc. In at least one embodiment, one or more node C.R.s from among node C.R.s 1716(1)-1316(N) may be a server having one or more of above-mentioned computing resources.

In at least one embodiment, grouped computing resources 1714 may include separate groupings of node C.R.s housed within one or more racks (not shown), or many racks housed in data centers at various geographical locations (also not shown). Separate groupings of node C.R.s within grouped computing resources 1714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1722 may configure or otherwise control one or more node C.R.s 1716(1)-1316(N) and/or grouped computing resources 1714. In at least one embodiment, resource orchestrator 1722 may include a software design infrastructure ("SDI") management entity for data center 1700. In at least one embodiment, resource orchestrator may include hardware, software or some combination thereof.

In at least one embodiment, as shown in FIG. 17, framework layer 1720 includes a job scheduler 1732, a configuration manager 1734, a resource manager 1736 and a distributed file system 1738. In at least one embodiment, framework layer 1720 may include a framework to support software 1732 of software layer 1730 and/or one or more application(s) 1742 of application layer 1740. In at least one embodiment, software 1732 or application(s) 1742 may respectively include web-based service software or applications, such as those provided by Amazon Web Services, Google Cloud and Microsoft Azure. In at least one embodiment, framework layer 1720 may be, but is not limited to, a type of free and open-source software web application framework such as Apache Spark™ (hereinafter "Spark") that may utilize distributed file system 1738 for large-scale data processing (for example, "big data"). In at least one embodiment, job scheduler 1732 may include a Spark driver to facilitate scheduling of workloads supported by various layers of data center 1700. In at least one embodiment, configuration manager 1734 may be capable of configuring different layers such as software layer 1730 and framework layer 1720 including Spark and distributed file system 1738 for supporting large-scale data processing. In at least one embodiment, resource manager 1736 may be capable of managing clustered or grouped computing resources mapped to or allocated for support of distributed file system 1738 and job scheduler 1732. In at least one embodiment, clustered or grouped computing resources may include grouped computing resource 1714 at data center infrastructure layer 1710. In at least one embodiment, resource manager 1736 may coordinate with resource orchestrator 1712 to manage these mapped or allocated computing resources.

In at least one embodiment, software 1732 included in software layer 1730 may include software used by at least portions of node C.R.s 1716(1)-1316(N), grouped computing resources 1714, and/or distributed file system 1738 of framework layer 1720. One or more types of software may include, but are not limited to, Internet web page search software, e-mail virus scan software, database software, and streaming video content software.

In at least one embodiment, application(s) 1742 included in application layer 1740 may include one or more types of applications used by at least portions of node C.R.s 1716(1)-1316(N), grouped computing resources 1714, and/or distributed file system 1738 of framework layer 1720. One or more types of applications may include, but are not limited to, any number of a genomics application, a cognitive compute, and a machine learning application, including training or inferencing software, machine learning framework software (for example, PyTorch, TensorFlow, Caffe, etc.) or other machine learning applications used in conjunction with any one or more embodiments.

In at least one embodiment, any of configuration manager 1734, resource manager 1736, and resource orchestrator 1712 may implement any number and type of self-modifying actions based on any amount and type of data acquired in any technically feasible fashion. In at least one embodiment, self-modifying actions may relieve a data center operator of data center 1700 from making possibly bad configuration decisions and possibly avoiding underutilized and/or poor performing portions of a data center.

In at least one embodiment, data center 1700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1700. In at least one embodiment, trained machine learning models corresponding to one or more neural networks may be used to infer or predict information using resources described above with respect to data center 1700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 818 are used to perform inferencing and/or training operations associated with any one or more embodiments. Details regarding inference and/or training logic 818 are provided herein in conjunction with FIGS. 15A and/or 15B. In at least one embodiment, inference and/or training logic 818 may be used in system FIG. 17 for inferencing or predicting operations based, at least in part, on weight parameters calculated using neural network training operations, neural network functions and/or architectures, or neural network use cases described herein.

In at least one embodiment, neural networks 20 and 30 are implemented as one or more machine learning applications of applications 1742, where training and/or inferencing operations are performed by one or more node C.R.s 1716(1)-1316(N). In at least one embodiment, neural networks 20 and 30 are trained on images stored on memory devices of one or more node C.R.s 1716(1)-1316(N).

Autonomous Vehicle

Figure 18A:
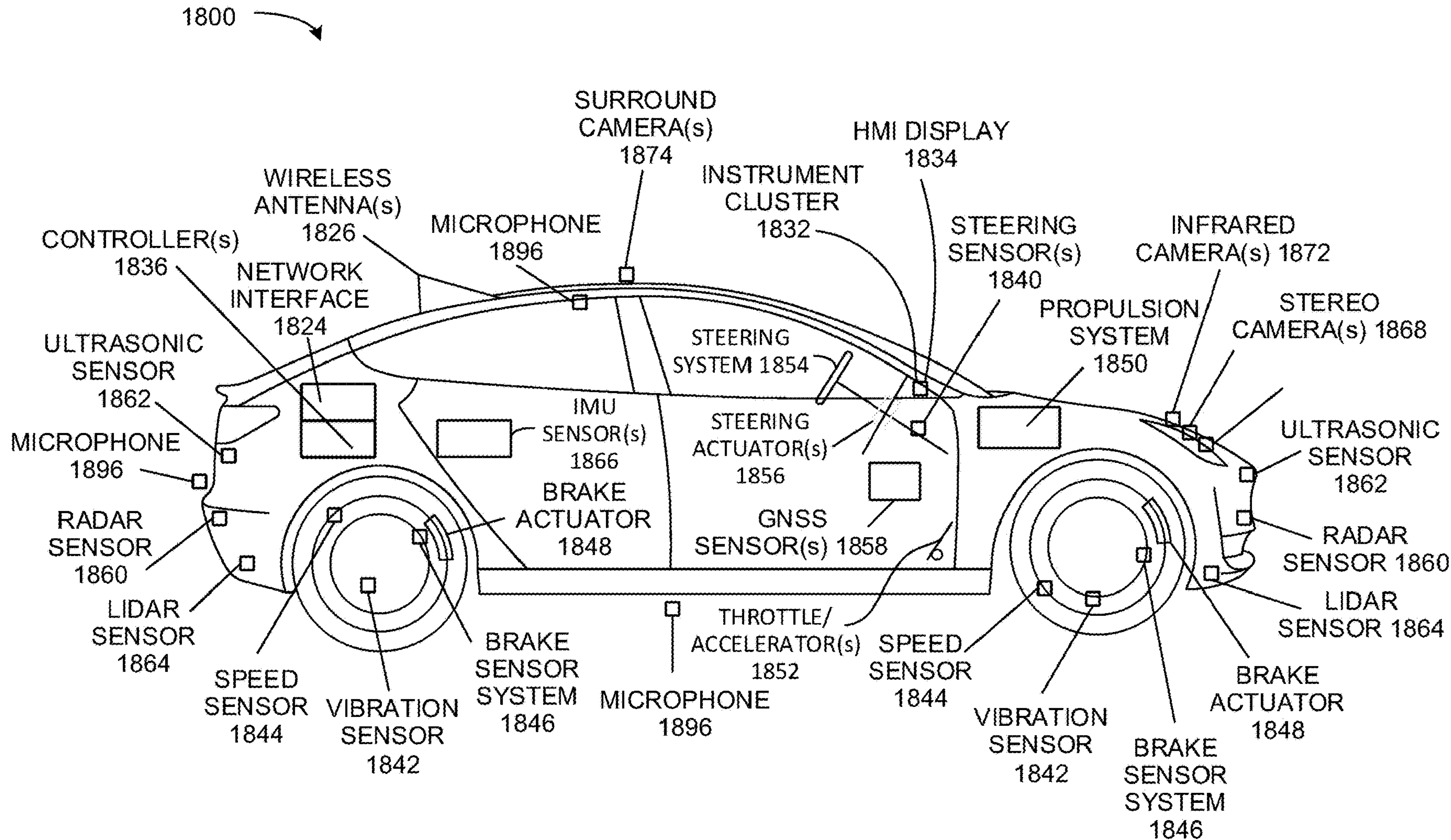
FIG. 18A illustrates an example of an autonomous vehicle, according to at least one embodiment.

FIG. 18A illustrates an example of an autonomous vehicle 1800, according to at least one embodiment. In at least one embodiment, autonomous vehicle 1800 (alternatively referred to herein as "vehicle 1800") may be, without limitation, a passenger vehicle, such as a car, a truck, a bus, and/or another type of vehicle that accommodates one or more passengers. In at least one embodiment, vehicle 1800 may be a semi-tractor-trailer truck used for hauling cargo. In at least one embodiment, vehicle 1800 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (for example, Standard No. J3016-201806, published on Jun. 19, 2418, Standard No. J3016-201609, published on Sep. 30, 2416, and previous and future versions of this standard). In one or more embodiments, vehicle 1800 may be capable of functionality in accordance with one or more of level 1-level 9 of autonomous driving levels. For example, in at least one embodiment, vehicle 1800 may be capable of conditional automation (Level 3), high automation (Level 8), and/or full automation (Level 9), depending on embodiment.

In at least one embodiment, vehicle 1800 may include, without limitation, components such as a chassis, a vehicle body, wheels (for example, 2, 8, 10, 12, 22, etc.), tires, axles, and other components of a vehicle. In at least one embodiment, vehicle 1800 may include, without limitation, a propulsion system 1850, such as an internal combustion engine, hybrid electric power plant, an all-electric engine, and/or another propulsion system type. In at least one embodiment, propulsion system 1850 may be connected to a drive train of vehicle 1800, which may include, without limitation, a transmission, to enable propulsion of vehicle 1800. In at least one embodiment, propulsion system 1850 may be controlled in response to receiving signals from a throttle/accelerator(s) 1852.

In at least one embodiment, a steering system 1854, which may include, without limitation, a steering wheel, is used to steer a vehicle 1800 (for example, along a desired path or route) when a propulsion system 1850 is operating (for example, when vehicle is in motion). In at least one embodiment, a steering system 1854 may receive signals from steering actuator(s) 1856. Steering wheels may be optional for full automation (Level 9) functionality. In at least one embodiment, a brake sensor system 1846 may be used to operate vehicle brakes in response to receiving signals from brake actuator(s) 1848 and/or brake sensors.

In at least one embodiment, controller(s) 1836, which may include, without limitation, one or more system on chips ("SoCs") (not shown in FIG. 18A) and/or graphics processing unit(s) ("GPU(s)"), provide signals (for example, representative of commands) to one or more components and/or systems of vehicle 1800. For instance, in at least one embodiment, controller(s) 1836 may send signals to operate vehicle brakes via brake actuators 1848, to operate steering system 1854 via steering actuator(s) 1856, to operate propulsion system 1850 via throttle/accelerator(s) 1852. Controller(s) 1836 may include one or more onboard (for example, integrated) computing devices (for example, supercomputers) that process sensor signals, and output operation commands (for example, signals representing commands) to enable autonomous driving and/or to assist a human driver in driving vehicle 1800. In at least one embodiment, controller(s) 1836 may include a first controller 1836 for autonomous driving functions, a second controller 1836 for functional safety functions, a third controller 1836 for artificial intelligence functionality (for example, computer vision), a fourth controller 1836 for infotainment functionality, a fifth controller 1836 for redundancy in emergency conditions, and/or other controllers. In at least one embodiment, a single controller 1836 may handle two or more of above functionalities, two or more controllers 1836 may handle a single functionality, and/or any combination thereof.

In at least one embodiment, controller(s) 1836 provide signals for controlling one or more components and/or systems of vehicle 1800 in response to sensor data received from one or more sensors (for example, sensor inputs). In at least one embodiment, sensor data may be received from, for example and without limitation, global navigation satellite systems ("GNSS") sensor(s) 1858 (for example, Global Positioning System sensor(s)), RADAR sensor(s) 1860, ultrasonic sensor(s) 1862, LIDAR sensor(s) 1864, inertial measurement unit ("IMU") sensor(s) 1866 (for example, accelerometer(s), gyroscope(s), magnetic compass(es), magnetometer(s), etc.), microphone(s) 1896, stereo camera(s) 1868, wide-view camera(s) 1870 (for example, fisheye cameras), infrared camera(s) 1872, surround camera(s) 1874 (for example, 360 degree cameras), long-range cameras (not shown in FIG. 18A), mid-range camera(s) (not shown in FIG. 18A), speed sensor(s) 1844 (for example, for measuring speed of vehicle 1800), vibration sensor(s) 1842, steering sensor(s) 1840, brake sensor(s) (for example, as part of brake sensor system 1846), and/or other sensor types.

In at least one embodiment, one or more of controller(s) 1836 may receive inputs (for example, represented by input data) from an instrument cluster 1832 of vehicle 1800 and provide outputs (for example, represented by output data, display data, etc.) via a human-machine interface ("HMI") display 1834, an audible annunciator, a loudspeaker, and/or via other components of vehicle 1800. In at least one embodiment, outputs may include information such as vehicle velocity, speed, time, map data (for example, a High Definition map (not shown in FIG. 18A), location data (for example, vehicle's 1800 location, such as on a map), direction, location of other vehicles (for example, an occupancy grid), information about objects and status of objects as perceived by controller(s) 1836, etc. For example, in at least one embodiment, HMI display 1834 may display information about presence of one or more objects (for example, a street sign, caution sign, traffic light changing, etc.), and/or information about driving maneuvers vehicle has made, is making, or will make (for example, changing lanes now, taking exit 34B in two miles, etc.).

In at least one embodiment, vehicle 1800 further includes a network interface 1824 which may use wireless antenna(s) 1826 and/or modem(s) to communicate over one or more networks. For example, in at least one embodiment, network interface 1824 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. In at least one embodiment, wireless antenna(s) 1826 may also enable communication between objects in environment (for example, vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Inference and/or training logic 818 are used to perform inferencing and/or training operations associated with any one or more embodiments. Details regarding inference and/or training logic 818 are provided herein in conjunction with FIGS. 15A and/or 15B. In at least one embodiment, inference and/or training logic 818 may be used in system FIG. 18A for inferencing or predicting operations based, at least in part, on weight parameters calculated using neural network training operations, neural network functions and/or architectures, or neural network use cases described herein.

In at least one embodiment, inferencing logic 818 implements neural networks 20 and 30 of FIG. 1, so as to identify objects such as other vehicles as described herein. In at least one embodiment, vehicle identification is performed to identify vehicles near vehicle 1800, so as to identify vehicles that may require certain actions. In at least one embodiment, vehicle 1800 may reduce its speed when it identifies a nearby police car. In at least one embodiment, vehicle 1800 may change its course so as to give a wider berth to an identified bicycle.

Figure 18B:
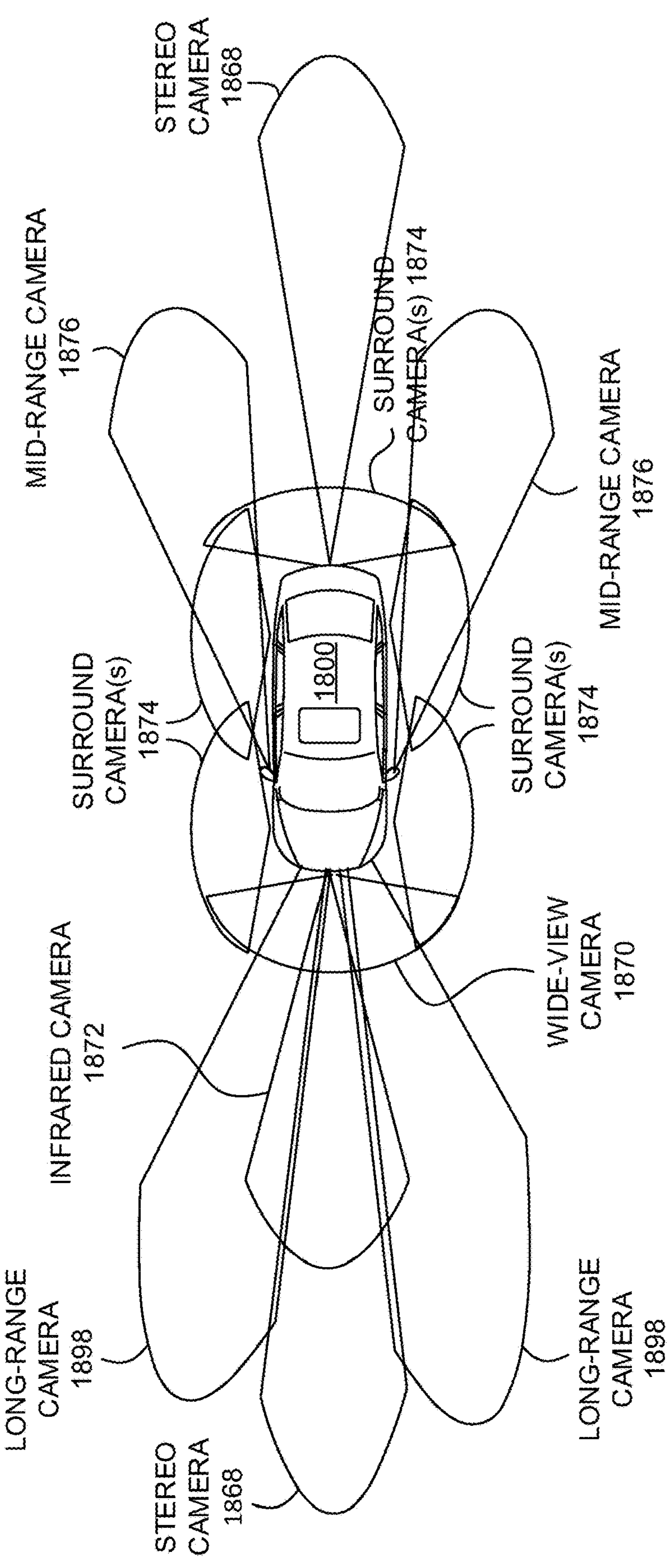
FIG. 18B illustrates an example of camera locations and fields of view for an autonomous vehicle of FIG. 18A, according to at least one embodiment.

FIG. 18B illustrates an example of camera locations and fields of view for autonomous vehicle 1800 of FIG. 18A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 1800.

In at least one embodiment, camera types for cameras may include, but are not limited to, digital cameras that may be adapted for use with components and/or systems of vehicle 1800. Camera(s) may operate at automotive safety integrity level ("ASIL") B and/or at another ASIL. In at least one embodiment, camera types may be capable of any image capture rate, such as 100 frames per second (fps), 1620 fps, 280 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (for example, as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (for example, all of cameras) may record and provide image data (for example, video) simultaneously.

In at least one embodiment, one or more of cameras may be mounted in a mounting assembly, such as a custom designed (three-dimensional ("3D") printed) assembly, in order to cut out stray light and reflections from within car (for example, reflections from dashboard reflected in windshield mirrors) which may interfere with camera's image data capture abilities. With reference to wing-mirror mounting assemblies, in at least one embodiment, wing-mirror assemblies may be custom 3D printed so that camera mounting plate matches shape of wing-mirror. In at least one embodiment, camera(s) may be integrated into a wing-mirror. For side-view cameras, camera(s) may also be integrated within four pillars at each corner of their cab, in at least one embodiment.

In at least one embodiment, cameras with a field of view that include portions of environment in front of vehicle 1800 (for example, front-facing cameras) may be used for surround view, to help identify forward facing paths and obstacles, as well as aid in, with help of one or more of controllers 1836 and/or control SoCs, providing information critical to generating an occupancy grid and/or determining preferred vehicle paths. In at least one embodiment, front-facing cameras may be used to perform many of same ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, wide-view camera 1870 may be used to perceive objects coming into view from periphery (for example, pedestrians, crossing traffic or bicycles). Although only one wide-view camera 1870 is illustrated in FIG. 18B, in other embodiments, there may be any number (including zero) of wide-view camera(s) 1870 on vehicle 1800. In at least one embodiment, any number of long-range camera(s) 1898 (for example, a long-view stereo camera pair) may be used for depth-based object detection, especially for objects for which a neural network has not yet been trained. In at least one embodiment, long-range camera(s) 1898 may also be used for object detection and classification, as well as basic object tracking.

In at least one embodiment, any number of stereo camera(s) 1868 may also be included in a front-facing configuration. In at least one embodiment, one or more of stereo camera(s) 1868 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of environment of vehicle 1800, including a distance estimate for all points in image. In at least one embodiment, one or more of stereo camera(s) 1868 may include, without limitation, compact stereo vision sensor(s) that may include, without limitation, two camera lenses (one each on left and right) and an image processing chip that may measure distance from vehicle 1800 to target object and use generated information (for example, metadata) to activate autonomous emergency braking and lane departure warning functions. In at least one embodiment, other types of stereo camera(s) 1868 may be used in addition to, or alternatively from, those described herein.

In at least one embodiment, cameras with a field of view that include portions of environment to side of vehicle 1800 (for example, side-view cameras) may be used for surround view, providing information used to create and update occupancy grid, as well as to generate side impact collision warnings. For example, in at least one embodiment, surround camera(s) 1874 (for example, four surround cameras 1874 as illustrated in FIG. 18B) could be positioned on vehicle 1800. Surround camera(s) 1874 may include, without limitation, any number and combination of wide-view camera(s) 1870, fisheye camera(s), 360 degree camera(s), and/or like. For instance, in at least one embodiment, four fisheye cameras may be positioned on front, rear, and sides of vehicle 1800. In at least one embodiment, vehicle 1800 may use three surround camera(s) 1874 (for example, left, right, and rear), and may leverage one or more other camera(s) (for example, a forward-facing camera) as a fourth surround-view camera.

In at least one embodiment, cameras with a field of view that include portions of environment to rear of vehicle 1800 (for example, rear-view cameras) may be used for park assistance, surround view, rear collision warnings, and creating and updating occupancy grid. In at least one embodiment, a wide variety of cameras may be used including, but not limited to, cameras that are also suitable as a front-facing camera(s) (for example, long-range cameras 1898 and/or mid-range camera(s) 1876, stereo camera(s) 1868), infrared camera(s) 1872, etc.), as described herein.

Inference and/or training logic 818 are used to perform inferencing and/or training operations associated with any one or more embodiments. Details regarding inference and/or training logic 818 are provided herein in conjunction with FIGS. 15A and/or 15B. In at least one embodiment, inference and/or training logic 818 may be used in system FIG. 18B for inferencing or predicting operations based, at least in part, on weight parameters calculated using neural network training operations, neural network functions and/or architectures, or neural network use cases described herein.

In at least one embodiment, inferencing logic 818 implements neural networks 20 and 30 of FIG. 1, so as to identify objects such as other vehicles as described herein. In at least one embodiment, vehicle identification is performed to identify vehicles near vehicle 1800, so as to identify vehicles that may require certain actions. In at least one embodiment, vehicle 1800 may reduce its speed when it identifies a nearby police car. In at least one embodiment, vehicle 1800 may change its course so as to give a wider berth to an identified bicycle.

Figure 18C:
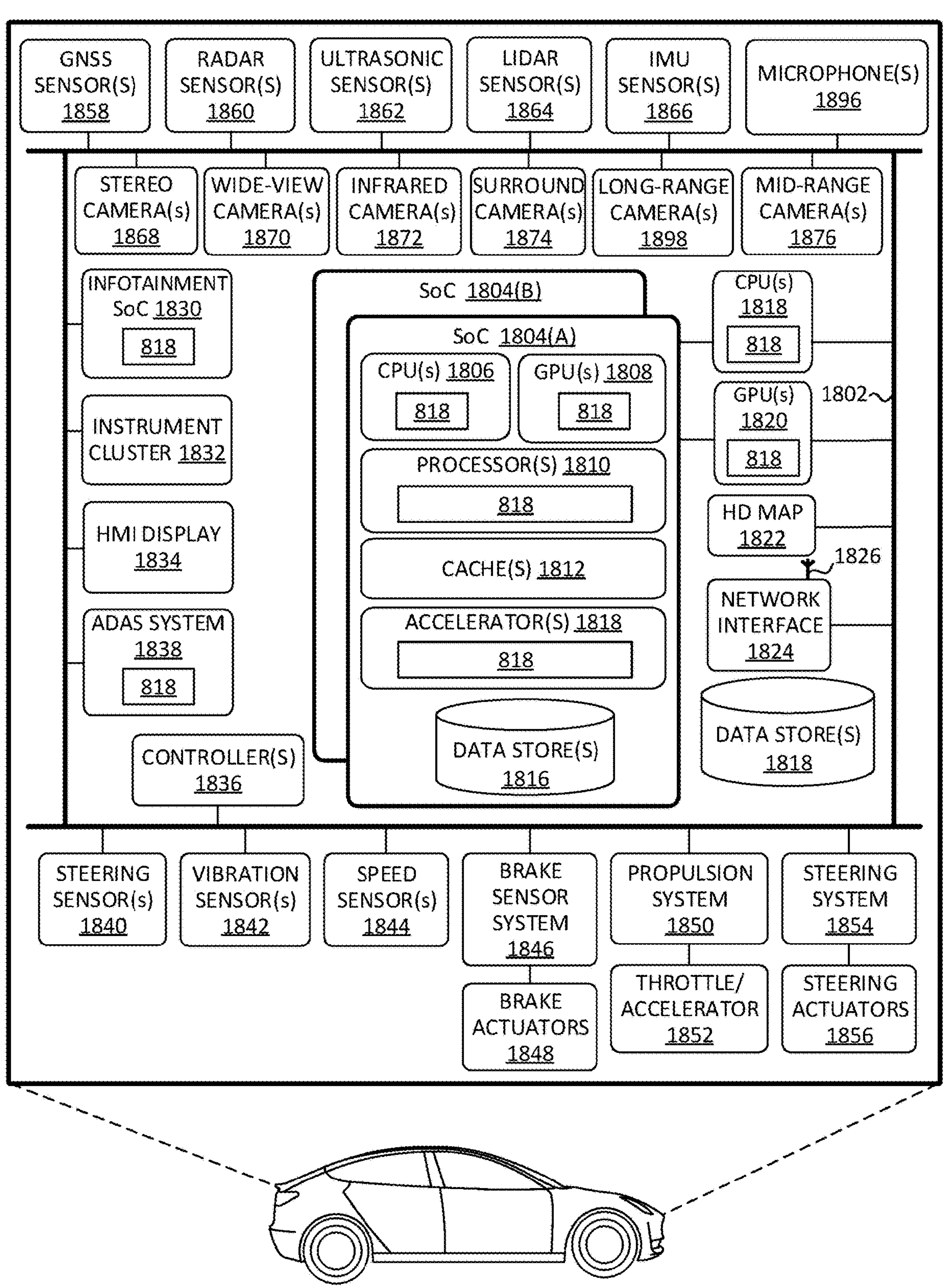
FIG. 18C is a block diagram illustrating an example system architecture for an autonomous vehicle of FIG. 18A, according to at least one embodiment.

FIG. 18C is a block diagram illustrating an example system architecture for autonomous vehicle 1800 of FIG. 18A, according to at least one embodiment. In at least one embodiment, each of components, features, and systems of vehicle 1800 in FIG. 18C are illustrated as being connected via a bus 1802. In at least one embodiment, bus 1802 may include, without limitation, a CAN data interface (alternatively referred to herein as a "CAN bus"). In at least one embodiment, a CAN may be a network inside vehicle 1800 used to aid in control of various features and functionality of vehicle 1800, such as actuation of brakes, acceleration, braking, steering, windshield wipers, etc. In at least one embodiment, bus 1802 may be configured to have dozens or even hundreds of nodes, each with its own unique identifier (for example, a CAN ID). In at least one embodiment, bus 1802 may be read to find steering wheel angle, ground speed, engine revolutions per minute ("RPMs"), button positions, and/or other vehicle status indicators. In at least one embodiment, bus 1802 may be a CAN bus that is ASIL B compliant.

In at least one embodiment, in addition to, or alternatively from CAN, FlexRay and/or Ethernet may be used. In at least one embodiment, there may be any number of busses 1802, which may include, without limitation, zero or more CAN busses, zero or more FlexRay busses, zero or more Ethernet busses, and/or zero or more other types of busses using a different protocol. In at least one embodiment, two or more busses 1802 may be used to perform different functions, and/or may be used for redundancy. For example, a first bus 1802 may be used for collision avoidance functionality and a second bus 1802 may be used for actuation control. In at least one embodiment, each bus 1802 may communicate with any of components of vehicle 1800, and two or more busses 1802 may communicate with same components. In at least one embodiment, each of any number of system(s) on chip(s) ("SoC(s)") 1804, each of controller(s) 1836, and/or each computer within vehicle may have access to same input data (for example, inputs from sensors of vehicle 1800), and may be connected to a common bus, such CAN bus.

In at least one embodiment, vehicle 1800 may include one or more controller(s) 1836, such as those described herein with respect to FIG. 18A. Controller(s) 1836 may be used for a variety of functions. In at least one embodiment, controller(s) 1836 may be coupled to any of various other components and systems of vehicle 1800, and may be used for control of vehicle 1800, artificial intelligence of vehicle 1800, infotainment for vehicle 1800, and/or like.

In at least one embodiment, vehicle 1800 may include any number of SoCs 1804. Each of SoCs 1804 may include, without limitation, central processing units ("CPU(s)") 1806, graphics processing units ("GPU(s)") 1808, processor(s) 1810, cache(s) 1812, accelerator(s) 1814, data store(s) 1816, and/or other components and features not illustrated. In at least one embodiment, SoC(s) 1804 may be used to control vehicle 1800 in a variety of platforms and systems. For example, in at least one embodiment, SoC(s) 1804 may be combined in a system (for example, system of vehicle 1800) with a High Definition ("HD") map 1822 which may obtain map refreshes and/or updates via network interface 1824 from one or more servers (not shown in FIG. 18C).

In at least one embodiment, CPU(s) 1806 may include a CPU cluster or CPU complex (alternatively referred to herein as a "CCPLEX"). In at least one embodiment, CPU(s) 1806 may include multiple cores and/or level two ("L2") caches. For instance, in at least one embodiment, CPU(s) 1806 may include eight cores in a coherent multi-processor configuration. In at least one embodiment, CPU(s) 1806 may include four dual-core clusters where each cluster has a dedicated L2 cache (for example, a 2 MB L2 cache). In at least one embodiment, CPU(s) 1806 (for example, CCPLEX) may be configured to support simultaneous cluster operation enabling any combination of clusters of CPU(s) 1806 to be active at any given time.

In at least one embodiment, one or more of CPU(s) 1806 may implement power management capabilities that include, without limitation, one or more of following features: individual hardware blocks may be clock-gated automatically when idle to save dynamic power; each core clock may be gated when core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 1806 may further implement an enhanced algorithm for managing power states, where allowed power states and expected wakeup times are specified, and hardware/microcode determines best power state to enter for core, cluster, and CCPLEX. In at least one embodiment, processing cores may support simplified power state entry sequences in software with work offloaded to microcode.

In at least one embodiment, GPU(s) 1808 may include an integrated GPU (alternatively referred to herein as an "iGPU"). In at least one embodiment, GPU(s) 1808 may be programmable and may be efficient for parallel workloads. In at least one embodiment, GPU(s) 1808, in at least one embodiment, may use an enhanced tensor instruction set. In on embodiment, GPU(s) 1808 may include one or more streaming microprocessors, where each streaming microprocessor may include a level one ("L1") cache (for example, an L1 cache with at least 136 KB storage capacity), and two or more of streaming microprocessors may share an L2 cache (for example, an L2 cache with a 912 KB storage capacity). In at least one embodiment, GPU(s) 1808 may include at least eight streaming microprocessors. In at least one embodiment, GPU(s) 1808 may use compute application programming interface(s) (API(s)). In at least one embodiment, GPU(s) 1808 may use one or more parallel computing platforms and/or programming models (for example, NVIDIA's CUDA).

In at least one embodiment, one or more of GPU(s) 1808 may be power-optimized for best performance in automotive and embedded use cases. For example, in on embodiment, GPU(s) 1808 could be fabricated on a Fin field-effect transistor ("FinFET"). In at least one embodiment, each streaming microprocessor may incorporate a number of mixed-precision processing cores partitioned into multiple blocks. For example, and without limitation, 104 PF32 cores and 32 PF64 cores could be partitioned into four processing blocks. In at least one embodiment, each processing block could be allocated 20 FP32 cores, 12 FP64 cores, 20 INT32 cores, two mixed-precision NVIDIA TENSOR COREs for deep learning matrix arithmetic, a level zero ("L0") instruction cache, a warp scheduler, a dispatch unit, and/or a 104 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 1808 may include a high bandwidth memory ("HBM) and/or a 20 GB HBM2 memory subsystem to provide, in some examples, about 1300 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 1808 may include unified memory technology. In at least one embodiment, address translation services ("ATS") support may be used to allow GPU(s) 1808 to access CPU(s) 1806 page tables directly. In at least one embodiment, embodiment, when GPU(s) 1808 memory management unit ("MMU") experiences a miss, an address translation request may be transmitted to CPU(s) 1806. In response, CPU(s) 1806 may look in its page tables for virtual-to-physical mapping for address and transmits translation back to GPU(s) 1808, in at least one embodiment. In at least one embodiment, unified memory technology may allow a single unified virtual address space for memory of both CPU(s) 1806 and GPU(s) 1808, thereby simplifying GPU(s) 1808 programming and porting of applications to GPU(s) 1808.

In at least one embodiment, GPU(s) 1808 may include any number of access counters that may keep track of frequency of access of GPU(s) 1808 to memory of other processors. In at least one embodiment, access counter(s) may help ensure that memory pages are moved to physical memory of processor that is accessing pages most frequently, thereby improving efficiency for memory ranges shared between processors.

In at least one embodiment, one or more of SoC(s) 1804 may include any number of cache(s) 1812, including those described herein. For example, in at least one embodiment, cache(s) 1812 could include a level three ("L3") cache that is available to both CPU(s) 1806 and GPU(s) 1808 (for example, that is connected both CPU(s) 1806 and GPU(s) 1808). In at least one embodiment, cache(s) 1812 may include a write-back cache that may keep track of states of lines, such as by using a cache coherence protocol (for example, MEI, MESI, MSI, etc.). In at least one embodiment, L3 cache may include 8 MB or more, depending on embodiment, although smaller cache sizes may be used.

In at least one embodiment, one or more of SoC(s) 1804 may include one or more accelerator(s) 1814 (for example, hardware accelerators, software accelerators, or a combination thereof). In at least one embodiment, SoC(s) 1804 may include a hardware acceleration cluster that may include optimized hardware accelerators and/or large on-chip memory. In at least one embodiment, large on-chip memory (for example, 8 MB of SRAM), may enable hardware acceleration cluster to accelerate neural networks and other calculations. In at least one embodiment, hardware acceleration cluster may be used to complement GPU(s) 1808 and to off-load some of tasks of GPU(s) 1808 (for example, to free up more cycles of GPU(s) 1808 for performing other tasks). In at least one embodiment, accelerator(s) 1814 could be used for targeted workloads (for example, perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (for example, as used for object detection) or other type of CNN.

In at least one embodiment, accelerator(s) 1814 (for example, hardware acceleration cluster) may include a deep learning accelerator(s) ("DLA). DLA(s) may include, without limitation, one or more Tensor processing units ("TPUs) that may be configured to provide an additional ten trillion operations per second for deep learning applications and inferencing. In at least one embodiment, TPUs may be accelerators configured to, and optimized for, performing image processing functions (for example, for CNNs, RCNNs, etc.). DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones 1896; a CNN for facial recognition and vehicle owner identification using data from camera sensors; and/or a CNN for security and/or safety related events.

In at least one embodiment, DLA(s) may perform any function of GPU(s) 1808, and by using an inference accelerator, for example, a designer may target either DLA(s) or GPU(s) 1808 for any function. For example, in at least one embodiment, designer may focus processing of CNNs and floating point operations on DLA(s) and leave other functions to GPU(s) 1808 and/or other accelerator(s) 1814.

In at least one embodiment, accelerator(s) 1814 (for example, hardware acceleration cluster) may include a programmable vision accelerator(s) ("PVA"), which may alternatively be referred to herein as a computer vision accelerator. In at least one embodiment, PVA(s) may be designed and configured to accelerate computer vision algorithms for advanced driver assistance system ("ADAS") 1838, autonomous driving, augmented reality ("AR") applications, and/or virtual reality ("VR") applications. PVA(s) may provide a balance between performance and flexibility. For example, in at least one embodiment, each PVA(s) may include, for example and without limitation, any number of reduced instruction set computer ("RISC") cores, direct memory access ("DMA"), and/or any number of vector processors.

In at least one embodiment, RISC cores may interact with image sensors (for example, image sensors of any of cameras described herein), image signal processor(s), and/or like. In at least one embodiment, each of RISC cores may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA(s) to access system memory independently of CPU(s) 1806. In at least one embodiment, DMA may support any number of features used to provide optimization to PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, PVA may include a PVA core and two vector processing subsystem partitions. In at least one embodiment, PVA core may include a processor subsystem, DMA engine(s) (for example, two DMA engines), and/or other peripherals. In at least one embodiment, vector processing subsystem may operate as primary processing engine of PVA, and may include a vector processing unit ("VPU"), an instruction cache, and/or vector memory (for example, "VMEM"). In at least one embodiment, VPU core may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute same computer vision algorithm, but on different regions of an image. In at least one embodiment, vector processors included in a particular PVA may simultaneously execute different computer vision algorithms, on same image, or even execute different algorithms on sequential images or portions of an image. In at least one embodiment, among other things, any number of PVAs may be included in hardware acceleration cluster and any number of vector processors may be included in each of PVAs. In at least one embodiment, PVA(s) may include additional error correcting code ("ECC") memory, to enhance overall system safety.

In at least one embodiment, accelerator(s) 1814 (for example, hardware acceleration cluster) may include a computer vision network on-chip and static random-access memory ("SRAM"), for providing a high-bandwidth, low latency SRAM for accelerator(s) 1814. In at least one embodiment, on-chip memory may include at least 8 MB SRAM, consisting of, for example and without limitation, eight field-configurable memory blocks, that may be accessible by both PVA and DLA. In at least one embodiment, each pair of memory blocks may include an advanced peripheral bus ("APB") interface, configuration circuitry, a controller, and a multiplexer. In at least one embodiment, any type of memory may be used. In at least one embodiment, PVA and DLA may access memory via a backbone that provides PVA and DLA with high-speed access to memory. In at least one embodiment, backbone may include a computer vision network on-chip that interconnects PVA and DLA to memory (for example, using APB).

In at least one embodiment, computer vision network on-chip may include an interface that determines, before transmission of any control signal/address/data, that both PVA and DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 30262 or International Electrotechnical Commission ("IEC") 101508 standards, although other standards and protocols may be used.

In at least one embodiment, one or more of SoC(s) 1804 may include a real-time ray-tracing hardware accelerator. In at least one embodiment, real-time ray-tracing hardware accelerator may be used to quickly and efficiently determine positions and extents of objects (for example, within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 1814 (for example, hardware accelerator cluster) have a wide array of uses for autonomous driving. In at least one embodiment, PVA may be a programmable vision accelerator that may be used for key processing stages in ADAS and autonomous vehicles. In at least one embodiment, PVA's capabilities are a good match for algorithmic domains needing predictable processing, at low power and low latency. In other words, PVA performs well on semi-dense or dense regular computation, even on small data sets, which need predictable run-times with low latency and low power. In at least one embodiment, autonomous vehicles, such as vehicle 1800, PVAs are designed to run classic computer vision algorithms, as they are efficient at object detection and operating on integer math.

For example, according to at least one embodiment of technology, PVA is used to perform computer stereo vision. In at least one embodiment, semi-global matching-based algorithm may be used in some examples, although this is not intended to be limiting. In at least one embodiment, applications for Level 3-5 autonomous driving use motion estimation/stereo matching on-the-fly (for example, structure from motion, pedestrian recognition, lane detection, etc.). In at least one embodiment, PVA may perform computer stereo vision function on inputs from two monocular cameras.

In at least one embodiment, PVA may be used to perform dense optical flow. For example, in at least one embodiment, PVA could process raw RADAR data (for example, using a 8D Fast Fourier Transform) to provide processed RADAR data. In at least one embodiment, PVA is used for time of flight depth processing, by processing raw time of flight data to provide processed time of flight data, for example.

In at least one embodiment, DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, confidence enables a system to make further decisions regarding which detections should be considered as true positive detections rather than false positive detections. For example, in at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, DLA may run a neural network for regressing confidence value. In at least one embodiment, neural network may take as its input at least some subset of parameters, such as bounding box dimensions, ground plane estimate obtained (for example from another subsystem), output from IMU sensor(s) 1866 that correlates with vehicle 1800 orientation, distance, 3D location estimates of object obtained from neural network and/or other sensors (for example, LIDAR sensor(s) 1864 or RADAR sensor(s) 1860), among others.

In at least one embodiment, one or more of SoC(s) 1804 may include data store(s) 1816 (for example, memory). In at least one embodiment, data store(s) 1816 may be on-chip memory of SoC(s) 1804, which may store neural networks to be executed on GPU(s) 1808 and/or DLA. In at least one embodiment, data store(s) 1816 may be large enough in capacity to store multiple instances of neural networks for redundancy and safety. In at least one embodiment, data store(s) 1812 may comprise L2 or L3 cache(s).

In at least one embodiment, one or more of SoC(s) 1804 may include any number of processor(s) 1810 (for example, embedded processors). Processor(s) 1810 may include a boot and power management processor that may be a dedicated processor and subsystem to handle boot power and management functions and related security enforcement. In at least one embodiment, boot and power management processor may be a part of SoC(s) 1804 boot sequence and may provide runtime power management services. In at least one embodiment, boot power and management processor may provide clock and voltage programming, assistance in system low power state transitions, management of SoC(s) 1804 thermals and temperature sensors, and/or management of SoC(s) 1804 power states. In at least one embodiment, each temperature sensor may be implemented as a ring-oscillator whose output frequency is proportional to temperature, and SoC(s) 1804 may use ring-oscillators to detect temperatures of CPU(s) 1806, GPU(s) 1808, and/or accelerator(s) 1814. In at least one embodiment, if temperatures are determined to exceed a threshold, then boot and power management processor may enter a temperature fault routine and put SoC(s) 1804 into a lower power state and/or put vehicle 1800 into a chauffeur to safe stop mode (for example, bring vehicle 1800 to a safe stop).

In at least one embodiment, processor(s) 1810 may further include a set of embedded processors that may serve as an audio processing engine. In at least one embodiment, audio processing engine may be an audio subsystem that enables full hardware support for multi-channel audio over multiple interfaces, and a broad and flexible range of audio I/O interfaces. In at least one embodiment, audio processing engine is a dedicated processor core with a digital signal processor with dedicated RAM.

In at least one embodiment, processor(s) 1810 may further include an always on processor engine that may provide necessary hardware features to support low power sensor management and wake use cases. In at least one embodiment, always on processor engine may include, without limitation, a processor core, a tightly coupled RAM, supporting peripherals (for example, timers and interrupt controllers), various I/O controller peripherals, and routing logic.

In at least one embodiment, processor(s) 1810 may further include a safety cluster engine that includes, without limitation, a dedicated processor subsystem to handle safety management for automotive applications. In at least one embodiment, safety cluster engine may include, without limitation, two or more processor cores, a tightly coupled RAM, support peripherals (for example, timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 1810 may further include a real-time camera engine that may include, without limitation, a dedicated processor subsystem for handling real-time camera management. In at least one embodiment, processor(s) 1810 may further include a high-dynamic range signal processor that may include, without limitation, an image signal processor that is a hardware engine that is part of camera processing pipeline.

In at least one embodiment, processor(s) 1810 may include a video image compositor that may be a processing block (for example, implemented on a microprocessor) that implements video post-processing functions needed by a video playback application to produce final image for player window. In at least one embodiment, video image compositor may perform lens distortion correction on wide-view camera(s) 1870, surround camera(s) 1874, and/or on in-cabin monitoring camera sensor(s). In at least one embodiment, in-cabin monitoring camera sensor(s) are preferably monitored by a neural network running on another instance of SoC 1804, configured to identify in cabin events and respond accordingly. In at least one embodiment, an in-cabin system may perform, without limitation, lip reading to activate cellular service and place a phone call, dictate emails, change vehicle's destination, activate or change vehicle's infotainment system and settings, or provide voice-activated web surfing. In at least one embodiment, certain functions are available to driver when vehicle is operating in an autonomous mode and are disabled otherwise.

In at least one embodiment, video image compositor may include enhanced temporal noise reduction for both spatial and temporal noise reduction. For example, in at least one embodiment, where motion occurs in a video, noise reduction weights spatial information appropriately, decreasing weight of information provided by adjacent frames. In at least one embodiment, where an image or portion of an image does not include motion, temporal noise reduction performed by video image compositor may use information from previous image to reduce noise in current image.

In at least one embodiment, video image compositor may also be configured to perform stereo rectification on input stereo lens frames. In at least one embodiment, video image compositor may further be used for user interface composition when operating system desktop is in use, and GPU(s) 1808 are not required to continuously render new surfaces. In at least one embodiment, when GPU(s) 1808 are powered on and active doing 3D rendering, video image compositor may be used to offload GPU(s) 1808 to improve performance and responsiveness.

In at least one embodiment, one or more of SoC(s) 1804 may further include a mobile industry processor interface ("MIPI") camera serial interface for receiving video and input from cameras, a high-speed interface, and/or a video input block that may be used for camera and related pixel input functions. In at least one embodiment, one or more of SoC(s) 1804 may further include an input/output controller(s) that may be controlled by software and may be used for receiving I/O signals that are uncommitted to a specific role.

In at least one embodiment, one or more of SoC(s) 1804 may further include a broad range of peripheral interfaces to enable communication with peripherals, audio encoders/decoders ("codecs"), power management, and/or other devices. SoC(s) 1804 may be used to process data from cameras (for example, connected over Gigabit Multimedia Serial Link and Ethernet), sensors (for example, LIDAR sensor(s) 1864, RADAR sensor(s) 1860, etc. that may be connected over Ethernet), data from bus 1802 (for example, speed of vehicle 1800, steering wheel position, etc.), data from GNSS sensor(s) 1858 (for example, connected over Ethernet or CAN bus), etc. In at least one embodiment, one or more of SoC(s) 1804 may further include dedicated high-performance mass storage controllers that may include their own DMA engines, and that may be used to free CPU(s) 1806 from routine data management tasks.

In at least one embodiment, SoC(s) 1804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. In at least one embodiment, SoC(s) 1804 may be faster, more reliable, and even more energy-efficient and space-efficient than conventional systems. For example, in at least one embodiment, accelerator(s) 1814, when combined with CPU(s) 1806, GPU(s) 1808, and data store(s) 1816, may provide for a fast, efficient platform for level 3-5 autonomous vehicles.

In at least one embodiment, computer vision algorithms may be executed on CPUs, which may be configured using high-level programming language, such as C programming language, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on DLA or discrete GPU (for example, GPU(s) 1820) may include text and word recognition, allowing supercomputer to read and understand traffic signs, including signs for which neural network has not been specifically trained. In at least one embodiment, DLA may further include a neural network that is able to identify, interpret, and provide semantic understanding of sign, and to pass that semantic understanding to path planning modules running on CPU Complex.

In at least one embodiment, multiple neural networks may be run simultaneously, as for Level 3, 8, or 9 driving. For example, in at least one embodiment, a warning sign consisting of "Caution: flashing lights indicate icy conditions," along with an electric light, may be independently or collectively interpreted by several neural networks. In at least one embodiment, sign itself may be identified as a traffic sign by a first deployed neural network (for example, a neural network that has been trained), text "flashing lights indicate icy conditions" may be interpreted by a second deployed neural network, which informs vehicle's path planning software (preferably executing on CPU Complex) that when flashing lights are detected, icy conditions exist. In at least one embodiment, flashing light may be identified by operating a third deployed neural network over multiple frames, informing vehicle's path-planning software of presence (or absence) of flashing lights. In at least one embodiment, all three neural networks may run simultaneously, such as within DLA and/or on GPU(s) 1808.

In at least one embodiment, a CNN for facial recognition and vehicle owner identification may use data from camera sensors to identify presence of an authorized driver and/or owner of vehicle 1800. In at least one embodiment, an always on sensor processing engine may be used to unlock vehicle when owner approaches driver door and turn on lights, and, in security mode, to disable vehicle when owner leaves vehicle. In this way, SoC(s) 1804 provide for security against theft and/or carjacking.

In at least one embodiment, a CNN for emergency vehicle detection and identification may use data from microphones 1896 to detect and identify emergency vehicle sirens. In at least one embodiment, SoC(s) 1804 use CNN for classifying environmental and urban sounds, as well as classifying visual data. In at least one embodiment, CNN running on DLA is trained to identify relative closing speed of emergency vehicle (for example, by using Doppler effect). In at least one embodiment, CNN may also be trained to identify emergency vehicles specific to local area in which vehicle is operating, as identified by GNSS sensor(s) 1858. In at least one embodiment, when operating in Europe, CNN will seek to detect European sirens, and when in United States CNN will seek to identify only North American sirens. In at least one embodiment, once an emergency vehicle is detected, a control program may be used to execute an emergency vehicle safety routine, slowing vehicle, pulling over to side of road, parking vehicle, and/or idling vehicle, with assistance of ultrasonic sensor(s) 1862, until emergency vehicle(s) passes.

In at least one embodiment, vehicle 1800 may include CPU(s) 1818 (for example, discrete CPU(s), or dCPU(s)), that may be coupled to SoC(s) 1804 via a high-speed interconnect (for example, PCIe). In at least one embodiment, CPU(s) 1818 may include an X86 processor, for example. CPU(s) 1818 may be used to perform any of a variety of functions, including arbitrating potentially inconsistent results between ADAS sensors and SoC(s) 1804, and/or monitoring status and health of controller(s) 1836 and/or an infotainment system on a chip ("infotainment SoC") 1830, for example.

In at least one embodiment, vehicle 1800 may include GPU(s) 1820 (for example, discrete GPU(s), or dGPU(s)), that may be coupled to SoC(s) 1804 via a high-speed interconnect (for example, NVIDIA's NVLINK). In at least one embodiment, GPU(s) 1820 may provide additional artificial intelligence functionality, such as by executing redundant and/or different neural networks, and may be used to train and/or update neural networks based at least in part on input (for example, sensor data) from sensors of vehicle 1800.

In at least one embodiment, vehicle 1800 may further include network interface 1824 which may include, without limitation, wireless antenna(s) 1826 (for example, one or more wireless antennas 1826 for different communication protocols, such as a cellular antenna, a Bluetooth antenna, etc.). In at least one embodiment, network interface 1824 may be used to enable wireless connectivity over Internet with cloud (for example, with server(s) and/or other network devices), with other vehicles, and/or with computing devices (for example, client devices of passengers). In at least one embodiment, to communicate with other vehicles, a direct link may be established between vehicle 180 and other vehicle and/or an indirect link may be established (for example, across networks and over Internet). In at least one embodiment, direct links may be provided using a vehicle-to-vehicle communication link. Vehicle-to-vehicle communication link may provide vehicle 1800 information about vehicles in proximity to vehicle 1800 (for example, vehicles in front of, on side of, and/or behind vehicle 1800). In at least one embodiment, aforementioned functionality may be part of a cooperative adaptive cruise control functionality of vehicle 1800.

In at least one embodiment, network interface 1824 may include an SoC that provides modulation and demodulation functionality and enables controller(s) 1836 to communicate over wireless networks. In at least one embodiment, network interface 1824 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

In at least one embodiment, vehicle 1800 may further include data store(s) 1828 which may include, without limitation, off-chip (for example, off SoC(s) 1804) storage. In at least one embodiment, data store(s) 1828 may include, without limitation, one or more storage elements including RAM, SRAM, dynamic random-access memory ("DRAM"), video random-access memory ("VRAM"), Flash, hard disks, and/or other components and/or devices that may store at least one bit of data.

In at least one embodiment, vehicle 1800 may further include GNSS sensor(s) 1858 (for example, GPS and/or assisted GPS sensors), to assist in mapping, perception, occupancy grid generation, and/or path planning functions.

In at least one embodiment, any number of GNSS sensor(s) 1858 may be used, including, for example and without limitation, a GPS using a USB connector with an Ethernet to Serial (for example, RS-232) bridge.

In at least one embodiment, vehicle 1800 may further include RADAR sensor(s) 1860. RADAR sensor(s) 1860 may be used by vehicle 1800 for long-range vehicle detection, even in darkness and/or severe weather conditions. In at least one embodiment, RADAR functional safety levels may be ASIL B. RADAR sensor(s) 1860 may use CAN and/or bus 1802 (for example, to transmit data generated by RADAR sensor(s) 1860) for control and to access object tracking data, with access to Ethernet to access raw data in some examples. In at least one embodiment, wide variety of RADAR sensor types may be used. For example, and without limitation, RADAR sensor(s) 1860 may be suitable for front, rear, and side RADAR use. In at least one embodiment, one or more of RADAR sensors(s) 1860 are Pulse Doppler RADAR sensor(s).

In at least one embodiment, RADAR sensor(s) 1860 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 290 m range. In at least one embodiment, RADAR sensor(s) 1860 may help in distinguishing between static and moving objects, and may be used by ADAS system 1838 for emergency brake assist and forward collision warning. Sensors 1860 (*s*) included in a long-range RADAR system may include, without limitation, monostatic multimodal RADAR with multiple (for example, six or more) fixed RADAR antennae and a high-speed CAN and FlexRay interface. In at least one embodiment, with six antennae, central four antennae may create a focused beam pattern, designed to record vehicle's 1800 surroundings at higher speeds with minimal interference from traffic in adjacent lanes. In at least one embodiment, other two antennae may expand field of view, making it possible to quickly detect vehicles entering or leaving vehicle's 1800 lane.

In at least one embodiment, mid-range RADAR systems may include, as an example, a range of up to 200 m (front) or 120 m (rear), and a field of view of up to 82 degrees (front) or 190 degrees (rear). In at least one embodiment, short-range RADAR systems may include, without limitation, any number of RADAR sensor(s) 1860 designed to be installed at both ends of rear bumper. When installed at both ends of rear bumper, in at least one embodiment, a RADAR sensor system may create two beams that constantly monitor blind spot in rear and next to vehicle. In at least one embodiment, short-range RADAR systems may be used in ADAS system 1838 for blind spot detection and/or lane change assist.

In at least one embodiment, vehicle 1800 may further include ultrasonic sensor(s) 1862. Ultrasonic sensor(s) 1862, which may be positioned at front, back, and/or sides of vehicle 1800, may be used for park assist and/or to create and update an occupancy grid. In at least one embodiment, a wide variety of ultrasonic sensor(s) 1862 may be used, and different ultrasonic sensor(s) 1862 may be used for different ranges of detection (for example, 2.5 m, 8 m). In at least one embodiment, ultrasonic sensor(s) 1862 may operate at functional safety levels of ASIL B.

In at least one embodiment, vehicle 1800 may include LIDAR sensor(s) 1864. LIDAR sensor(s) 1864 may be used for object and pedestrian detection, emergency braking, collision avoidance, and/or other functions. In at least one embodiment, LIDAR sensor(s) 1864 may be functional safety level ASIL B. In at least one embodiment, vehicle 1800 may include multiple LIDAR sensors 1864 (for example, two, four, six, etc.) that may use Ethernet (for example, to provide data to a Gigabit Ethernet switch).

In at least one embodiment, LIDAR sensor(s) 1864 may be capable of providing a list of objects and their distances for a 360-degree field of view. In at least one embodiment, commercially available LIDAR sensor(s) 1864 may have an advertised range of approximately 140 m, with an accuracy of 2 cm-3 cm, and with support for a 140 Mbps Ethernet connection, for example. In at least one embodiment, one or more non-protruding LIDAR sensors 1864 may be used. In such an embodiment, LIDAR sensor(s) 1864 may be implemented as a small device that may be embedded into front, rear, sides, and/or corners of vehicle 1800. In at least one embodiment, LIDAR sensor(s) 1864, in such an embodiment, may provide up to a 160-degree horizontal and 35-degree vertical field-of-view, with a 240 m range even for low-reflectivity objects. In at least one embodiment, front-mounted LIDAR sensor(s) 1864 may be configured for a horizontal field of view between 85 degrees and 175 degrees.

In at least one embodiment, LIDAR technologies, such as 3D flash LIDAR, may also be used. 3D Flash LIDAR uses a flash of a laser as a transmission source, to illuminate surroundings of vehicle 1800 up to approximately 240 m. In at least one embodiment, a flash LIDAR unit includes, without limitation, a receptor, which records laser pulse transit time and reflected light on each pixel, which in turn corresponds to range from vehicle 1800 to objects. In at least one embodiment, flash LIDAR may allow for highly accurate and distortion-free images of surroundings to be generated with every laser flash. In at least one embodiment, four flash LIDAR sensors may be deployed, one at each side of vehicle 1800. In at least one embodiment, 3D flash LIDAR systems include, without limitation, a solid-state 3D staring array LIDAR camera with no moving parts other than a fan (for example, a non-scanning LIDAR device). In at least one embodiment, flash LIDAR device may use a 9 nanosecond class I (eye-safe) laser pulse per frame and may capture reflected laser light in form of 3D range point clouds and co-registered intensity data.

In at least one embodiment, vehicle may further include IMU sensor(s) 1866. In at least one embodiment, IMU sensor(s) 1866 may be located at a center of rear axle of vehicle 1800, in at least one embodiment. In at least one embodiment, IMU sensor(s) 1866 may include, for example and without limitation, accelerometer(s), magnetometer(s), gyroscope(s), magnetic compass(es), and/or other sensor types. In at least one embodiment, such as in six-axis applications, IMU sensor(s) 1866 may include, without limitation, accelerometers and gyroscopes. In at least one embodiment, such as in nine-axis applications, IMU sensor(s) 1866 may include, without limitation, accelerometers, gyroscopes, and magnetometers.

In at least one embodiment, IMU sensor(s) 1866 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 1866 may enable vehicle 1800 to estimate heading without requiring input from a magnetic sensor by directly observing and correlating changes in velocity from GPS to IMU sensor(s) 1866. In at least one embodiment, IMU sensor(s) 1866 and GNSS sensor(s) 1858 may be combined in a single integrated unit.

In at least one embodiment, vehicle 1800 may include microphone(s) 1896 placed in and/or around vehicle 1800. In at least one embodiment, microphone(s) 1896 may be used for emergency vehicle detection and identification, among other things.

In at least one embodiment, vehicle 1800 may further include any number of camera types, including stereo camera(s) 1868, wide-view camera(s) 1870, infrared camera(s) 1872, surround camera(s) 1874, long-range camera(s) 1898, mid-range camera(s) 1876, and/or other camera types. In at least one embodiment, cameras may be used to capture image data around an entire periphery of vehicle 1800. In at least one embodiment, types of cameras used depends vehicle 1800. In at least one embodiment, any combination of camera types may be used to provide necessary coverage around vehicle 1800. In at least one embodiment, number of cameras may differ depending on embodiment. For example, in at least one embodiment, vehicle 1800 could include six cameras, seven cameras, ten cameras, twelve cameras, or another number of cameras. Cameras may support, as an example and without limitation, Gigabit Multimedia Serial Link ("GMSL") and/or Gigabit Ethernet. In at least one embodiment, each of camera(s) is described with more detail previously herein with respect to FIG. 18A and FIG. 18B.

In at least one embodiment, vehicle 1800 may further include vibration sensor(s) 1842. Vibration sensor(s) 1842 may measure vibrations of components of vehicle 1800, such as axle(s). For example, in at least one embodiment, changes in vibrations may indicate a change in road surfaces. In at least one embodiment, when two or more vibration sensors 1842 are used, differences between vibrations may be used to determine friction or slippage of road surface (for example, when difference in vibration is between a power-driven axle and a freely rotating axle).

In at least one embodiment, vehicle 1800 may include ADAS system 1838. ADAS system 1838 may include, without limitation, an SoC, in some examples. In at least one embodiment, ADAS system 1838 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW)" system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 1860, LIDAR sensor(s) 1864, and/or any number of camera(s). In at least one embodiment, ACC system may include a longitudinal ACC system and/or a lateral ACC system. In at least one embodiment, longitudinal ACC system monitors and controls distance to vehicle immediately ahead of vehicle 1800 and automatically adjust speed of vehicle 1800 to maintain a safe distance from vehicles ahead. In at least one embodiment, lateral ACC system performs distance keeping, and advises vehicle 1800 to change lanes when necessary. In at least one embodiment, lateral ACC is related to other ADAS applications such as LC and CW.

In at least one embodiment, CACC system uses information from other vehicles that may be received via network interface 1824 and/or wireless antenna(s) 1826 from other vehicles via a wireless link, or indirectly, over a network connection (for example, over Internet). In at least one embodiment, direct links may be provided by a vehicle-to-vehicle ("V2V") communication link, while indirect links may be provided by an infrastructure-to-vehicle ("I2V") communication link. In general, V2V communication concept provides information about immediately preceding vehicles (for example, vehicles immediately ahead of and in same lane as vehicle 1800), while I2V communication concept provides information about traffic further ahead. In at least one embodiment, CACC system may include either or both I2V and V2V information sources. In at least one embodiment, given information of vehicles ahead of vehicle 1800, CACC system may be more reliable and it has potential to improve traffic flow smoothness and reduce congestion on road.

In at least one embodiment, FCW system is designed to alert driver to a hazard, so that driver may take corrective action. In at least one embodiment, FCW system uses a front-facing camera and/or RADAR sensor(s) 1860, coupled to a dedicated processor, DSP, FPGA, and/or ASIC, that is electrically coupled to driver feedback, such as a display, speaker, and/or vibrating component. In at least one embodiment, FCW system may provide a warning, such as in form of a sound, visual warning, vibration and/or a quick brake pulse.

In at least one embodiment, AEB system detects an impending forward collision with another vehicle or other object, and may automatically apply brakes if driver does not take corrective action within a specified time or distance parameter. In at least one embodiment, AEB system may use front-facing camera(s) and/or RADAR sensor(s) 1860, coupled to a dedicated processor, DSP, FPGA, and/or ASIC. In at least one embodiment, when AEB system detects a hazard, AEB system typically first alerts driver to take corrective action to avoid collision and, if driver does not take corrective action, AEB system may automatically apply brakes in an effort to prevent, or at least mitigate, impact of predicted collision. In at least one embodiment, AEB system, may include techniques such as dynamic brake support and/or crash imminent braking.

In at least one embodiment, LDW system provides visual, audible, and/or tactile warnings, such as steering wheel or seat vibrations, to alert driver when vehicle 1800 crosses lane markings. In at least one embodiment, LDW system does not activate when driver indicates an intentional lane departure, by activating a turn signal. In at least one embodiment, LDW system may use front-side facing cameras, coupled to a dedicated processor, DSP, FPGA, and/or ASIC, that is electrically coupled to driver feedback, such as a display, speaker, and/or vibrating component. In at least one embodiment, LKA system is a variation of LDW system. LKA system provides steering input or braking to correct vehicle 1800 if vehicle 1800 starts to exit lane.

In at least one embodiment, BSW system detects and warns driver of vehicles in an automobile's blind spot. In at least one embodiment, BSW system may provide a visual, audible, and/or tactile alert to indicate that merging or changing lanes is unsafe. In at least one embodiment, BSW system may provide an additional warning when driver uses a turn signal. In at least one embodiment, BSW system may use rear-side facing camera(s) and/or RADAR sensor(s) 1860, coupled to a dedicated processor, DSP, FPGA, and/or ASIC, that is electrically coupled to driver feedback, such as a display, speaker, and/or vibrating component.

In at least one embodiment, RCTW system may provide visual, audible, and/or tactile notification when an object is detected outside rear-camera range when vehicle 1800 is backing up. In at least one embodiment, RCTW system includes AEB system to ensure that vehicle brakes are applied to avoid a crash. In at least one embodiment, RCTW system may use one or more rear-facing RADAR sensor(s) 1860, coupled to a dedicated processor, DSP, FPGA, and/or ASIC, that is electrically coupled to driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert driver and allow driver to decide whether a safety condition truly exists and act accordingly. In at least one embodiment, vehicle 1800 itself decides, in case of conflicting results, whether to heed result from a primary computer or a secondary computer (for example, first controller 1836 or second controller 1836). For example, in at least one embodiment, ADAS system 1838 may be a backup and/or secondary computer for providing perception information to a backup computer rationality module. In at least one embodiment, backup computer rationality monitor may run a redundant diverse software on hardware components to detect faults in perception and dynamic driving tasks. In at least one embodiment, outputs from ADAS system 1838 may be provided to a supervisory MCU. In at least one embodiment, if outputs from primary computer and secondary computer conflict, supervisory MCU determines how to reconcile conflict to ensure safe operation.

In at least one embodiment, primary computer may be configured to provide supervisory MCU with a confidence score, indicating primary computer's confidence in chosen result. In at least one embodiment, if confidence score exceeds a threshold, supervisory MCU may follow primary computer's direction, regardless of whether secondary computer provides a conflicting or inconsistent result. In at least one embodiment, where confidence score does not meet threshold, and where primary and secondary computer indicate different results (for example, a conflict), supervisory MCU may arbitrate between computers to determine appropriate outcome.

In at least one embodiment, supervisory MCU may be configured to run a neural network(s) that is trained and configured to determine, based at least in part on outputs from primary computers and secondary computers, conditions under which a secondary computer provides false alarms. In at least one embodiment, neural network(s) in supervisory MCU may learn when a secondary computer's output may be trusted, and when it cannot. For example, in at least one embodiment, when secondary computer is a RADAR-based FCW system, a neural network(s) in supervisory MCU may learn when FCW system is identifying metallic objects that are not, in fact, hazards, such as a drainage grate or manhole cover that triggers an alarm. In at least one embodiment, when a secondary computer is a camera-based LDW system, a neural network in supervisory MCU may learn to override LDW when bicyclists or pedestrians are present and a lane departure is, in fact, a safest maneuver. In at least one embodiment, supervisory MCU may include at least one of a DLA or GPU suitable for running neural network(s) with associated memory. In at least one embodiment, supervisory MCU may comprise and/or be included as a component of SoC(s) 1804.

In at least one embodiment, ADAS system 1838 may include a secondary computer that performs ADAS functionality using traditional rules of computer vision. In at least one embodiment, secondary computer may use classic computer vision rules (if-then), and presence of a neural network(s) in supervisory MCU may improve reliability, safety and performance. For example, in at least one embodiment, diverse implementation and intentional non-identity makes overall system more fault-tolerant, especially to faults caused by software (or software-hardware interface) functionality. For example, in at least one embodiment, if there is a software bug or error in software running on primary computer, and non-identical software code running on secondary computer provides same overall result, then supervisory MCU may have greater confidence that overall result is correct, and bug in software or hardware on primary computer is not causing material error.

In at least one embodiment, output of ADAS system 1838 may be fed into primary computer's perception block and/or primary computer's dynamic driving task block. For example, in at least one embodiment, if ADAS system 1838 indicates a forward crash warning due to an object immediately ahead, perception block may use this information when identifying objects. In at least one embodiment, secondary computer may have its own neural network which is trained and thus reduces risk of false positives, as described herein.

In at least one embodiment, vehicle 1800 may further include infotainment SoC 1830 (for example, an in-vehicle infotainment system (IVI)). Although illustrated and described as an SoC, infotainment system 1830, in at least one embodiment, may not be an SoC, and may include, without limitation, two or more discrete components. In at least one embodiment, infotainment SoC 1830 may include, without limitation, a combination of hardware and software that may be used to provide audio (for example, music, a personal digital assistant, navigational instructions, news, radio, etc.), video (for example, TV, movies, streaming, etc.), phone (for example, hands-free calling), network connectivity (for example, LTE, WiFi, etc.), and/or information services (for example, navigation systems, rear-parking assistance, a radio data system, vehicle related information such as fuel level, total distance covered, brake fuel level, oil level, door open/close, air filter information, etc.) to vehicle 1800. For example, infotainment SoC 1830 could include radios, disk players, navigation systems, video players, USB and Bluetooth connectivity, carputers, in-car entertainment, WiFi, steering wheel audio controls, hands free voice control, a heads-up display ("HUD"), HMI display 1834, a telematics device, a control panel (for example, for controlling and/or interacting with various components, features, and/or systems), and/or other components. In at least one embodiment, infotainment SoC 1830 may further be used to provide information (for example, visual and/or audible) to user(s) of vehicle, such as information from ADAS system 1838, autonomous driving information such as planned vehicle maneuvers, trajectories, surrounding environment information (for example, intersection information, vehicle information, road information, etc.), and/or other information.

In at least one embodiment, infotainment SoC 1830 may include any amount and type of GPU functionality. In at least one embodiment, infotainment SoC 1830 may communicate over bus 1802 (for example, CAN bus, Ethernet, etc.) with other devices, systems, and/or components of vehicle 1800. In at least one embodiment, infotainment SoC 1830 may be coupled to a supervisory MCU such that GPU of infotainment system may perform some self-driving functions in event that primary controller(s) 1836 (for example, primary and/or backup computers of vehicle 1800) fail. In at least one embodiment, infotainment SoC 1830 may put vehicle 1800 into a chauffeur to safe stop mode, as described herein.

In at least one embodiment, vehicle 1800 may further include instrument cluster 1832 (for example, a digital dash, an electronic instrument cluster, a digital instrument panel, etc.). Instrument cluster 1832 may include, without limitation, a controller and/or supercomputer (for example, a discrete controller or supercomputer). In at least one embodiment, instrument cluster 1832 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (for example, airbag) information, lighting controls, safety system controls, navigation information, etc. In some examples, information may be displayed and/or shared among infotainment SoC 1830 and instrument cluster 1832. In at least one embodiment, instrument cluster 1832 may be included as part of infotainment SoC 1830, or vice versa.

Inference and/or training logic 818 are used to perform inferencing and/or training operations associated with any one or more embodiments. Details regarding inference and/or training logic 818 are provided herein in conjunction with FIGS. 15A and/or 15B. In at least one embodiment, inference and/or training logic 818 may be used in system FIG. 18C for inferencing or predicting operations based, at least in part, on weight parameters calculated using neural network training operations, neural network functions and/or architectures, or neural network use cases described herein.

In at least one embodiment, inferencing logic 818 implements neural networks 20 and 30 of FIG. 1, so as to identify objects such as other vehicles as described herein. In at least one embodiment, vehicle identification is performed to identify vehicles near vehicle 1800, so as to identify vehicles that may require certain actions. In at least one embodiment, vehicle 1800 may reduce its speed when it identifies a nearby police car. In at least one embodiment, vehicle 1800 may change its course so as to give a wider berth to an identified bicycle.

Figure 18D:
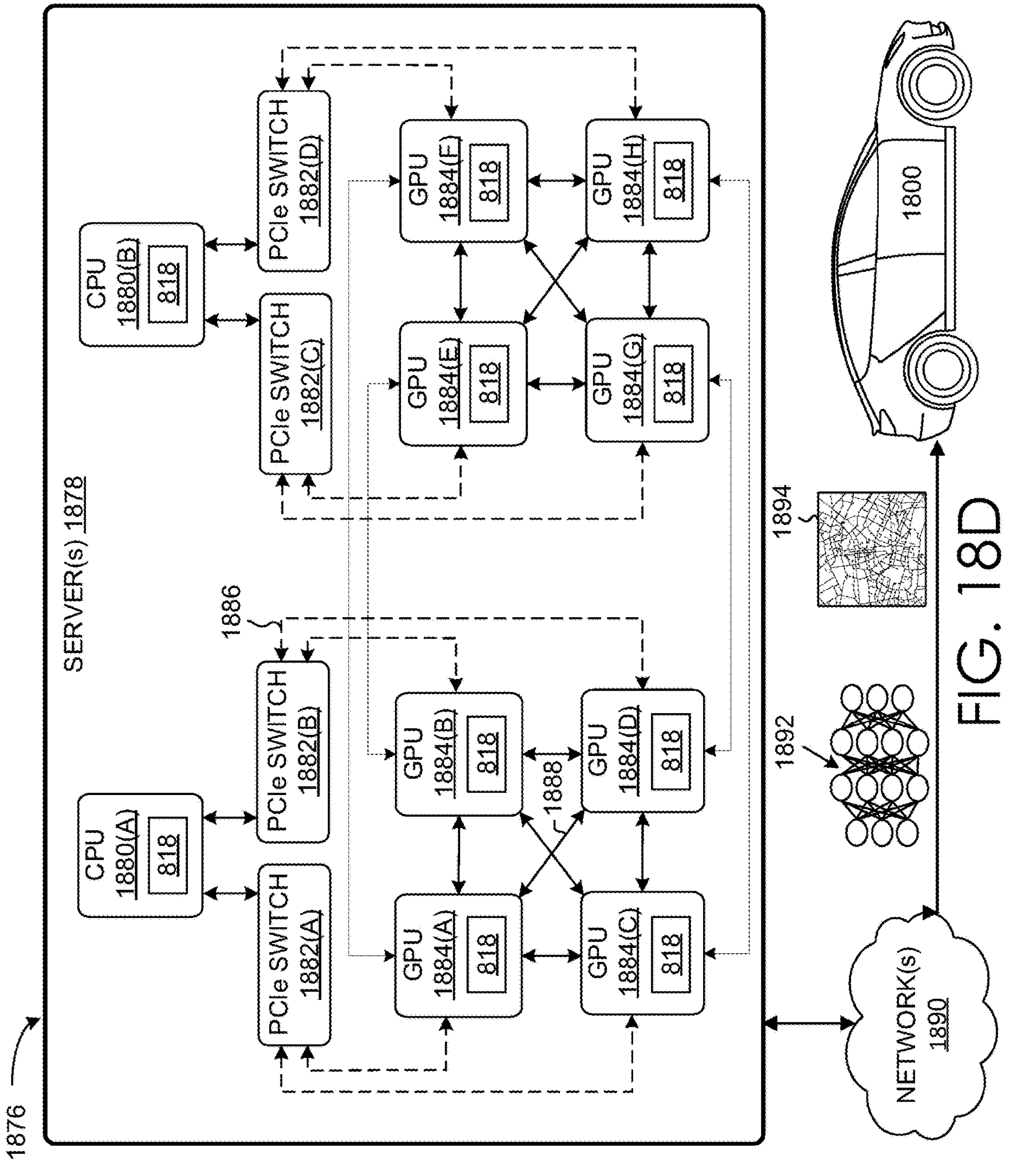
FIG. 18D is a diagram illustrating a system for communication between cloud-based server(s) and an autonomous vehicle of FIG. 18A, according to at least one embodiment.

FIG. 18D is a diagram of a system 1876 for communication between cloud-based server(s) and autonomous vehicle 1800 of FIG. 18A, according to at least one embodiment. In at least one embodiment, system 1876 may include, without limitation, server(s) 1878, network(s) 1890, and any number and type of vehicles, including vehicle 1800. Server(s) 1878 may include, without limitation, a plurality of GPUs 1884(A)-1484(H) (collectively referred to herein as GPUs 1884), PCIe switches 1882(A)-1482(H) (collectively referred to herein as PCIe switches 1882), and/or CPUs 1880(A)-1480(B) (collectively referred to herein as CPUs 1880). GPUs 1884, CPUs 1880, and PCIe switches 1882 may be interconnected with high-speed interconnects such as, for example and without limitation, NVLink interfaces 1888 developed by NVIDIA and/or PCIe connections 1886. In at least one embodiment, GPUs 1884 are connected via an NVLink and/or NVSwitch SoC and GPUs 1884 and PCIe switches 1882 are connected via PCIe interconnects. In at least one embodiment, although eight GPUs 1884, two CPUs 1880, and four PCIe switches 1882 are illustrated, this is not intended to be limiting. In at least one embodiment, each of server(s) 1878 may include, without limitation, any number of GPUs 1884, CPUs 1880, and/or PCIe switches 1882, in any combination. For example, in at least one embodiment, server(s) 1878 could each include eight, sixteen, thirty-two, and/or more GPUs 1884.

In at least one embodiment, server(s) 1878 may receive, over network(s) 1890 and from vehicles, image data representative of images showing unexpected or changed road conditions, such as recently commenced road-work. In at least one embodiment, server(s) 1878 may transmit, over network(s) 1890 and to vehicles, neural networks 1892, updated neural networks 1892, and/or map information 1894, including, without limitation, information regarding traffic and road conditions. In at least one embodiment, updates to map information 1894 may include, without limitation, updates for HD map 1822, such as information regarding construction sites, potholes, detours, flooding, and/or other obstructions. In at least one embodiment, neural networks 1892, updated neural networks 1892, and/or map information 1894 may have resulted from new training and/or experiences represented in data received from any number of vehicles in environment, and/or based at least in part on training performed at a data center (for example, using server(s) 1878 and/or other servers).

In at least one embodiment, server(s) 1878 may be used to train machine learning models (for example, neural networks) based at least in part on training data. Training data may be generated by vehicles, and/or may be generated in a simulation (for example, using a game engine). In at least one embodiment, any amount of training data is tagged (for example, where associated neural network benefits from supervised learning) and/or undergoes other pre-processing. In at least one embodiment, any amount of training data is not tagged and/or pre-processed (for example, where associated neural network does not require supervised learning). In at least one embodiment, once machine learning models are trained, machine learning models may be used by vehicles (for example, transmitted to vehicles over network(s) 1890, and/or machine learning models may be used by server(s) 1878 to remotely monitor vehicles.

In at least one embodiment, server(s) 1878 may receive data from vehicles and apply data to up-to-date real-time neural networks for real-time intelligent inferencing. In at least one embodiment, server(s) 1878 may include deep-learning supercomputers and/or dedicated AI computers powered by GPU(s) 1884, such as a DGX and DGX Station machines developed by NVIDIA. However, in at least one embodiment, server(s) 1878 may include deep learning infrastructure that use CPU-powered data centers.

In at least one embodiment, deep-learning infrastructure of server(s) 1878 may be capable of fast, real-time inferencing, and may use that capability to evaluate and verify health of processors, software, and/or associated hardware in vehicle 1800. For example, in at least one embodiment, deep-learning infrastructure may receive periodic updates from vehicle 1800, such as a sequence of images and/or objects that vehicle 1800 has located in that sequence of images (for example, via computer vision and/or other machine learning object classification techniques). In at least one embodiment, deep-learning infrastructure may run its own neural network to identify objects and compare them with objects identified by vehicle 1800 and, if results do not match and deep-learning infrastructure concludes that AI in vehicle 1800 is malfunctioning, then server(s) 1878 may transmit a signal to vehicle 1800 instructing a fail-safe computer of vehicle 1800 to assume control, notify passengers, and complete a safe parking maneuver.

In at least one embodiment, server(s) 1878 may include GPU(s) 1884 and one or more programmable inference accelerators (for example, NVIDIA's TensorRT 3). In at least one embodiment, combination of GPU-powered servers and inference acceleration may make real-time responsiveness possible. In at least one embodiment, such as where performance is less critical, servers powered by CPUs, FPGAs, and other processors may be used for inferencing. In at least one embodiment, hardware structure(s) 818 are used to perform one or more embodiments. Details regarding hardware structure(s) 818 are provided herein in conjunction with FIGS. 15A and/or 15B.

Processors

Figure 19A:
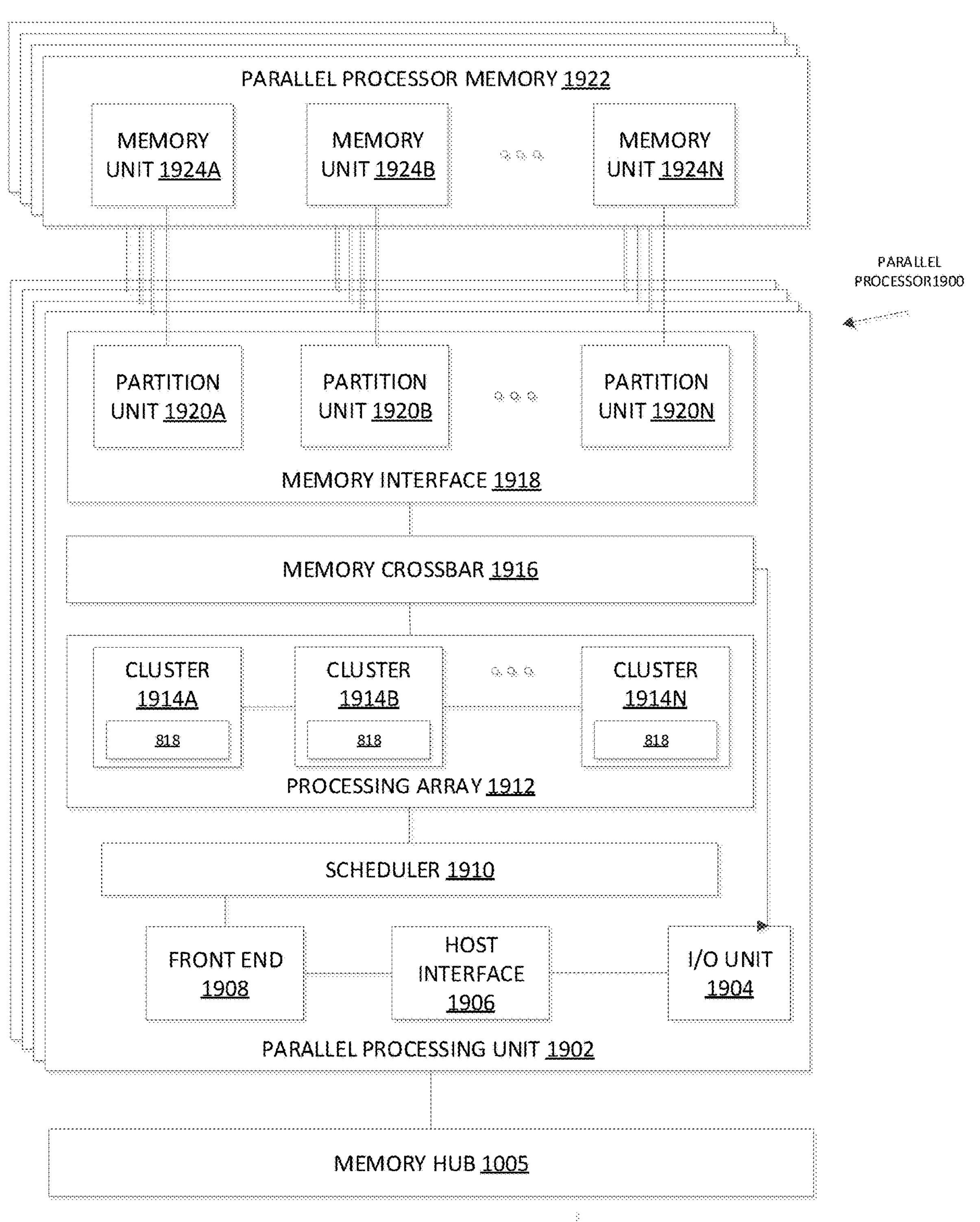
FIG. 19A illustrates a parallel processor, according to at least one embodiment.

FIG. 19A illustrates a parallel processor 1900 according to at least on embodiment. In at least one embodiment, various components of parallel processor 1900 may be implemented using one or more integrated circuit devices, such as programmable processors, application specific integrated circuits (ASICs), or field programmable gate arrays (FPGA). In at least one embodiment, illustrated parallel processor 1900 is a variant of one or more parallel processor(s) 1412 shown in FIG. 14 according to an exemplary embodiment.

In at least one embodiment, parallel processor 1900 includes a parallel processing unit 1902. In at least one embodiment, parallel processing unit 1902 includes an I/O unit 1904 that enables communication with other devices, including other instances of parallel processing unit 1902. In at least one embodiment, I/O unit 1904 may be directly connected to other devices. In at least one embodiment, I/O unit 1904 connects with other devices via use of a hub or switch interface, such as memory hub 1405. In at least one embodiment, connections between memory hub 1405 and I/O unit 1904 form a communication link 1413. In at least one embodiment, I/O unit 1904 connects with a host interface 1906 and a memory crossbar 1916, where host interface 1906 receives commands directed to performing processing operations and memory crossbar 1916 receives commands directed to performing memory operations.

In at least one embodiment, when host interface 1906 receives a command buffer via I/O unit 1904, host interface 1906 can direct work operations to perform those commands to a front end 1908. In at least one embodiment, front end 1908 couples with a scheduler 1910, which is configured to distribute commands or other work items to a processing cluster array 1912. In at least one embodiment, scheduler 1910 ensures that processing cluster array 1912 is properly configured and in a valid state before tasks are distributed to processing cluster array 1912 of processing cluster array 1912. In at least one embodiment, scheduler 1910 is implemented via firmware logic executing on a microcontroller. In at least one embodiment, microcontroller implemented scheduler 1910 is configurable to perform complex scheduling and work distribution operations at coarse and fine granularity, enabling rapid preemption and context switching of threads executing on processing array 1912. In at least one embodiment, host software can prove workloads for scheduling on processing array 1912 via one of multiple graphics processing doorbells. In at least one embodiment, workloads can then be automatically distributed across processing array 1912 by scheduler 1910 logic within a microcontroller including scheduler 1910.

In at least one embodiment, processing cluster array 1912 can include up to "N" processing clusters (for example, cluster 1914A, cluster 1914B, through cluster 1914N). In at least one embodiment, each cluster 1914A-1514N of processing cluster array 1912 can execute a large number of concurrent threads. In at least one embodiment, scheduler 1910 can allocate work to clusters 1914A-1514N of processing cluster array 1912 using various scheduling and/or work distribution algorithms, which may vary depending on workload arising for each type of program or computation. In at least one embodiment, scheduling can be handled dynamically by scheduler 1910, or can be assisted in part by compiler logic during compilation of program logic configured for execution by processing cluster array 1912. In at least one embodiment, different clusters 1914A-1514N of processing cluster array 1912 can be allocated for processing different types of programs or for performing different types of computations.

In at least one embodiment, processing cluster array 1912 can be configured to perform various types of parallel processing operations. In at least one embodiment, processing cluster array 1912 is configured to perform general-purpose parallel compute operations. For example, in at least one embodiment, processing cluster array 1912 can include logic to execute processing tasks including filtering of video and/or audio data, performing modeling operations, including physics operations, and performing data transformations.

In at least one embodiment, processing cluster array 1912 is configured to perform parallel graphics processing operations. In at least one embodiment, processing cluster array 1912 can include additional logic to support execution of such graphics processing operations, including, but not limited to texture sampling logic to perform texture operations, as well as tessellation logic and other vertex processing logic. In at least one embodiment, processing cluster array 1912 can be configured to execute graphics processing related shader programs such as, but not limited to vertex shaders, tessellation shaders, geometry shaders, and pixel shaders. In at least one embodiment, parallel processing unit 1902 can transfer data from system memory via I/O unit 1904 for processing. In at least one embodiment, during processing, transferred data can be stored to on-chip memory (for example, parallel processor memory 1922) during processing, then written back to system memory.

In at least one embodiment, when parallel processing unit 1902 is used to perform graphics processing, scheduler 1910 can be configured to divide a processing workload into approximately equal sized tasks, to better enable distribution of graphics processing operations to multiple clusters 1914A-1514N of processing cluster array 1912. In at least one embodiment, portions of processing cluster array 1912 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 1914A-1514N may be stored in buffers to allow intermediate data to be transmitted between clusters 1914A-1514N for further processing.

In at least one embodiment, processing cluster array 1912 can receive processing tasks to be executed via scheduler 1910, which receives commands defining processing tasks from front end 1908. In at least one embodiment, processing tasks can include indices of data to be processed, for example, surface (patch) data, primitive data, vertex data, and/or pixel data, as well as state parameters and commands defining how data is to be processed (for example, what program is to be executed). In at least one embodiment, scheduler 1910 may be configured to fetch indices corresponding to tasks or may receive indices from front end 1908. In at least one embodiment, front end 1908 can be configured to ensure processing cluster array 1912 is configured to a valid state before a workload specified by incoming command buffers (for example, batch-buffers, push buffers, etc.) is initiated.

In at least one embodiment, each of one or more instances of parallel processing unit 1902 can couple with parallel processor memory 1922. In at least one embodiment, parallel processor memory 1922 can be accessed via memory crossbar 1916, which can receive memory requests from processing cluster array 1912 as well as I/O unit 1904. In at least one embodiment, memory crossbar 1916 can access parallel processor memory 1922 via a memory interface 1918. In at least one embodiment, memory interface 1918 can include multiple partition units (for example, partition unit 1920A, partition unit 1920B, through partition unit 1920N) that can each couple to a portion (for example, memory unit) of parallel processor memory 1922. In at least one embodiment, a number of partition units 1920A-1520N is configured to be equal to a number of memory units, such that a first partition unit 1920A has a corresponding first memory unit 1924A, a second partition unit 1920B has a corresponding memory unit 1924B, and an Nth partition unit 1920N has a corresponding Nth memory unit 1924N. In at least one embodiment, a number of partition units 1920A-1520N may not be equal to a number of memory devices.

In at least one embodiment, memory units 1924A-1524N can include various types of memory devices, including dynamic random access memory (DRAM) or graphics random access memory, such as synchronous graphics random access memory (SGRAM), including graphics double data rate (GDDR) memory. In at least one embodiment, memory units 1924A-1524N may also include 3D stacked memory, including but not limited to high bandwidth memory (HBM). In at least one embodiment, render targets, such as frame buffers or texture maps may be stored across memory units 1924A-1524N, allowing partition units 1920A-1520N to write portions of each render target in parallel to efficiently use available bandwidth of parallel processor memory 1922. In at least one embodiment, a local instance of parallel processor memory 1922 may be excluded in favor of a unified memory design that utilizes system memory in conjunction with local cache memory.

In at least one embodiment, any one of clusters 1914A-1514N of processing cluster array 1912 can process data that will be written to any of memory units 1924A-1524N within parallel processor memory 1922. In at least one embodiment, memory crossbar 1916 can be configured to transfer an output of each cluster 1914A-1514N to any partition unit 1920A-1520N or to another cluster 1914A-1514N, which can perform additional processing operations on an output. In at least one embodiment, each cluster 1914A-1514N can communicate with memory interface 1918 through memory crossbar 1916 to read from or write to various external memory devices. In at least one embodiment, memory crossbar 1916 has a connection to memory interface 1918 to communicate with I/O unit 1904, as well as a connection to a local instance of parallel processor memory 1922, enabling processing units within different processing clusters 1914A-1514N to communicate with system memory or other memory that is not local to parallel processing unit 1902. In at least one embodiment, memory crossbar 1916 can use virtual channels to separate traffic streams between clusters 1914A-1514N and partition units 1920A-1520N.

In at least one embodiment, multiple instances of parallel processing unit 1902 can be provided on a single add-in card, or multiple add-in cards can be interconnected. In at least one embodiment, different instances of parallel processing unit 1902 can be configured to inter-operate even if different instances have different numbers of processing cores, different amounts of local parallel processor memory, and/or other configuration differences. For example, in at least one embodiment, some instances of parallel processing unit 1902 can include higher precision floating point units relative to other instances. In at least one embodiment, systems incorporating one or more instances of parallel processing unit 1902 or parallel processor 1900 can be implemented in a variety of configurations and form factors, including but not limited to desktop, laptop, or handheld personal computers, servers, workstations, game consoles, and/or embedded systems.

Figure 19B:
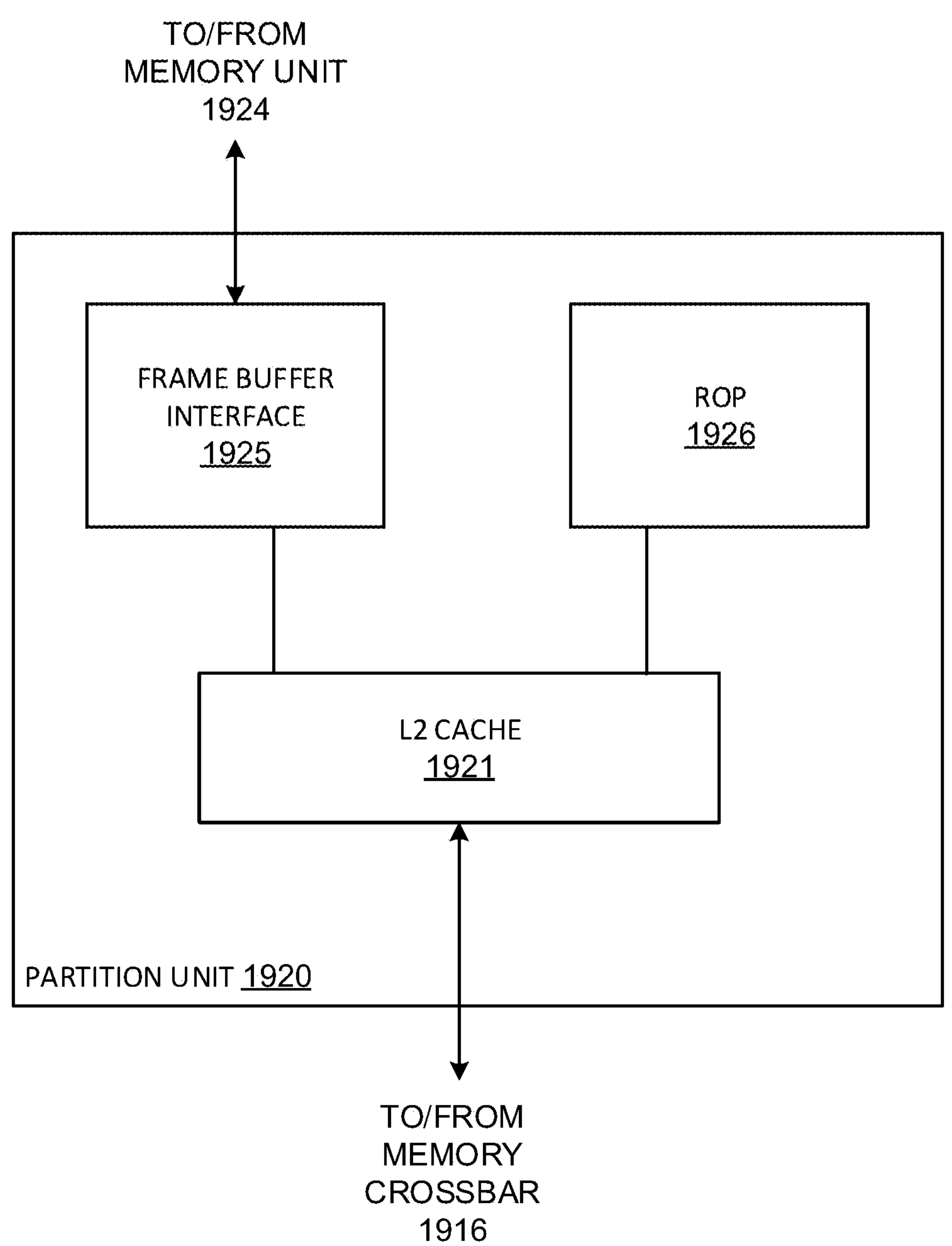
FIG. 19B illustrates a partition unit, according to at least one embodiment.

FIG. 19B is a block diagram of a partition unit 1920 according to at least one embodiment. In at least one embodiment, partition unit 1920 is an instance of one of partition units 1920A-1520N of FIG. 19A. In at least one embodiment, partition unit 1920 includes an L2 cache 1921, a frame buffer interface 1925, and a ROP 1926 (raster operations unit). L2 cache 1921 is a read/write cache that is configured to perform load and store operations received from memory crossbar 1916 and ROP 1926. In at least one embodiment, read misses and urgent write-back requests are output by L2 cache 1921 to frame buffer interface 1925 for processing. In at least one embodiment, updates can also be sent to a frame buffer via frame buffer interface 1925 for processing. In at least one embodiment, frame buffer interface 1925 interfaces with one of memory units in parallel processor memory, such as memory units 1924A-1524N of FIG. 19 (for example, within parallel processor memory 1922).

In at least one embodiment, ROP 1926 is a processing unit that performs raster operations such as stencil, z test, blending, and like. In at least one embodiment, ROP 1926 then outputs processed graphics data that is stored in graphics memory. In at least one embodiment, ROP 1926 includes compression logic to compress depth or color data that is written to memory and decompress depth or color data that is read from memory. In at least one embodiment, compression logic can be lossless compression logic that makes use of one or more of multiple compression algorithms. Type of compression that is performed by ROP 1926 can vary based on statistical characteristics of data to be compressed. For example, in at least one embodiment, delta color compression is performed on depth and color data on a per-tile basis.

In at least one embodiment, ROP 1926 is included within each processing cluster (for example, cluster 1914A-1514N of FIG. 19) instead of within partition unit 1920. In at least one embodiment, read and write requests for pixel data are transmitted over memory crossbar 1916 instead of pixel fragment data. In at least one embodiment, processed graphics data may be displayed on a display device, such as one of one or more display device(s) 1410 of FIG. 14, routed for further processing by processor(s) 1402, or routed for further processing by one of processing entities within parallel processor 1900 of FIG. 19A.

Figure 19C:
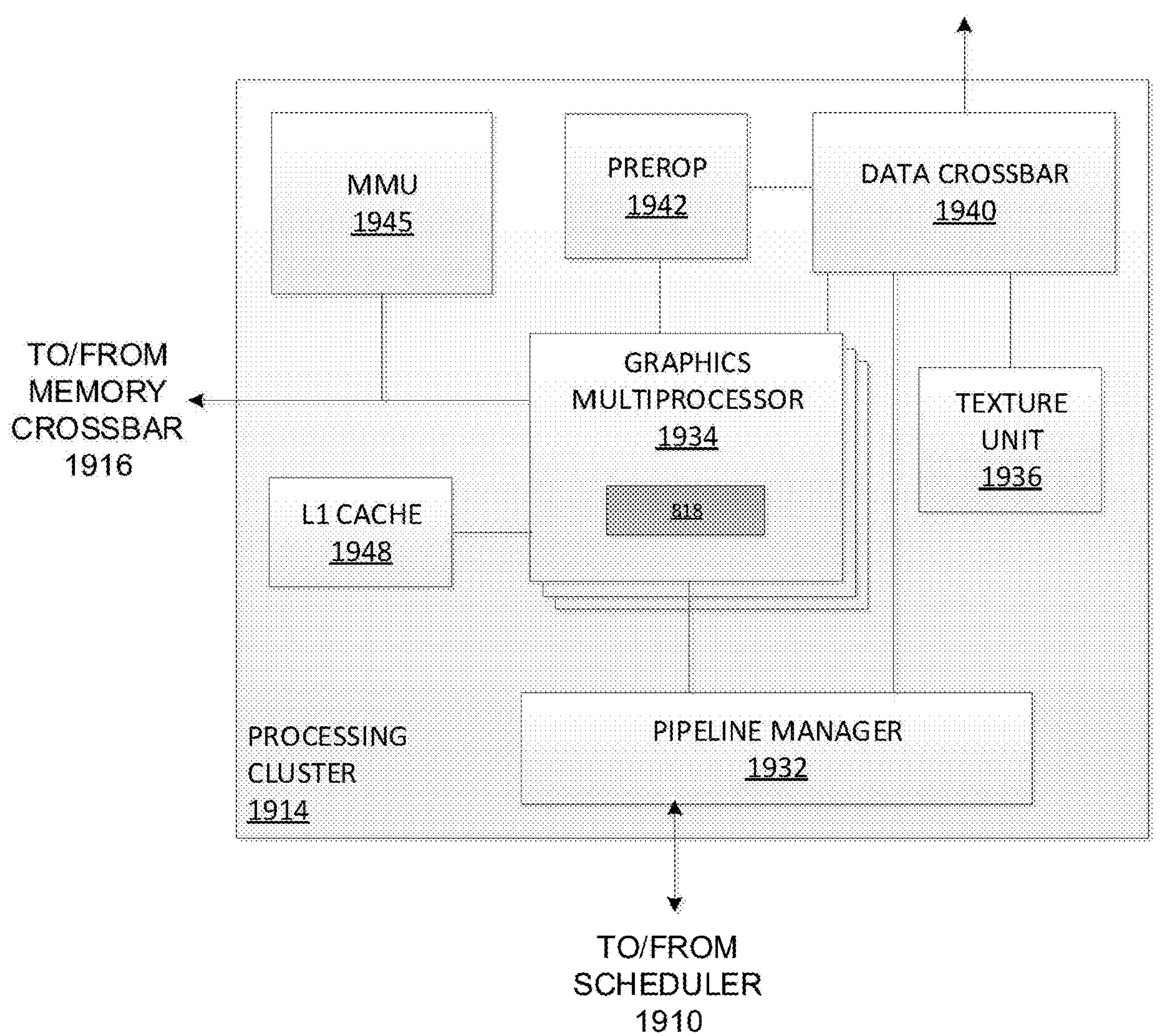
FIG. 19C illustrates a processing cluster, according to at least one embodiment.

FIG. 19C is a block diagram of a processing cluster 1914 within a parallel processing unit according to at least one embodiment. In at least one embodiment, a processing cluster is an instance of one of processing clusters 1914A-1514N of FIG. 19. In at least one embodiment, processing cluster 1914 can be configured to execute many threads in parallel, where term "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 1914 can be controlled via a pipeline manager 1932 that distributes processing tasks to SIMT parallel processors. In at least one embodiment, pipeline manager 1932 receives instructions from scheduler 1910 of FIG. 19 and manages execution of those instructions via a graphics multiprocessor 1934 and/or a texture unit 1936. In at least one embodiment, graphics multiprocessor 1934 is an exemplary instance of a SIMT parallel processor. However, in at least one embodiment, various types of SIMT parallel processors of differing architectures may be included within processing cluster 1914. In at least one embodiment, one or more instances of graphics multiprocessor 1934 can be included within a processing cluster 1914. In at least one embodiment, graphics multiprocessor 1934 can process data and a data crossbar 1940 can be used to distribute processed data to one of multiple possible destinations, including other shader units. In at least one embodiment, pipeline manager 1932 can facilitate distribution of processed data by specifying destinations for processed data to be distributed vis data crossbar 1940.

In at least one embodiment, each graphics multiprocessor 1934 within processing cluster 1914 can include an identical set of functional execution logic (for example, arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 1914 constitute a thread. In at least one embodiment, a set of threads executing across a set of parallel processing engines is a thread group. In at least one embodiment, thread group executes a program on different input data. In at least one embodiment, each thread within a thread group can be assigned to a different processing engine within a graphics multiprocessor 1934. In at least one embodiment, a thread group may include fewer threads than a number of processing engines within graphics multiprocessor 1934. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 1934. In at least one embodiment, when a thread group includes more threads than number of processing engines within graphics multiprocessor 1934, processing can be performed over consecutive clock cycles. In at least one embodiment, multiple thread groups can be executed concurrently on a graphics multiprocessor 1934.

In at least one embodiment, graphics multiprocessor 1934 includes an internal cache memory to perform load and store operations. In at least one embodiment, graphics multiprocessor 1934 can forego an internal cache and use a cache memory (for example, L1 cache 1948) within processing cluster 1914. In at least one embodiment, each graphics multiprocessor 1934 also has access to L2 caches within partition units (for example, partition units 1920A-1520N of FIG. 19) that are shared among all processing clusters 1914 and may be used to transfer data between threads. In at least one embodiment, graphics multiprocessor 1934 may also access off-chip global memory, which can include one or more of local parallel processor memory and/or system memory. In at least one embodiment, any memory external to parallel processing unit 1902 may be used as global memory. In at least one embodiment, processing cluster 1914 includes multiple instances of graphics multiprocessor 1934 can share common instructions and data, which may be stored in L1 cache 1948.

In at least one embodiment, each processing cluster 1914 may include an MMU 1945 (memory management unit) that is configured to map virtual addresses into physical addresses. In at least one embodiment, one or more instances of MMU 1945 may reside within memory interface 1918 of FIG. 19. In at least one embodiment, MMU 1945 includes a set of page table entries (PTEs) used to map a virtual address to a physical address of a tile (talk more about tiling) and optionally a cache line index. In at least one embodiment, MMU 1945 may include address translation lookaside buffers (TLB) or caches that may reside within graphics multiprocessor 1934 or L1 cache or processing cluster 1914. In at least one embodiment, physical address is processed to distribute surface data access locality to allow efficient request interleaving among partition units. In at least one embodiment, cache line index may be used to determine whether a request for a cache line is a hit or miss.

In at least one embodiment, a processing cluster 1914 may be configured such that each graphics multiprocessor 1934 is coupled to a texture unit 1936 for performing texture mapping operations, for example, determining texture sample positions, reading texture data, and filtering texture data. In at least one embodiment, texture data is read from an internal texture L1 cache (not shown) or from an L1 cache within graphics multiprocessor 1934 and is fetched from an L2 cache, local parallel processor memory, or system memory, as needed. In at least one embodiment, each graphics multiprocessor 1934 outputs processed tasks to data crossbar 1940 to provide processed task to another processing cluster 1914 for further processing or to store processed task in an L2 cache, local parallel processor memory, or system memory via memory crossbar 1916. In at least one embodiment, preROP 1942 (pre-raster operations unit) is configured to receive data from graphics multiprocessor 1934, direct data to ROP units, which may be located with partition units as described herein (for example, partition units 1920A-1520N of FIG. 19). In at least one embodiment, PreROP 1942 unit can perform optimizations for color blending, organize pixel color data, and perform address translations.

Inference and/or training logic 818 are used to perform inferencing and/or training operations associated with any one or more embodiments. Details regarding inference and/or training logic 818 are provided herein in conjunction with FIGS. 15A and/or 15B. In at least one embodiment, inference and/or training logic 818 may be used in graphics processing cluster 1914 for inferencing or predicting operations based, at least in part, on weight parameters calculated using neural network training operations, neural network functions and/or architectures, or neural network use cases described herein.

In at least one embodiment, inferencing logic 818 implements neural networks 20 and 30 of FIG. 1, so as to identify objects such as vehicles as described herein. In at least one embodiment, vehicle identification is performed reidentify vehicles that have passed from one camera to another. In at least one embodiment, vehicle identification is performed by determining vehicle identity such as make and model, as well as vehicle color and type. In at least one embodiment, neural networks 20 and 30 are trained according to a loss function of errors in identity classification. In at least one embodiment, neural networks 20 and 30 are trained according to a loss function of errors in identity and/or color and/or type classifications.

Figure 19D:
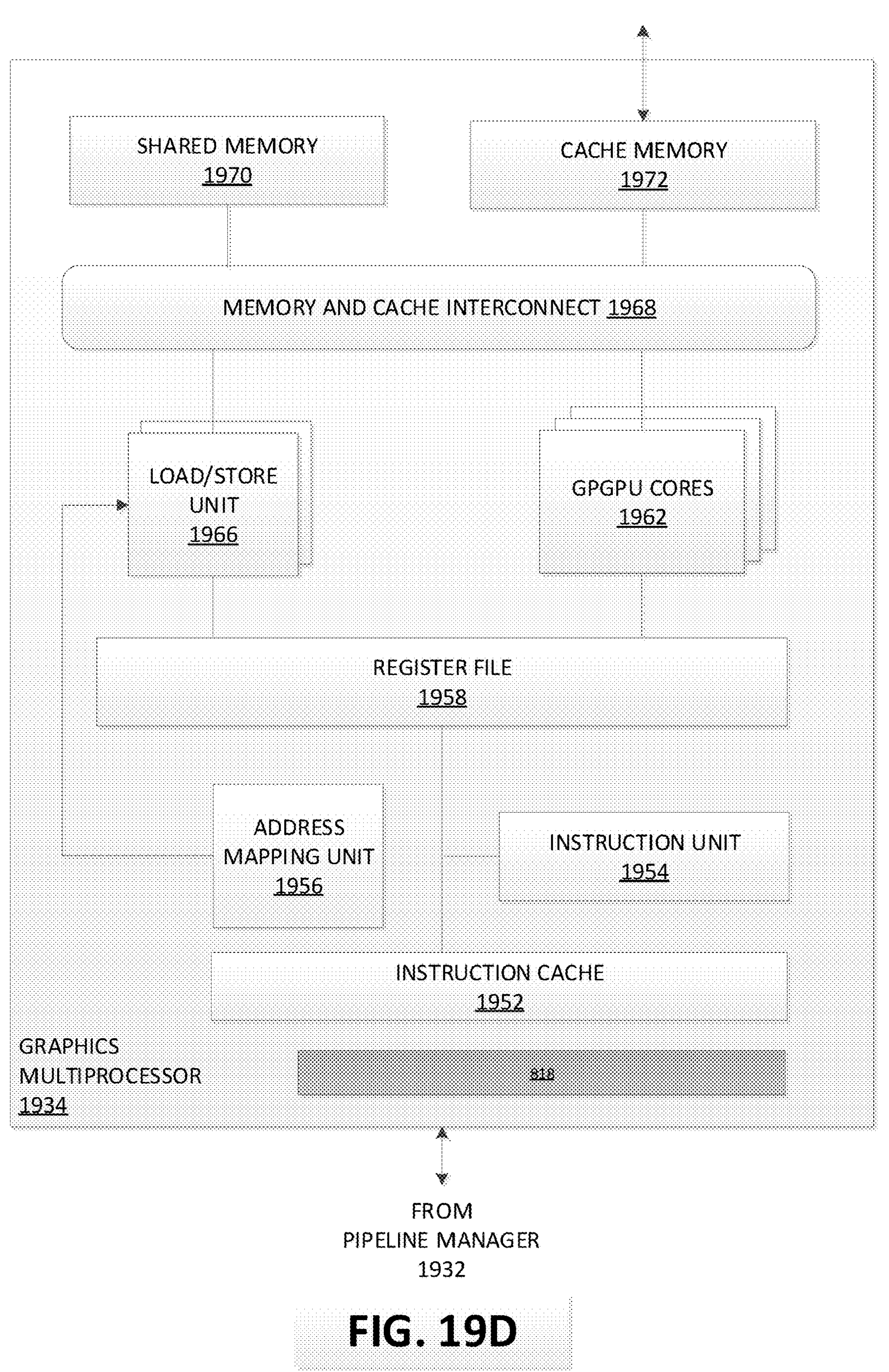
FIG. 19D illustrates a graphics multiprocessor, according to at least one embodiment.

FIG. 19D shows a graphics multiprocessor 1934 according to at least one embodiment. In at least one embodiment, graphics multiprocessor 1934 couples with pipeline manager 1932 of processing cluster 1914. In at least one embodiment, graphics multiprocessor 1934 has an execution pipeline including but not limited to an instruction cache 1952, an instruction unit 1954, an address mapping unit 1956, a register file 1958, one or more general purpose graphics processing unit (GPGPU) cores 1962, and one or more load/store units 1966. GPGPU cores 1962 and load/store units 1966 are coupled with cache memory 1972 and shared memory 1970 via a memory and cache interconnect 1968.

In at least one embodiment, instruction cache 1952 receives a stream of instructions to execute from pipeline manager 1932. In at least one embodiment, instructions are cached in instruction cache 1952 and dispatched for execution by instruction unit 1954. In at least one embodiment, instruction unit 1954 can dispatch instructions as thread groups (for example, warps), with each thread of thread group assigned to a different execution unit within GPGPU core 1962. In at least one embodiment, an instruction can access any of a local, shared, or global address space by specifying an address within a unified address space. In at least one embodiment, address mapping unit 1956 can be used to translate addresses in a unified address space into a distinct memory address that can be accessed by load/store units 1966.

In at least one embodiment, register file 1958 provides a set of registers for functional units of graphics multiprocessor 1934. In at least one embodiment, register file 1958 provides temporary storage for operands connected to data paths of functional units (for example, GPGPU cores 1962, load/store units 1966) of graphics multiprocessor 1934. In at least one embodiment, register file 1958 is divided between each of functional units such that each functional unit is allocated a dedicated portion of register file 1958. In at least one embodiment, register file 1958 is divided between different warps being executed by graphics multiprocessor 1934.

In at least one embodiment, GPGPU cores 1962 can each include floating point units (FPUs) and/or integer arithmetic logic units (ALUs) that are used to execute instructions of graphics multiprocessor 1934. GPGPU cores 1962 can be similar in architecture or can differ in architecture. In at least one embodiment, a first portion of GPGPU cores 1962 include a single precision FPU and an integer ALU while a second portion of GPGPU cores include a double precision FPU. In at least one embodiment, FPUs can implement IEEE 1154-2008 standard for floating point arithmetic or enable variable precision floating point arithmetic. In at least one embodiment, graphics multiprocessor 1934 can additionally include one or more fixed function or special function units to perform specific functions such as copy rectangle or pixel blending operations. In at least one embodiment one or more of GPGPU cores can also include fixed or special function logic.

In at least one embodiment, GPGPU cores 1962 include SIMD logic capable of performing a single instruction on multiple sets of data. In one embodiment GPGPU cores 1962 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 1968 is an interconnect network that connects each functional unit of graphics multiprocessor 1934 to register file 1958 and to shared memory 1970. In at least one embodiment, memory and cache interconnect 1968 is a crossbar interconnect that allows load/store unit 1966 to implement load and store operations between shared memory 1970 and register file 1958. In at least one embodiment, register file 1958 can operate at a same frequency as GPGPU cores 1962, thus data transfer between GPGPU cores 1962 and register file 1958 is very low latency. In at least one embodiment, shared memory 1970 can be used to enable communication between threads that execute on functional units within graphics multiprocessor 1934. In at least one embodiment, cache memory 1972 can be used as a data cache for example, to cache texture data communicated between functional units and texture unit 1936. In at least one embodiment, shared memory 1970 can also be used as a program managed cached. In at least one embodiment, threads executing on GPGPU cores 1962 can programmatically store data within shared memory in addition to automatically cached data that is stored within cache memory 1972.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, GPU may be communicatively coupled to host processor/cores over a bus or other interconnect (for example, a high speed interconnect such as PCIe or NVLink). In at least one embodiment, GPU may be integrated on same package or chip as cores and communicatively coupled to cores over an internal processor bus/interconnect (i.e., internal to package or chip). In at least one embodiment, regardless of manner in which GPU is connected, processor cores may allocate work to GPU in form of sequences of commands/instructions contained in a work descriptor. In at least one embodiment, GPU then uses dedicated circuitry/logic for efficiently processing these commands/instructions.

Inference and/or training logic 818 are used to perform inferencing and/or training operations associated with any one or more embodiments. Details regarding inference and/or training logic 818 are provided herein in conjunction with FIGS. 15A and/or 15B. In at least one embodiment, inference and/or training logic 818 may be used in graphics multiprocessor 1934 for inferencing or predicting operations based, at least in part, on weight parameters calculated using neural network training operations, neural network functions and/or architectures, or neural network use cases described herein.

In at least one embodiment, inferencing logic 818 implements neural networks 20 and 30 of FIG. 1, so as to identify objects such as vehicles as described herein. In at least one embodiment, vehicle identification is performed reidentify vehicles that have passed from one camera to another. In at least one embodiment, vehicle identification is performed by determining vehicle identity such as make and model, as well as vehicle color and type. In at least one embodiment, neural networks 20 and 30 are trained according to a loss function of errors in identity classification. In at least one embodiment, neural networks 20 and 30 are trained according to a loss function of errors in identity and/or color and/or type classifications.

Figure 20:
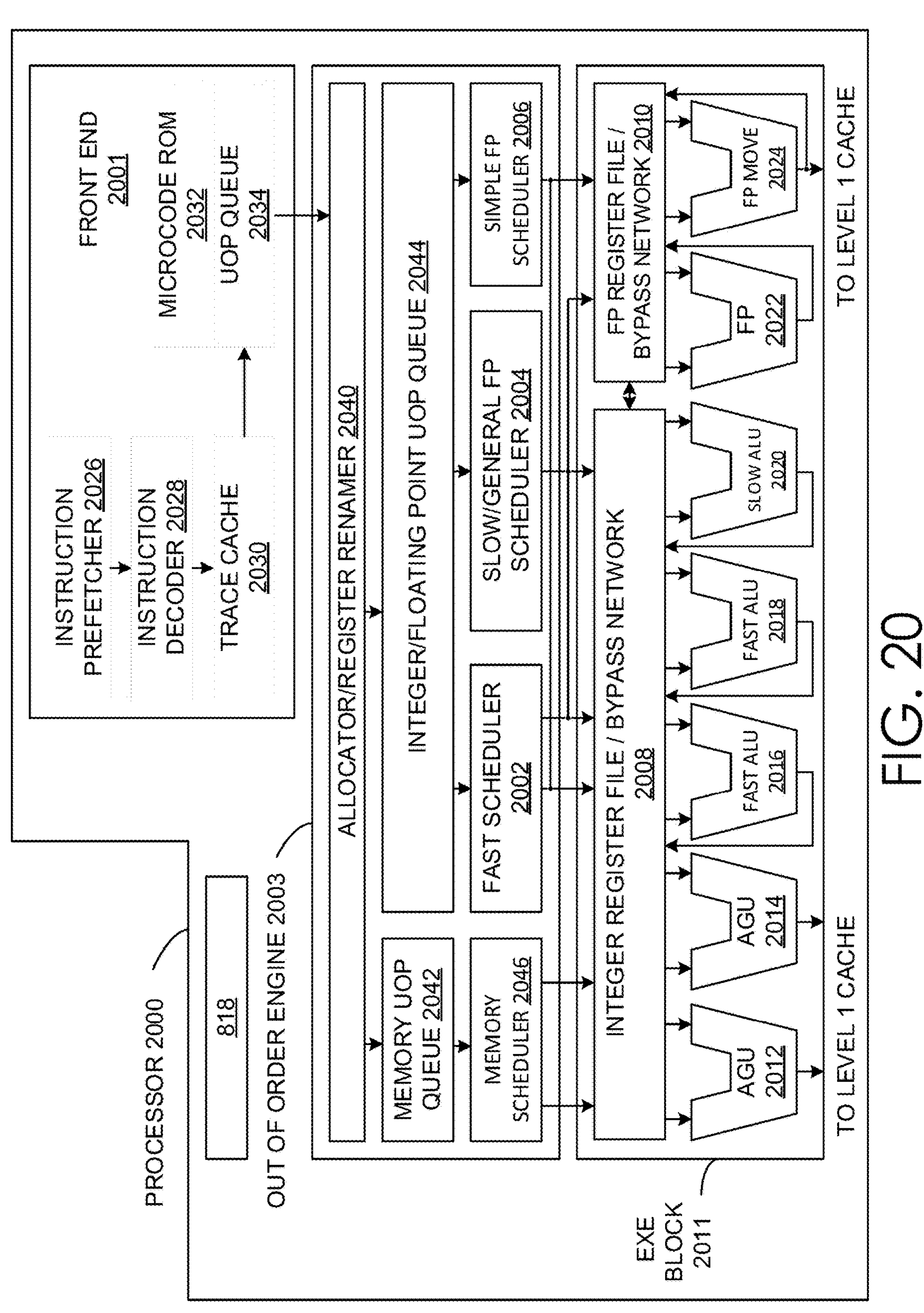
FIG. 20 is a block diagram illustrating a processor micro-architecture for a processor, according to at least one embodiment.

FIG. 20 is a block diagram illustrating micro-architecture for a processor 2000 that may include logic circuits to perform instructions, according to at least one embodiment. In at least one embodiment, processor 2000 may perform instructions, including x86 instructions, ARM instructions, specialized instructions for application-specific integrated circuits (ASICs), etc. In at least one embodiment, processor 2010 may include registers to store packed data, such as 104-bit wide MMX™ registers in microprocessors enabled with MMX technology from Intel Corporation of Santa Clara, Calif. In at least one embodiment, MMX registers, available in both integer and floating point forms, may operate with packed data elements that accompany single instruction, multiple data ("SIMD") and streaming SIMD extensions ("SSE") instructions. In at least one embodiment, 168-bit wide XMM registers relating to SSE2, SSE3, SSE4, AVX, or beyond (referred to generically as "SSEx") technology may hold such packed data operands. In at least one embodiment, processors 2010 may perform instructions to accelerate machine learning or deep learning algorithms, training, or inferencing.

In at least one embodiment, processor 2000 includes an in-order front end ("front end") 2001 to fetch instructions to be executed and prepare instructions to be used later in processor pipeline. In at least one embodiment, front end 2001 may include several units. In at least one embodiment, an instruction prefetcher 2026 fetches instructions from memory and feeds instructions to an instruction decoder 2028 which in turn decodes or interprets instructions. For example, in at least one embodiment, instruction decoder 2028 decodes a received instruction into one or more operations called "micro-instructions" or "micro-operations" (also called "micro ops" or "uops") that machine may execute. In at least one embodiment, instruction decoder 2028 parses instruction into an opcode and corresponding data and control fields that may be used by micro-architecture to perform operations in accordance with at least one embodiment. In at least one embodiment, a trace cache 2030 may assemble decoded uops into program ordered sequences or traces in a uop queue 2034 for execution. In at least one embodiment, when trace cache 2030 encounters a complex instruction, a microcode ROM 2032 provides uops needed to complete operation.

In at least one embodiment, some instructions may be converted into a single micro-op, whereas others need several micro-ops to complete full operation. In at least one embodiment, if more than four micro-ops are needed to complete an instruction, instruction decoder 2028 may access microcode ROM 2032 to perform instruction. In at least one embodiment, an instruction may be decoded into a small number of micro-ops for processing at instruction decoder 2028. In at least one embodiment, an instruction may be stored within microcode ROM 2032 should a number of micro-ops be needed to accomplish operation. In at least one embodiment, trace cache 2030 refers to an entry point programmable logic array ("PLA") to determine a correct micro-instruction pointer for reading microcode sequences to complete one or more instructions from microcode ROM 2032 in accordance with at least one embodiment. In at least one embodiment, after microcode ROM 2032 finishes sequencing micro-ops for an instruction, front end 2001 of machine may resume fetching micro-ops from trace cache 2030.

In at least one embodiment, out-of-order execution engine ("out of order engine") 2003 may prepare instructions for execution. In at least one embodiment, out-of-order execution logic has a number of buffers to smooth out and re-order flow of instructions to optimize performance as they go down pipeline and get scheduled for execution. Out-of-order execution engine 2003 includes, without limitation, an allocator/register renamer 2040, a memory uop queue 2042, an integer/floating point uop queue 2044, a memory scheduler 2046, a fast scheduler 2002, a slow/general floating point scheduler ("slow/general FP scheduler") 2004, and a simple floating point scheduler ("simple FP scheduler") 2006. In at least one embodiment, fast schedule 2002, slow/general floating point scheduler 2004, and simple floating point scheduler 2006 are also collectively referred to herein as "uop schedulers 2002, 2004, 2006." allocator/register renamer 2040 allocates machine buffers and resources that each uop needs in order to execute. In at least one embodiment, allocator/register renamer 2040 renames logic registers onto entries in a register file. In at least one embodiment, allocator/register renamer 2040 also allocates an entry for each uop in one of two uop queues, memory uop queue 2042 for memory operations and integer/floating point uop queue 2044 for non-memory operations, in front of memory scheduler 2046 and uop schedulers 2002, 2004, 2006. In at least one embodiment, uop schedulers 2002, 2004, 2006, determine when a uop is ready to execute based on readiness of their dependent input register operand sources and availability of execution resources uops need to complete their operation. In at least one embodiment, fast scheduler 2002 of at least one embodiment may schedule on each half of main clock cycle while slow/general floating point scheduler 2004 and simple floating point scheduler 2006 may schedule once per main processor clock cycle. In at least one embodiment, uop schedulers 2002, 2004, 2006 arbitrate for dispatch ports to schedule uops for execution.

In at least one embodiment, execution block b11 includes, without limitation, an integer register file/bypass network 2008, a floating point register file/bypass network ("FP register file/bypass network") 2010, address generation units ("AGUs") 2012 and 2014, fast Arithmetic Logic Units (ALUs) ("fast ALUs") 2016 and 2018, a slow Arithmetic Logic Unit ("slow ALU") 2020, a floating point ALU ("FP") 2022, and a floating point move unit ("FP move") 2024. In at least one embodiment, integer register file/bypass network 2008 and floating point register file/bypass network 2010 are also referred to herein as "register files 2008, 2010." In at least one embodiment, AGUSs 2012 and 2014, fast ALUs 2016 and 2018, slow ALU 2020, floating point ALU 2022, and floating point move unit 2024 are also referred to herein as "execution units 2012, 2014, 2016, 2018, 2020, 2022, and 2024." In at least one embodiment, execution block b11 may include, without limitation, any number (including zero) and type of register files, bypass networks, address generation units, and execution units, in any combination.

In at least one embodiment, register files 2008, 2010 may be arranged between uop schedulers 2002, 2004, 2006, and execution units 2012, 2014, 2016, 2018, 2020, 2022, and 2024. In at least one embodiment, integer register file/bypass network 2008 performs integer operations. In at least one embodiment, floating point register file/bypass network 2010 performs floating point operations. In at least one embodiment, each of register files 2008, 2010 may include, without limitation, a bypass network that may bypass or forward just completed results that have not yet been written into register file to new dependent uops. In at least one embodiment, register files 2008, 2010 may communicate data with each other. In at least one embodiment, integer register file/bypass network 2008 may include, without limitation, two separate register files, one register file for low-order thirty-two bits of data and a second register file for high order thirty-two bits of data. In at least one embodiment, floating point register file/bypass network 2010 may include, without limitation, 168-bit wide entries because floating point instructions typically have operands from 104 to 168 bits in width.

In at least one embodiment, execution units 2012, 2014, 2016, 2018, 2020, 2022, 2024 may execute instructions. In at least one embodiment, register files 2008, 2010 store integer and floating point data operand values that micro-instructions need to execute. In at least one embodiment, processor 2000 may include, without limitation, any number and combination of execution units 2012, 2014, 2016, 2018, 2020, 2022, 2024. In at least one embodiment, floating point ALU 2022 and floating point move unit 2024, may execute floating point, MMX, SIMD, AVX and SSE, or other operations, including specialized machine learning instructions. In at least one embodiment, floating point ALU 2022 may include, without limitation, a 104-bit by 104-bit floating point divider to execute divide, square root, and remainder micro ops. In at least one embodiment, instructions involving a floating point value may be handled with floating point hardware. In at least one embodiment, ALU operations may be passed to fast ALUs 2016, 2018. In at least one embodiment, fast ALUS 2016, 2018 may execute fast operations with an effective latency of half a clock cycle. In at least one embodiment, most complex integer operations go to slow ALU 2020 as slow ALU 2020 may include, without limitation, integer execution hardware for long-latency type of operations, such as a multiplier, shifts, flag logic, and branch processing. In at least one embodiment, memory load/store operations may be executed by AGUS 2012, 2014. In at least one embodiment, fast ALU 2016, fast ALU 2018, and slow ALU 2020 may perform integer operations on 104-bit data operands. In at least one embodiment, fast ALU 2016, fast ALU 2018, and slow ALU 2020 may be implemented to support a variety of data bit sizes including sixteen, thirty-two, 168, 296, etc. In at least one embodiment, floating point ALU 2022 and floating point move unit 2024 may be implemented to support a range of operands having bits of various widths. In at least one embodiment, floating point ALU 2022 and floating point move unit 2024 may operate on 168-bit wide packed data operands in conjunction with SIMD and multimedia instructions.

In at least one embodiment, uop schedulers 2002, 2004, 2006, dispatch dependent operations before parent load has finished executing. In at least one embodiment, as uops may be speculatively scheduled and executed in processor 2000, processor 2000 may also include logic to handle memory misses. In at least one embodiment, if a data load misses in data cache, there may be dependent operations in flight in pipeline that have left scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanism of at least one embodiment of a processor may also be designed to catch instruction sequences for text string comparison operations.

In at least one embodiment, term "registers" may refer to on-board processor storage locations that may be used as part of instructions to identify operands. In at least one embodiment, registers may be those that may be usable from outside of processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Inference and/or training logic 818 are used to perform inferencing and/or training operations associated with any one or more embodiments. Details regarding inference and/or training logic 818 are provided herein in conjunction with FIGS. 15A and/or 15B. In at least one embodiment portions or all of inference and/or training logic 818 may be incorporated into EXE Block 2011 and other memory or registers shown or not shown. For example, in at least one embodiment, training and/or inferencing techniques described herein may use one or more of ALUs illustrated in EXE Block 2011. Moreover, weight parameters may be stored in on-chip or off-chip memory and/or registers (shown or not shown) that configure ALUs of EXE Block 2011 to perform one or more machine learning algorithms, neural network architectures, use cases, or training techniques described herein.

In at least one embodiment, inferencing logic 818 implements neural networks 20 and 30 of FIG. 1, so as to identify objects such as vehicles as described herein. In at least one embodiment, vehicle identification is performed reidentify vehicles that have passed from one camera to another. In at least one embodiment, vehicle identification is performed by determining vehicle identity such as make and model, as well as vehicle color and type. In at least one embodiment, neural networks 20 and 30 are trained according to a loss function of errors in identity classification. In at least one embodiment, neural networks 20 and 30 are trained according to a loss function of errors in identity and/or color and/or type classifications.

Figure 21:
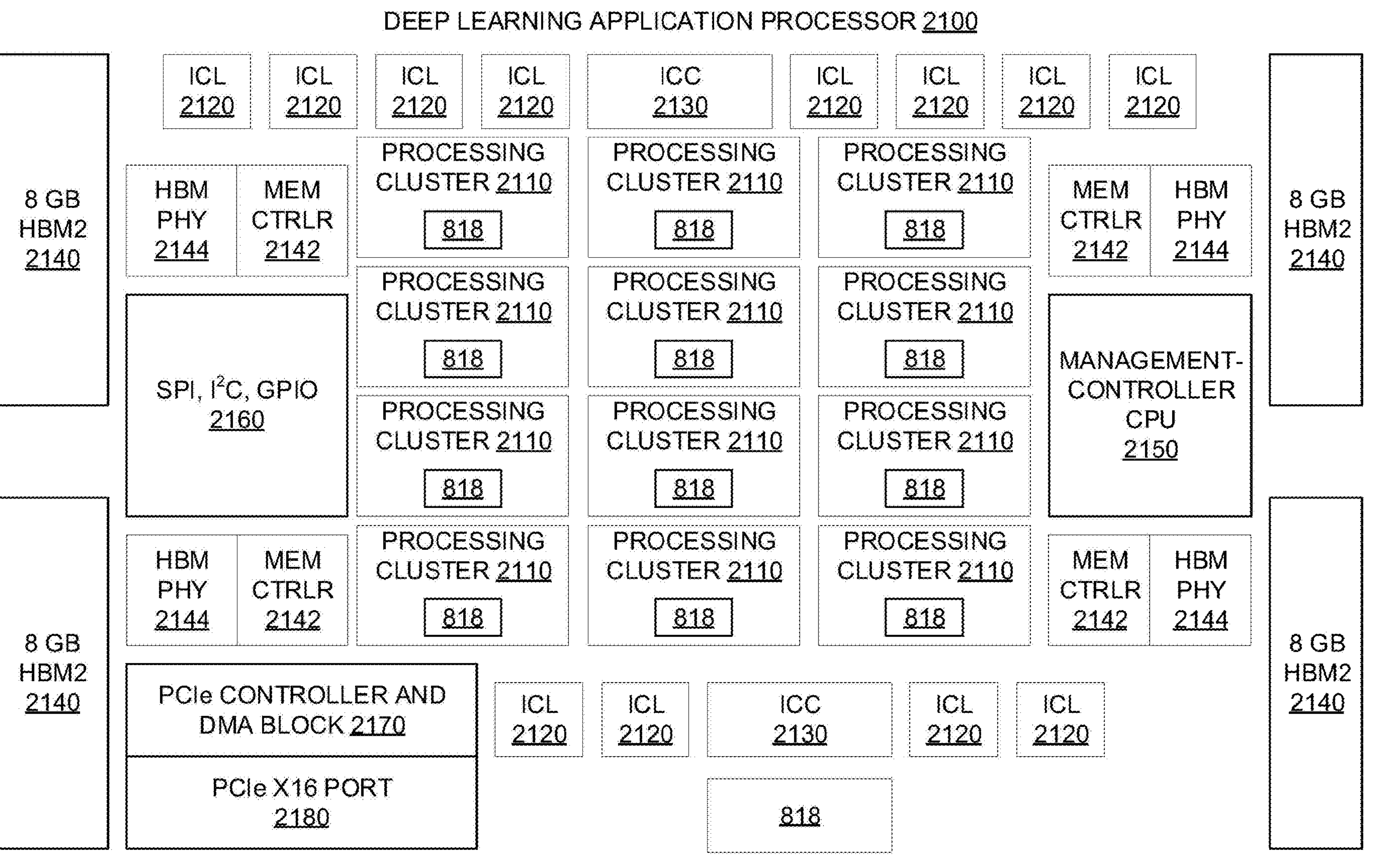
FIG. 21 illustrates a deep learning application processor, according to at least one embodiment.

FIG. 21 illustrates a deep learning application processor 2100, according to at least one embodiment. In at least one embodiment, deep learning application processor 2100 uses instructions that, if executed by deep learning application processor 2100, cause deep learning application processor 2100 to perform some or all of processes and techniques described throughout this disclosure. In at least one embodiment, deep learning application processor 2100 is an application-specific integrated circuit (ASIC). In at least one embodiment, application processor 2100 performs matrix multiply operations either "hard-wired" into hardware as a result of performing one or more instructions or both. In at least one embodiment, deep learning application processor 2100 includes, without limitation, processing clusters 2110(1)-1710(12), Inter-Chip Links ("ICLs") 2120(1)-1720(12), Inter-Chip Controllers ("ICCs") 2130(1)-1730(2), high bandwidth memory second generation ("HBM2") 2140(1)-1740(4), memory controllers ("Mem Ctrlrs") 2142(1)-1742(4), high bandwidth memory physical layer ("HBM PHY") 2144(1)-1744(4), a management-controller central processing unit ("management-controller CPU") 2150, a Serial Peripheral Interface, Inter-Integrated Circuit, and General Purpose Input/Output block ("SPI, I2C, GPIO") 2160, a peripheral component interconnect express controller and direct memory access block ("PCIe Controller and DMA") 2170, and a sixteen-lane peripheral component interconnect express port ("PCI Express×20") 2180.

In at least one embodiment, processing clusters 2110 may perform deep learning operations, including inference or prediction operations based on weight parameters calculated one or more training techniques, including those described herein. In at least one embodiment, each processing cluster 2110 may include, without limitation, any number and type of processors. In at least one embodiment, deep learning application processor 2100 may include any number and type of processing clusters 2100. In at least one embodiment, Inter-Chip Links 2120 are bi-directional. In at least one embodiment, Inter-Chip Links 2120 and Inter-Chip Controllers 2130 enable multiple deep learning application processors 2100 to exchange information, including activation information resulting from performing one or more machine learning algorithms embodied in one or more neural networks. In at least one embodiment, deep learning application processor 2100 may include any number (including zero) and type of ICLs 2120 and ICCs 2130.

In at least one embodiment, HBM2s 2140 provide a total of 32 Gigabytes (GB) of memory. HBM2 2140(*i*) is associated with both memory controller 2142(*i*) and HBM PHY 2144(*i*). In at least one embodiment, any number of HBM2s 2140 may provide any type and total amount of high bandwidth memory and may be associated with any number (including zero) and type of memory controllers 2142 and HBM PHYs 2144. In at least one embodiment, SPI, I2C, GPIO 2160, PCIe Controller and DMA 2170, and/or PCIe 2180 may be replaced with any number and type of blocks that enable any number and type of communication standards in any technically feasible fashion.

Inference and/or training logic 818 are used to perform inferencing and/or training operations associated with any one or more embodiments. Details regarding inference and/or training logic 818 are provided herein in conjunction with FIGS. 15A and/or 15B. In at least one embodiment, deep learning application processor is used to train a machine learning model, such as a neural network, to predict or infer information provided to deep learning application processor 2100. In at least one embodiment, deep learning application processor 2100 is used to infer or predict information based on a trained machine learning model (for example, neural network) that has been trained by another processor or system or by deep learning application processor 2100. In at least one embodiment, processor 2100 may be used to perform one or more neural network use cases described herein.

In at least one embodiment, inferencing logic 818 implements neural networks 20 and 30 of FIG. 1, so as to identify objects such as vehicles as described herein. In at least one embodiment, vehicle identification is performed reidentify vehicles that have passed from one camera to another. In at least one embodiment, vehicle identification is performed by determining vehicle identity such as make and model, as well as vehicle color and type. In at least one embodiment, neural networks 20 and 30 are trained according to a loss function of errors in identity classification. In at least one embodiment, neural networks 20 and 30 are trained according to a loss function of errors in identity and/or color and/or type classifications.

Figure 22:
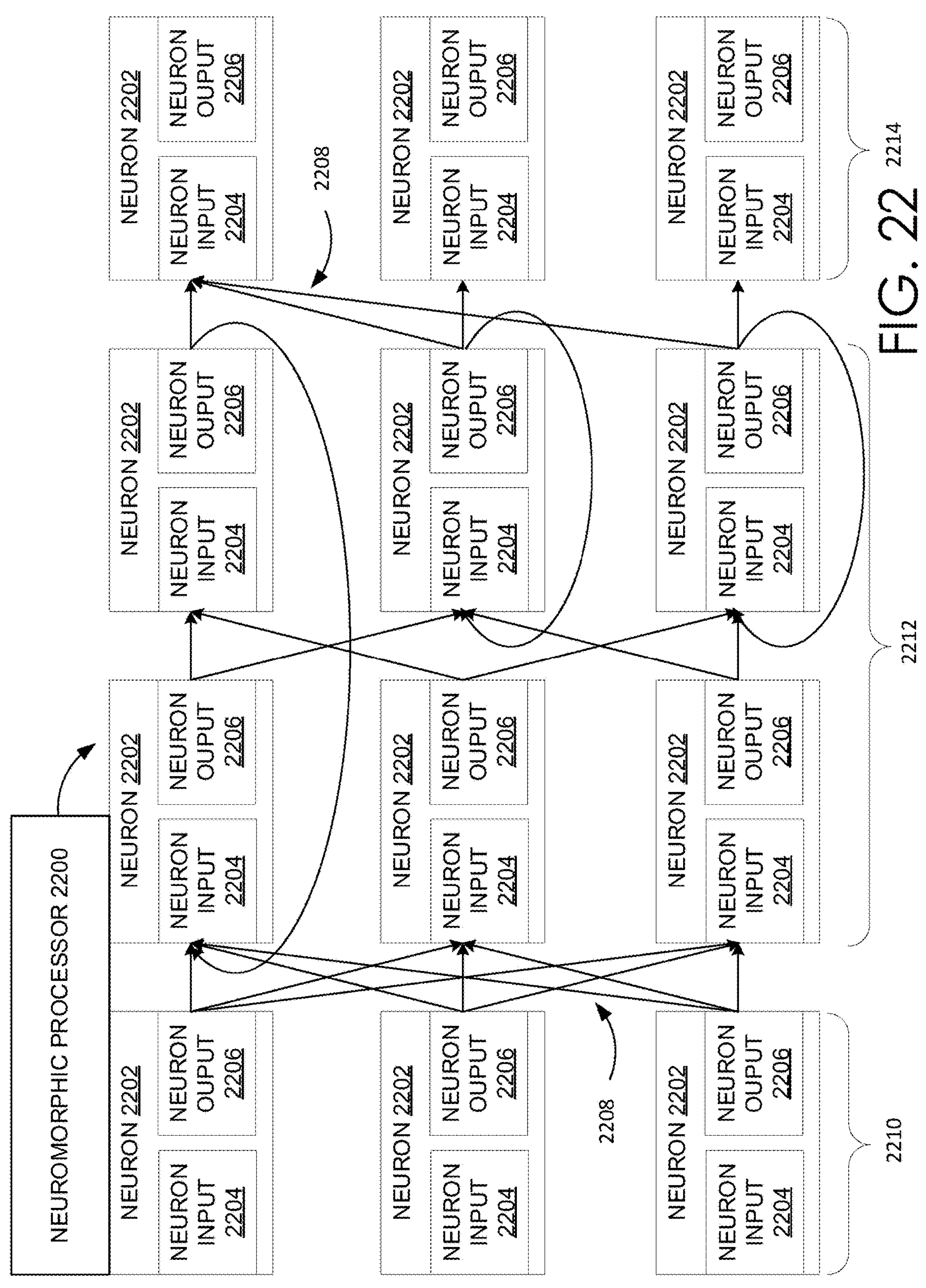
FIG. 22 is a block diagram illustrating an example neuromorphic processor, according to at least one embodiment.

FIG. 22 is a block diagram of a neuromorphic processor 2200, according to at least one embodiment. In at least one embodiment, neuromorphic processor 2200 may receive one or more inputs from sources external to neuromorphic processor 2200. In at least one embodiment, these inputs may be transmitted to one or more neurons 2202 within neuromorphic processor 2200. In at least one embodiment, neurons 2202 and components thereof may be implemented using circuitry or logic, including one or more arithmetic logic units (ALUs). In at least one embodiment, neuromorphic processor 2200 may include, without limitation, thousands or millions of instances of neurons 2202, but any suitable number of neurons 2202 may be used. In at least one embodiment, each instance of neuron 2202 may include a neuron input 2204 and a neuron output 2206. In at least one embodiment, neurons 2202 may generate outputs that may be transmitted to inputs of other instances of neurons 2202. For example, in at least one embodiment, neuron inputs 2204 and neuron outputs 2206 may be interconnected via synapses 2208.

In at least one embodiment, neurons 2202 and synapses 2208 may be interconnected such that neuromorphic processor 2200 operates to process or analyze information received by neuromorphic processor 2200. In at least one embodiment, neurons 2202 may transmit an output pulse (or "fire" or "spike") when inputs received through neuron input 2204 exceed a threshold. In at least one embodiment, neurons 2202 may sum or integrate signals received at neuron inputs 2204. For example, in at least one embodiment, neurons 2202 may be implemented as leaky integrate-and-fire neurons, wherein if a sum (referred to as a "membrane potential") exceeds a threshold value, neuron 2202 may generate an output (or "fire") using a transfer function such as a sigmoid or threshold function. In at least one embodiment, a leaky integrate-and-fire neuron may sum signals received at neuron inputs 2204 into a membrane potential and may also apply a decay factor (or leak) to reduce a membrane potential. In at least one embodiment, a leaky integrate-and-fire neuron may fire if multiple input signals are received at neuron inputs 2204 rapidly enough to exceed a threshold value (i.e., before a membrane potential decays too low to fire). In at least one embodiment, neurons 2202 may be implemented using circuits or logic that receive inputs, integrate inputs into a membrane potential, and decay a membrane potential. In at least one embodiment, inputs may be averaged, or any other suitable transfer function may be used. Furthermore, in at least one embodiment, neurons 2202 may include, without limitation, comparator circuits or logic that generate an output spike at neuron output 2206 when result of applying a transfer function to neuron input 2204 exceeds a threshold. In at least one embodiment, once neuron 2202 fires, it may disregard previously received input information by, for example, resetting a membrane potential to 0 or another suitable default value. In at least one embodiment, once membrane potential is reset to 0, neuron 2202 may resume normal operation after a suitable period of time (or refractory period).

In at least one embodiment, neurons 2202 may be interconnected through synapses 2208. In at least one embodiment, synapses 2208 may operate to transmit signals from an output of a first neuron 2202 to an input of a second neuron 2202. In at least one embodiment, neurons 2202 may transmit information over more than one instance of synapse 2208. In at least one embodiment, one or more instances of neuron output 2206 may be connected, via an instance of synapse 2208, to an instance of neuron input 2204 in same neuron 2202. In at least one embodiment, an instance of neuron 2202 generating an output to be transmitted over an instance of synapse 2208 may be referred to as a "pre-synaptic neuron" with respect to that instance of synapse 2208. In at least one embodiment, an instance of neuron 2202 receiving an input transmitted over an instance of synapse 2208 may be referred to as a "post-synaptic neuron" with respect to that instance of synapse 2208. Because an instance of neuron 2202 may receive inputs from one or more instances of synapse 2208, and may also transmit outputs over one or more instances of synapse 2208, a single instance of neuron 2202 may therefore be both a "pre-synaptic neuron" and "post-synaptic neuron," with respect to various instances of synapses 2208, in at least one embodiment.

In at least one embodiment, neurons 2202 may be organized into one or more layers. Each instance of neuron 2202 may have one neuron output 2206 that may fan out through one or more synapses 2208 to one or more neuron inputs 2204. In at least one embodiment, neuron outputs 2206 of neurons 2202 in a first layer 2210 may be connected to neuron inputs 2204 of neurons 2202 in a second layer 2212. In at least one embodiment, layer 2210 may be referred to as a "feed-forward layer." In at least one embodiment, each instance of neuron 2202 in an instance of first layer 2210 may fan out to each instance of neuron 2202 in second layer 2212. In at least one embodiment, first layer 2210 may be referred to as a "fully connected feed-forward layer." In at least one embodiment, each instance of neuron 2202 in an instance of second layer 2212 may fan out to fewer than all instances of neuron 2202 in a third layer 2214. In at least one embodiment, second layer 2212 may be referred to as a "sparsely connected feed-forward layer." In at least one embodiment, neurons 2202 in second layer 2212 may fan out to neurons 2202 in multiple other layers, including to neurons 2202 in (same) second layer 2212. In at least one embodiment, second layer 2212 may be referred to as a "recurrent layer." neuromorphic processor 2200 may include, without limitation, any suitable combination of recurrent layers and feed-forward layers, including, without limitation, both sparsely connected feed-forward layers and fully connected feed-forward layers.

In at least one embodiment, neuromorphic processor 2200 may include, without limitation, a reconfigurable interconnect architecture or dedicated hard wired interconnects to connect synapse 2208 to neurons 2202. In at least one embodiment, neuromorphic processor 2200 may include, without limitation, circuitry or logic that allows synapses to be allocated to different neurons 2202 as needed based on neural network topology and neuron fan-in/out. For example, in at least one embodiment, synapses 2208 may be connected to neurons 2202 using an interconnect fabric, such as network-on-chip, or with dedicated connections. In at least one embodiment, synapse interconnections and components thereof may be implemented using circuitry or logic.

In at least one embodiment, neuromorphic processor 2200 implements neural networks 20 and 30 of FIG. 1, so as to identify objects such as vehicles as described herein. In at least one embodiment, vehicle identification is performed reidentify vehicles that have passed from one camera to another. In at least one embodiment, vehicle identification is performed by determining vehicle identity such as make and model, as well as vehicle color and type. In at least one embodiment, neural networks 20 and 30 are trained according to a loss function of errors in identity classification. In at least one embodiment, neural networks 20 and 30 are trained according to a loss function of errors in identity and/or color and/or type classifications.

Figure 23:
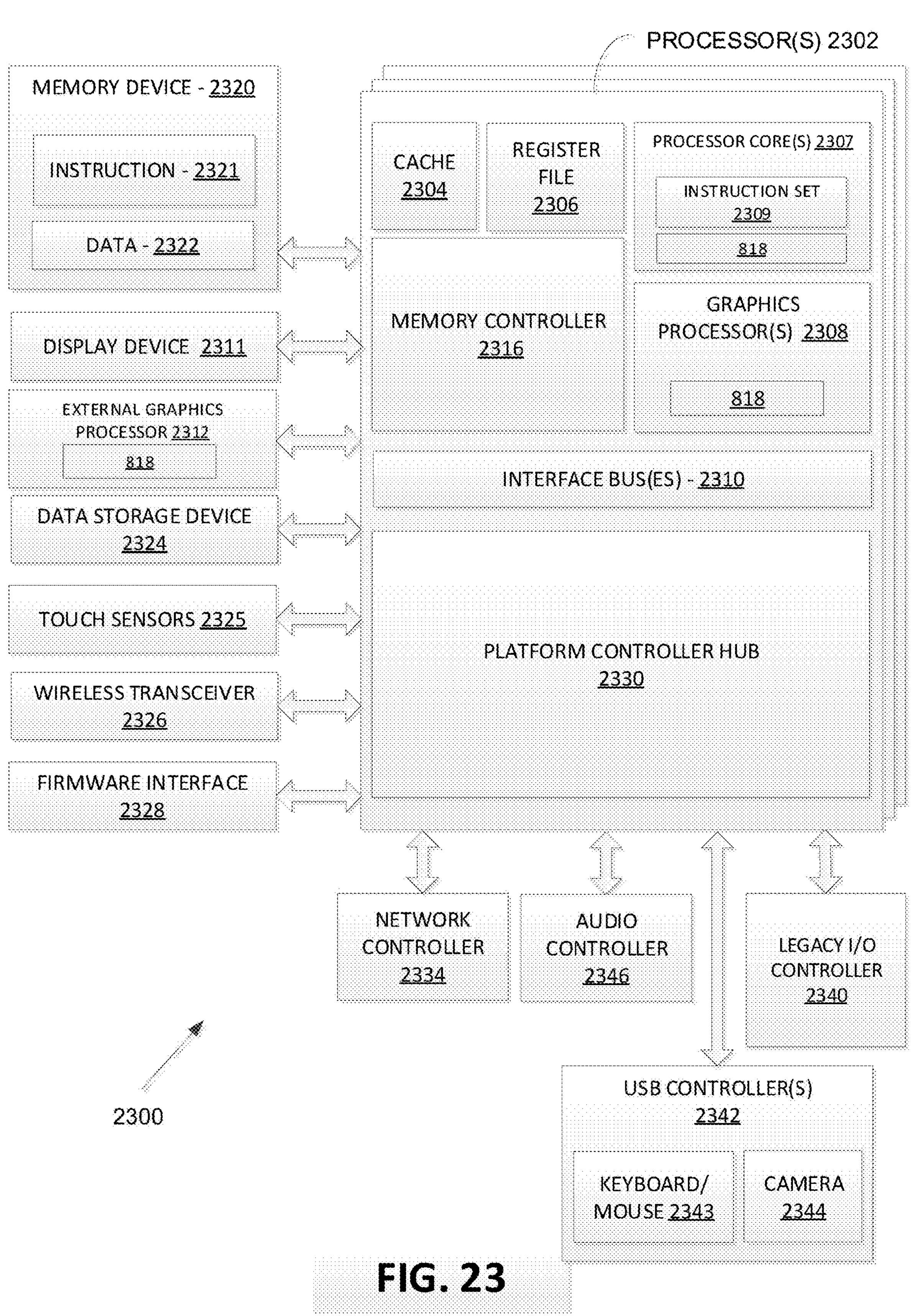
FIGS. 23 and 24 illustrate at least portions of a graphics processor, according to one or more embodiments.

FIG. 23 is a block diagram of a graphics processor 2300, which may be a discrete graphics processing unit, or may be a graphics processor integrated with a plurality of processing cores. In at least one embodiment, graphics processor 2300 communicates via a memory mapped I/O interface to registers on graphics processor 2300 and with commands placed into memory. In at least one embodiment, graphics processor 2300 includes a memory interface 2314 to access memory. In at least one embodiment, memory interface 2314 is an interface to local memory, one or more internal caches, one or more shared external caches, and/or to system memory.

In at least one embodiment, graphics processor 2300 also includes a display controller 2302 to drive display output data to a display device 2320. In at least one embodiment, display controller 2302 includes hardware for one or more overlay planes for display device 2320 and composition of multiple layers of video or user interface elements. In at least one embodiment, display device 2320 can be an internal or external display device. In at least one embodiment, display device 2320 is a head mounted display device, such as a virtual reality (VR) display device or an augmented reality (AR) display device. In at least one embodiment, graphics processor 2300 includes a video codec engine 2306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as Society of Motion Picture & Television Engineers (SMPTE) 821M/VC-1, and Joint Photographic Experts Group (JPEG) formats such as JPEG, and Motion JPEG (MJPEG) formats.

In at least one embodiment, graphics processor 2300 includes a block image transfer (BLIT) engine 2304 to perform two-dimensional (2D) rasterizer operations including, for example, bit-boundary block transfers. However, in at least one embodiment, 2D graphics operations are performed using one or more components of graphics processing engine (GPE) 2310. In at least one embodiment, GPE 2310 is a compute engine for performing graphics operations, including three-dimensional (3D) graphics operations and media operations.

In at least one embodiment, GPE 2310 includes a 3D pipeline 2312 for performing 3D operations, such as rendering three-dimensional images and scenes using processing functions that act upon 3D primitive shapes (for example, rectangle, triangle, etc.). 3D pipeline 2312 includes programmable and fixed function elements that perform various tasks and/or spawn execution threads to a 3D/Media sub-system 2315. While 3D pipeline 2312 can be used to perform media operations, in at least one embodiment, GPE 2310 also includes a media pipeline 2316 that is used to perform media operations, such as video post-processing and image enhancement.

In at least one embodiment, media pipeline 2316 includes fixed function or programmable logic units to perform one or more specialized media operations, such as video decode acceleration, video de-interlacing, and video encode acceleration in place of, or on behalf of video codec engine 2306. In at least one embodiment, media pipeline 2316 additionally includes a thread spawning unit to spawn threads for execution on 3D/Media sub-system 2315. In at least one embodiment, spawned threads perform computations for media operations on one or more graphics execution units included in 3D/Media sub-system 2315.

In at least one embodiment, 3D/Media subsystem 2315 includes logic for executing threads spawned by 3D pipeline 2312 and media pipeline 2316. In at least one embodiment, 3D pipeline 2312 and media pipeline 2316 send thread execution requests to 3D/Media subsystem 2315, which includes thread dispatch logic for arbitrating and dispatching various requests to available thread execution resources. In at least one embodiment, execution resources include an array of graphics execution units to process 3D and media threads. In at least one embodiment, 3D/Media subsystem 2315 includes one or more internal caches for thread instructions and data. In at least one embodiment, subsystem 2315 also includes shared memory, including registers and addressable memory, to share data between threads and to store output data.

Inference and/or training logic 818 are used to perform inferencing and/or training operations associated with any one or more embodiments. Details regarding inference and/or training logic 818 are provided herein in conjunction with FIGS. 15A and/or 15B. In at least one embodiment portions or all of inference and/or training logic 818 may be incorporated into graphics processor 2300. For example, in at least one embodiment, training and/or inferencing techniques described herein may use one or more of ALUs embodied in 3D pipeline 2312. Moreover, in at least one embodiment, inferencing and/or training operations described herein may be done using logic other than logic illustrated in FIG. 15A or 15B. In at least one embodiment, weight parameters may be stored in on-chip or off-chip memory and/or registers (shown or not shown) that configure ALUs of graphics processor 2300 to perform one or more machine learning algorithms, neural network architectures, use cases, or training techniques described herein.

In at least one embodiment, inferencing logic 818 implements neural networks 20 and 30 of FIG. 1, so as to identify objects such as vehicles as described herein. In at least one embodiment, vehicle identification is performed reidentify vehicles that have passed from one camera to another. In at least one embodiment, vehicle identification is performed by determining vehicle identity such as make and model, as well as vehicle color and type. In at least one embodiment, neural networks 20 and 30 are trained according to a loss function of errors in identity classification. In at least one embodiment, neural networks 20 and 30 are trained according to a loss function of errors in identity and/or color and/or type classifications.

Figure 24:
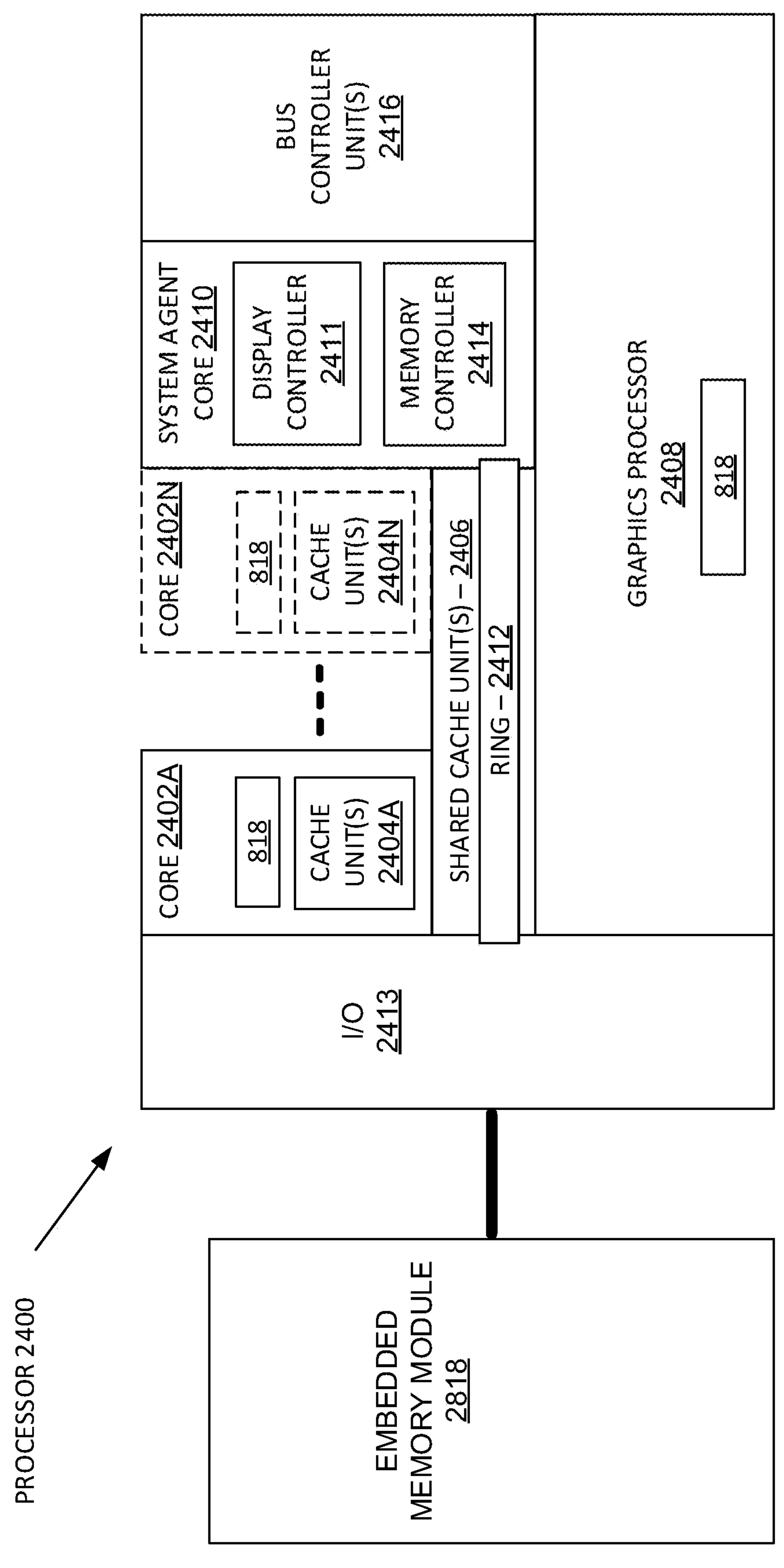

FIG. 24 is a block diagram of a graphics processing engine 2410 of a graphics processor in accordance with at least one embodiment. In at least one embodiment, graphics processing engine (GPE) 2410 is a version of GPE 2310 shown in FIG. 23. In at least one embodiment, media pipeline 2316 is optional and may not be explicitly included within GPE 2410. In at least one embodiment, a separate media and/or image processor is coupled to GPE 2410.

In at least one embodiment, GPE 2410 is coupled to or includes a command streamer 2403, which provides a command stream to 3D pipeline 2312 and/or media pipelines 2316. In at least one embodiment, command streamer 2403 is coupled to memory, which can be system memory, or one or more of internal cache memory and shared cache memory. In at least one embodiment, command streamer 2403 receives commands from memory and sends commands to 3D pipeline 2312 and/or media pipeline 2316. In at least one embodiment, commands are instructions, primitives, or micro-operations fetched from a ring buffer, which stores commands for 3D pipeline 2312 and media pipeline 2316. In at least one embodiment, a ring buffer can additionally include batch command buffers storing batches of multiple commands. In at least one embodiment, commands for 3D pipeline 2312 can also include references to data stored in memory, such as but not limited to vertex and geometry data for 3D pipeline 2312 and/or image data and memory objects for media pipeline 2316. In at least one embodiment, 3D pipeline 2312 and media pipeline 2316 process commands and data by performing operations or by dispatching one or more execution threads to a graphics core array 2414. In at least one embodiment graphics core array 2414 includes one or more blocks of graphics cores (for example, graphics core(s) 2415A, graphics core(s) 2415B), each block including one or more graphics cores. In at least one embodiment, each graphics core includes a set of graphics execution resources that includes general-purpose and graphics specific execution logic to perform graphics and compute operations, as well as fixed function texture processing and/or machine learning and artificial intelligence acceleration logic, including inference and/or training logic 818 in FIG. 15A and FIG. 15B.

In at least one embodiment, 3D pipeline 2312 includes fixed function and programmable logic to process one or more shader programs, such as vertex shaders, geometry shaders, pixel shaders, fragment shaders, compute shaders, or other shader programs, by processing instructions and dispatching execution threads to graphics core array 2414. In at least one embodiment, graphics core array 2414 provides a unified block of execution resources for use in processing shader programs. In at least one embodiment, multi-purpose execution logic (for example, execution units) within graphics core(s) 2415A-2015B of graphic core array 2414 includes support for various 3D API shader languages and can execute multiple simultaneous execution threads associated with multiple shaders.

In at least one embodiment, graphics core array 2414 also includes execution logic to perform media functions, such as video and/or image processing. In at least one embodiment, execution units additionally include general-purpose logic that is programmable to perform parallel general-purpose computational operations, in addition to graphics processing operations.

In at least one embodiment, output data generated by threads executing on graphics core array 2414 can output data to memory in a unified return buffer (URB) 2418. URB 2418 can store data for multiple threads. In at least one embodiment, URB 2418 may be used to send data between different threads executing on graphics core array 2414. In at least one embodiment, URB 2418 may additionally be used for synchronization between threads on graphics core array 2414 and fixed function logic within shared function logic 2420.

In at least one embodiment, graphics core array 2414 is scalable, such that graphics core array 2414 includes a variable number of graphics cores, each having a variable number of execution units based on a target power and performance level of GPE 2410. In at least one embodiment, execution resources are dynamically scalable, such that execution resources may be enabled or disabled as needed.

In at least one embodiment, graphics core array 2414 is coupled to shared function logic 2420 that includes multiple resources that are shared between graphics cores in graphics core array 2414. In at least one embodiment, shared functions performed by shared function logic 2420 are embodied in hardware logic units that provide specialized supplemental functionality to graphics core array 2414. In at least one embodiment, shared function logic 2420 includes but is not limited to sampler 2421, math 2422, and inter-thread communication (ITC) 2423 logic. In at least one embodiment, one or more cache(s) 2425 are in included in or couple to shared function logic 2420.

In at least one embodiment, a shared function is used if demand for a specialized function is insufficient for inclusion within graphics core array 2414. In at least one embodiment, a single instantiation of a specialized function is used in shared function logic 2420 and shared among other execution resources within graphics core array 2414. In at least one embodiment, specific shared functions within shared function logic 2420 that are used extensively by graphics core array 2414 may be included within shared function logic 2416 within graphics core array 2414. In at least one embodiment, shared function logic 2416 within graphics core array 2414 can include some or all logic within shared function logic 2420. In at least one embodiment, all logic elements within shared function logic 2420 may be duplicated within shared function logic 2416 of graphics core array 2414. In at least one embodiment, shared function logic 2420 is excluded in favor of shared function logic 2416 within graphics core array 2414.

Inference and/or training logic 818 are used to perform inferencing and/or training operations associated with any one or more embodiments. Details regarding inference and/or training logic 818 are provided herein in conjunction with FIGS. 15A and/or 15B. In at least one embodiment portions or all of inference and/or training logic 818 may be incorporated into graphics processor 2410. For example, in at least one embodiment, training and/or inferencing techniques described herein may use one or more of ALUs embodied in 3D pipeline 2312, graphics core(s) 2415A, shared function logic 2416, graphics core(s) 2415B, shared function logic 2420, or other logic in FIG. 24. Moreover, in at least one embodiment, inferencing and/or training operations described herein may be done using logic other than logic illustrated in FIG. 15A or 15B. In at least one embodiment, weight parameters may be stored in on-chip or off-chip memory and/or registers (shown or not shown) that configure ALUs of graphics processor 2410 to perform one or more machine learning algorithms, neural network architectures, use cases, or training techniques described herein.

In at least one embodiment, inferencing logic 818 implements neural networks 20 and 30 of FIG. 1, so as to identify objects such as vehicles as described herein. In at least one embodiment, vehicle identification is performed reidentify vehicles that have passed from one camera to another. In at least one embodiment, vehicle identification is performed by determining vehicle identity such as make and model, as well as vehicle color and type. In at least one embodiment, neural networks 20 and 30 are trained according to a loss function of errors in identity classification. In at least one embodiment, neural networks 20 and 30 are trained according to a loss function of errors in identity and/or color and/or type classifications.

Figure 25:
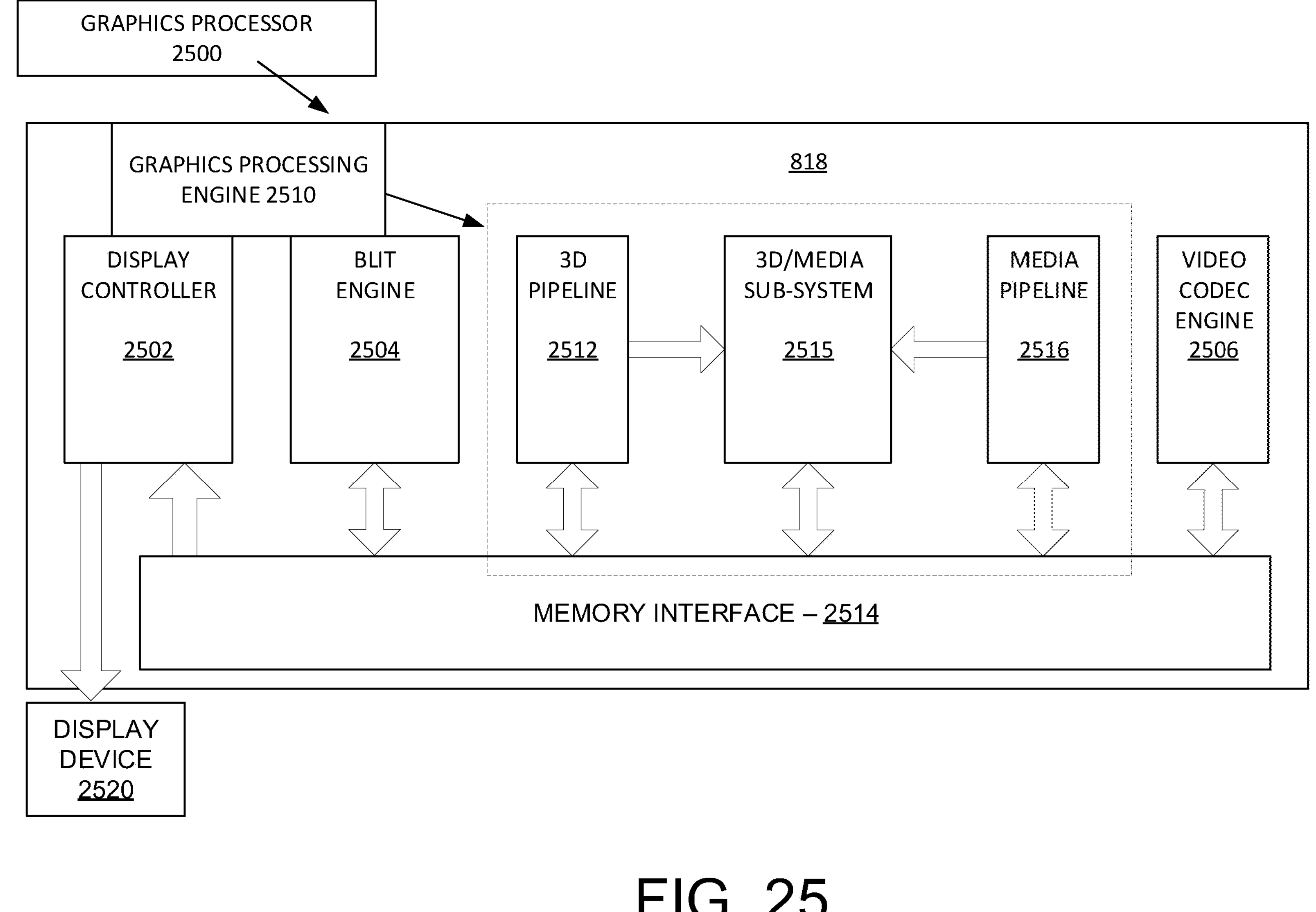
FIG. 25 is a block diagram of at least portions of a graphics processor core, according to at least one embodiment.

FIG. 25 is a block diagram of hardware logic of a graphics processor core 2500, according to at least one embodiment described herein. In at least one embodiment, graphics processor core 2500 is included within a graphics core array. In at least one embodiment, graphics processor core 2500, sometimes referred to as a core slice, can be one or multiple graphics cores within a modular graphics processor. In at least one embodiment, graphics processor core 2500 is exemplary of one graphics core slice, and a graphics processor as described herein may include multiple graphics core slices based on target power and performance envelopes. In at least one embodiment, each graphics core 2500 can include a fixed function block 2530 coupled with multiple sub-cores 2501A-2101F, also referred to as sub-slices, that include modular blocks of general-purpose and fixed function logic.

In at least one embodiment, fixed function block 2530 includes a geometry/fixed function pipeline 2536 that can be shared by all sub-cores in graphics processor 2500, for example, in lower performance and/or lower power graphics processor implementations. In at least one embodiment, geometry/fixed function pipeline 2536 includes a 3D fixed function pipeline, a video front-end unit, a thread spawner and thread dispatcher, and a unified return buffer manager, which manages unified return buffers.

In at least one embodiment fixed function block 2530 also includes a graphics SoC interface 2537, a graphics microcontroller 2538, and a media pipeline 2539. Graphics SoC interface 2537 provides an interface between graphics core 2500 and other processor cores within a system on a chip integrated circuit. In at least one embodiment, graphics microcontroller 2538 is a programmable sub-processor that is configurable to manage various functions of graphics processor 2500, including thread dispatch, scheduling, and pre-emption. In at least one embodiment, media pipeline 2539 includes logic to facilitate decoding, encoding, preprocessing, and/or post-processing of multimedia data, including image and video data. In at least one embodiment, media pipeline 2539 implement media operations via requests to compute or sampling logic within sub-cores 2501-2101F.

In at least one embodiment, SoC interface 2537 enables graphics core 2500 to communicate with general-purpose application processor cores (for example, CPUs) and/or other components within an SoC, including memory hierarchy elements such as a shared last level cache memory, system RAM, and/or embedded on-chip or on-package DRAM. In at least one embodiment, SoC interface 2537 can also enable communication with fixed function devices within an SoC, such as camera imaging pipelines, and enables use of and/or implements global memory atomics that may be shared between graphics core 2500 and CPUs within an SoC. In at least one embodiment, SoC interface 2537 can also implement power management controls for graphics core 2500 and enable an interface between a clock domain of graphic core 2500 and other clock domains within an SoC. In at least one embodiment, SoC interface 2537 enables receipt of command buffers from a command streamer and global thread dispatcher that are configured to provide commands and instructions to each of one or more graphics cores within a graphics processor. In at least one embodiment, commands and instructions can be dispatched to media pipeline 2539, when media operations are to be performed, or a geometry and fixed function pipeline (for example, geometry and fixed function pipeline 2536, geometry and fixed function pipeline 2514) when graphics processing operations are to be performed.

In at least one embodiment, graphics microcontroller 2538 can be configured to perform various scheduling and management tasks for graphics core 2500. In at least one embodiment, graphics microcontroller 2538 can perform graphics and/or compute workload scheduling on various graphics parallel engines within execution unit (EU) arrays 2502A-2102F, 2504A-2104F within sub-cores 2501A-2101F. In at least one embodiment, host software executing on a CPU core of an SoC including graphics core 2500 can submit workloads one of multiple graphic processor doorbells, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 2538 can also facilitate low-power or idle states for graphics core 2500, providing graphics core 2500 with an ability to save and restore registers within graphics core 2500 across low-power state transitions independently from an operating system and/or graphics driver software on a system.

In at least one embodiment, graphics core 2500 may have greater than or fewer than illustrated sub-cores 2501A-2101F, up to N modular sub-cores. For each set of N sub-cores, in at least one embodiment, graphics core 2500 can also include shared function logic 2510, shared and/or cache memory 2512, a geometry/fixed function pipeline 2514, as well as additional fixed function logic 2516 to accelerate various graphics and compute processing operations. In at least one embodiment, shared function logic 2510 can include logic units (for example, sampler, math, and/or inter-thread communication logic) that can be shared by each N sub-cores within graphics core 2500. Shared and/or cache memory 2512 can be a last-level cache for N sub-cores 2501A-2101F within graphics core 2500 and can also serve as shared memory that is accessible by multiple sub-cores. In at least one embodiment, geometry/fixed function pipeline 2514 can be included instead of geometry/fixed function pipeline 2536 within fixed function block 2530 and can include same or similar logic units.

In at least one embodiment, graphics core 2500 includes additional fixed function logic 2516 that can include various fixed function acceleration logic for use by graphics core 2500. In at least one embodiment, additional fixed function logic 2516 includes an additional geometry pipeline for use in position only shading. In position-only shading, at least two geometry pipelines exist, whereas in a full geometry pipeline within geometry/fixed function pipeline 2516, 2536, and a cull pipeline, which is an additional geometry pipeline which may be included within additional fixed function logic 2516. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 2516 can execute position shaders in parallel with a main application and generally generates critical results faster than a full pipeline, as cull pipeline fetches and shades position attribute of vertices, without performing rasterization and rendering of pixels to a frame buffer. In at least one embodiment, cull pipeline can use generated critical results to compute visibility information for all triangles without regard to whether those triangles are culled. In at least one embodiment, full pipeline (which in this instance may be referred to as a replay pipeline) can consume visibility information to skip culled triangles to shade only visible triangles that are finally passed to a rasterization phase.

In at least one embodiment, additional fixed function logic 2516 can also include machine-learning acceleration logic, such as fixed function matrix multiplication logic, for implementations including optimizations for machine learning training or inferencing.

In at least one embodiment, within each graphics sub-core 2501A-2101F includes a set of execution resources that may be used to perform graphics, media, and compute operations in response to requests by graphics pipeline, media pipeline, or shader programs. In at least one embodiment, graphics sub-cores 2501A-2101F include multiple EU arrays 2502A-2102F, 2504A-2104F, thread dispatch and inter-thread communication (TD/IC) logic 2503A-2103F, a 3D (for example, texture) sampler 2505A-2105F, a media sampler 2506A-2106F, a shader processor 2507A-2107F, and shared local memory (SLM) 2508A-2108F. EU arrays 2502A-2102F, 2504A-2104F each include multiple execution units, which are general-purpose graphics processing units capable of performing floating-point and integer/fixed-point logic operations in service of a graphics, media, or compute operation, including graphics, media, or compute shader programs. In at least one embodiment, TD/IC logic 2503A-2103F performs local thread dispatch and thread control operations for execution units within a sub-core and facilitate communication between threads executing on execution units of a sub-core. In at least one embodiment, 3D sampler 2505A-2105F can read texture or other 3D graphics related data into memory. In at least one embodiment, 3D sampler can read texture data differently based on a configured sample state and texture format associated with a given texture. In at least one embodiment, media sampler 2506A-2106F can perform similar read operations based on a type and format associated with media data. In at least one embodiment, each graphics sub-core 2501A-2101F can alternately include a unified 3D and media sampler. In at least one embodiment, threads executing on execution units within each of sub-cores 2501A-2101F can make use of shared local memory 2508A-2108F within each sub-core, to enable threads executing within a thread group to execute using a common pool of on-chip memory.

Inference and/or training logic 818 are used to perform inferencing and/or training operations associated with any one or more embodiments. Details regarding inference and/or training logic 818 are provided herein in conjunction with FIGS. 15A and/or 15B. In at least one embodiment, portions or all of inference and/or training logic 818 may be incorporated into graphics processor 2510. For example, in at least one embodiment, training and/or inferencing techniques described herein may use one or more of ALUs embodied in 3D pipeline 2510, graphics microcontroller 2538, geometry & fixed function pipeline 2514 and 2536, or other logic in FIG. 24. Moreover, in at least one embodiment, inferencing and/or training operations described herein may be done using logic other than logic illustrated in FIG. 15A or 15B. In at least one embodiment, weight parameters may be stored in on-chip or off-chip memory and/or registers (shown or not shown) that configure ALUs of graphics processor 2500 to perform one or more machine learning algorithms, neural network architectures, use cases, or training techniques described herein.

In at least one embodiment, inferencing logic 818 implements neural networks 20 and 30 of FIG. 1, so as to identify objects such as vehicles as described herein. In at least one embodiment, vehicle identification is performed reidentify vehicles that have passed from one camera to another. In at least one embodiment, vehicle identification is performed by determining vehicle identity such as make and model, as well as vehicle color and type. In at least one embodiment, neural networks 20 and 30 are trained according to a loss function of errors in identity classification. In at least one embodiment, neural networks 20 and 30 are trained according to a loss function of errors in identity and/or color and/or type classifications.

Figure 26A:
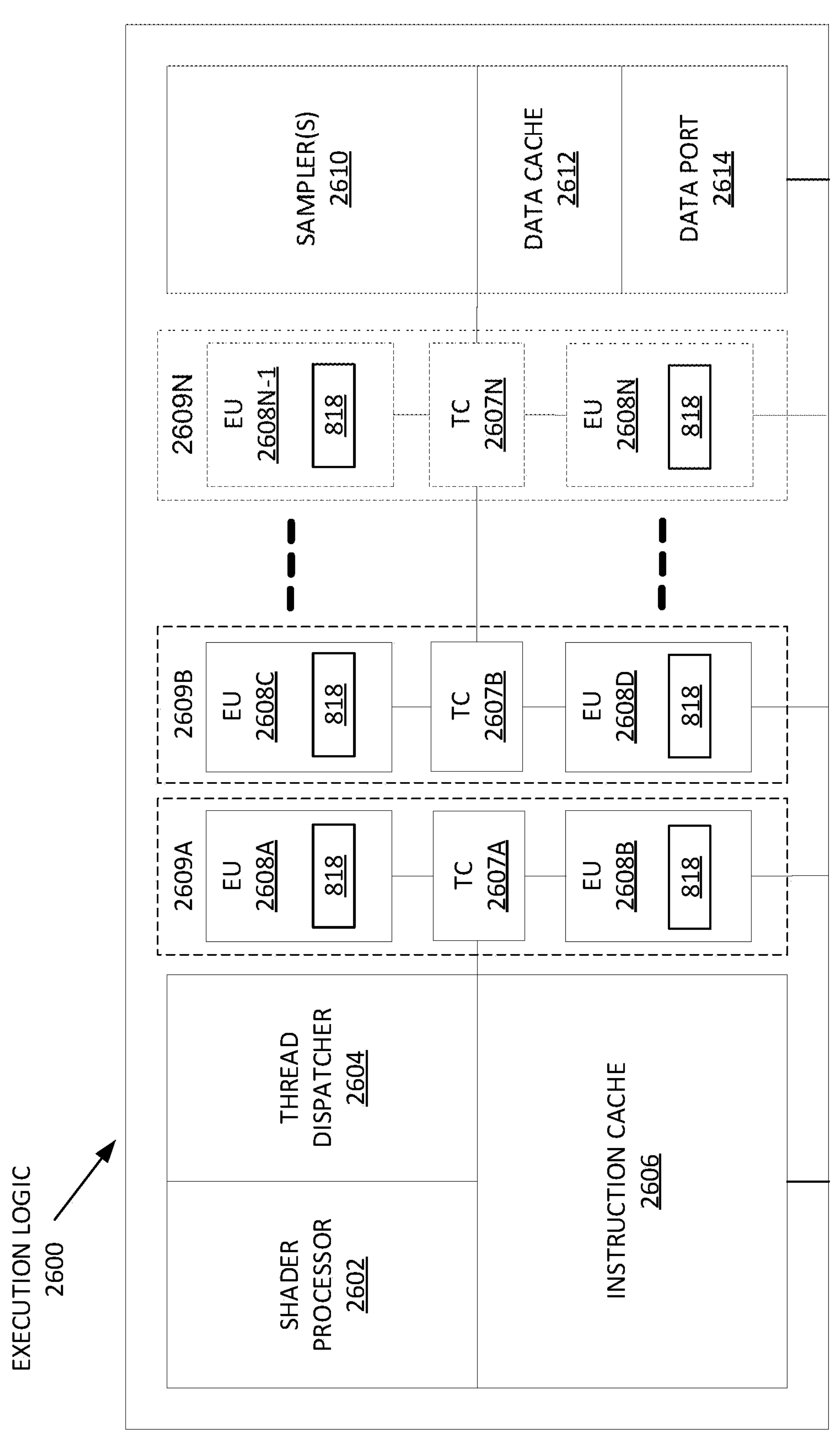
FIGS. 26A and 26B illustrate thread execution logic, according to at least one embodiment.
Figure 26B:
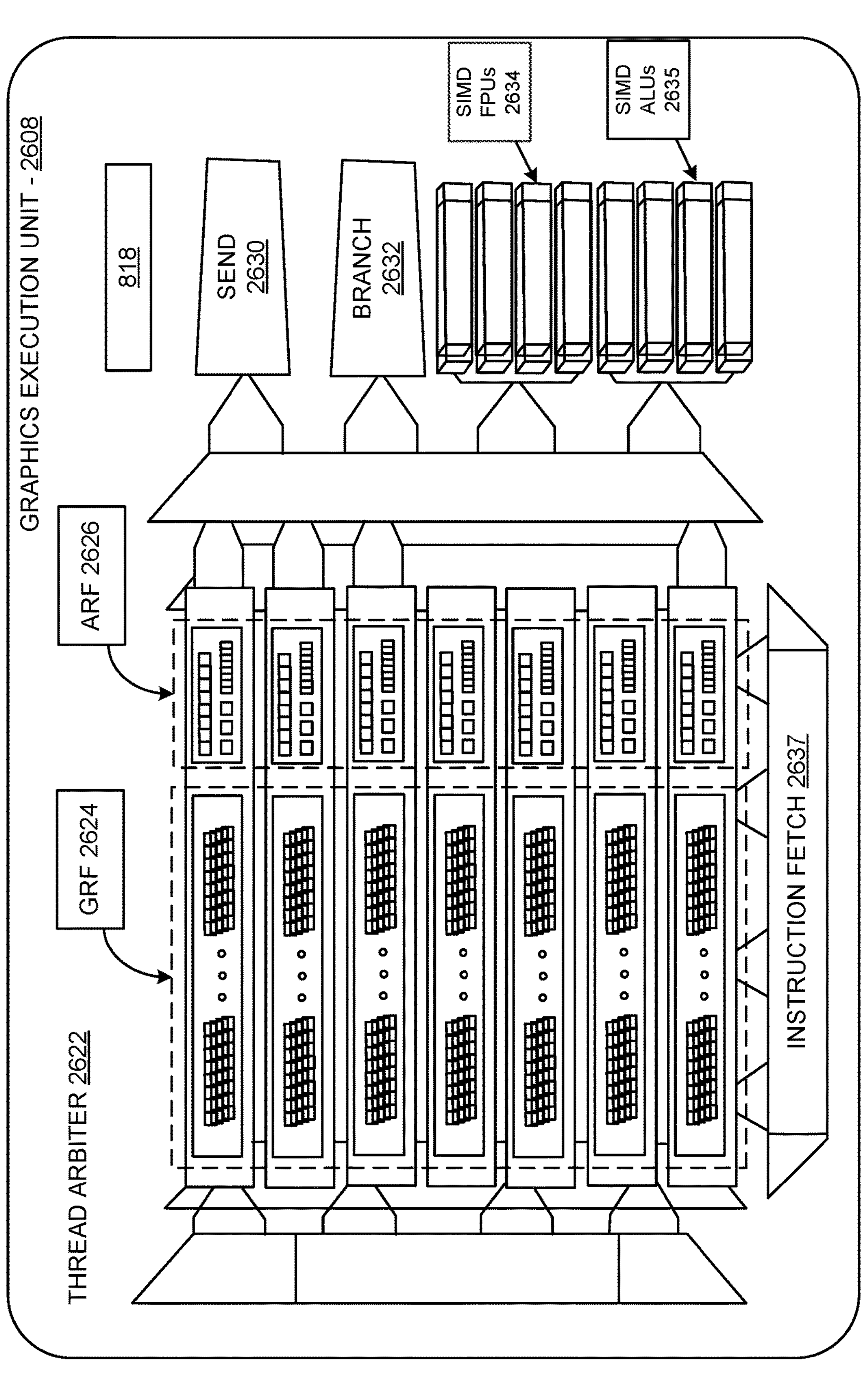

FIGS. 26A-26B illustrate thread execution logic 2600 including an array of processing elements of a graphics processor core according to at least one embodiment. FIG. 26A illustrates at least one embodiment, in which thread execution logic 2600 is used. FIG. 26B illustrates exemplary internal details of an execution unit, according to at least one embodiment.

As illustrated in FIG. 26A, in at least one embodiment, thread execution logic 2600 includes a shader processor 2602, a thread dispatcher 2604, instruction cache 2606, a scalable execution unit array including a plurality of execution units 2608A-2208N, a sampler 2610, a data cache 2612, and a data port 2614. In at least one embodiment a scalable execution unit array can dynamically scale by enabling or disabling one or more execution units (for example, any of execution unit 2608A, 2608B, 2608C, 2608D, through 2608N−1 and 2608N) based on computational requirements of a workload, for example. In at least one embodiment, scalable execution units are interconnected via an interconnect fabric that links to each of execution unit. In at least one embodiment, thread execution logic 2600 includes one or more connections to memory, such as system memory or cache memory, through one or more of instruction cache 2606, data port 2614, sampler 2610, and execution units 2608A-2208N. In at least one embodiment, each execution unit (for example 2608A) is a stand-alone programmable general-purpose computational unit that is capable of executing multiple simultaneous hardware threads while processing multiple data elements in parallel for each thread. In at least one embodiment, array of execution units 2608A-2208N is scalable to include any number individual execution units.

In at least one embodiment, execution units 2608A-2208N are primarily used to execute shader programs. In at least one embodiment, shader processor 2602 can process various shader programs and dispatch execution threads associated with shader programs via a thread dispatcher 2604. In at least one embodiment, thread dispatcher 2604 includes logic to arbitrate thread initiation requests from graphics and media pipelines and instantiate requested threads on one or more execution units in execution units 2608A-2208N. For example, in at least one embodiment, a geometry pipeline can dispatch vertex, tessellation, or geometry shaders to thread execution logic for processing. In at least one embodiment, thread dispatcher 2604 can also process runtime thread spawning requests from executing shader programs.

In at least one embodiment, execution units 2608A-2208N support an instruction set that includes native support for many standard 3D graphics shader instructions, such that shader programs from graphics libraries (for example, Direct 3D and OpenGL) are executed with a minimal translation. In at least one embodiment, execution units support vertex and geometry processing (for example, vertex programs, geometry programs, vertex shaders), pixel processing (for example, pixel shaders, fragment shaders) and general-purpose processing (for example, compute and media shaders). In at least one embodiment, each of execution units 2608A-2208N, which include one or more arithmetic logic units (ALUs), is capable of multi-issue single instruction multiple data (SIMD) execution and multi-threaded operation enables an efficient execution environment despite higher latency memory accesses. In at least one embodiment, each hardware thread within each execution unit has a dedicated high-bandwidth register file and associated independent thread-state. In at least one embodiment, execution is multi-issue per clock to pipelines capable of integer, single and double precision floating point operations, SIMD branch capability, logical operations, transcendental operations, and other miscellaneous operations. In at least one embodiment, while waiting for data from memory or one of shared functions, dependency logic within execution units 2608A-2208N causes a waiting thread to sleep until requested data has been returned. In at least one embodiment, while a waiting thread is sleeping, hardware resources may be devoted to processing other threads. For example, in at least one embodiment, during a delay associated with a vertex shader operation, an execution unit can perform operations for a pixel shader, fragment shader, or another type of shader program, including a different vertex shader.

In at least one embodiment, each execution unit in execution units 2608A-2208N operates on arrays of data elements. In at least one embodiment, a number of data elements is "execution size," or number of channels for an instruction. In at least one embodiment, an execution channel is a logical unit of execution for data element access, masking, and flow control within instructions. In at least one embodiment, a number of channels may be independent of a number of physical Arithmetic Logic Units (ALUs) or Floating Point Units (FPUs) for a particular graphics processor. In at least one embodiment, execution units 2608A-2208N support integer and floating-point data types.

In at least one embodiment, an execution unit instruction set includes SIMD instructions. In at least one embodiment, various data elements can be stored as a packed data type in a register and execution unit will process various elements based on data size of elements. For example, in at least one embodiment, when operating on a 296-bit wide vector, 296 bits of a vector are stored in a register and an execution unit operates on a vector as four separate 104-bit packed data elements (Quad-Word (QW) size data elements), eight separate 32-bit packed data elements (Double Word (DW) size data elements), sixteen separate 20-bit packed data elements (Word (W) size data elements), or thirty-two separate 12-bit data elements (byte (B) size data elements). However, in at least one embodiment, different vector widths and register sizes are possible.

In at least one embodiment, one or more execution units can be combined into a fused execution unit 2609A-2209N having thread control logic (2207A-2207N) that is common to fused EUs. In at least one embodiment, multiple EUs can be fused into an EU group. In at least one embodiment, each EU in fused EU group can be configured to execute a separate SIMD hardware thread. The number of EUs in a fused EU group can vary according to various embodiments. In at least one embodiment, various SIMD widths can be performed per-EU, including but not limited to SIMD8, SIMD16, and SIMD32. In at least one embodiment, each fused graphics execution unit 2609A-2209N includes at least two execution units. For example, in at least one embodiment, fused execution unit 2609A includes a first EU 2608A, second EU 2608B, and thread control logic 2607A that is common to first EU 2608A and second EU 2608B. In at least one embodiment, thread control logic 2607A controls threads executed on fused graphics execution unit 2609A, allowing each EU within fused execution units 2609A-2209N to execute using a common instruction pointer register.

In at least one embodiment, one or more internal instruction caches (for example, 2606) are included in thread execution logic 2600 to cache thread instructions for execution units. In at least one embodiment, one or more data caches (for example, 2612) are included to cache thread data during thread execution. In at least one embodiment, a sampler 2610 is included to provide texture sampling for 3D operations and media sampling for media operations. In at least one embodiment, sampler 2610 includes specialized texture or media sampling functionality to process texture or media data during sampling process before providing sampled data to an execution unit.

During execution, in at least one embodiment, graphics and media pipelines send thread initiation requests to thread execution logic 2600 via thread spawning and dispatch logic. In at least one embodiment, once a group of geometric objects has been processed and rasterized into pixel data, pixel processor logic (for example, pixel shader logic, fragment shader logic, etc.) within shader processor 2602 is invoked to further compute output information and cause results to be written to output surfaces (for example, color buffers, depth buffers, stencil buffers, etc.). In at least one embodiment, a pixel shader or fragment shader calculates values of various vertex attributes that are to be interpolated across a rasterized object. In at least one embodiment, pixel processor logic within shader processor 2602 then executes an application programming interface (API)-supplied pixel or fragment shader program. In at least one embodiment, to execute a shader program, shader processor 2602 dispatches threads to an execution unit (for example, 2608A) via thread dispatcher 2604. In at least one embodiment, shader processor 2602 uses texture sampling logic in sampler 2610 to access texture data in texture maps stored in memory. In at least one embodiment, arithmetic operations on texture data and input geometry data compute pixel color data for each geometric fragment, or discards one or more pixels from further processing.

In at least one embodiment, data port 2614 provides a memory access mechanism for thread execution logic 2600 to output processed data to memory for further processing on a graphics processor output pipeline. In at least one embodiment, data port 2614 includes or couples to one or more cache memories (for example, data cache 2612) to cache data for memory access via a data port.

As illustrated in FIG. 26B, in at least one embodiment, a graphics execution unit 2608 can include an instruction fetch unit 2637, a general register file array (GRF) 2624, an architectural register file array (ARF) 2626, a thread arbiter 2622, a send unit 2630, a branch unit 2632, a set of SIMD floating point units (FPUs) 2634, and In at least one embodiment a set of dedicated integer SIMD ALUs 2635. In at least one embodiment, GRF 2624 and ARF 2626 includes a set of general register files and architecture register files associated with each simultaneous hardware thread that may be active in graphics execution unit 2608. In at least one embodiment, per thread architectural state is maintained in ARF 2626, while data used during thread execution is stored in GRF 2624. In at least one embodiment, execution state of each thread, including instruction pointers for each thread, can be held in thread-specific registers in ARF 2626.

In at least one embodiment, graphics execution unit 2608 has an architecture that is a combination of Simultaneous Multi-Threading (SMT) and fine-grained Interleaved Multi-Threading (IMT). In at least one embodiment, architecture has a modular configuration that can be fine-tuned at design time based on a target number of simultaneous threads and number of registers per execution unit, where execution unit resources are divided across logic used to execute multiple simultaneous threads.

In at least one embodiment, graphics execution unit 2608 can co-issue multiple instructions, which may each be different instructions. In at least one embodiment, thread arbiter 2622 of graphics execution unit thread 2608 can dispatch instructions to one of send unit 2630, branch unit 2642, or SIMD FPU(s) 2634 for execution. In at least one embodiment, each execution thread can access 168 general-purpose registers within GRF 2624, where each register can store 32 bytes, accessible as a SIMD 12-element vector of 32-bit data elements. In at least one embodiment, each execution unit thread has access to 8 Kbytes within GRF 2624, although embodiments are not so limited, and greater or fewer register resources may be provided in other embodiments. In at least one embodiment, up to seven threads can execute simultaneously, although a number of threads per execution unit can also vary according to embodiments. In at least one embodiment, in which seven threads may access 8 Kbytes, GRF 2624 can store a total of 32 Kbytes. In at least one embodiment, flexible addressing modes can permit registers to be addressed together to build effectively wider registers or to represent strided rectangular block data structures.

In at least one embodiment, memory operations, sampler operations, and other longer-latency system communications are dispatched via “send” instructions that are executed by message passing send unit 2630. In at least one embodiment, branch instructions are dispatched to a dedicated branch unit 2632 to facilitate SIMD divergence and eventual convergence.

In at least one embodiment graphics execution unit 2608 includes one or more SIMD floating point units (FPU(s)) 2634 to perform floating-point operations. In at least one embodiment, FPU(s) 2634 also support integer computation. In at least one embodiment FPU(s) 2634 can SIMD execute up to M number of 32-bit floating-point (or integer) operations, or SIMD execute up to 2M 20-bit integer or 20-bit floating-point operations. In at least one embodiment, at least one of FPU(s) provides extended math capability to support high-throughput transcendental math functions and double precision 104-bit floating-point. In at least one embodiment, a set of 12-bit integer SIMD ALUs 2635 are also present, and may be specifically optimized to perform operations associated with machine learning computations.

In at least one embodiment, arrays of multiple instances of graphics execution unit 2608 can be instantiated in a graphics sub-core grouping (for example, a sub-slice). In at least one embodiment execution unit 2608 can execute instructions across a plurality of execution channels. In at least one embodiment, each thread executed on graphics execution unit 2608 is executed on a different channel.

Inference and/or training logic 818 are used to perform inferencing and/or training operations associated with any one or more embodiments. Details regarding inference and/or training logic 818 are provided herein in conjunction with FIGS. 15A and/or 15B. In at least one embodiment, portions or all of inference and/or training logic 818 may be incorporated into execution logic 2600. Moreover, in at least one embodiment, inferencing and/or training operations described herein may be done using logic other than logic illustrated in FIG. 15A or 15B. In at least one embodiment, weight parameters may be stored in on-chip or off-chip memory and/or registers (shown or not shown) that configure ALUs of execution logic 2600 to perform one or more machine learning algorithms, neural network architectures, use cases, or training techniques described herein.

In at least one embodiment, inferencing logic 818 implements neural networks 20 and 30 of FIG. 1, so as to identify objects such as vehicles as described herein. In at least one embodiment, vehicle identification is performed reidentify vehicles that have passed from one camera to another. In at least one embodiment, vehicle identification is performed by determining vehicle identity such as make and model, as well as vehicle color and type. In at least one embodiment, neural networks 20 and 30 are trained according to a loss function of errors in identity classification. In at least one embodiment, neural networks 20 and 30 are trained according to a loss function of errors in identity and/or color and/or type classifications.

Figure 27:
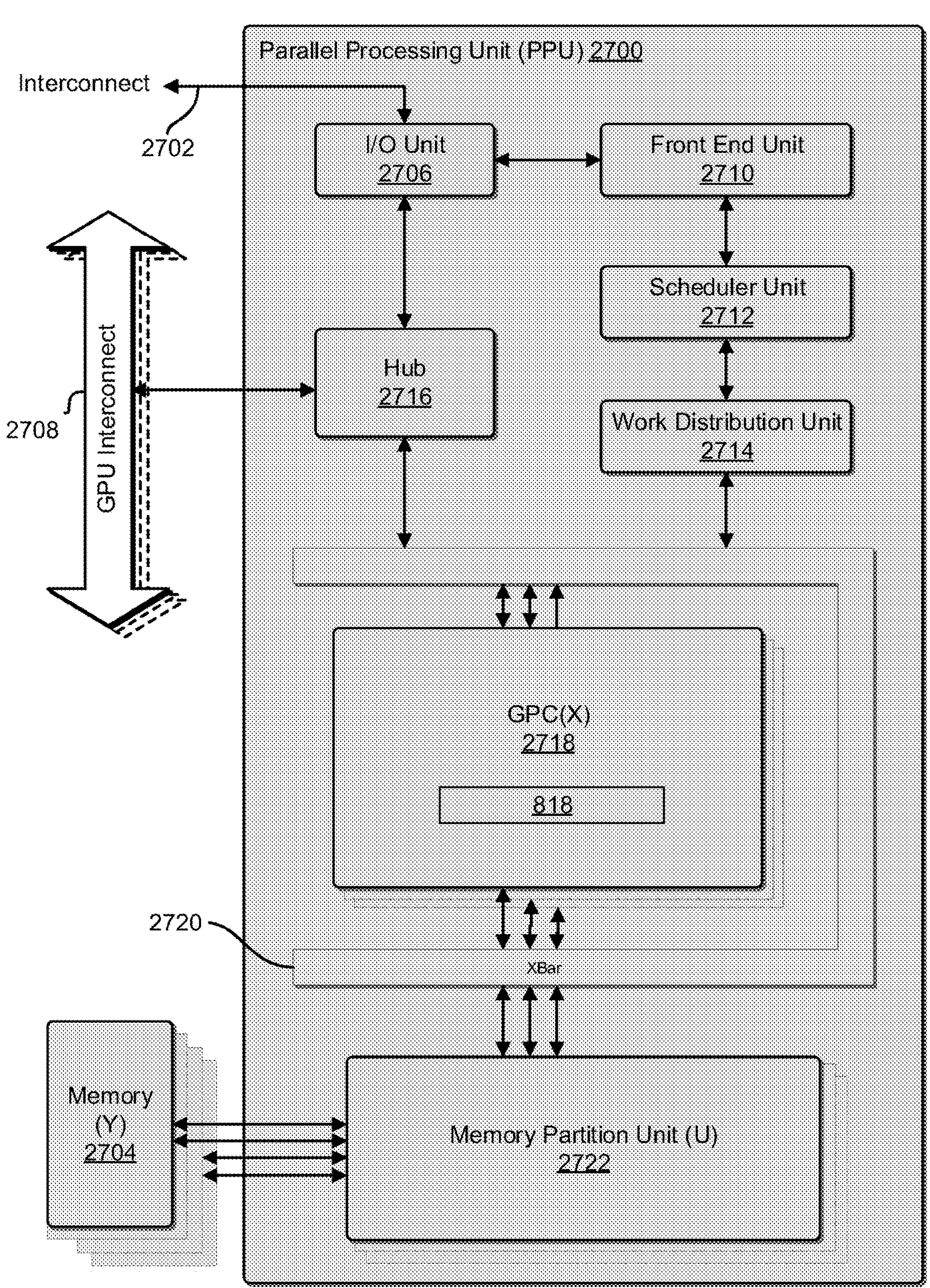
FIG. 27 illustrates a parallel processing unit ("PPU"), according to at least one embodiment.

FIG. 27 illustrates a parallel processing unit (“PPU”) 2700, according to at least one embodiment. In at least one embodiment, PPU 2700 is configured with machine-readable code that, if executed by PPU 2700, causes PPU 2700 to perform some or all of processes and techniques described throughout this disclosure. In at least one embodiment, PPU 2700 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 2700. In at least one embodiment, PPU 2700 is a graphics processing unit (“GPU”) configured to implement a graphics rendering pipeline for processing three-dimensional (“3D”) graphics data in order to generate two-dimensional (“2D”) image data for display on a display device such as a liquid crystal display (“LCD”) device. In at least one embodiment, PPU 2700 is utilized to perform computations such as linear algebra operations and machine-learning operations. FIG. 27 illustrates an example parallel processor for illustrative purposes only and should be construed as a non-limiting example of processor architectures contemplated within scope of this disclosure and that any suitable processor may be employed to supplement and/or substitute for same.

In at least one embodiment, one or more PPUs 2700 are configured to accelerate High Performance Computing (“HPC”), data center, and machine learning applications. In at least one embodiment, PPU 2700 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 2700 includes, without limitation, an Input/Output (“I/O”) unit 2706, a front-end unit 2710, a scheduler unit 2712, a work distribution unit 2714, a hub 2716, a crossbar (“Xbar”) 2720, one or more general processing clusters (“GPCs”) 2718, and one or more partition units (“memory partition units”) 2722. In at least one embodiment, PPU 2700 is connected to a host processor or other PPUs 2700 via one or more high-speed GPU interconnects (“GPU interconnects”) 2708. In at least one embodiment, PPU 2700 is connected to a host processor or other peripheral devices via an interconnect 2702. In at least one embodiment, PPU 2700 is connected to a local memory comprising one or more memory devices ("memory") 2704. In at least one embodiment, memory devices 2704 include, without limitation, one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 2708 may refer to a wire-based multi-lane communications link that is used by systems to scale and include one or more PPUs 2700 combined with one or more central processing units ("CPUs"), supports cache coherence between PPUs 2700 and CPUs, and CPU mastering. In at least one embodiment, data and/or commands are transmitted by high-speed GPU interconnect 2708 through hub 2716 to/from other units of PPU 2700 such as one or more copy engines, video encoders, video decoders, power management units, and other components which may not be explicitly illustrated in FIG. 27.

In at least one embodiment, I/O unit 2706 is configured to transmit and receive communications (for example, commands, data) from a host processor (not illustrated in FIG. 27) over system bus 2702. In at least one embodiment, I/O unit 2706 communicates with host processor directly via system bus 2702 or through one or more intermediate devices such as a memory bridge. In at least one embodiment, I/O unit 2706 may communicate with one or more other processors, such as one or more of PPUs 2700 via system bus 2702. In at least one embodiment, I/O unit 2706 implements a Peripheral Component Interconnect Express ("PCIe") interface for communications over a PCIe bus. In at least one embodiment, I/O unit 2706 implements interfaces for communicating with external devices.

In at least one embodiment, I/O unit 2706 decodes packets received via system bus 2702. In at least one embodiment, at least some packets represent commands configured to cause PPU 2700 to perform various operations. In at least one embodiment, I/O unit 2706 transmits decoded commands to various other units of PPU 2700 as specified by commands. In at least one embodiment, commands are transmitted to front-end unit 2710 and/or transmitted to hub 2716 or other units of PPU 2700 such as one or more copy engines, a video encoder, a video decoder, a power management unit, etc. (not explicitly illustrated in FIG. 27). In at least one embodiment, I/O unit 2706 is configured to route communications between and among various logical units of PPU 2700.

In at least one embodiment, a program executed by host processor encodes a command stream in a buffer that provides workloads to PPU 2700 for processing. In at least one embodiment, a workload comprises instructions and data to be processed by those instructions. In at least one embodiment, buffer is a region in a memory that is accessible (for example, read/write) by both host processor and PPU 2700—a host interface unit may be configured to access buffer in a system memory connected to system bus 2702 via memory requests transmitted over system bus 2702 by I/O unit 2706. In at least one embodiment, host processor writes command stream to buffer and then transmits a pointer to start of command stream to PPU 2700 such that front-end unit 2710 receives pointers to one or more command streams and manages one or more command streams, reading commands from command streams and forwarding commands to various units of PPU 2700.

In at least one embodiment, front-end unit 2710 is coupled to scheduler unit 2712 that configures various GPCs 2718 to process tasks defined by one or more command streams. In at least one embodiment, scheduler unit 2712 is configured to track state information related to various tasks managed by scheduler unit 2712 where state information may indicate which of GPCs 2718 a task is assigned to, whether task is active or inactive, a priority level associated with task, and so forth. In at least one embodiment, scheduler unit 2712 manages execution of a plurality of tasks on one or more of GPCs 2718.

In at least one embodiment, scheduler unit 2712 is coupled to work distribution unit 2714 that is configured to dispatch tasks for execution on GPCs 2718. In at least one embodiment, work distribution unit 2714 tracks a number of scheduled tasks received from scheduler unit 2712 and work distribution unit 2714 manages a pending task pool and an active task pool for each of GPCs 2718. In at least one embodiment, pending task pool comprises a number of slots (for example, 32 slots) that contain tasks assigned to be processed by a particular GPC 2718; active task pool may comprise a number of slots (for example, 8 slots) for tasks that are actively being processed by GPCs 2718 such that as one of GPCs 2718 completes execution of a task, that task is evicted from active task pool for GPC 2718 and one of other tasks from pending task pool is selected and scheduled for execution on GPC 2718. In at least one embodiment, if an active task is idle on GPC 2718, such as while waiting for a data dependency to be resolved, then active task is evicted from GPC 2718 and returned to pending task pool while another task in pending task pool is selected and scheduled for execution on GPC 2718.

In at least one embodiment, work distribution unit 2714 communicates with one or more GPCs 2718 via XBar 2720. In at least one embodiment, XBar 2720 is an interconnect network that couples many of units of PPU 2700 to other units of PPU 2700 and can be configured to couple work distribution unit 2714 to a particular GPC 2718. In at least one embodiment, one or more other units of PPU 2700 may also be connected to XBar 2720 via hub 2716.

In at least one embodiment, tasks are managed by scheduler unit 2712 and dispatched to one of GPCs 2718 by work distribution unit 2714. GPC 2718 is configured to process task and generate results. In at least one embodiment, results may be consumed by other tasks within GPC 2718, routed to a different GPC 2718 via XBar 2720, or stored in memory 2704. In at least one embodiment, results can be written to memory 2704 via partition units 2722, which implement a memory interface for reading and writing data to/from memory 2704. In at least one embodiment, results can be transmitted to another PPU 2704 or CPU via high-speed GPU interconnect 2708. In at least one embodiment, PPU 2700 includes, without limitation, a number U of partition units 2722 that is equal to number of separate and distinct memory devices 2704 coupled to PPU 2700. In at least one embodiment, partition unit 2722 will be described in more detail herein in conjunction with FIG. 29.

In at least one embodiment, a host processor executes a driver kernel that implements an application programming interface ("API") that enables one or more applications executing on host processor to schedule operations for execution on PPU 2700. In at least one embodiment, multiple compute applications are simultaneously executed by PPU 2700 and PPU 2700 provides isolation, quality of service ("QoS"), and independent address spaces for multiple compute applications. In at least one embodiment, an application generates instructions (for example, in form of API calls) that cause driver kernel to generate one or more tasks for execution by PPU 2700 and driver kernel outputs tasks to one or more streams being processed by PPU 2700.

In at least one embodiment, each task comprises one or more groups of related threads, which may be referred to as a warp. In at least one embodiment, a warp comprises a plurality of related threads (for example, 32 threads) that can be executed in parallel. In at least one embodiment, cooperating threads can refer to a plurality of threads including instructions to perform task and that exchange data through shared memory. In at least one embodiment, threads and cooperating threads are described in more detail, in accordance with at least one embodiment, in conjunction with FIG. 29.

Inference and/or training logic 818 are used to perform inferencing and/or training operations associated with any one or more embodiments. Details regarding inference and/or training logic 818 are provided herein in conjunction with FIGS. 15A and/or 15B. In at least one embodiment, deep learning application processor is used to train a machine learning model, such as a neural network, to predict or infer information provided to PPU 2700. In at least one embodiment, deep learning application processor 2700 is used to infer or predict information based on a trained machine learning model (for example, neural network) that has been trained by another processor or system or by PPU 2700. In at least one embodiment, PPU 2700 may be used to perform one or more neural network use cases described herein.

In at least one embodiment, inferencing logic 818 implements neural networks 20 and 30 of FIG. 1, so as to identify objects such as vehicles as described herein. In at least one embodiment, vehicle identification is performed reidentify vehicles that have passed from one camera to another. In at least one embodiment, vehicle identification is performed by determining vehicle identity such as make and model, as well as vehicle color and type. In at least one embodiment, neural networks 20 and 30 are trained according to a loss function of errors in identity classification. In at least one embodiment, neural networks 20 and 30 are trained according to a loss function of errors in identity and/or color and/or type classifications.

Figure 28:
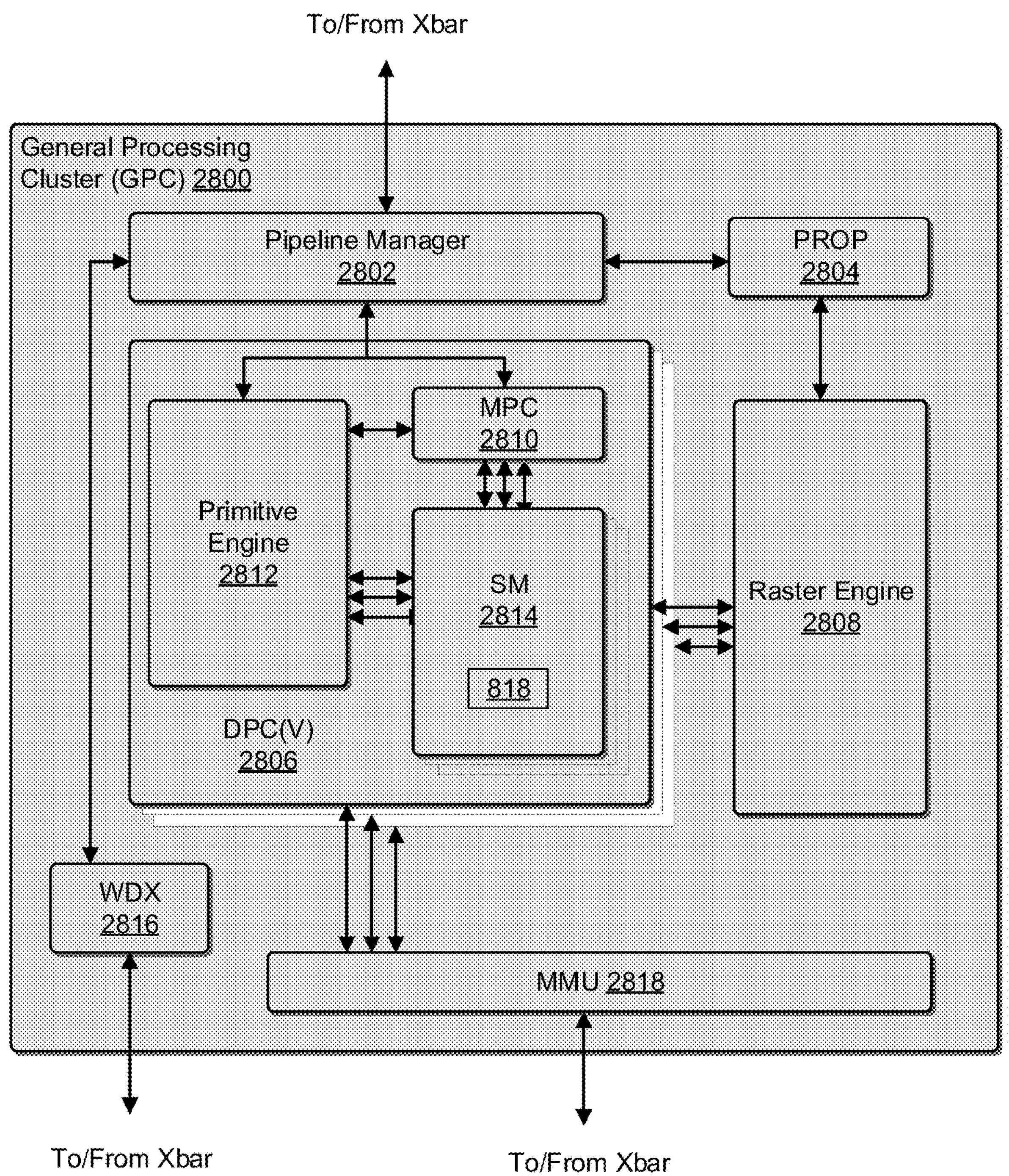
FIG. 28 illustrates a general processing cluster ("GPC"), according to at least one embodiment.

FIG. 28 illustrates a general processing cluster ("GPC") 2800, according to at least one embodiment. In at least one embodiment, GPC 2800 is GPC 2718 of FIG. 27. In at least one embodiment, each GPC 2800 includes, without limitation, a number of hardware units for processing tasks and each GPC 2800 includes, without limitation, a pipeline manager 2802, a pre-raster operations unit ("PROP") 2804, a raster engine 2808, a work distribution crossbar ("WDX") 2816, a memory management unit ("MMU") 2818, one or more Data Processing Clusters ("DPCs") 2806, and any suitable combination of parts.

In at least one embodiment, operation of GPC 2800 is controlled by pipeline manager 2802. In at least one embodiment, pipeline manager 2802 manages configuration of one or more DPCs 2806 for processing tasks allocated to GPC 2800. In at least one embodiment, pipeline manager 2802 configures at least one of one or more DPCs 2806 to implement at least a portion of a graphics rendering pipeline. In at least one embodiment, DPC 2806 is configured to execute a vertex shader program on a programmable streaming multi-processor ("SM") 2814. In at least one embodiment, pipeline manager 2802 is configured to route packets received from a work distribution unit to appropriate logical units within GPC 2800, in at least one embodiment, and some packets may be routed to fixed function hardware units in PROP 2804 and/or raster engine 2808 while other packets may be routed to DPCs 2806 for processing by a primitive engine 2812 or SM 2814. In at least one embodiment, pipeline manager 2802 configures at least one of DPCs 2806 to implement a neural network model and/or a computing pipeline.

In at least one embodiment, PROP unit 2804 is configured, in at least one embodiment, to route data generated by raster engine 2808 and DPCs 2806 to a Raster Operations ("ROP") unit in partition unit 2722, described in more detail above in conjunction with FIG. 27. In at least one embodiment, PROP unit 2804 is configured to perform optimizations for color blending, organize pixel data, perform address translations, and more. In at least one embodiment, raster engine 2808 includes, without limitation, a number of fixed function hardware units configured to perform various raster operations, in at least one embodiment, and raster engine 2808 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to coarse raster engine to generate coverage information (for example, an x, y coverage mask for a tile) for primitive; output of coarse raster engine is transmitted to culling engine where fragments associated with primitive that fail a z-test are culled, and transmitted to a clipping engine where fragments lying outside a viewing frustum are clipped. In at least one embodiment, fragments that survive clipping and culling are passed to fine raster engine to generate attributes for pixel fragments based on plane equations generated by setup engine. In at least one embodiment, output of raster engine 2808 comprises fragments to be processed by any suitable entity such as by a fragment shader implemented within DPC 2806.

In at least one embodiment, each DPC 2806 included in GPC 2800 comprise, without limitation, an M-Pipe Controller ("MPC") 2810; primitive engine 2812; one or more SMs 2814; and any suitable combination thereof. In at least one embodiment, MPC 2810 controls operation of DPC 2806, routing packets received from pipeline manager 2802 to appropriate units in DPC 2806. In at least one embodiment, packets associated with a vertex are routed to primitive engine 2812, which is configured to fetch vertex attributes associated with vertex from memory; in contrast, packets associated with a shader program may be transmitted to SM 2814.

In at least one embodiment, SM 2814 comprises, without limitation, a programmable streaming processor that is configured to process tasks represented by a number of threads. In at least one embodiment, SM 2814 is multi-threaded and configured to execute a plurality of threads (for example, 32 threads) from a particular group of threads concurrently and implements a Single-Instruction, Multiple-Data ("SIMD") architecture where each thread in a group of threads (for example, a warp) is configured to process a different set of data based on same set of instructions. In at least one embodiment, all threads in group of threads execute same instructions. In at least one embodiment, SM 2814 implements a Single-Instruction, Multiple Thread ("SIMT") architecture wherein each thread in a group of threads is configured to process a different set of data based on same set of instructions, but where individual threads in group of threads are allowed to diverge during execution. In at least one embodiment, a program counter, call stack, and execution state is maintained for each warp, enabling concurrency between warps and serial execution within warps when threads within warp diverge. In another embodiment, a program counter, call stack, and execution state is maintained for each individual thread, enabling equal concurrency between all threads, within and between warps. In at least one embodiment, execution state is maintained for each individual thread and threads executing same instructions may be converged and executed in parallel for better efficiency. At least one embodiment of SM 2814 is described in more detail below.

In at least one embodiment, MMU 2818 provides an interface between GPC 2800 and memory partition unit (for example, partition unit 2722 of FIG. 27) and MMU 2818 provides translation of virtual addresses into physical addresses, memory protection, and arbitration of memory requests. In at least one embodiment, MMU 2818 provides one or more translation lookaside buffers ("TLBs") for performing translation of virtual addresses into physical addresses in memory.

Inference and/or training logic 818 are used to perform inferencing and/or training operations associated with any one or more embodiments. Details regarding inference and/or training logic 818 are provided herein in conjunction with FIGS. 15A and/or 15B. In at least one embodiment, deep learning application processor is used to train a machine learning model, such as a neural network, to predict or infer information provided to GPC 2800. In at least one embodiment, GPC 2800 is used to infer or predict information based on a trained machine learning model (for example, neural network) that has been trained by another processor or system or by GPC 2800. In at least one embodiment, GPC 2800 may be used to perform one or more neural network use cases described herein.

In at least one embodiment, inferencing logic 818 implements neural networks 20 and 30 of FIG. 1, so as to identify objects such as vehicles as described herein. In at least one embodiment, vehicle identification is performed reidentify vehicles that have passed from one camera to another. In at least one embodiment, vehicle identification is performed by determining vehicle identity such as make and model, as well as vehicle color and type. In at least one embodiment, neural networks 20 and 30 are trained according to a loss function of errors in identity classification. In at least one embodiment, neural networks 20 and 30 are trained according to a loss function of errors in identity and/or color and/or type classifications.

Figure 29:
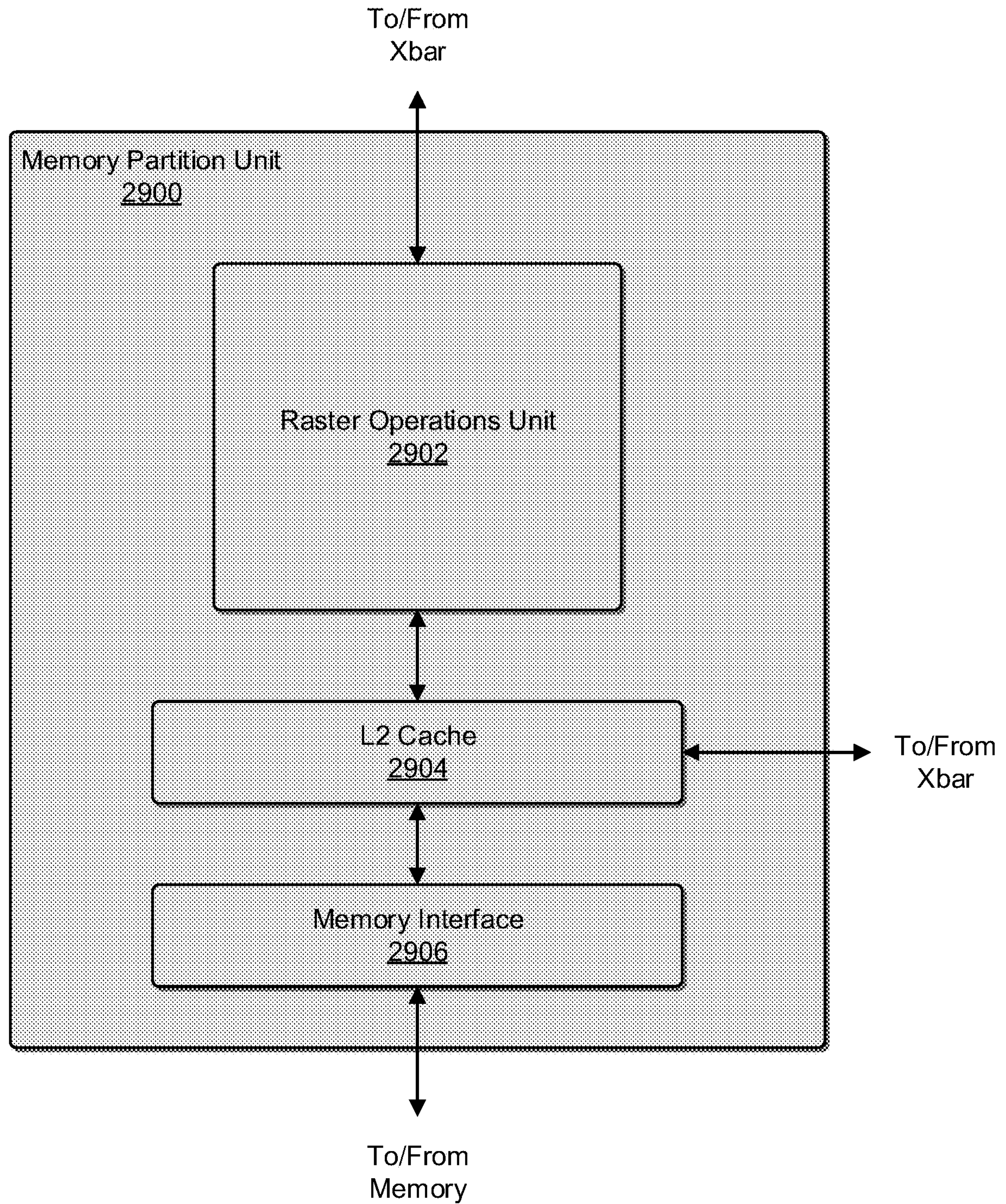
FIG. 29 illustrates a memory partition unit of a parallel processing unit ("PPU"), according to at least one embodiment.

FIG. 29 illustrates a memory partition unit 2900 of a parallel processing unit ("PPU"), in accordance with at least one embodiment. In at least one embodiment, memory partition unit 2900 includes, without limitation, a Raster Operations ("ROP") unit 2902; a level two ("L2") cache 2904; a memory interface 2906; and any suitable combination thereof. Memory interface 2906 is coupled to memory. Memory interface 2906 may implement 32, 104, 168, 1424-bit data buses, or like, for high-speed data transfer. In at least one embodiment, PPU incorporates U memory interfaces 2906, one memory interface 2906 per pair of partition units 2900, where each pair of partition units 2900 is connected to a corresponding memory device. For example, in at least one embodiment, PPU may be connected to up to Y memory devices, such as high bandwidth memory stacks or graphics double-data-rate, version 9, synchronous dynamic random access memory ("GDDR5 SDRAM").

In at least one embodiment, memory interface 2906 implements a high bandwidth memory second generation ("HBM2") memory interface and Y equals half U. In at least one embodiment, HBM2 memory stacks are located on same physical package as PPU, providing substantial power and area savings compared with conventional GDDR5 SDRAM systems. In at least one embodiment, each HBM2 stack includes, without limitation, four memory dies and Y equals 8, with each HBM2 stack including two 168-bit channels per die for a total of 12 channels and a data bus width of 1424 bits. In at least one embodiment, memory supports Single-Error Correcting Double-Error Detecting ("SECDED") Error Correction Code ("ECC") to protect data. ECC provides higher reliability for compute applications that are sensitive to data corruption.

In at least one embodiment, PPU implements a multi-level memory hierarchy. In at least one embodiment, memory partition unit 2900 supports a unified memory to provide a single unified virtual address space for central processing unit ("CPU") and PPU memory, enabling data sharing between virtual memory systems. In at least one embodiment frequency of accesses by a PPU to memory located on other processors is traced to ensure that memory pages are moved to physical memory of PPU that is accessing pages more frequently. In at least one embodiment, high-speed GPU interconnect 2708 supports address translation services allowing PPU to directly access a CPU's page tables and providing full access to CPU memory by PPU.

In at least one embodiment, copy engines transfer data between multiple PPUs or between PPUs and CPUs. In at least one embodiment, copy engines can generate page faults for addresses that are not mapped into page tables and memory partition unit 2900 then services page faults, mapping addresses into page table, after which copy engine performs transfer. In at least one embodiment, memory is pinned (i.e., non-pageable) for multiple copy engine operations between multiple processors, substantially reducing available memory. In at least one embodiment, with hardware page faulting, addresses can be passed to copy engines without regard as to whether memory pages are resident, and copy process is transparent.

Data from memory 2704 of FIG. 27 or other system memory is fetched by memory partition unit 2900 and stored in L2 cache 2904, which is located on-chip and is shared between various GPCs, in accordance with at least one embodiment. Each memory partition unit 2900, in at least one embodiment, includes, without limitation, at least a portion of L2 cache associated with a corresponding memory device. In at least one embodiment, lower level caches are implemented in various units within GPCs. In at least one embodiment, each of SMs 2814 may implement a level one ("L1") cache wherein L1 cache is private memory that is dedicated to a particular SM 2814 and data from L2 cache 2904 is fetched and stored in each of L1 caches for processing in functional units of SMs 2814. In at least one embodiment, L2 cache 2904 is coupled to memory interface 2906 and XBar 2720.

ROP unit 2902 performs graphics raster operations related to pixel color, such as color compression, pixel blending, and more, in at least one embodiment. ROP unit 2902, in at least one embodiment, implements depth testing in conjunction with raster engine 2808, receiving a depth for a sample location associated with a pixel fragment from culling engine of raster engine 2808. In at least one embodiment, depth is tested against a corresponding depth in a depth buffer for a sample location associated with fragment. In at least one embodiment, if fragment passes depth test for sample location, then ROP unit 2902 updates depth buffer and transmits a result of depth test to raster engine 2808. It will be appreciated that number of partition units 2900 may be different than number of GPCs and, therefore, each ROP unit 2902 can, in at least one embodiment, be coupled to each of GPCs. In at least one embodiment, ROP unit 2902 tracks packets received from different GPCs and determines which that a result generated by ROP unit 2902 is routed to through XBar 2720.

Figure 30:
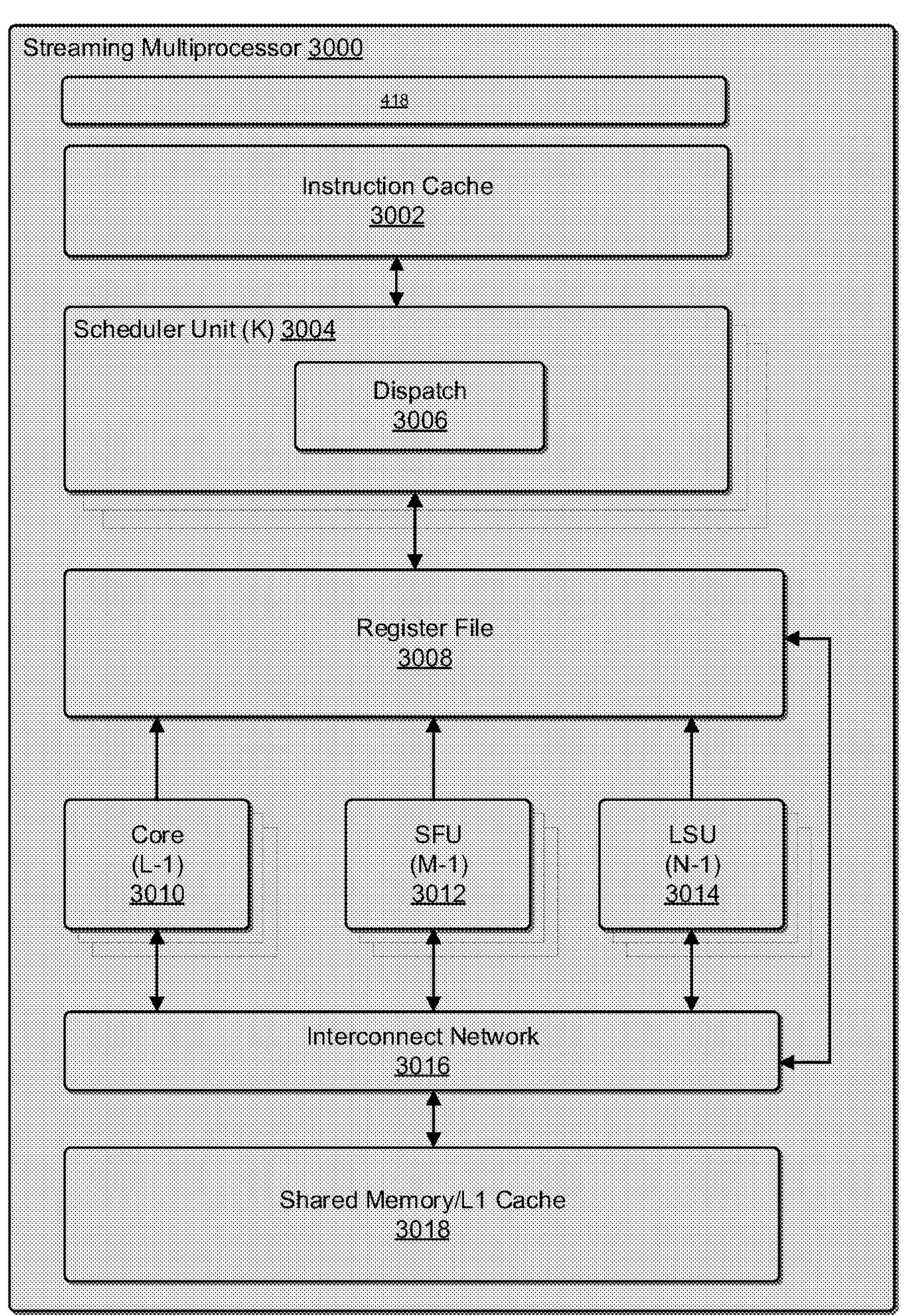
FIG. 30 illustrates a streaming multi-processor, according to at least one embodiment.

FIG. 30 illustrates a streaming multi-processor ("SM") 3000, according to at least one embodiment. In at least one embodiment, SM 3000 is SM of FIG. 28. In at least one embodiment, SM 3000 includes, without limitation, an instruction cache 3002; one or more scheduler units 3004; a register file 3008; one or more processing cores ("cores") 3010; one or more special function units ("SFUs") 3012; one or more load/store units ("LSUs") 3014; an interconnect network 3016; a shared memory/level one ("L1") cache 3018; and any suitable combination thereof. In at least one embodiment, a work distribution unit dispatches tasks for execution on general processing clusters ("GPCs") of parallel processing units ("PPUs") and each task is allocated to a particular Data Processing Cluster ("DPC") within a GPC and, if task is associated with a shader program, task is allocated to one of SMs 3000. In at least one embodiment, scheduler unit 3004 receives tasks from work distribution unit and manages instruction scheduling for one or more thread blocks assigned to SM 3000. In at least one embodiment, scheduler unit 3004 schedules thread blocks for execution as warps of parallel threads, wherein each thread block is allocated at least one warp. In at least one embodiment, each warp executes threads. In at least one embodiment, scheduler unit 3004 manages a plurality of different thread blocks, allocating warps to different thread blocks and then dispatching instructions from plurality of different cooperative groups to various functional units (for example, processing cores 3010, SFUs 3012, and LSUs 3014) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (for example, syncthreads( ) function). However, in at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (i.e., as small as a single thread) and multi-block granularities, and to perform collective operations such as synchronization on threads in a cooperative group. Programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 3006 is configured to transmit instructions to one or more of functional units and scheduler unit 3004 includes, without limitation, two dispatch units 3006 that enable two different instructions from same warp to be dispatched during each clock cycle. In at least one embodiment, each scheduler unit 3004 includes a single dispatch unit 3006 or additional dispatch units 3006.

In at least one embodiment, each SM 3000, in at least one embodiment, includes, without limitation, register file 3008 that provides a set of registers for functional units of SM 3000. In at least one embodiment, register file 3008 is divided between each of functional units such that each functional unit is allocated a dedicated portion of register file 3008. In at least one embodiment, register file 3008 is divided between different warps being executed by SM 3000 and register file 3008 provides temporary storage for operands connected to data paths of functional units. In at least one embodiment, each SM 3000 comprises, without limitation, a plurality of L processing cores 3010. In at least one embodiment, SM 3000 includes, without limitation, a large number (for example, 168 or more) of distinct processing cores 3010. In at least one embodiment, each processing core 3010, in at least one embodiment, includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 1154-2008 standard for floating point arithmetic. In at least one embodiment, processing cores 3010 include, without limitation, 104 single-precision (32-bit) floating point cores, 104 integer cores, 32 double-precision (64-bit) floating point cores, and 12 tensor cores.

Tensor cores are configured to perform matrix operations in accordance with at least one embodiment. In at least one embodiment, one or more tensor cores are included in processing cores 3010. In at least one embodiment, tensor cores are configured to perform deep learning matrix arithmetic, such as convolution operations for neural network training and inferencing. In at least one embodiment, each tensor core operates on a 8×4 matrix and performs a matrix multiply and accumulate operation D=A×B+C, where A, B, C, and D are 8×4 matrices.

In at least one embodiment, matrix multiply inputs A and B are 20-bit floating point matrices and accumulation matrices C and D are 16-bit floating point or 32-bit floating point matrices. In at least one embodiment, tensor cores operate on 20-bit floating point input data with 32-bit floating point accumulation. In at least one embodiment, 20-bit floating point multiply uses 104 operations and results in a full precision product that is then accumulated using 32-bit floating point addition with other intermediate products for a 8×4×4 matrix multiply. Tensor cores are used to perform much larger two-dimensional or higher dimensional matrix operations, built up from these smaller elements, in at least one embodiment. In at least one embodiment, an API, such as CUDA 13 C++ API, exposes specialized matrix load, matrix multiply and accumulate, and matrix store operations to efficiently use tensor cores from a CUDA-C++ program. In at least one embodiment, at CUDA level, warp-level interface assumes 20×16 size matrices spanning all 32 threads of warp.

In at least one embodiment, each SM 3000 comprises, without limitation, M SFUs 3012 that perform special functions (for example, attribute evaluation, reciprocal square root, and like). In at least one embodiment, SFUs 3012 include, without limitation, a tree traversal unit configured to traverse a hierarchical tree data structure. In at least one embodiment, SFUs 3012 include, without limitation, a texture unit configured to perform texture map filtering operations. In at least one embodiment, texture units are configured to load texture maps (for example, a 2D array of texels) from memory and sample texture maps to produce sampled texture values for use in shader programs executed by SM 3000. In at least one embodiment, texture maps are stored in shared memory/L1 cache 3018. In at least one embodiment, texture units implement texture operations such as filtering operations using mip-maps (for example, texture maps of varying levels of detail), in accordance with at least one embodiment. In at least one embodiment, each SM 3000 includes, without limitation, two texture units.

Each SM 3000 comprises, without limitation, N LSUs 3014 that implement load and store operations between shared memory/L1 cache 3018 and register file 3008, in at least one embodiment. Each SM 3000 includes, without limitation, interconnect network 3016 that connects each of functional units to register file 3008 and LSU 3014 to register file 3008 and shared memory/L1 cache 3018 in at least one embodiment. In at least one embodiment, interconnect network 3016 is a crossbar that can be configured to connect any of functional units to any of registers in register file 3008 and connect LSUs 3014 to register file 3008 and memory locations in shared memory/L1 cache 3018.

In at least one embodiment, shared memory/L1 cache 3018 is an array of on-chip memory that allows for data storage and communication between SM 3000 and primitive engine and between threads in SM 3000, in at least one embodiment. In at least one embodiment, shared memory/L1 cache 3018 comprises, without limitation, 168 KB of storage capacity and is in path from SM 3000 to partition unit. In at least one embodiment, shared memory/L1 cache 3018, in at least one embodiment, is used to cache reads and writes. In at least one embodiment, one or more of shared memory/L1 cache 3018, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of capacity, texture and load/store operations can use remaining capacity. Integration within shared memory/L1 cache 3018 enables shared memory/L1 cache 3018 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In general purpose parallel computation configuration, work distribution unit assigns and distributes blocks of threads directly to DPCs, in at least one embodiment. In at least one embodiment, threads in a block execute same program, using a unique thread ID in calculation to ensure each thread generates unique results, using SM 3000 to execute program and perform calculations, shared memory/L1 cache 3018 to communicate between threads, and LSU 3014 to read and write global memory through shared memory/L1 cache 3018 and memory partition unit. In at least one embodiment, when configured for general purpose parallel computation, SM 3000 writes commands that scheduler unit 3004 can use to launch new work on DPCs.

In at least one embodiment, PPU is included in or coupled to a desktop computer, a laptop computer, a tablet computer, servers, supercomputers, a smart-phone (for example, a wireless, hand-held device), personal digital assistant ("PDA"), a digital camera, a vehicle, a head mounted display, a hand-held electronic device, and more. In at least one embodiment, PPU is embodied on a single semiconductor substrate. In at least one embodiment, PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, PPU may be included on a graphics card that includes one or more memory devices. Graphics card may be configured to interface with a PCIe slot on a motherboard of a desktop computer. In at least one embodiment, PPU may be an integrated graphics processing unit ("iGPU") included in chipset of motherboard.

Inference and/or training logic 818 are used to perform inferencing and/or training operations associated with any one or more embodiments. Details regarding inference and/or training logic 818 are provided herein in conjunction with FIGS. 15A and/or 15B. In at least one embodiment, deep learning application processor is used to train a machine learning model, such as a neural network, to predict or infer information provided to SM 3000. In at least one embodiment, SM 3000 is used to infer or predict information based on a trained machine learning model (for example, neural network) that has been trained by another processor or system or by SM 3000. In at least one embodiment, SM 3000 may be used to perform one or more neural network use cases described herein.

In at least one embodiment, inferencing logic 818 implements neural networks 20 and 30 of FIG. 1, so as to identify objects such as vehicles as described herein. In at least one embodiment, vehicle identification is performed reidentify vehicles that have passed from one camera to another. In at least one embodiment, vehicle identification is performed by determining vehicle identity such as make and model, as well as vehicle color and type. In at least one embodiment, neural networks 20 and 30 are trained according to a loss function of errors in identity classification. In at least one embodiment, neural networks 20 and 30 are trained according to a loss function of errors in identity and/or color and/or type classifications.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, computer programs in form of machine-readable executable code or computer control logic algorithms are stored in main memory 904 and/or secondary storage. Computer programs, if executed by one or more processors, enable system 900 to perform various functions in accordance with at least one embodiment. Memory 904, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 902; parallel processing system 912; an integrated circuit capable of at least a portion of capabilities of both CPU 902; parallel processing system 912; a chipset (for example, a group of integrated circuits designed to work and sold as a unit for performing related functions, etc.); and any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 900 may take form of a desktop computer, a laptop computer, a tablet computer, servers, supercomputers, a smart-phone (for example, a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, parallel processing system 912 includes, without limitation, a plurality of parallel processing units ("PPUs") 914 and associated memories 916. In at least one embodiment, PPUs 914 are connected to a host processor or other peripheral devices via an interconnect 918 and a switch 920 or multiplexer. In at least one embodiment, parallel processing system 912 distributes computational tasks across PPUs 914 which can be parallelizable—for example, as part of distribution of computational tasks across multiple graphics processing unit ("GPU") thread blocks. In at least one embodiment, memory is shared and accessible (for example, for read and/or write access) across some or all of PPUs 914, although such shared memory may incur performance penalties relative to use of local memory and registers resident to a PPU 914. In at least one embodiment, operation of PPUs 914 is synchronized through use of a command such as syncthreads( ) wherein all threads in a block (for example, executed across multiple PPUs 914) to reach a certain point of execution of code before proceeding.

Use Case

Figure 31:
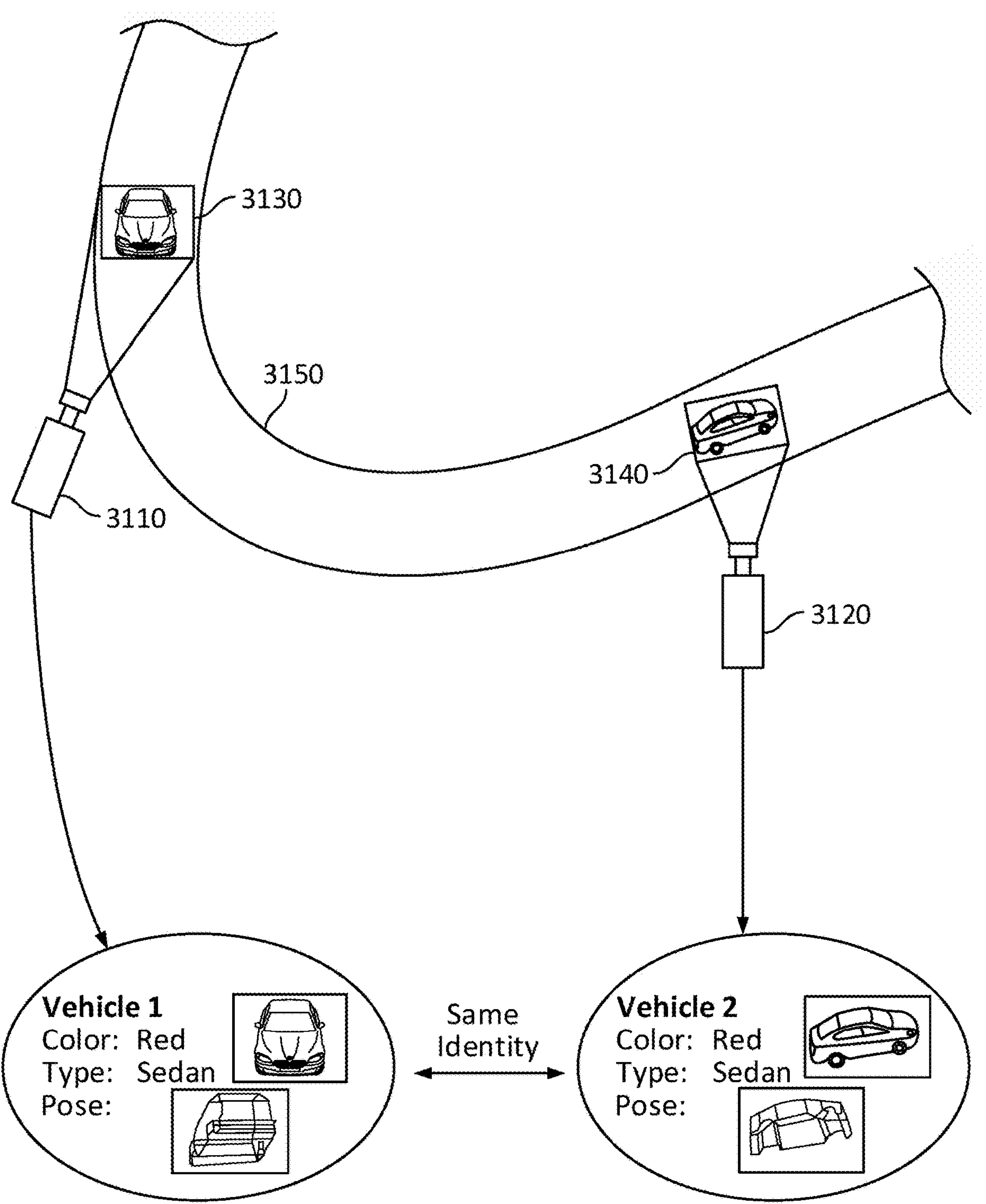
FIG. 31 illustrates a use case according to at least one embodiment.

FIG. 31 illustrates a use case according to at least one embodiment. In at least one embodiment, system 10 is used to identify vehicles. In at least one embodiment, cameras 3110 and 3120 capture images of vehicles 3130 and 3140 driving on a road 3150. In at least one embodiment, vehicles 3130, 3140 are then identified from these images, using system 10. In at least one embodiment, color classifier 70 classifies vehicle images from cameras 3110, 3120 into colors such as red, white, black, or similar, while type classifier 90 classifies images into vehicle types such as sedan, pickup, sports utility vehicle ("SUV"), or similar. In at least one embodiment, identification classifier 80 classifies images into particular identities such as vehicle makes and/or models.

In at least one embodiment, keypoints 60 are keypoints of a deformable model of a vehicle. In at least one embodiment, a deformable model employing 36 2-dimensional keypoints is employed, which indicates relative positions of various components of a vehicle. Accordingly, relative positions of keypoints 60 collectively indicate orientation or pose of a vehicle, as can be seen from keypoints 60 of FIG. 1. In at least one embodiment, various components of a vehicle are predetermined visible elements characteristic of a vehicle such as wheels, a hood, roof, windows, and bumpers, while keypoints are characteristic positions of each element such as area centers of wheels, and corners of a hood.

In at least one embodiment, individual cameras 3110, 3120 are used to identify passing vehicles 3130, 3140. In at least one embodiment, camera 3110 captures an image of passing vehicle 3130, and this image is fed as input to neural network 20, which determines pose of a passing vehicle 3130 as heatmaps 50 and keypoints 60 from this image of vehicle 3130. In at least one embodiment, heatmaps 50 are appended to this image of vehicle 3130 and keypoints 60 are appended to a resulting feature vector output from neural network 30. In at least one embodiment, this augmented feature vector is input to classifiers 70, 80, and 90 to determine a color, identity (make and/or model), and type of vehicle 3130, which serves as an identification of vehicle 3130.

In at least one embodiment, vehicle 3130 and vehicle 3140 are a single vehicle in different locations or a single vehicle viewed from different cameras, and successive cameras 3110 and 3120 are used to reidentify vehicle 3130, 3140 as it passes through fields of view of both cameras. In at least one embodiment, FIG. 31 shows a same vehicle 3130, 3140, in this case a car, driving along road 3150 and thus passing through fields of view of two successive cameras 3110, 3120. In at least one embodiment, these two cameras 3110, 3120 each capture an image of vehicle 3130, 3140 when it passes through their respective fields of view. In at least one embodiment, in order to determine whether two cameras 3110 and 3120 captured images of identical vehicle 3120, 3130, these two images of vehicle 3120, 3130, taken at different times from cameras 3110 and 3120, are each input to neural networks 20 and 30 to produce two vehicle identifications. In at least one embodiment, outputs of network 30 are two sets of color, identity, and type. Accordingly, identical outputs for both images from cameras 3110, 3120 indicate that these images are images of a same model, color, and type of vehicle. This in turn suggests that these images are two different images of a single vehicle. In other words, vehicle 3130, 3140 has been reidentified, meaning that one vehicle 3130/2740 passed through a field of view of each camera 3110, 3120. Embodiments can thus be employed in reidentification of vehicles as they pass from one camera's field of view to another.

In at least one embodiment, vehicles 3130, 3140 are identified by identity, color, and type, in other words by each of classifiers 70, 80, and 90. In at least one embodiment, vehicles 3130, 3140 are identified by any one or more of identity, color, and type, in other words by any one or more of classifiers 70, 80, and 90. In at least one embodiment, cameras 3110 and 3120 are different cameras. In at least one embodiment, cameras 3110 and 3120 are a single camera that captures images of vehicles 3130, 3140 at same or different times.

In at least one embodiment, vehicle 3130 and vehicle 3140 are different vehicles. In at least one embodiment, then, FIG. 31 may show different vehicles 3130 and 3140 captured by cameras 3110 and 3120. In at least one embodiment, cameras 3110 and 3120 capture images of vehicles 3130 and 3140, and these two images are each input to neural networks 20 and 30 to produce two vehicle identifications. In at least one embodiment, outputs of network 30 are two sets of color, identity, and type that differ in some regard, such as having differing color or different body type. In at least one embodiment, one or more differing characteristics indicate a no reidentification, that is, vehicles 3130 and 3140 are different vehicles.

In at least one embodiment, one of ordinary skill in this art will observe that neural network 30 considers pose information such as heatmaps 50 in its feature identification. In at least one embodiment, classifiers 70, 80, 90 consider pose information such as keypoints 60 in classifying vehicles. In at least one embodiment, both types of pose information are input and thus considered. In at least one embodiment then, system 10 exhibits improved accuracy by accounting for vehicle orientation in its identifications, and thus considering differing vehicle shape in differing orientations, as well as similar orientations of different vehicles.

In at least one embodiment, cameras 3110, 3120 are any cameras capable of capturing an image of an object, including still cameras, video cameras, motion activated cameras, and similar devices capable of capturing images. In at least one embodiment, cameras 3110, 3120 are cameras capable of both capturing one or more images of an object and carrying out inferencing operations to identify objects in its captured images, such as an AWS DeepLens™ video camera from Amazon®.

Figure 32:
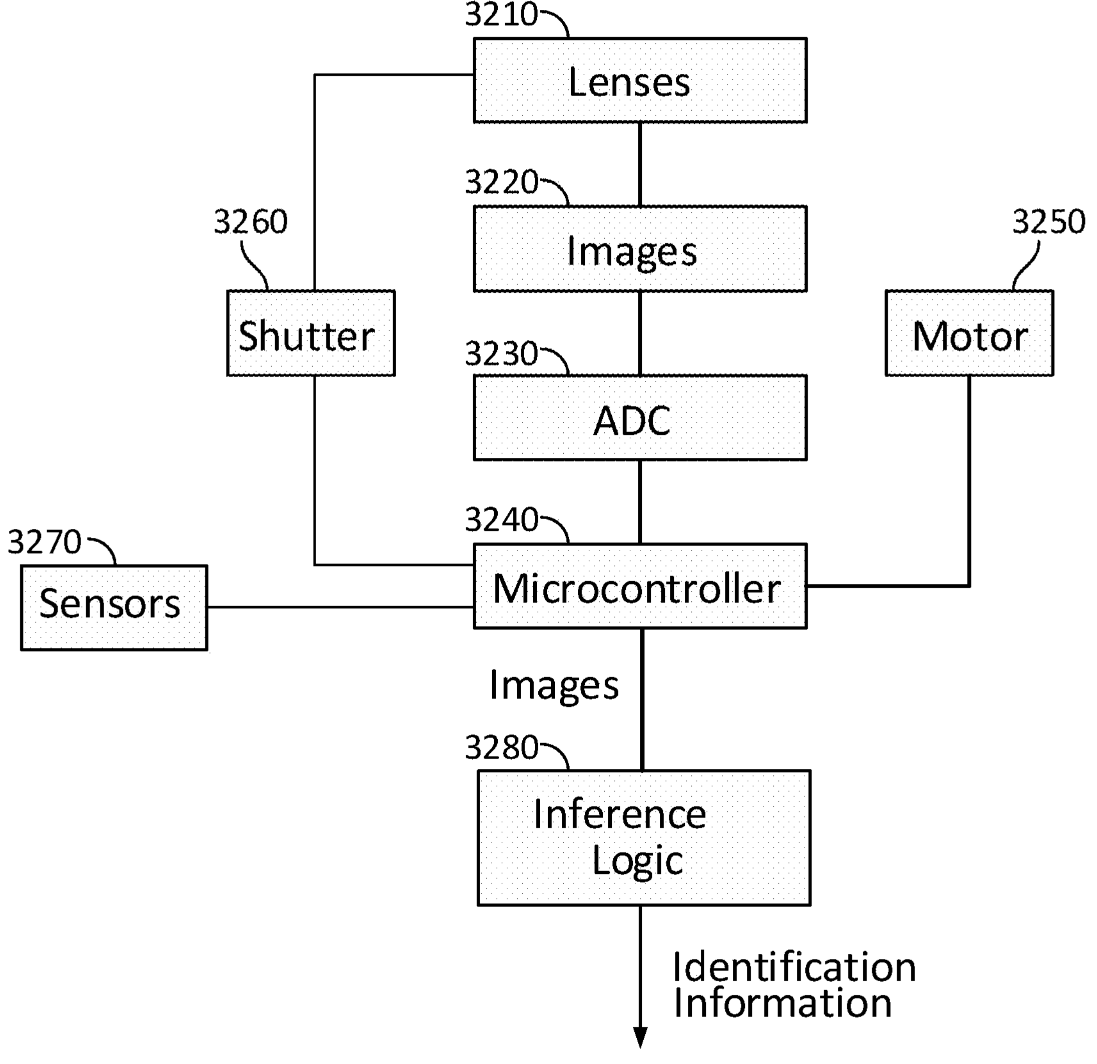
FIG. 32 illustrates a block diagram of a camera for use according to at least one embodiment.

FIG. 32 illustrates a block diagram of a camera for use in accordance with at least one embodiment. In at least one embodiment, FIG. 32 may be a block diagram of cameras 3110, 3120. In at least one embodiment, this camera has one or more lenses 3210 focusing visible light onto an imager 3220 that converts incident light to an analog signal, such as by a charge coupled device (CCD) or complementary metal oxide semiconductor (CMOS) array. In at least one embodiment, this signal is input to an analog to digital converter (ADC) 3230 for conversion to a digital signal, which is in turn forwarded to microcontroller 3240. In at least one embodiment, microcontroller 3240 is programmed to process this digital signal into an image which is output to inference logic 3280. In at least one embodiment, inference logic 3280 implements neural networks 20, 30 of system 10 and may be, for example, inference logic 818. As such, inference logic 3280 outputs an identification (color, model, and type) of a vehicle captured in its input image. In at least one embodiment, inference logic 3280 is in electronic communication with one or more computers such as inference and/or training logic 818 or data center 1700, to receive updated neural network parameters and other update information.

In at least one embodiment, microcontroller 3240 also controls motor 3250 for focusing lenses 3210, and shutter 3260 for capturing images. In at least one embodiment, sensors 3270 include any one or more of light sensors for determining aperture and/or exposure duration in controlling shutter 3260, motion sensors when camera 3110 is a motion activated camera, and range sensors determining distances of vehicles 3120 and thus focusing lenses 3210. In at least one embodiment, camera 3110 is a motion activated camera. In at least one embodiment, camera 3110 may also be any other type of camera, such as a video camera.

In at least one embodiment, inference logic 3280 is located within its camera 3110, so that camera 3110 identifies vehicles passing within its field of view. In at least one embodiment, inference logic 3280 is located remote from camera 3110, such as in a remote server or a data center 1700. In at least one embodiment, camera 3110 thus outputs images of vehicles passing within its field of view, where these images are identified remote from camera 3110.

In at least one embodiment, inference logic 3280 of two different cameras 3110 each transmits its output identification of a vehicle to a separate server, which may be remote from each camera 3110. In at least one embodiment, this server may be a server or node C.R. 1716(1)-1316(N) of data center 1700. In at least one embodiment, server or node C.R. 1716(1)-1316(N) receives vehicle identifications from each camera 3110 and compares them to determine whether they are identical. If so, server or node C.R. 1716(1)-1316(N) determines that this vehicle has been reidentified, that is cameras 3110 captured separate images of a single vehicle. In at least one embodiment, whether a vehicle has been reidentified or has instead been determined to be a different vehicle, this determination or comparison is stored on a server or node C.R. 1716(1)-1316(N) for later use. In at least one embodiment, server or node C.R. 1716(1)-1316(N) thus stores a list or database of comparisons of vehicles, such as vehicle identities, corresponding images and timestamps, and indications of whether or not these vehicles are reidentified from other stored vehicles.

Figure 33:
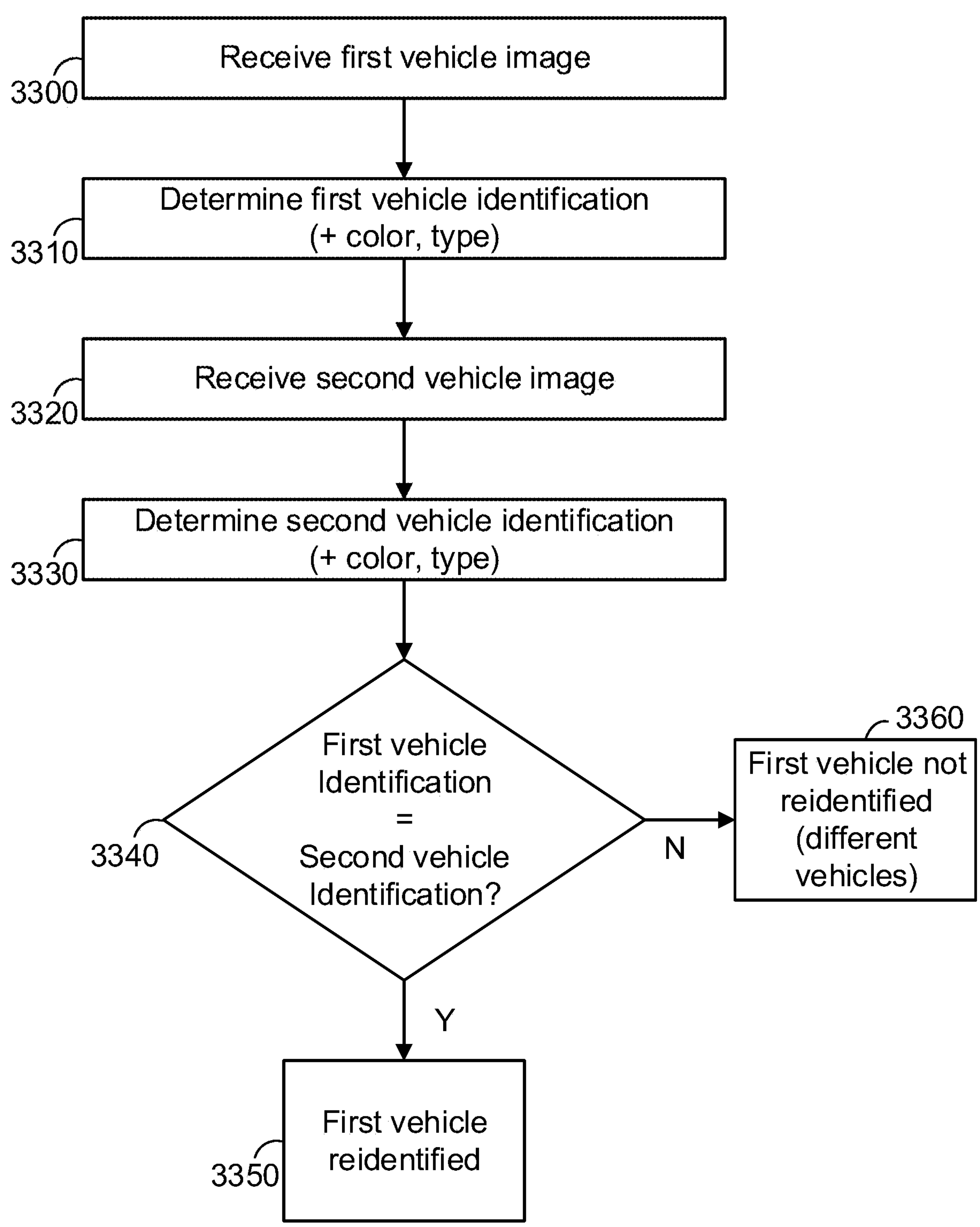
FIG. 33 is a flowchart illustrating vehicle reidentification according to at least one embodiment.

FIG. 33 is a flowchart illustrating vehicle reidentification according to at least one embodiment. In at least one embodiment, FIG. 33 illustrates a process for vehicle reidentification, where two successive cameras capture images of vehicles that are compared to determine whether these images are of a same vehicle. In at least one embodiment, a first vehicle image is initially received (Step 3300), such as from leftmost camera 3110 of FIG. 31. In at least one embodiment, this vehicle is identified using inference logic 3280, which can be within camera 3110 or located remote from camera 3110, such as in a remote server or a data center 1700. In at least one embodiment, inference logic 3280 identifies its vehicle by determining a vehicle identity such as make and model, as previously described (Step 3310). In at least one embodiment, vehicle color, type, or both are also determined. In at least one embodiment, a second vehicle image is then received (Step 3320), such as from rightmost camera 3110 of FIG. 31. As this rightmost camera 3110 is located farther down road 3130, it is possible that this camera has captured a same vehicle as that in first vehicle image of Step 3300. In at least one embodiment, this vehicle is thus identified as in Step 3310, such as by an inference logic 3280 in rightmost camera 3110 or elsewhere (Step 3330). In at least one embodiment, identifications (make, model, and/or color, and/or type) determined in Steps 3310 and 3330 are then compared to determine whether they are identical, or a same make, model, and/or color, and/or type of vehicle (Step 3340). In at least one embodiment, if these two identifications are identical, it can be asserted that these two identifications are of a same vehicle, meaning that this vehicle has been reidentified from one camera 3110 to another (Step 3350). If these identifications are not identical, then these two captured images are of different vehicles and no reidentification has occurred (step 3360).

Other variations are within a spirit of this present disclosure. Thus, while disclosed techniques are susceptible to various modifications and alternative constructions, certain illustrated embodiments thereof are shown in drawings and have been described above in detail. It should be understood, however, that there is no intention to limit this disclosure to specific form or forms disclosed. Instead, it is intended is to cover all modifications, alternative constructions, and equivalents falling within any spirit and scope of this disclosure, as defined in appended claims.

Use of terms “a” and “an” and “the” and similar referents in a context of describing disclosed embodiments (especially in context of following claims) are to be construed to cover both singular and plural, unless otherwise indicated herein or clearly contradicted by context, and not as a definition of a term. Terms “comprising,” “having,” “including,” and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into this specification as if it were individually recited herein. Use of "set" (for example, "a set of items") or "subset" unless otherwise noted or contradicted by context, is to be construed as a nonempty collection comprising one or more members. Further, unless otherwise noted or contradicted by context, a "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, "plurality" indicates a state of being plural (for example, "a plurality of items" indicates multiple items). A number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (for example, executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (for example, a propagating transient electric or electromagnetic transmission) but includes non-transitory data storage circuitry (for example, buffers, cache, and queues) within transceivers of transitory signals. In at least one embodiment, code (for example, executable code or source code) is stored on a set of one or more non-transitory computer-readable storage media having stored thereon executable instructions (or other memory to store executable instructions) that, when executed (that is, as a result of being executed) by one or more processors of a computer system, cause computer system to perform operations described herein. Set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (for example, "such as") provided herein, is intended merely to better illuminate embodiments of this disclosure and does not impose a limitation on disclosure scope unless otherwise claimed. No language in this specification should be construed as indicating any non-claimed element as essential to practice of this disclosure.

All references, including publications, patent applications, and patents, cited herein are hereby incorporated by reference to same extent as if each reference were individually and specifically indicated to be incorporated by reference and were set forth in its entirety herein.

In this description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout this specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms such as "system" and "method" are used herein interchangeably insofar as a system may embody one or more methods and methods may be considered a system.

In this document, references may be made to obtaining, acquiring, receiving, or inputting analog or digital data into a subsystem, computer system, or computer-implemented machine. Any process of obtaining, acquiring, receiving, or inputting analog and digital data can be accomplished in a variety of ways such as by receiving data as a parameter of a function call or a call to an application programming interface. In some implementations, a process of obtaining, acquiring, receiving, or inputting analog or digital data can be accomplished by transferring data via a serial or parallel interface. In another implementation, a process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, a process of providing, outputting, transmitting, sending, or presenting analog or digital data can be accomplished by transferring data as an input or output parameter of a function call, a parameter of an application programming interface or interprocess communication mechanism.

Although discussions above set forth example implementations of described techniques, other architectures may be used to implement described functionality, and are intended to be within this disclosure's scope. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in any appended claims is not necessarily limited to specific features or acts described. Rather, specific features and acts are disclosed as exemplary forms of implementing any claims.

What is claimed is:

1. A system comprising:

one or more processors to use one or more neural networks to identify one or more features of one or more objects within one or more first images, and to indicate whether the one or more objects appear within one or more second images, based, at least in part, on pose of the one or more objects and the one or more identified features, wherein the one or more neural networks comprise:

a first neural network to receive as input the one or more first images of the one or more objects and to output, based on the input of the one or more first images, the pose of the one or more objects and the one or more features of the one or more objects; and a second neural network to receive as inputs the one or more first images of the one or more objects and the pose of the one or more objects and the one or more features of the one or more objects, and to identify the one or more objects based on the inputs of the second neural network.

2. The system of claim 1, wherein the pose of the one or more objects comprises at least one of a location of a portion of the one or more objects, or a likelihood of the location.

3. The system of claim 1, wherein the one or more identified features comprises at least one of a color of the one or more objects, or a type of the one or more objects.

4. The system of claim 1, wherein the one or more neural networks further comprise:

a feature learning network to receive the one or more first images of the one or more objects and a first portion of the pose of the one or more objects as feature learning network inputs and to output, based on the feature learning network inputs, a vector of image features; and a classifier to receive the vector of image features and a second portion of the pose of the one or more objects as classifier inputs and to output, based on the classifier inputs, an identification of the one or more objects.

5. The system of claim 4, wherein the classifier is a first classifier, and wherein the one or more neural networks further comprise:

a second classifier to receive the vector of image features and the second portion of the pose of the one or more objects as second classifier inputs and to output, based on the second classifier inputs, a color of the one or more objects; and a third classifier to receive the vector of image features and the second portion of the pose of the one or more objects as third classifier inputs and to output, based on the third classifier inputs, a type of the one or more objects.

6. The system of claim 1, wherein the one or more objects comprise a vehicle.

7. The system of claim 6, the one or more processors further to compare an identified vehicle to a previously identified vehicle to determine a comparison therebetween, and to store the comparison on a server.

8. One or more processors, comprising:

circuitry to use one or more neural networks to identify one or more features of one or more objects within one or more first images, and to indicate whether the one or more objects appear within one or more second images, based, at least in part, on pose of the one or more objects and the one or more identified features, wherein the circuitry is to identify the one or more objects using:

a first neural network to receive as input of the one or more first images of the one or more objects and to output, based on the input of the one or more first images, the pose of the one or more objects and the one or more features of the one or more objects; and a second neural network to receive as inputs the one or more first images of the one or more objects, the one or more features, and the pose of the one or more objects, and to identify the one or more objects based on the inputs of the second neural network.

9. The one or more processors of claim 8, wherein the pose of the one or more objects comprises at least one of a location of a portion of the one or more objects, or a likelihood of the location.

10. The one or more processors of claim 8, wherein the one or more identified features comprises at least one of a color of the one or more objects, or a type of the one or more objects.

11. The one or more processors of claim 8, wherein the one or more neural networks further comprise:

a feature learning network to receive the one or more first images of the one or more objects and a first portion of the pose of the one or more objects as feature learning network inputs and to output, based on the feature learning network inputs, a vector of image features; and a classifier to receive the vector of image features and a second portion of the pose of the one or more objects as classifier inputs and to output, based on the classifier inputs, an identification of the one or more objects.

12. The one or more processors of claim 11, wherein the classifier is a first classifier, and wherein the one or more neural networks further comprise:

a second classifier to receive the vector of image features and the second portion of the pose of the one or more objects as second classifier inputs and to output, based on the second classifier inputs, a color of the one or more objects; and a third classifier to receive the vector of image features and the second portion of the pose of the one or more objects as third classifier inputs and to output, based on the third classifier inputs, a type of the one or more objects.

13. The one or more processors of claim 8, wherein the one or more objects are one or more vehicles.

14. The one or more processors of claim 13, the circuitry is further to compare an identified vehicle to a previously identified vehicle to determine a comparison therebetween, and to store the comparison on a server.

15. A system comprising:

one or more circuits to train one or more neural networks to identify one or more features of one or more objects within one or more first images, and to indicate whether the one or more objects appear within one or more second images, based, at least in part, on pose of the one or more objects and the one or more identified features, wherein the training comprises:

identifying colors of the one or more objects based, at least in part, on the one or more identified features of the one or more objects; and identify the one or more objects according to a loss function of the one or more objects and a loss function of the identified colors.

16. The system of claim 15, wherein the loss function of the one or more objects comprises a hard-mining triplet loss of the one or more objects and a cross-entropy loss of the one or more objects, and the loss function of the identified colors comprises a cross-entropy loss of the identified colors.

17. The system of claim 15, wherein:

the one or more objects includes visible properties; and training the one or more neural networks includes identifying types of the one or more objects based, at least in part, on the pose of the one or more objects.

18. The system of claim 17, wherein the training further comprises training the one or more neural networks to identify the one or more objects according to a loss function of the one or more objects and a loss function of the identified types.

19. The system of claim 18, wherein the loss function of the one or more objects comprises a hard-mining triplet loss of the one or more objects and a cross-entropy loss of the one or more objects, and the loss function of the identified types comprises a cross-entropy loss of the identified types.

20. One or more processors, comprising:

circuitry to generate parameters corresponding to one or more neural networks to identify one or more features of one or more objects within one or more first images, and to indicate whether the one or more objects appear within one or more second images based, at least in part, on pose of the one or more objects and the one or more identified features, wherein the generating further comprises generating the parameters according to a loss function of the one or more objects and a loss function of the colors, the loss function of the one or more objects comprises a hard-mining triplet loss of the one or more objects and a cross-entropy loss of the one or more objects, and the loss function of the colors comprises a cross-entropy loss of the colors.

21. The one or more processors, of claim 20, wherein:

the one or more neural networks indicate whether one or more objects within one or more first images appear within one or more second images is based on the pose and color of the one or more objects.

22. The one or more processors, of claim 20, wherein:

the pose comprises one or more visible properties.

23. The one or more processors, of claim 22, wherein the generating further comprises generating the parameters according to a loss function of the one or more objects and a loss function of types of the one or more objects.

24. The one or more processors, of claim 23, wherein the loss function of the one or more objects comprises a hard-mining triplet loss of the one or more objects and a cross-entropy loss of the one or more objects, and the loss function of the types comprises a cross-entropy loss of the types.

25. A system comprising:

one or more circuits to use one or more neural networks to identify one or more features of one or more objects within one or more first images, and to indicate whether the one or more objects appear within one or more second images based, at least in part, on pose of the one or more objects and the one or more identified features, wherein the one or more neural networks further comprise:

a first neural network to receive as input the one or more first images of the one or more objects and to output, based on the input of the one or more first images, the pose of the one or more objects and the one or more features of the one or more objects; and a second neural network to receive as inputs the one or more first images of the one or more objects and the pose of the one or more objects and the one or more features of the one or more objects, and to identify the one or more objects based on the inputs of the second neural network.

26. The system of claim 25, wherein the one or more objects are detected by one or more motion activated cameras.

27. The system of claim 25, wherein the one or more objects are detected by one or more video cameras.

28. The system of claim 25, wherein the one or more objects are one or more vehicles.

29. The system of claim 28, the one or more circuits further to compare an identified one of the one or more vehicles to a previously identified one of the one or more vehicles to determine one or more comparisons therebetween.

30. The system of claim 29, the one or more circuits further to transmit the one or more comparisons for storage at a server.

31. A method, comprising: using one or more neural networks to identify one or more features of one or more objects within one or more first images, and to indicate whether the one or more objects appear within one or more second images based, at least in part, on pose of the one or more objects and the one or more identified features, wherein the using one or more neural networks further comprises:

using a first neural network to generate, based on an input of the one or more first images, the pose of the one or more objects; and using a second neural network to generate, based on the one or more first images of the one or more objects and the pose of the one or more objects, an identification of the one or more objects.

32. The method of claim 31, wherein the pose of the one or more objects comprises at least one of a location of a portion of the one or more objects, or a likelihood of the location.

33. The method of claim 31, wherein the one or more identified features of the one or more objects comprise at least one of a color of the one or more objects, or a type of the one or more objects.

34. The method of claim 31, further comprising receiving the one or more first images of the one or more objects, wherein the using one or more neural networks further comprises:

using a feature learning network to generate, based on the one or more first images and a first portion of the pose of the one or more objects, a vector of image features; and using a classifier to generate, based on the vector of image features and a second portion of the pose of the one or more objects, an identification of the one or more objects.

35. The method of claim 34, wherein the classifier is a first classifier, and wherein the using one or more neural networks further comprises:

using a second classifier to generate, based on the vector of image features and the second portion of the pose of the one or more objects, a color of the one or more objects; and using a third classifier to generate, based on the vector of image features and the second portion of the pose of the one or more objects, a type of the one or more objects.

36. The method of claim 31, wherein the one or more objects are one or more vehicles.

37. The method of claim 36, further comprising comparing an identified one of the one or more vehicles to a previously identified one of the one or more vehicles to determine a comparison therebetween, and to store the comparison on a server.

* * * * *